(12) United States Patent
Hurst

(10) Patent No.: US 10,088,849 B2
(45) Date of Patent: Oct. 2, 2018

(54) FLUID ACTIVATED FLOW CONTROL APPARATUS

(71) Applicant: Colt Irrigation, LLC, Goleta, CA (US)

(72) Inventor: James Walter Hurst, Goleta, CA (US)

(73) Assignee: Colt Irrigation, LLC, Goleta, CA (US)

( * ) Notice: Subject to any disclaimer, the term of this patent is extended or adjusted under 35 U.S.C. 154(b) by 0 days.

(21) Appl. No.: 15/075,663

(22) Filed: Mar. 21, 2016

(65) Prior Publication Data
US 2016/0202708 A1    Jul. 14, 2016

Related U.S. Application Data

(63) Continuation-in-part of application No. 14/599,356, filed on Jan. 16, 2015, now Pat. No. 9,599,286.
(Continued)

(51) Int. Cl.
*F16K 31/06* (2006.01)
*G05D 7/06* (2006.01)
(Continued)

(52) U.S. Cl.
CPC .......... *G05D 7/0641* (2013.01); *F16K 1/221* (2013.01); *F16K 7/17* (2013.01); *F16K 11/0712* (2013.01); *F16K 31/0613* (2013.01); *F16K 31/124* (2013.01); *F16K 31/128* (2013.01); *F16K 31/365* (2013.01); *F16K 31/385* (2013.01); *F17D 3/00* (2013.01); *G05D 16/202* (2013.01); *A01G 25/00* (2013.01); *Y10T 137/0318* (2015.04); *Y10T 137/8671* (2015.04); *Y10T 137/87772* (2015.04)

(58) Field of Classification Search
CPC ......... Y10T 137/8671; Y10T 137/8667; Y10T 137/86606; Y10T 137/86614; Y10T 137/87209; Y10T 137/86622; F16K 31/124; F16K 31/128; F16K 31/42; F16K 31/423
See application file for complete search history.

(56) References Cited

U.S. PATENT DOCUMENTS

| 981,271 A | 1/1911 | Hutchins |
| 1,590,558 A | 6/1926 | Stenhouse |

(Continued)

FOREIGN PATENT DOCUMENTS

| EP | 2 687 763 A1 | 1/2014 |
| GB | 1 491 779 | 11/1977 |

(Continued)

OTHER PUBLICATIONS

4000 Series Indexing Valves from http://web.archive.org/web/20060312222240/http://www.krain.com/index.cfm?fuseaction=Indexingvlvs.4000series&CFID=28203112&CFTOKEN=85029057, Mar. 12, 2006.
(Continued)

*Primary Examiner* — Matthew W Jellett
(74) *Attorney, Agent, or Firm* — Knobbe, Martens, Olson & Bear LLP

(57) ABSTRACT

Embodiments of a fluid flow regulating device and methods of using the same are described. Certain embodiments manages fluid flow between one or more input ports and output ports at least partly in response to fluid pressure changes and/or by a mechanism driven by fluid flow, optionally without using electrical power.

2 Claims, 144 Drawing Sheets

Related U.S. Application Data

(60) Provisional application No. 61/930,866, filed on Jan. 23, 2014, provisional application No. 62/087,186, filed on Dec. 3, 2014, provisional application No. 62/139,526, filed on Mar. 27, 2015.

(51) Int. Cl.

| | |
|---|---|
| *G05D 16/20* | (2006.01) |
| *F16K 11/07* | (2006.01) |
| *F16K 31/124* | (2006.01) |
| *F16K 31/128* | (2006.01) |
| *F16K 31/365* | (2006.01) |
| *F16K 31/385* | (2006.01) |
| *F17D 3/00* | (2006.01) |
| *F16K 1/22* | (2006.01) |
| *F16K 7/17* | (2006.01) |
| *A01G 25/00* | (2006.01) |

(56) References Cited

U.S. PATENT DOCUMENTS

| | | |
|---|---|---|
| 1,606,245 A | 11/1926 | Lang |
| 1,704,374 A | 3/1929 | Stewart et al. |
| 1,812,586 A | 6/1931 | Elder |
| 1,826,450 A | 10/1931 | Bragg et al. |
| 1,859,357 A | 5/1932 | Elder |
| 1,901,496 A | 3/1933 | Elder |
| 2,059,126 A | 10/1936 | Malthaner |
| 2,311,108 A | 2/1943 | Hauser |
| 2,341,041 A | 2/1944 | Hauser |
| 2,389,817 A | 11/1945 | Rider |
| 2,404,514 A * | 7/1946 | McClure ............ F16K 31/0693 137/596.17 |
| 2,418,794 A | 4/1947 | Severson |
| 2,533,960 A | 12/1950 | Rothschild |
| 2,591,216 A | 4/1952 | Thompson et al. |
| 2,619,105 A | 11/1952 | Hauswer |
| 2,625,429 A | 1/1953 | Coles |
| 2,641,280 A | 6/1953 | Fleischhauer |
| 2,642,076 A | 6/1953 | Tigert et al. |
| 2,678,662 A | 5/1954 | Boteler |
| 2,744,541 A | 5/1956 | Fleischhauer |
| 2,749,080 A | 6/1956 | Griswold |
| 2,771,905 A | 11/1956 | Griswold |
| 2,784,648 A | 3/1957 | Zelewsky |
| 2,837,241 A | 6/1958 | Griswold |
| 2,844,167 A | 7/1958 | Griswold |
| 2,861,301 A | 11/1958 | Haberlin |
| 2,880,757 A | 4/1959 | Campbell |
| 2,919,590 A | 1/1960 | Griswold |
| 2,921,629 A | 1/1960 | Stout |
| 2,931,233 A | 4/1960 | Griswold |
| 2,944,565 A | 7/1960 | Dahl |
| 2,986,167 A | 5/1961 | Griswold |
| 2,991,796 A | 7/1961 | Griswold |
| 3,003,514 A | 10/1961 | Furlong |
| 3,018,788 A | 1/1962 | Perlis |
| 3,042,074 A | 7/1962 | Graybill |
| 3,103,339 A | 9/1963 | Rose |
| 3,105,518 A | 10/1963 | Kunz |
| 3,108,609 A | 10/1963 | Schroder |
| 3,125,112 A | 3/1964 | Maurice |
| 3,147,770 A | 9/1964 | Perlis |
| 3,181,551 A | 5/1965 | Coletti |
| 3,204,872 A | 9/1965 | Whear |
| 3,217,653 A | 11/1965 | Griswold |
| 3,224,458 A | 12/1965 | Davis |
| 3,226,909 A | 1/1966 | Zelewsky et al. |
| 3,232,317 A | 2/1966 | Fowler |
| 3,241,569 A | 3/1966 | Sully et al. |
| 3,252,285 A | 5/1966 | Krautwurst et al. |
| 3,256,909 A | 6/1966 | Obidniak et al. |
| 3,278,424 A | 10/1966 | Griswold |
| 3,303,755 A | 2/1967 | Linker et al. |
| 3,335,756 A | 8/1967 | McPherson |
| 3,336,843 A | 8/1967 | Griswold |
| 3,344,809 A | 10/1967 | Smith |
| 3,367,621 A | 2/1968 | Griswold |
| 3,369,565 A | 2/1968 | Haggard, Jr. |
| 3,402,890 A | 9/1968 | Heitzman |
| 3,405,733 A | 10/1968 | Hansen |
| 3,420,270 A | 1/1969 | Neyer |
| 3,422,847 A | 1/1969 | Polizzi |
| 3,431,933 A | 3/1969 | Tidd |
| 3,454,048 A | 7/1969 | Van Der Veer |
| 3,478,780 A | 11/1969 | Gheen |
| 3,480,034 A | 11/1969 | Jerome |
| 3,512,543 A | 5/1970 | Kubik |
| 3,519,016 A | 7/1970 | Kah et al. |
| 3,524,470 A | 8/1970 | Kah et al. |
| 3,540,213 A | 11/1970 | Johnston et al. |
| 3,604,456 A | 9/1971 | Jones |
| 3,635,237 A | 1/1972 | Kah et al. |
| 3,730,208 A | 5/1973 | Lewis |
| 3,735,722 A | 5/1973 | Hunter et al. |
| 3,747,620 A | 7/1973 | Kah, Jr. |
| 3,752,184 A | 8/1973 | Griswold |
| 3,779,269 A | 12/1973 | Gould |
| 3,785,391 A | 1/1974 | Miller |
| 3,791,619 A | 2/1974 | Pelt |
| 3,797,740 A | 3/1974 | Kah et al. |
| 3,838,046 A | 9/1974 | Hunter |
| 3,845,777 A | 11/1974 | Gilson |
| 3,853,145 A | 12/1974 | Judd |
| 3,867,961 A | 2/1975 | Rudelick |
| 3,870,274 A | 3/1975 | Broe |
| 3,888,143 A | 6/1975 | Kolehmainen et al. |
| 3,938,426 A | 2/1976 | Hunter et al. |
| 3,948,285 A | 4/1976 | Flynn |
| 3,967,808 A | 7/1976 | Lieding |
| 3,989,066 A | 11/1976 | Sturman et al. |
| 4,022,239 A | 5/1977 | Schwindt et al. |
| RE29,252 E | 6/1977 | Miller |
| 4,029,119 A | 6/1977 | Klieves |
| 4,034,775 A | 7/1977 | Slagel |
| 4,051,767 A | 10/1977 | Landsberg |
| 4,067,541 A | 1/1978 | Hunter |
| 4,077,424 A | 3/1978 | Ehret et al. |
| 4,105,186 A | 8/1978 | Eby |
| 4,125,124 A | 11/1978 | Kah |
| 4,135,696 A | 1/1979 | Saarem et al. |
| 4,150,685 A | 4/1979 | Van Haaften |
| 4,176,687 A * | 12/1979 | Ensign ............ F16K 11/044 137/625.27 |
| 4,178,954 A | 12/1979 | Klieves |
| 4,180,236 A | 12/1979 | Saarem et al. |
| 4,189,792 A | 2/1980 | Veach |
| 4,199,130 A | 4/1980 | Stoll et al. |
| 4,203,459 A | 5/1980 | Boschung |
| 4,210,169 A | 7/1980 | Palma |
| 4,212,320 A | 7/1980 | Stoll et al. |
| 4,235,254 A | 11/1980 | Kirby |
| 4,253,494 A | 3/1981 | Cooke |
| 4,312,379 A | 1/1982 | Kinder |
| 4,313,455 A | 2/1982 | Pitman |
| 4,316,480 A | 2/1982 | Kah, Jr. |
| 4,323,194 A | 4/1982 | Newbold et al. |
| 4,330,003 A | 5/1982 | D'Alonzo |
| 4,342,424 A | 8/1982 | Meyer et al. |
| 4,353,386 A | 10/1982 | Slagel |
| 4,398,562 A | 8/1983 | Saarem et al. |
| 4,407,451 A | 10/1983 | Hunter |
| 4,452,272 A | 6/1984 | Griswold |
| 4,492,247 A | 1/1985 | Lockwood |
| 4,496,103 A | 1/1985 | Pitchford |
| 4,502,506 A | 3/1985 | Fisher |
| 4,505,450 A | 3/1985 | Saarem et al. |
| 4,523,606 A | 6/1985 | Gould et al. |
| 4,526,198 A | 7/1985 | Scott |
| 4,537,356 A | 8/1985 | Lawson |
| 4,565,235 A | 1/1986 | Fischer et al. |
| 4,585,027 A | 4/1986 | Stillions |
| 4,592,379 A | 6/1986 | Goettl |

(56) References Cited

U.S. PATENT DOCUMENTS

| | | | |
|---|---|---|---|
| 4,611,617 A | 9/1986 | Hewitt | |
| 4,617,992 A | 10/1986 | Abel | |
| 4,647,003 A | 3/1987 | Hilpert et al. | |
| 4,671,485 A | 6/1987 | Saarem et al. | |
| 4,676,264 A | 6/1987 | Wiseman | |
| 4,708,264 A | 11/1987 | Bruninga | |
| D295,280 S | 4/1988 | Walser | |
| 4,744,285 A | 5/1988 | Presley | |
| 4,796,657 A | 1/1989 | Baker | |
| 4,809,910 A | 3/1989 | Meyer | |
| 4,817,661 A | 4/1989 | Howeth | |
| 4,838,485 A | 6/1989 | Rinkewich | |
| 4,852,802 A | 8/1989 | Iggulden | |
| 4,911,401 A | 3/1990 | Holcomb et al. | |
| 4,921,002 A | 5/1990 | Christon et al. | |
| 4,961,538 A | 10/1990 | Hewitt | |
| 5,022,426 A | 6/1991 | Fischer | |
| 5,031,875 A | 7/1991 | Zimmerman | |
| 5,082,015 A | 1/1992 | Baker | |
| 5,082,022 A | 1/1992 | Boundy | |
| 5,100,056 A | 3/1992 | Theodorsen et al. | |
| 5,104,090 A | 4/1992 | Grizzle et al. | |
| 5,118,072 A | 6/1992 | Sakamoto et al. | |
| 5,129,620 A | 7/1992 | Castetter | |
| 5,158,475 A | 10/1992 | Tyler | |
| 5,170,144 A | 12/1992 | Nielsen | |
| 5,205,539 A | 4/1993 | Schalk | |
| 5,207,354 A | 5/1993 | Hsu et al. | |
| 5,213,124 A | 5/1993 | Costa | |
| 5,230,366 A | 7/1993 | Marandi | |
| 5,259,554 A | 11/1993 | Ewing et al. | |
| 5,263,680 A * | 11/1993 | Laux | F15B 13/0402 137/625.65 |
| 5,263,681 A * | 11/1993 | Laux | F15B 13/0402 137/625.65 |
| 5,263,685 A | 11/1993 | Winnike et al. | |
| 5,299,774 A | 4/1994 | Arneson et al. | |
| 5,301,710 A | 4/1994 | Marandi | |
| 5,301,919 A | 4/1994 | May | |
| 5,328,149 A | 7/1994 | Reuter | |
| 5,335,688 A | 8/1994 | Caviar | |
| 5,406,974 A | 4/1995 | Griswold | |
| 5,427,350 A | 6/1995 | Rinkewich | |
| 5,433,243 A | 7/1995 | Griswold et al. | |
| 5,445,182 A | 8/1995 | Sturman et al. | |
| 5,460,076 A | 10/1995 | Pierce et al. | |
| 5,487,409 A | 1/1996 | Stoll | |
| 5,535,987 A | 7/1996 | Wlodarczyk | |
| 5,636,652 A * | 6/1997 | Toschi | B66B 1/24 137/1 |
| 5,647,397 A | 7/1997 | Heiniger et al. | |
| 5,649,562 A | 7/1997 | Sturman et al. | |
| 5,682,918 A | 11/1997 | Stoll et al. | |
| 5,685,336 A | 11/1997 | Heiniger | |
| 5,706,855 A | 1/1998 | Heiniger | |
| 5,711,486 A | 1/1998 | Clark et al. | |
| 5,746,058 A | 5/1998 | Vertanen | |
| 5,762,092 A | 6/1998 | Yang | |
| 5,762,270 A | 6/1998 | Kearby | |
| 5,796,008 A | 8/1998 | Stoll et al. | |
| 5,806,556 A | 9/1998 | Johnson | |
| 5,823,505 A | 10/1998 | Stoll et al. | |
| 5,853,026 A | 12/1998 | Wlodarczyk et al. | |
| 5,879,559 A | 3/1999 | Schreiner et al. | |
| 6,007,045 A | 12/1999 | Heiniger et al. | |
| 6,050,286 A | 4/2000 | Kruer et al. | |
| 6,059,259 A | 5/2000 | Gregoire et al. | |
| 6,082,703 A | 7/2000 | Fava et al. | |
| 6,102,362 A | 8/2000 | Gerber | |
| 6,126,141 A | 10/2000 | Geiger | |
| 6,182,941 B1 | 2/2001 | Scheuerenbrand et al. | |
| 6,220,293 B1 | 4/2001 | Rashidi et al. | |
| 6,227,455 B1 | 5/2001 | Scott et al. | |
| 6,241,158 B1 | 6/2001 | Clark et al. | |
| 6,257,264 B1 | 7/2001 | Sturman et al. | |
| D449,872 S | 10/2001 | Lohde et al. | |
| 6,298,872 B1 | 10/2001 | Keller et al. | |
| 6,299,075 B1 | 10/2001 | Koller et al. | |
| 6,311,728 B1 | 11/2001 | Goettl | |
| 6,314,999 B1 | 11/2001 | Conn | |
| 6,325,087 B1 | 12/2001 | Tarr | |
| 6,360,767 B1 | 3/2002 | Barnes | |
| 6,386,232 B2 | 5/2002 | Serrano Sanchez et al. | |
| 6,394,126 B2 | 5/2002 | Lohde et al. | |
| 6,394,412 B2 | 5/2002 | Zakai et al. | |
| 6,397,687 B1 | 6/2002 | Garmas | |
| 6,416,033 B1 | 7/2002 | McKell et al. | |
| 6,484,754 B1 | 11/2002 | Muth et al. | |
| 6,491,235 B1 | 12/2002 | Scott et al. | |
| 6,499,509 B2 | 12/2002 | Berger et al. | |
| 6,539,967 B2 | 4/2003 | Tarr | |
| 6,547,214 B2 | 4/2003 | Gregoire | |
| 6,612,335 B1 | 9/2003 | Assa et al. | |
| 6,622,933 B1 | 9/2003 | Young et al. | |
| 6,663,078 B1 | 12/2003 | Stoll et al. | |
| 6,679,053 B2 | 1/2004 | Priese | |
| 6,708,715 B2 | 3/2004 | Duebel et al. | |
| 6,748,970 B2 | 6/2004 | Keller | |
| 6,749,136 B1 | 6/2004 | Wilson et al. | |
| 6,837,271 B1 | 1/2005 | Saint | |
| 6,860,469 B2 | 3/2005 | Kerg et al. | |
| 6,874,756 B2 | 4/2005 | Hawkins et al. | |
| 6,877,714 B2 | 4/2005 | Hall | |
| 6,889,922 B1 | 5/2005 | Knight et al. | |
| 6,948,697 B2 | 9/2005 | Herbert et al. | |
| 6,986,500 B2 | 1/2006 | Giousouf et al. | |
| 7,007,916 B2 | 3/2006 | Lee | |
| 7,040,840 B2 | 5/2006 | Zook | |
| 7,156,322 B1 | 1/2007 | Heitzman | |
| 7,201,187 B2 | 4/2007 | Irwin et al. | |
| 7,252,032 B2 | 8/2007 | Scheffel et al. | |
| 7,303,147 B1 | 12/2007 | Danner et al. | |
| D559,955 S | 1/2008 | Donovan | |
| 7,343,845 B2 | 3/2008 | Wirtl et al. | |
| 7,392,824 B2 | 7/2008 | Bogdanowicz et al. | |
| 7,475,863 B2 | 1/2009 | Donovan | |
| 7,503,346 B1 | 3/2009 | Clark | |
| 7,503,348 B2 | 3/2009 | Irwin et al. | |
| 7,537,437 B2 | 5/2009 | Muramatsu et al. | |
| 7,552,906 B2 | 6/2009 | Irwin et al. | |
| 7,694,934 B2 | 4/2010 | Irwin | |
| D622,226 S | 8/2010 | Crist | |
| 7,789,052 B2 | 9/2010 | Ellison et al. | |
| 7,793,913 B2 | 9/2010 | Hara | |
| 7,806,382 B1 | 10/2010 | Palumbo et al. | |
| 7,826,931 B2 | 11/2010 | Lorenz | |
| 8,397,745 B2 | 3/2013 | Hurst | |
| 8,535,540 B2 | 9/2013 | Chandler, Jr. | |
| 8,651,141 B2 | 2/2014 | Giacomini et al. | |
| 8,733,672 B2 | 5/2014 | Nations | |
| 8,746,591 B2 | 6/2014 | Lichte et al. | |
| 2002/0003042 A1 | 1/2002 | Reilly | |
| 2003/0030021 A1 | 2/2003 | Hawkins et al. | |
| 2005/0109400 A1 | 5/2005 | Glime et al. | |
| 2005/0139061 A1 | 6/2005 | Timko et al. | |
| 2005/0199292 A1 | 9/2005 | Stedman et al. | |
| 2005/0230650 A1 | 10/2005 | Peterson | |
| 2007/0187634 A1 * | 8/2007 | Sneh | F16K 7/14 251/30.01 |
| 2007/0199600 A1 | 8/2007 | Irwin et al. | |
| 2008/0029722 A1 | 2/2008 | Irwin | |
| 2009/0126801 A1 | 5/2009 | Grill et al. | |
| 2010/0024414 A1 | 2/2010 | Hittle et al. | |
| 2010/0072410 A1 | 3/2010 | Lacasse et al. | |
| 2010/0161144 A1 | 6/2010 | Crist | |
| 2010/0163765 A1 | 7/2010 | Gregoire | |
| 2010/0276011 A1 | 11/2010 | Spitzer | |
| 2011/0015794 A1 | 1/2011 | Lorenz | |
| 2011/0248104 A1 | 10/2011 | Malsam | |
| 2011/0284790 A1 | 11/2011 | Ikeda et al. | |
| 2011/0308619 A1 | 12/2011 | Martino et al. | |
| 2011/0309274 A1 | 12/2011 | Parsons et al. | |

(56) References Cited

U.S. PATENT DOCUMENTS

2013/0180599 A1    7/2013  Hurst
2013/0206242 A1    8/2013  Hurst
2014/0217315 A1    8/2014  Morozumi et al.

FOREIGN PATENT DOCUMENTS

WO    WO 2012124349 A1    9/2012
WO    WO 2013/169511       11/2013

OTHER PUBLICATIONS

Dorot matholding group article on *Irrigation—Hydraulic remote control—Principles and assembly schemes*, downloaded from http://www.dorot.com/index.php?page_id=820, on Jan. 22, 2015, © Dorot 2015 (4 pp).
GEMÜ® product description brochure for Diaphragm Valve, Plastic, Model 693, © Sep. 2014 by GEMÜ Gebr.Müller—Apparatebau GmbH & Co. KT, Ingelfingen-Criesbach, Germany (9 pp).
Humpherys et al., Momentarily-Energized Pilot Valves for Irrigation Systems, *Transactions of the ASAE* (American Society of Agricultural Engineers, St. Joseph, Michigan), pp. 1471-1475, vol. 26, No. 5.
International Search Report and Written Option regarding PCT/US2013/038613, dated Apr. 29, 2013.
Pohjakas, K., Development of Automated Surface Irrigation, Canadian Agricultural Engineering, pp. 72-74, vol. 14, No. 2, Dec. 1972.

\* cited by examiner

Diaphragm Valve in On Position

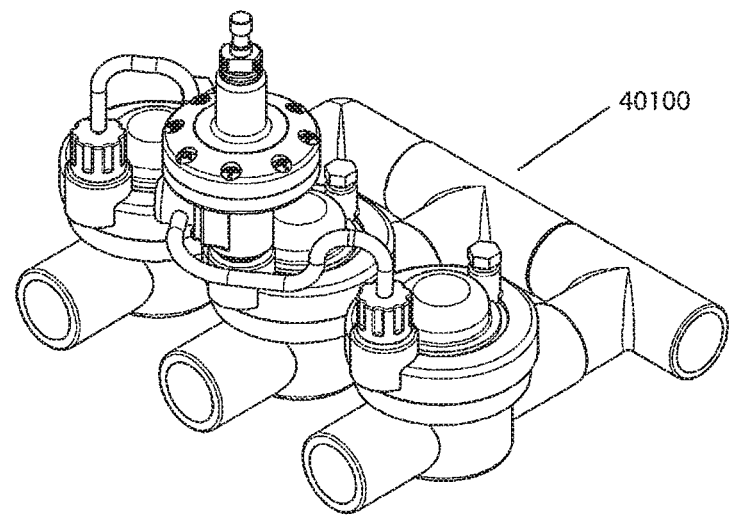
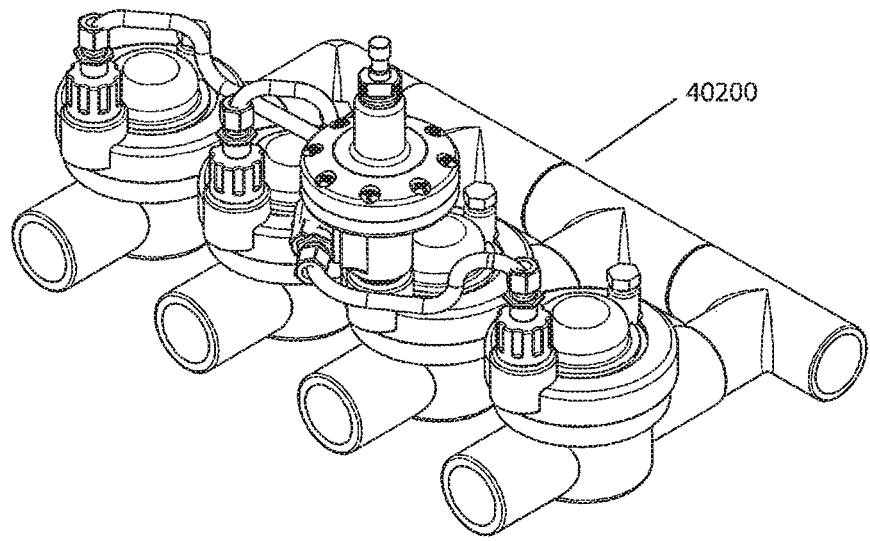
Fig. 40

Actuator with Dampening
Unit Installed

Actuator with Dampening Unit Installed with Pressure Release Unit

Butterfly Valve Cros-Section View

2 Step Drive Wheel

4 Step Assembly Section View

4 Step Drive Wheel

| State | Electro Mechanical Devices Status | | | | | | FluidPulse Pilot Valve Status | | |
|---|---|---|---|---|---|---|---|---|---|
| | Control SW1 | Relay SW2 | Limit Switch SW3 | Limit Switch SW4 | Cam Lobe Engaged | Motor | FluidPulse Shaft Motion | Bleed Port | In Port |
| 1 Shown in schematic | Closed | Open | Closed | Open | 1 or 2 | Off | Fixed | Open | Closed |
| 2 | Open | Closed | Closed | Closed | none | Running | Rotating 90 Deg. | Closing | Opening |
| 3 | Open | Closed | Open | Closed | 3 or 4 | Off | Fixed | Closed | Open |
| 4 | Closed | Open | Closed | Closed | none | Running | Rotating 90 Deg. | Opening | Closing |
| 5 | All parameters same as state 1. Cycle repeats for all subsequent control switch commands. | | | | | | | | |

Fig. 117

Single Pole Double Throw Signal Sequence Table
FluidPulse Switch

| State | Electrical Control Sequence ||| Fluid Valve Port Sequence |||
| | Control SW 1 | Limit Switch SW2 (spdt) | Motor, Uni-Directional | Cam & Switch Status | FluidPulse Shaft Motion | Bleed Port | In Port |
|---|---|---|---|---|---|---|---|
| 1 Shown in schematic | a and b closed a and c open | d and e closed d and f open | Running | Lobe 1 Engaged | Rotating 90 Deg. | Opening | Closing |
| 2 | a and b closed a and c open | d and e open d and f closed | Off | Lobe 1 Disengaged | Stationary | Open | Closed |
| 3 | a and b open a and c closed | d and f closed d and e open | Running | Lobe 2 Engaged | Rotating 90 Deg. | Closing | Opening |
| 4 | a and b open a and c closed | d and f open d and e closed | Off | Lobe 2 Disengaged | Stationary | Closed | Open |
| 5 | Continual Repeat of Sequence 1 through 4 |||||||

Figure 125

On / Off Sequence Table
FluidPulse Switch

| | Electrical Control Sequence | | | | | Fluid Valve Port Sequence | | |
|---|---|---|---|---|---|---|---|---|
| State | Control SW 11 | Relay SW 22 (dpdt) | Limit Switch SW33 (spdt) | Motor | Cam & Switch Status | FluidPulse Shaft Motion | Bleed Port | In Port |
| 1 Shown in schematic | a2 and b2 open | c2 and d2 closed g2 and h2 open | i2 and j2 closed i2 and k2 open | Running | Lobe 1 Engaged | Rotating 90 Deg. | Opening | Closing |
| 2 | a2 and b2 open | c2 and d2 closed g2 and h2 open | i2 and j2 open i2 and k2 closed | Off | Lobe 1 Disengaged | Stationary | Open | Closed |
| 3 | a2 and b2 closed | c2 and d2 open g2 and h2 closed | i2 and j2 open i2 and k2 closed | Running | Lobe 2 Engaged | Rotating 90 Deg. | Closing | Opening |
| 4 | a2 and b2 closed | c2 and d2 open g2 and h2 closed | i2 and j2 closed i2 and k2 open | Off | Lobe 2 Disengaged | Stationary | Closed | Open |
| 5 | Repeat of sequence 1 | | | | | | | |

Figure 126

Single Pole Double Throw Signal Sequence Table
FluidPulse Switch

| State | Electrical Control Sequence ||||| Fluid Valve Port Sequence |||
|---|---|---|---|---|---|---|---|---|
| | Control SW 111 | Relay Switch SW 222 (spdt) | Limit Switch SW333 (spdt) | Motor, Uni-Directional | Cam & Switch Status | FluidPulse Shaft Motion | Bleed Port | In Port |
| 1 Shown in schematic | ZAa and ZAb closed | ZAc and ZAd closed ZAc and ZAe open | ZAg and ZAh closed ZAf and ZAh open | Running | Lobe 1 Engaged | Rotating 90 Deg. | Opening | Closing |
| 2 | ZAa and ZAb closed | ZAc and ZAd closed ZAc and ZAe open | ZAg and ZAh open ZAf and ZAh closed | Off | Lobe 1 Disengaged | Stationary | Open | Closed |
| 3 | ZAa and ZAb open | ZAc and ZAe closed ZAc and ZAd open | ZAf and ZAh closed ZAg and ZAh open | Running | Lobe 2 Engaged | Rotating 90 Deg. | Closing | Opening |
| 4 | ZAa and ZAb open | ZAc and ZAe closed ZAc and ZAd open | ZAf and ZAh open ZAg and ZAh closed | Off | Lobe 2 Disengaged | Stationary | Closed | Open |
| 5 | Repeat of sequence 1 through 4 | | | | | | | |

Figure 131

Output Valve Closed State

Lower Chamber Completely Filled Resulting in Pilot Shaft Port Alignment that Closes Valve Valve Open State

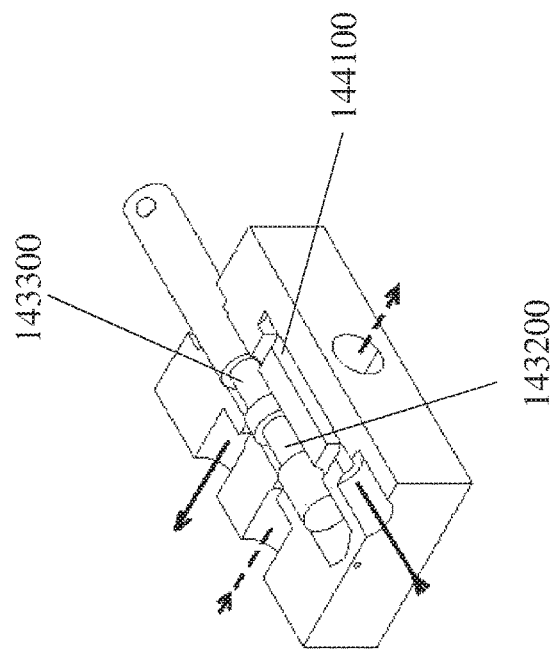
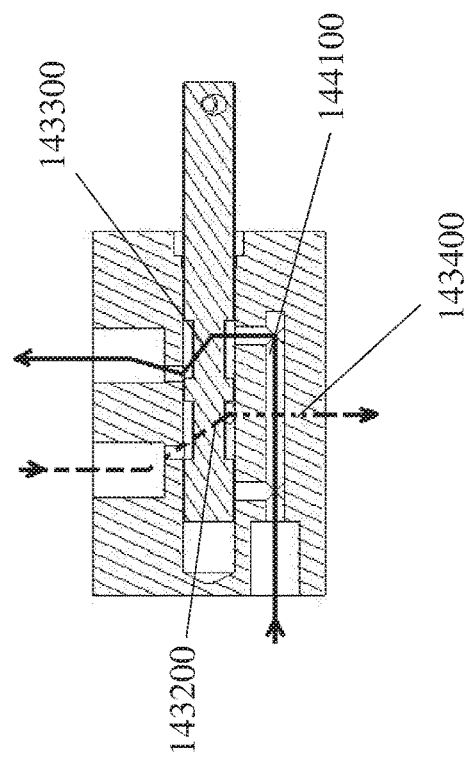
Figure 144

FLUID ACTIVATED FLOW CONTROL APPARATUS

FIELD OF THE INVENTION

This invention relates generally to devices and methods for regulating fluid flow and in particular, to pressure sensitive flow control apparatus and methods for using the same.

BACKGROUND OF THE INVENTION

Agricultural, commercial, and domestic irrigation systems are commonly constructed of fixed piping that depend on a single source for delivery of water to the entire system. The flow in a given pipeline is limited by its length, diameter, internal surface condition, and fluid pressure. Thus, for any single fluid source the flow in a pipeline is not expandable beyond a given length or number of fluid delivery terminals such as a sprinkler head. Thus, expansion of fluid delivery coverage is difficult, costly, and commonly involves addition of additional source controls and pipe.

Adding new pipe runs has the added difficulty of requiring costly trenching and cutting or circumventing pavement such as sidewalks, roads, driveways, and patios. More importantly, should all the control circuits be utilized in the existing system, expansion will require addition of a new or additional timing mechanism further increasing the cost, maintenance, and difficulty of operating the system.

Further, installation of long piping runs with more than one flow control valve involves installation of long electrical runs to service solenoids that may be distant from the electrical source. This adds significantly to the cost of expanding an existing irrigation system and results in increased maintenance needs.

Current irrigation systems switch between multiple irrigation runs by using an electronic clock system that signals solenoids placed on remote valves to activate or shut off water flow through each respective valve. This system organization requires installation of electrical cables from the clock system to each solenoid valve. Thus, both flow control and a timer control mechanisms are required to distribute a single source of water through a system of lines. This multiple control system is costly to purchase and install. Further, expansion of the existing system requires additional trenching to install new electric lines to regulate new valve systems.

Prior art solutions to the above problems employed various schemes that used an impeller driven rotating plate with an orifice or cam that sequentially opened radially positioned ports. Such a device is illustrated in U.S. Pat. No. 6,539,967, which is incorporated herein by reference in its entirety. These devices suffer from numerous drawbacks including water hammering due to slow activation or deactivation of the output valves and difficult or absent timing adjustment. Devices that provided timing adjustment required a difficult and awkward process of changing the cams within the mechanism, thus requiring shutting down the system and professional adjustment.

Installation of prior art water distribution systems requires replacing or removing existing valve systems and replacing them with a complicated control device. The complexity of the prior art control devices requires precise manufacturing standards to ensure functionality and results in increased cost of purchase, operation, and maintenance, thus, increasing warranty replacement costs and detrimentally affecting customer goodwill.

Thus, there exists a need for a fluid control device capable of expanding fluid delivery area in an existing system, utilizing an existing timing control or requiring no timing control, and is suitable for installation at a location distant from an electrical source.

SUMMARY OF THE INVENTION

Embodiments of a fluid flow control device are provided whereby a servo assembly is controlled by a pressure activated mechanism and/or a fluid flow mechanism. Optionally, the fluid flow control devices described in this specification require no electrical power to manage the flow of fluid through a one or more output valves (although a remote upstream controller, that controls fluid flowing to the fluid flow control devices, may be electrically powered).

An example fluid control device includes an inlet, an outlet, and an actuator configured to, (without utilizing an electrically powered component in certain embodiments), open a first valve to provide a fluid flow path between the inlet and outlet at least partly in response to a first flow of pressurized fluid received via the inlet, close the first valve to obstruct the fluid flow path between the inlet and outlet at least partly in response to an interruption of the first flow of pressurized or a reduction in the first flow pressure received via the inlet and a subsequent second flow (which may be in the form of an increase in pressure of the first flow) of pressurized fluid received via the inlet.

An example fluid control device may include a fluid inlet port, a fluid outlet port, a chamber configured to receive fluid via the fluid inlet port, wherein the chamber is configured to undergo a first increase in size in response to fluid pressurized to a first degree received via the fluid inlet port, and a mechanism configured to open a fluid passage between the fluid inlet port and the fluid outlet port at least partly in response to the first increase in size of the chamber, and close the fluid passage at least partly in response to a reduction in the chamber size resulting from the fluid being pressurized to a second degree, the second degree less than the first degree, and a subsequent second increase in size of the chamber. Optionally, the chamber includes at least one diaphragm, and the first increase in size results at least in part from an expansion/change in shape/dimension of the diaphragm.

An example device includes a pressure activated servo assembly with a diaphragm connected to a drive post. The drive post is positioned so that movement of the diaphragm translates to rotational motion of a cog wheel. The cog wheel is connected to a servo valve that has at least one valve shaft port that is capable of transmitting fluid between a plurality of tubes that are connected to the servo valve. The tubes are also connected to at least one output valve. Two output valves are controlled by one pressure activated mechanism. The use of the terms servo assembly, fluid active actuator, pressure activated servo assembly, etc., as described herein are used interchangeably, unless the surrounding context indicates otherwise.

A given embodiment may include some or all of the features, functionality, systems and methods described herein.

An example embodiment provides a method for managing fluid flow in an output valve without using electrical power, comprising: receiving at a fluid pressure controlled actuator a first input flow of pressurized fluid at an inlet fluid port wherein the fluid pressure controlled actuator is mounted in a receiving area associated with an output valve, the receiving area configured to receive an electrically powered solenoid, wherein the fluid pressure controlled actuator is not electrically powered; directing, by the fluid pressure controlled actuator, at least a portion of the first input flow of pressurized fluid into a diaphragm chamber of the fluid pressure controlled actuator wherein the first input flow of pressurized fluid causes a first expansion of a diaphragm within the diaphragm chamber of the fluid pressure controlled actuator; at least partly in response to the first diaphragm expansion, rotating a wheel and a shaft wherein the wheel interfaces with the shaft and wherein the shaft includes a shaft fluid port, wherein the rotation of the shaft opens a fluid passage through the shaft fluid port, wherein the fluid passage interfaces with the associated output valve and fluid passing through the shaft fluid port causes, at least in part, the associated output valve to actuate to a first position; receiving at the fluid pressure controlled actuator a pressure reduction of the first input flow of pressurized fluid; after the pressure reduction of the first input flow of pressurized fluid, receiving at the fluid pressure controlled actuator a second input flow of pressurized fluid; directing, by the fluid pressure controlled actuator, at least a portion of the second input flow of pressurized fluid into the diaphragm chamber of the fluid pressure controlled actuator wherein the second input flow of pressurized fluid causes a second expansion of the diaphragm within the diaphragm chamber of the fluid pressure controlled actuator; at least partly in response to the second diaphragm expansion, rotating the wheel and the shaft to obstruct the open fluid passage through the shaft fluid port and causing, at least in part, the associated output valve to actuate to a second position wherein the second position is spaced apart from the first position; and, optionally wherein the first position is an opened position or a closed position; and, optionally further comprising: maintaining the fluid passage in an open state during the reduction in pressure of the first input flow of pressurized fluid; and, optionally wherein the fluid passage is fluidly connected to a diaphragm port of the associated output valve; and, optionally wherein the associated output valve actuates to the first position and the second position without using electrical power; and, optionally wherein the wheel is a cog wheel with four or more attached posts; and, optionally wherein the diaphragm interfaces with the wheel, at least in part, using a leaf spring; and, optionally wherein the fluid is a gas; and, optionally wherein the fluid is a liquid; and, optionally wherein the fluid is water; and, optionally wherein the fluid pressure controlled actuator is used in a hydrocarbon-based fluid application; and, optionally wherein the first and second input flow of pressurized fluid is managed by an electronic controller associated with a master valve; and, optionally further comprising: a one or more user controls which disable the fluid pressure controlled actuator; and, optionally wherein the interface to the shaft is through one or more gears; and, optionally wherein the first and second input flow of pressurized fluid is managed by an electronic controller associated with a master valve and wherein a configurable mechanism ensures that the electronic controller does not release the second input flow of pressurized fluid until a configurable time period has elapsed; and, optionally wherein the fluid pressure controlled actuator includes an externally viewable indicator which enables a user to view the actuator state and infer the position of the associated output valve; and, optionally wherein the fluid pressure controlled actuator includes a manual actuate control; and, optionally wherein the fluid pressure controlled actuator includes an adjustment mechanism which allows a user to adjust the compression force of one or more return springs.

An example embodiment provides a method for managing fluid flow in an output valve without using electrical power, comprising: receiving at a fluid pressure controlled actuator a first input flow of pressurized fluid at an inlet fluid port wherein the fluid pressure controlled actuator is mounted in a receiving area associated with an output valve, the receiving area configured to receive an electrically powered solenoid, wherein the fluid pressure controlled actuator is not electrically powered; directing, by the fluid pressure controlled actuator, at least a portion of the first input flow of pressurized fluid into a diaphragm chamber of the fluid pressure controlled actuator wherein the first input flow of pressurized fluid causes a first expansion of a diaphragm within the diaphragm chamber of the fluid pressure controlled actuator; at least partly in response to the first diaphragm expansion, rotating a wheel and a shaft wherein the wheel interfaces with the shaft and wherein the shaft includes a two or more shaft fluid ports, wherein the rotation of the shaft opens a first fluid passage through a first shaft fluid port and closes a second fluid passage through a second shaft fluid port wherein the first fluid passage interfaces with the associated output valve and fluid passing through the shaft fluid port causes, at least in part, the associated output valve to actuate to a closed position; receiving at the fluid pressure controlled actuator a pressure reduction of the first input flow of pressurized fluid; after the pressure reduction of the first input flow of pressurized fluid, receiving at the fluid pressure controlled actuator a second input flow of pressurized fluid; directing, by the fluid pressure controlled actuator, at least a portion of the second input flow of pressurized fluid into the diaphragm chamber of the fluid pressure controlled actuator wherein the second input flow of pressurized fluid causes a second expansion of the diaphragm within the diaphragm chamber of the fluid pressure controlled actuator; at least partly in response to the second diaphragm expansion, rotating the wheel and the shaft wherein the rotation of the shaft obstructs the open first fluid passage through the first shaft fluid port and opens the second fluid passage through the second shaft fluid port wherein the second fluid passage interfaces with the associated output valve and fluid passing through the second shaft fluid port causes, at least in part, the associated output valve to actuate to an open position; and, optionally further comprising: maintaining the first fluid passage in an open state during the reduction in pressure of the first input flow of pressurized fluid; and, optionally wherein the first fluid passage is fluidly connected to a diaphragm port of the associated output valve; and, optionally wherein the second fluid passage is fluidly connected to a diaphragm port of the associated output valve; and, optionally wherein the associated output valve actuates to the open position and the closed position without using electrical power; and, optionally wherein the wheel is a cog wheel with four or more attached posts; and, optionally wherein the diaphragm interfaces with the wheel, at least in part, using a leaf spring; and, optionally wherein the fluid is a gas; and, optionally wherein the fluid is a liquid; and, optionally wherein the fluid is water; and, optionally wherein the fluid pressure controlled actuator is used in a hydrocarbon-based fluid application; and, optionally wherein the first and second input flow of pressurized fluid is managed by an electronic controller associated with a master valve; and, optionally further comprising: a one or more user controls which disable the fluid pressure controlled actuator; and, optionally wherein the interface to the shaft is through one or more gears; and, optionally wherein the first and second input flow of pressurized fluid is managed by an electronic controller associated with a master valve and wherein a configurable mechanism ensures that the electronic controller does not release the second input flow of pressurized fluid until a configurable time period has elapsed; and, optionally wherein the fluid pressure controlled actuator includes an externally viewable indicator which enables a user to view the actuator state and infer the position of the associated output valve; and, optionally wherein the fluid pressure controlled actuator includes a manual actuate control; and, optionally wherein the fluid pressure controlled actuator includes an adjustment mechanism which allows a user to adjust the compression force of one or more return springs.

An example embodiment provides a method for managing fluid flow in an output valve without using electrical power, comprising: receiving at a fluid pressure controlled actuator a first input flow of pressurized fluid at an inlet fluid port wherein the fluid pressure controlled actuator is mounted in a receiving area associated with an output valve, the receiving area configured to receive an electrically powered solenoid, wherein the fluid pressure controlled actuator is not electrically powered; directing, by the fluid pressure controlled actuator, at least a portion of the first input flow of pressurized fluid into a diaphragm chamber of the fluid pressure controlled actuator wherein the first input flow of pressurized fluid causes a first expansion of a diaphragm within the diaphragm chamber of the fluid pressure controlled actuator; at least partly in response to the first diaphragm expansion, rotating a wheel and a shaft wherein the wheel interfaces with the shaft and wherein the shaft includes a one or more cam lobes and wherein the rotation of the shaft raises a fluid pressure controlled actuator plunger, wherein the raising of the plunger opens a first fluid passage, wherein the first fluid passage interfaces with the associated output valve and fluid passing through the first fluid passage causes, at least in part, the associated output valve to actuate to an open position; receiving at the fluid pressure controlled actuator a pressure reduction of the first input flow of pressurized fluid; after the pressure reduction of the first input flow of pressurized fluid, receiving at the fluid pressure controlled actuator a second input flow of pressurized fluid; directing, by the fluid pressure controlled actuator, at least a portion of the second input flow of pressurized fluid into the diaphragm chamber of the fluid pressure controlled actuator wherein the second input flow of pressurized fluid causes a second expansion of the diaphragm within the diaphragm chamber of the fluid pressure controlled actuator; at least partly in response to the second diaphragm expansion, rotating the wheel and the shaft wherein the rotation of the shaft lowers a fluid pressure controlled actuator plunger, wherein the lowering obstructs the first open fluid passage causing, at least in part, the associated output valve to actuate to a closed position; and, optionally further comprising: maintaining the first fluid passage in an open state during the reduction in pressure of the first input flow of pressurized fluid; and, optionally wherein the first fluid passage is fluidly connected to a diaphragm port of the associated output valve; and, optionally wherein the associated output valve actuates to the open position and the closed position without using electrical power; and, optionally wherein the wheel is a cog wheel with four or more attached posts; and, optionally wherein the diaphragm interfaces with the wheel, at least in part, using a leaf spring; and, optionally wherein the fluid is a gas; and, optionally wherein the fluid is a liquid; and, optionally wherein the fluid is water; and, optionally wherein the fluid pressure controlled actuator is used in a hydrocarbon-based fluid application; and, optionally wherein the first and second input flow of pressurized fluid is managed by an electronic controller associated with a master valve; and, optionally further comprising: a one or more user controls which disable the fluid pressure controlled actuator; and, optionally wherein the interface to the shaft is through one or more gears; and, optionally wherein the first and second input flow of pressurized fluid is managed by an electronic controller associated with a master valve and wherein a configurable mechanism ensures that the electronic controller does not release the second input flow of pressurized fluid until a configurable time period has elapsed; and, optionally wherein the fluid pressure controlled actuator includes an externally viewable indicator which enables a user to view the actuator state and infer the position of the associated output valve; and, optionally wherein the fluid pressure controlled actuator includes a manual actuate control; and, optionally wherein the fluid pressure controlled actuator includes an adjustment mechanism which allows a user to adjust the compression force of one or more return springs.

An example embodiment provides a method for managing fluid flow in an output valve without using electrical power, comprising: receiving at a fluid pressure controlled actuator a first input flow of pressurized fluid at an inlet fluid port wherein the fluid pressure controlled actuator is mounted in a receiving area associated with an output valve, the receiving area configured to receive an electrically powered solenoid, wherein the fluid pressure controlled actuator is not electrically powered; directing, by the fluid pressure controlled actuator, at least a portion of the first input flow of pressurized fluid into a diaphragm chamber of the fluid pressure controlled actuator wherein the first input flow of pressurized fluid causes a first expansion of a diaphragm within the diaphragm chamber of the fluid pressure controlled actuator; at least partly in response to the first diaphragm expansion, rotating a wheel and a dual lobe shaft wherein the wheel interfaces with the dual lobe shaft and wherein the rotation of the dual lobe shaft raises a first fluid pressure controlled actuator plunger and opens a first fluid passage and wherein the first fluid passage interfaces with the associated output valve and fluid passing through the shaft fluid port causes, at least in part, the associated output valve to actuate to a closed position; receiving at the fluid pressure controlled actuator a pressure reduction of the first input flow of pressurized fluid; after the pressure reduction of the first input flow of pressurized fluid, receiving at the fluid pressure controlled actuator a second input flow of pressurized fluid; directing, by the fluid pressure controlled actuator, at least a portion of the second input flow of pressurized fluid into the diaphragm chamber of the fluid pressure controlled actuator wherein the second input flow of pressurized fluid causes a second expansion of the diaphragm within the diaphragm chamber of the fluid pressure controlled actuator; at least partly in response to the second diaphragm expansion, rotating the wheel and the dual lobe wherein the rotation of the dual lobe shaft lowers the first fluid pressure controlled actuator plunger and obstructs the first fluid passage and raises a second fluid pressure controlled actuator plunger and opens a second fluid passage wherein the second fluid passage interfaces with the associated output valve and fluid passing through the second fluid passage causes, at least in part, the associated output valve to actuate to an open position; and, optionally further comprising: maintaining the first fluid passage in an open state during the reduction in pressure of the first input flow of pressurized fluid; and, optionally wherein the first fluid passage is fluidly connected to a diaphragm port of the associated output valve; and, optionally wherein the second fluid passage is fluidly connected to a diaphragm port of the associated output valve; and, optionally wherein the associated output valve actuates to the open position and the closed position without using electrical power; and, optionally wherein the wheel is a cog wheel with four or more attached posts; and, optionally wherein the diaphragm interfaces with the wheel, at least in part, using a leaf spring; and, optionally wherein the fluid is a gas; and, optionally wherein the fluid is a liquid; and, optionally wherein the fluid is water; and, optionally wherein the fluid pressure controlled actuator is used in a hydrocarbon-based fluid application; and, optionally wherein the first and second input flow of pressurized fluid is managed by an electronic controller associated with a master valve; and, optionally further comprising: a one or more user controls which disable the fluid pressure controlled actuator; and, optionally wherein the interface to the shaft is through one or more gears; and, optionally wherein the first and second input flow of pressurized fluid is managed by an electronic controller associated with a master valve and wherein a configurable mechanism ensures that the electronic controller does not release the second input flow of pressurized fluid until a configurable time period has elapsed; and, optionally wherein the fluid pressure controlled actuator includes an externally viewable indicator which enables a user to view the actuator state and infer the position of the associated output valve; and, optionally wherein the fluid pressure controlled actuator includes a manual actuate control; and, optionally wherein the fluid pressure controlled actuator includes an adjustment mechanism which allows a user to adjust the compression force of one or more return springs.

An example embodiment provides a method for managing fluid flow in an output valve, comprising: receiving at a fluid pressure controlled actuator a first input flow of pressurized fluid; directing, by the fluid pressure controlled actuator, at least a portion of the first input flow of pressurized fluid into a first chamber of the fluid pressure controlled actuator wherein the first input flow of pressurized fluid causes an expansion of a first diaphragm within the first chamber of the fluid pressure controlled actuator; at least partly in response to the first diaphragm expansion, opening a previously closed first fluid passage to cause, at least in part, an associated output valve to actuate to a first position; receiving at the fluid pressure controlled actuator a pressure reduction of the first input flow of pressurized fluid; after the pressure reduction of the first input flow of pressurized fluid, receiving at the fluid pressure controlled actuator a second input flow of pressurized fluid; directing, by the fluid pressure controlled actuator, at least a portion of the second input flow of pressurized fluid into a second chamber of the fluid pressure controlled actuator wherein the second input flow of pressurized fluid causes an expansion of a second diaphragm within the second chamber of the fluid pressure controlled actuator; at least partly in response to the second diaphragm expansion, obstructing the first fluid passage to cause, at least in part, the associated output valve to actuate to a second position wherein the second position is spaced apart from the first position; and, optionally wherein the first diaphragm chamber and the second diaphragm chamber are the same diaphragm chamber; and, optionally wherein the first diaphragm and the second diaphragm are the same diaphragm; and optionally wherein the fluid pressure controlled actuator is mounted in a receiving area associated with the output valve, the receiving area configured to receive an electrically powered solenoid; and, optionally further comprising: at least partly in response to the second diaphragm expansion, opening a previously closed second fluid passage to cause, at least in part, the associated output valve to actuate to a second position wherein the second position is spaced apart from the first position; and optionally wherein the first position is an opened position or a closed position; and, optionally further comprising: maintaining the fluid passage in an open state during the reduction in pressure of the first input flow of pressurized fluid; and, optionally wherein the fluid passage is fluidly connected to a diaphragm port of the associated output valve; and, optionally wherein the associated output valve actuates to the first position and the second position without using electrical power; and, optionally wherein the wheel is a cog wheel with four or more attached posts; and, optionally wherein the diaphragm interfaces with the wheel, at least in part, using a leaf spring; and, optionally wherein the fluid is a gas; and, optionally wherein the fluid is a liquid; and, optionally wherein the fluid is water; and, optionally wherein the fluid pressure controlled actuator is used in a hydrocarbon-based fluid application; and, optionally wherein the first and second input flow of pressurized fluid is managed by an electronic controller associated with a master valve; and, optionally further comprising: a one or more user controls which disable the fluid pressure controlled actuator; and, optionally wherein the first and second input flow of pressurized fluid is managed by an electronic controller associated with a master valve and wherein a configurable mechanism ensures that the electronic controller does not release the second input flow of pressurized fluid until a configurable time period has elapsed; and, optionally wherein the fluid pressure controlled actuator includes an externally viewable indicator which enables a user to view the actuator state and infer the position of the associated output valve; and, optionally wherein the fluid pressure controlled actuator includes a manual actuate control; and, optionally wherein the fluid pressure controlled actuator includes an adjustment mechanism which allows a user to adjust the compression force of one or more return springs.

An example embodiment provides a fluid regulator, comprising: one or more fluid inlets configured to receive a first flow of pressurized fluid; one or more fluid outlets; one or more diaphragms; one or more fluid passages; an actuator configured to, without utilizing an electrically powered component: open an output valve to provide a fluid flow path between the at least one of the one or more fluid inlets and the at least one of the one or more fluid outlets at least partly in response to: a first flow of pressurized fluid received via the at least one of the one or more fluid inlets, an expansion of a first diaphragm caused at least in part by the first flow of pressurized fluid received via the at least one of the one or more fluid inlets, and an opened first fluid passage caused at least in part by the expansion of the first diaphragm; close the output valve to obstruct the fluid flow path at least partly in response to: an interruption of the first flow of pressurized fluid received via the inlet, a subsequent, relative to the interruption of the first flow, second flow of pressurized fluid received via the one or more fluid inlets, an expansion of a second diaphragm caused at least in part by the second flow of pressurized fluid received via the at least one of the one or more fluid inlets and a closed second fluid passage caused at least in part by the expansion of the second diaphragm; and, optionally wherein the fluid passage is configured to be fluidly connected to a diaphragm port of the output valve; and, optionally wherein the first fluid passage and the second fluid passage are the same fluid passage; and, optionally wherein the actuator is mounted in a receiving area associated with the output valve, the receiving area configured to receive an electrically powered solenoid; and, optionally further comprising: an open third fluid passage caused at least in part by the expansion of the second diaphragm; and, optionally wherein the first diaphragm and the second diaphragm are the same diaphragm; and, optionally further comprising: maintaining the fluid passage in an open state during the interruption of the first flow of pressurized fluid received via the inlet; and, optionally wherein the first fluid passage is fluidly connected to a diaphragm port of the output valve; optionally wherein the first fluid passage is fluidly connected to a diaphragm port of the output valve; and, optionally wherein the output valve actuates to the open position and the closed position without using electrical power; and, optionally wherein the fluid is a gas; and, optionally wherein the fluid is a liquid; and, optionally wherein the fluid is water; and, optionally wherein the actuator is used in a hydrocarbon-based fluid application; and, optionally wherein the first and second input flow of pressurized fluid via the inlet is managed by an electronic controller associated with a master valve; and, optionally further comprising: a one or more user controls which disable the actuator; and, optionally wherein the first and second input flow of pressurized fluid is managed by an electronic controller associated with a master valve and wherein a configurable mechanism ensures that the electronic controller does not release the second flow of pressurized fluid until a configurable time period has elapsed; and, optionally wherein the actuator includes an externally viewable indicator which enables a user to view the actuator state and infer the position of the output valve; and, optionally wherein the actuator includes a manual actuate control; and, optionally wherein the actuator includes an adjustment mechanism which allows a user to adjust the compression force of one or more return springs.

An example embodiment provides a method of retrofitting a valve actuator of a fluid regulator, the method consisting essentially of (or in certain embodiments, consisting of): removing from a first mount of the fluid regulator a solenoid configured to be electrically controlled to open and close a fluid regulator valve; and coupling to the first mount a fluid controlled actuator, wherein the fluid controlled actuator is configured to open and close the fluid regulator valve at least partly in response fluid pressure; and, optionally wherein the fluid controlled actuator comprises: a fluid inlet port; a fluid outlet port; a chamber configured to receive fluid via the fluid inlet port, wherein the chamber is configured to undergo a first increase in size in response to fluid pressurized to a first degree received via the fluid inlet port; a mechanism configured to: open a fluid passage between the fluid inlet port and the fluid outlet port at least partly in response to the first increase in size of the chamber; close the fluid passage at least partly in response to a reduction in the chamber size resulting from the fluid being pressurized to a second degree, the second degree less than the first degree, and a subsequent second increase in size of the chamber; and, optionally wherein the chamber includes a diaphragm, and the first increase in size results at least in part from an expansion of the diaphragm.

An example embodiment provides a method of retrofitting a valve actuator of a fluid regulator, the method consisting essentially of (or in certain embodiments, consisting of): removing from a first mount of the fluid regulator a solenoid configured to be electrically controlled to open and close a fluid regulator valve; and coupling to the first mount a fluid controlled actuator using an adaptor, wherein the fluid controlled actuator is configured to open and close the fluid regulator valve at least partly in response fluid pressure; and, optionally wherein the fluid controlled actuator comprises: a fluid inlet port; a fluid outlet port; a chamber configured to receive fluid via the fluid inlet port, wherein the chamber is configured to undergo a first increase in size in response to fluid pressurized to a first degree received via the fluid inlet port; a mechanism configured to: open a fluid passage between the fluid inlet port and the fluid outlet port at least partly in response to the first increase in size of the chamber; close the fluid passage at least partly in response to a reduction in the chamber size resulting from the fluid being pressurized to a second degree, the second degree less than the first degree, and a subsequent second increase in size of the chamber; and, optionally wherein the chamber includes a diaphragm, and the first increase in size results at least in part from an expansion of the diaphragm; and, optionally wherein the adapter is a gasket; and, optionally wherein the adapter enables the coupling to the first mount to use one or more different thread dimensions.

An example embodiment provides a method of retrofitting a valve actuator of a fluid regulator, the method consisting essentially of (or in certain embodiments, consisting of): removing from a first mount of the fluid regulator a solenoid configured to be electrically controlled to open and close a fluid regulator valve; and coupling to the first mount a fluid controlled actuator, wherein the fluid controlled actuator is configured to open and close the fluid regulator valve at least partly in response to fluid pressure, wherein a first flow of pressurized fluid received via a fluid regulator inlet causes the fluid controlled actuator to control the fluid regulator valve so as to permit fluid to flow from the fluid regulator inlet to a fluid regulator outlet, and a second flow of pressurized fluid received via the fluid regulator inlet causes the fluid controlled actuator to control the fluid regulator valve so as to inhibit the flow of fluid from the fluid regulator inlet to the fluid regulator outlet.

An example embodiment provides a method of retrofitting a valve actuator of a fluid regulator, the method consisting essentially of (or in certain embodiments, consisting of): removing from a first mount of the fluid regulator a solenoid configured to be electrically controlled to open and close a fluid regulator valve; and coupling to the first mount a fluid controlled actuator using an adapter, wherein the fluid controlled actuator is configured to open and close the fluid regulator valve at least partly in response fluid pressure, wherein a first flow of pressurized fluid received via a fluid regulator inlet causes the fluid controlled actuator to control the fluid regulator valve so as to permit fluid to flow from the fluid regulator inlet to a fluid regulator outlet, and a second flow of pressurized fluid received via the fluid regulator inlet causes the fluid controlled actuator to control the fluid regulator valve so as to inhibit the flow of fluid from the fluid regulator inlet to the fluid regulator outlet; and, optionally wherein the adapter is a gasket; and optionally wherein the adapter enables the coupling to the first mount to use one or more different thread dimensions.

An example embodiment provides a fluid regulator, comprising: one or more fluid inlets configured to receive a flow of pressurized fluid; one or more fluid outlets; a turbine shaft drive; a turbine in fluid communication with said fluid inlet port, said turbine connected to said turbine shaft drive; a speed reducing mechanism connected to said turbine drive shaft such that rotation of at least a portion of said turbine drives said speed reducing mechanism; a timing control assembly; a servo valve connected to said timing control assembly; a valve shaft connected to said speed reducing mechanism and said timing control assembly; one or more fluid passages; an actuator configured to, without utilizing an electrically powered component: open a first output valve to provide a fluid flow path between the at least one of the one or more fluid inlets and the at least one of the one or more fluid outlets at least partly in response to: a flow of pressurized fluid received via the at least one of the one or more fluid inlets, a rotation of the turbine and associated turbine drive shaft caused at least in part by the flow of pressurized fluid received via the at least one or more fluid inlets, and a closed first fluid passage interfacing with the first output valve caused at least in part by the rotation of the turbine; close the first output valve to obstruct the fluid flow path at least partly in response to: a rotation of the turbine and associated turbine drive shaft caused at least in part by the flow of pressurized fluid received via the at least one or more fluid inlets and an opened first fluid passage interfacing with the first output valve caused at least in part by the rotation of the turbine; and, optionally further comprising: substantially at the same time the first output valve is closed, open a second output valve at to provide a fluid flow path between the at least one of the one or more fluid inlets and the at least one of the one or more fluid outlets at least partly in response to: a rotation of the turbine and associated turbine drive shaft caused at least in part by the flow of pressurized fluid received via the at least one or more fluid inlets and an opened second fluid passage interfacing with the second output valve caused at least in part by the rotation of the turbine; and, optionally wherein the fluid regulator, further comprising: a servo activation lever connected to said valve shaft; at least one spring arm connected to said speed reduction mechanism; said at least one spring arm in transient association with said servo activation lever; and, optionally wherein said servo activation lever further comprises at least one lever rotation stop; said lever rotation stop limiting the rotation of said servo activation lever; and, optionally further comprising: a detent bar, said detent bar in transient connection with said spring arm such that rotation of at least a portion of said spring arm is retarded when said spring arm is in contact with said detent bar; and, optionally further comprising: a timing control knob; and, optionally further comprising: an adapter having a body and a first port and a second port; wherein said first port is fixedly connected to one of said plurality of tubes such that fluid is transportable between said first port and one of said plurality of tubes; said first port in fluid communication with a diaphragm port in said at least one output valve; said second port is connected to one of said plurality of tubes such that fluid is transportable between said second port and one of said plurality of tubes; said second port in fluid communication with an exit port in said at least one output valve; said exit port in communication with a fluid port; and, optionally wherein said output valve further comprises a flow control arm; and, optionally wherein said timing control knob further comprises a color code to indicate relative time of operation of said at least one output valve; and, optionally further comprising: at least one color code button; and, optionally wherein said at least one output valve is in a linear alignment with said servo valve; and, optionally wherein said valve shaft rotates in response to said turbine and said speed reducing gear mechanism.

An example embodiment provides a fluid regulator, comprising: one or more fluid inlets configured to receive a flow of pressurized fluid; one or more fluid outlets; a turbine shaft drive; a turbine in fluid communication with said fluid inlet port, said turbine connected to said turbine shaft drive; a speed reducing mechanism connected to said turbine drive shaft such that rotation of at least a portion of said turbine drives said speed reducing mechanism; a timing control assembly; a servo valve connected to said timing control assembly; a valve shaft connected to said speed reducing mechanism and said timing control assembly; one or more fluid passages; at least one valve shaft port integral with said valve shaft such that rotation of said valve shaft rotates said at least one valve shaft port so as to provide fluid connection between a plurality of tubes; said plurality of tubes fixedly connected to said servo valve; at least one output valve; and said plurality of tubes fixedly connected to said at least one output valve; and, optionally wherein said at least one output valve is two output valves; and, optionally wherein the fluid regulator, further comprising: a servo activation lever connected to said valve shaft; at least one spring arm connected to said speed reduction mechanism; said at least one spring arm in transient association with said servo activation lever; and, optionally wherein said servo activation lever further comprises at least one lever rotation stop; said lever rotation stop limiting the rotation of said servo activation lever; and, optionally further comprising: a detent bar, said detent bar in transient connection with said spring arm such that rotation of at least a portion of said spring arm is retarded when said spring arm is in contact with said detent bar; and, optionally further comprising: a timing control knob; and, optionally further comprising: an adapter having a body and a first port and a second port; wherein said first port is fixedly connected to one of said plurality of tubes such that fluid is transportable between said first port and one of said plurality of tubes; said first port in fluid communication with a diaphragm port in said at least one output valve; said second port is connected to one of said plurality of tubes such that fluid is transportable between said second port and one of said plurality of tubes; said second port in fluid communication with an exit port in said at least one output valve; said exit port in communication with a fluid port; and, optionally wherein said output valve further comprises a flow control arm; and, optionally wherein said timing control knob further comprises a color code to indicate relative time of operation of said at least one output valve; and, optionally further comprising: at least one color code button; and, optionally wherein said at least one output valve is in a linear alignment with said servo valve; and, optionally wherein said valve shaft rotates in response to said turbine and said speed reducing gear mechanism.

An example embodiment provides a fluid regulator, comprising: one or more fluid inlets configured to receive a first flow of fluid; one or more fluid outlets; a turbine shaft drive; a turbine in fluid communication with said fluid inlet port, said turbine connected to said turbine shaft drive; a speed reducing mechanism connected to said turbine drive shaft such that rotation of said turbine drives said speed reducing mechanism; a timing control assembly; servo valve connected to said timing control assembly; a valve shaft connected to said speed reducing mechanism and said timing control assembly; one or more fluid passages; a threaded adapter wherein the threaded adapter is configured to removably engage a threaded receiving area of an output valve having a housing, the threaded adapter providing a fluid conduit to the output valve housing when the threaded adapter is screwed into the threaded receiving area of the output valve housing; the threaded adapter having a first port and a second port wherein said first port is fixedly connected to at least one of plurality of tubes such that fluid is transportable between said first port and said one of said plurality of tubes and wherein said first port is in fluid communication with a diaphragm port of the output valve, and wherein said second port is connected to one of said plurality of tubes such that fluid is transportable between said second port and said one of said plurality of tubes and wherein said second port is in fluid communication with an exit port in the output valve; a fluid regulator configured to, without utilizing an electrically powered component: open a first output valve to provide a fluid flow path between the at least one of the one or more fluid inlets and the at least one of the one or more fluid outlets at least partly in response to: a flow of fluid received via the at least one of the one or more fluid inlets, a rotation of the turbine and associated turbine drive shaft caused at least in part by the flow of fluid received via the at least one or more fluid inlets, an open first fluid passage interfacing with the first output valve caused at least in part by the rotation of the turbine, and a fluid flow through the first fluid passage from the output valve; the fluid regulator further configured to, without utilizing an electrically powered component close the first output valve to obstruct the fluid flow path between the at least one of the one or more fluid inlets and the at least one of the one or more fluid outlets at least partly in response to: a subsequent flow of fluid received via the at least one of the one or more fluid inlets, a rotation of the turbine and associated turbine drive shaft caused at least in part by the flow of fluid received via the at least one or more fluid inlets, and a closed first fluid passage interfacing with the first output valve caused at least in part by the rotation of the turbine; and, optionally further comprising: a servo activation lever connected to said valve shaft; at least one spring arm connected to said speed reduction mechanism; and said at least one spring arm in transient association with said servo activation lever; and, optionally further comprising: at least one lever rotation stop; and said lever rotation stop limiting the rotation of said servo activation lever; and, optionally further comprising: a detent bar; said detent bar in transient connection with said spring arm such that rotation of at least a portion of said spring arm is retarded when said spring arm is in contact with said detent bar; and, optionally further comprising: a timing control mechanism; and, optionally wherein said valve shaft rotates in response to said turbine.

An example embodiment provides a method for managing fluid flow in an output valve, comprising: providing a fluid regulator having a threaded adapter configured to removably engage a threaded receiving area of an output valve having a housing, the threaded adapter providing a fluid conduit to the output valve housing when the threaded adapter is screwed into the threaded receiving area of the output valve housing; receiving at the fluid regulator a first input flow of fluid; directing, by the fluid regulator, at least a portion of the first input flow of fluid into a chamber containing a turbine wherein the first input flow of fluid causes a rotation of the turbine; at least partly in response to the turbine rotation, opening a previously closed first fluid passage fluidly connected to the output valve to cause, at least in part, fluid to flow through the threaded adapter from the output valve housing to actuate the output valve to an open position; after the output valve actuates to an open position, directing, by the fluid regulator, at least a portion of the first input flow of fluid into a chamber containing a turbine wherein the first input flow of fluid causes a rotation of the turbine; at least partly in response to the turbine rotation, closing a previously opened first fluid passage fluidly connected to the output valve; obstructing the first fluid passage to interrupt the fluid flow through the threaded connector from the output valve housing, causing, at least in part, the output valve to actuate to a closed position; and, optionally wherein the first fluid passage is fluidly connected to the diaphragm port of the output valve; and, optionally further comprising: a valve shaft in association with the turbine wherein the valve shaft rotates in response to said turbine rotation; and, optionally wherein the output valve actuates to the open position and the closed position without using electrical power; and, optionally further comprising: a user accessible timing control mechanism.

An example embodiment provides a fluid regulator, comprising: a turbine shaft drive; a turbine in fluid communication with said fluid inlet port, said turbine connected to said turbine shaft drive; a servo valve; a valve shaft; one or more fluid passages; a fluid regulator configured to, without utilizing an electrically powered component: open a first output valve to provide a fluid flow path between at least one of the one or more fluid inlets and at least one of the one or more fluid outlets at least partly in response to: a flow of fluid received via the at least one of the one or more fluid inlets, a rotation of the turbine and associated turbine drive shaft caused at least in part by the flow of fluid received via the at least one or more fluid inlets, an open first fluid passage interfacing with the first output valve caused at least in part by the rotation of the turbine, and a fluid flow through the first fluid passage from the output valve; the fluid regulator further configured to, without utilizing an electrically powered component close the first output valve to obstruct the fluid flow path between the at least one of the one or more fluid inlets and the at least one of the one or more fluid outlets at least partly in response to: a subsequent flow of fluid received via the at least one of the one or more fluid inlets, a rotation of the turbine and associated turbine drive shaft caused at least in part by the flow of fluid received via the at least one or more fluid inlets, and a closed first fluid passage interfacing with the first output valve caused at least in part by the rotation of the turbine; and, optionally further comprising: a servo activation lever connected to said valve shaft; at least one spring arm; and said at least one spring arm in transient association with said servo activation lever; and, optionally further comprising: at least one lever rotation stop; and said lever rotation stop limiting the rotation of said servo activation lever; and, optionally further comprising: a detent bar; said detent bar in transient connection with said spring arm such that rotation of at least a portion of said spring arm is retarded when said spring arm is in contact with said detent bar; and, optionally further comprising: a timing control mechanism; and, optionally wherein said valve shaft rotates in response to said turbine; and, optionally wherein the output valve actuates to the open position and the closed position without using electrical power; and, optionally further comprising: a threaded adapter having a first port and a second port; wherein said first port is fixedly connected to one of a plurality of tubes such that fluid is transportable between said first port and said one of said plurality of tubes; wherein said first port in fluid communication with a diaphragm port in the output valve; wherein said second port is connected to one of said plurality of tubes such that fluid is transportable between said second port and said one of said plurality of tubes; and wherein said second port in fluid communication with an exit port in the output valve; and, optionally wherein the threaded adapter is configured to removably engage a threaded receiving area of the output valve having a housing, the threaded adapter providing a fluid conduit to the output valve housing when the threaded adapter is screwed into the threaded receiving area of the output valve housing.

An example embodiment provides a method of actuating an output valve, comprising: at least partly in response to the receipt of a first electrical signal at an electric motor of an actuator, the actuator having a first housing, the first housing having a connector configured to removably engage a receiving area of an output valve having a second housing, the connector providing a fluid conduit to the output valve when the connecter is seated into the receiving area of the output valve second housing; causing a rotation of a valve shaft of the actuator towards a first valve shaft position; at least partly in response to a first lobe of the rotating valve shaft interfacing with a first electric circuit, causing the valve shaft and the electric motor to stop at the first valve shaft position enabling, while the valve shaft of the actuator is at the first valve shaft position, a first input flow of fluid to flow through a first valve shaft port through the connector to the output valve second housing to actuate the output valve to a first output valve position; at least partly in response to the receipt of a second electrical signal at the electric motor of the actuator, causing a rotation of the valve shaft of the actuator towards a second valve shaft position; at least partly in response to a second lobe of the rotating valve shaft interfacing with a second electric circuit, causing: the valve shaft to stop at the second valve shaft position, and causing the electric motor to reduce or halt power consumption; and enabling, while the valve shaft of the actuator is at the second valve shaft position, a second input flow of fluid to flow towards a second valve shaft port through the connector from the output valve second housing to actuate the output valve to a second output valve position; and, optionally wherein the output valve comprises an externally ported diaphragm type valve; and, optionally wherein the first position is an opened position or a closed position; and, optionally wherein the first valve shaft position and the second valve shaft position are 90 degrees offset; and, optionally wherein the first electric circuit comprises a limit switch in series with a motor power circuit; and, optionally wherein the first electric circuit comprises a normally open relay in series with a limit switch; and, optionally wherein the first input flow of fluid and the second input flow of fluid comprises a gas; and, optionally wherein the second input flow of fluid comprises fluid exiting a diaphragm chamber of the output valve.

An example embodiment provides a method of actuating an output valve, comprising: at least partly in response to the receipt of an electrical signal at a rotary solenoid of an actuator, the actuator having a first housing and the first housing having a threaded connector configured to removably engage a threaded receiving area of an output valve having a second housing, the threaded connector providing a fluid conduit to the output valve second housing when the threaded connecter is screwed into the threaded receiving area of the output valve second housing, causing a rotation of a valve shaft of the actuator, wherein the rotation of the valve shaft enables a first input flow of fluid to flow through a first valve shaft port, and wherein the solenoid does not come into direct contact with the first input flow of fluid; at least partly in response to the valve shaft rotation, directing the first input flow of fluid from the first valve shaft port through the threaded connector to the output valve second housing to actuate the output valve to a first position; at least partly in response to the termination of the electrical signal at the actuator, causing a counter rotation of the valve shaft of the actuator, wherein the counter rotation of the valve shaft enables a second input flow of fluid to flow through a second valve shaft port; and at least partly in response to the valve shaft counter rotation, directing the second input flow of fluid towards the second valve shaft port from through the threaded connector from the output valve second housing to actuate the output valve to a second position; and, optionally wherein the output valve comprises an externally ported diaphragm type valve; and, optionally wherein the first output valve position is an opened output valve position or a closed output valve position; and, optionally wherein the valve shaft rotation is a rotation of 90 degrees and the valve shaft counter rotation is a rotation of 90 degrees; and, optionally wherein the second input flow of fluid comprises fluid exiting a diaphragm chamber of the output valve.

An example embodiment provides a method of actuating an output valve, comprising: at least partly in response to the receipt of a first electrical signal at an electric motor of an actuator, wherein the actuator has a first housing and wherein the actuator is fluidly connected to a diaphragm port of an output valve, causing a rotation of a valve shaft of the actuator towards a first valve shaft position; at least partly in response to a first lobe of the rotating valve shaft interfacing with a first electric circuit, causing the valve shaft to stop at the first valve shaft position, and causing the electric motor to reduce or halt power consumption; enabling, while the valve shaft of the actuator is at the first valve shaft position, a first input flow of fluid to flow through a first valve shaft port to the output valve to thereby actuate the output valve to a first output valve position; at least partly in response to the receipt of a second electrical signal at the electric motor of the actuator, causing a rotation of the valve shaft of the actuator towards a second valve shaft position; based at least in part on a second lobe of the rotating valve shaft interfacing with a second electric circuit, causing the valve shaft to stop at the second valve shaft position, and causing the electric motor to reduce or halt power consumption; and, enabling, while the valve shaft of the actuator is at the second valve shaft position, a second input flow of fluid to flow towards a second valve shaft port from the output valve to actuate the output valve to a second output valve position; and, optionally wherein the output valve comprises an externally ported diaphragm type valve; and, optionally wherein the output valve comprises a plurality of output valves fluidly connected to the actuator; and, optionally wherein the first output valve position is an opened output valve position or a closed output valve position; and, optionally wherein the first valve shaft position and the second valve shaft position are 90 degrees offset; and, optionally wherein the first electric circuit comprises a limit switch in series with a motor power circuit; and, optionally wherein the first electric circuit comprises a normally open relay in series with a limit switch; and, optionally wherein the first input flow of fluid and the second input flow of fluid comprises a gas; and, optionally wherein the second input flow of fluid comprises fluid exiting a diaphragm chamber of the output valve.

An example embodiment provides a fluid regulator, comprising: one or more fluid inlets configured to receive a first input flow of fluid; a valve shaft configured with at least: a first lobe, a second lobe, a first valve shaft port, a second valve shaft port; an electric motor configured with a first electric circuit and a second electric circuit; a first housing, the first housing having a connector configured to removably engage a receiving area of an output valve having a second housing, the connector providing a fluid conduit to the output valve when the connecter is seated into the receiving area of the output valve second housing; an actuator configured to: open the output valve to provide a fluid flow path from the output valve at least partly in response to: receipt of a first electrical signal at the electric motor of the actuator, cause a rotation of the valve shaft of the actuator towards a first valve shaft position, at least partly in response to the first lobe of the rotating valve shaft interfacing with the first electric circuit, cause the valve shaft of the actuator to stop at the first valve shaft position, cause the electric motor to reduce or halt power consumption, and enable, while the valve shaft of the actuator is at the first position, the first input flow of fluid to flow through the first valve shaft port through the connector to the output valve second housing; close the output valve to obstruct the fluid flow path at least partly in response to: a subsequent electrical signal at the electric motor of the actuator which causes the valve shaft of the actuator to rotate towards a second valve shaft position which in turn causes, at least in part, the second lobe of the rotating valve shaft to interface with the second electric circuit, which in turn causes, at least in part the valve shaft to stop at the second valve shaft position, which in turn causes, at least in part, the electric motor to reduce or halt power consumption, and wherein while the valve shaft of the actuator is at the second valve shaft position, the second input flow of fluid is enabled to flow towards the second valve shaft port through the connector from the output valve second housing; and, optionally wherein the output valve comprises an externally ported diaphragm type valve; and, optionally wherein the first valve shaft position and the second valve shaft position are 90 degrees offset; and, optionally wherein the first electric circuit comprises a limit switch in series with a motor power circuit; and, optionally wherein the first electric circuit comprises a normally open relay in series with a limit switch; and, optionally wherein the first input flow of fluid and the second input flow of fluid comprises a gas; and, optionally wherein the second input flow of fluid comprises fluid exiting a diaphragm chamber of the output valve.

An example embodiment provides a method of actuating an output valve, comprising: providing an actuator having a first housing and a rotary solenoid; at least partly in response to the receipt of an electrical signal at a rotary solenoid of the actuator, causing a rotation of a valve shaft of the actuator wherein the rotation of the valve shaft enables a first input flow of pressurized fluid to flow through a first valve shaft port and wherein the rotary solenoid does not interface with the first input flow of pressurized fluid; at least partly in response to the valve shaft rotation, directing the first input flow of pressurized fluid from the first valve shaft port to the output valve to actuate the output valve to a first position; at least partly in response to the termination of the electrical signal at the actuator, causing a counter rotation of the valve shaft of the actuator wherein the counter rotation of the valve shaft enables a second input flow of pressurized fluid to flow through a second valve shaft port; and at least partly in response to the valve shaft counter rotation, directing the second input flow of pressurized fluid towards the second valve shaft port from the output valve to actuate the output valve to a second position; and, optionally wherein the output valve comprises an externally ported diaphragm type valve; and, optionally wherein the first output valve position is an opened output valve position or a closed output valve position; and, optionally wherein the valve shaft rotation is a rotation of 90 degrees and the valve shaft counter rotation is a rotation of 90 degrees; and, optionally wherein the second input flow of fluid comprises fluid exiting a diaphragm chamber of the output valve.

An as aspect of the disclosure relates to a fluid regulator comprising: a shaft configured with at least: a first lobe, a second lobe, and a crank; an electric motor configured with a first electric circuit and a second electric circuit; a first housing, the first housing configured with at least a first port configured to enable, at least in part, a bi-directional fluid path to a receiving area of an output valve; a spool piston contained within the first housing, the spool piston in operative communication with the shaft via the crank, wherein the spool piston is capable of linear travel within the first housing; an actuator configured to: open the output valve by enabling an exhaust fluid flow from the receiving area of the output valve to the first port of the first housing at least partly in response to receipt of an electrical signal at the electric motor, which in turn causes, a rotation of the shaft towards a first shaft position and movement of the spool piston towards a first spool piston position, cause the rotating shaft to stop at the first shaft position at least partly in response to the first lobe of the shaft interfacing with the first electric circuit while the shaft is rotating, cause the movement of the spool piston to stop at the first spool piston position, cause the electric motor to reduce or halt power consumption, and while the spool piston is at the first spool piston position, block a control fluid flow from the first housing to the receiving area of the output valve, and enable an exhaust fluid flow from the receiving area of the output valve to the first port of the first housing; close the output valve by enabling the control fluid to flow from the first port of the first housing to the receiving area of the output valve at least partly in response to receipt of a subsequent electrical signal at the electric motor, which in turn causes a rotation of the shaft towards a second shaft position and movement of the spool piston towards a second spool piston position, at least partly in response to the second lobe of the rotating shaft interfacing with the second electric circuit, cause the shaft to stop at the second shaft position, cause the spool piston to stop at the second spool piston position, cause the electric motor to reduce or halt power consumption, and while the spool piston is at the second spool piston position enable the control fluid to flow from the first housing to the receiving area of the output valve; optionally, the output valve comprises an externally piloted diaphragm type valve; optionally, the first electric circuit comprises a limit switch in series with a motor power circuit; optionally, the first electric circuit comprises a normally open relay in series with a limit switch; optionally, the fluid comprises a gas; optionally the fluid comprises water; optionally, the first housing is further configured to include a second port, the second port capable of receiving the control fluid from a source external to the actuator; optionally, the first housing is further configured to include a second port, the second port capable of outputting from the first housing exhaust fluid flow from the receiving area of the output valve; optionally, the crank is connected to the spool piston via a linkage, the linkage configured to translate rotational motion of the crank into a linear spool piston motion; optionally, the exhaust fluid flow comprises fluid exiting a diaphragm chamber of the output valve.

An as aspect of the disclosure relates to a fluid regulator comprising: a shaft configured with at least: a first lobe, a second lobe, and a crank; an electric motor configured with an electric circuit; a first housing, the first housing configured with at least a first port configured to enable, at least in part, a bi-directional fluid path to an output valve; a piston contained within the first housing, the piston in operative communication with the shaft via the crank, wherein the piston is capable of travel within the first housing; an actuator configured to: open the output valve at least partly in response to: receipt of an electrical signal at the electric motor, which causes the shaft to rotate towards a first shaft position and movement of the piston towards a first piston position, wherein the shaft rotation is stopped at the first shaft position and the movement of the piston is stopped at the first piston position at least partly in response to the first lobe of the shaft interfacing with the electric circuit while the shaft is rotating, which in turn causes, at least in part, the electric motor to reduce or halt power consumption, and while the piston of the actuator is at the first position, enable, a first fluid flow from the output valve to the first port; close the output valve at least partly in response to: a subsequent electrical signal at the electric motor, which causes the shaft to rotate towards a second shaft position and movement of the piston towards a second piston position which in turn causes, at least in part, the second lobe of the rotating valve shaft to interface with the electric circuit, which in turn causes, at least in part, the shaft to stop at the second shaft position and the piston to stop at the second piston position, which in turn causes, at least in part, the electric motor to reduce or halt power consumption, and while the piston is at the second position, a second fluid flow from the first housing to the output valve is enabled; optionally, the output valve comprises an externally piloted diaphragm type valve; optionally, wherein the electric circuit comprises a limit switch in series with a motor power circuit; optionally, the electric circuit comprises a normally open relay in series with a limit switch; optionally, the fluid comprises a gas; optionally the fluid comprises water; optionally, the first housing is further configured to include a second port, the second port configured to receive the second fluid flow from a source external to the actuator; the first housing is further configured to include a second port, the second port configured to output from the first housing the first fluid flow from the output valve; optionally, the crank is connected to the piston via a linkage, the linkage configured to translate rotational motion of the crank into a linear piston motion; optionally, the first fluid flow comprises fluid exiting a diaphragm chamber of the output valve; optionally, the second fluid flow comprises control fluid from a source external to the actuator.

An as aspect of the disclosure relates to a fluid regulator comprising: a shaft configured with at least: a first lobe, a second lobe, and a crank; an electric motor configured with an electric circuit; a first housing, the first housing configured with at least: a first port configured to enable, at least in part, a bi-directional fluid path to a first set of output valves, and a second port configured to enable, at least in part, a bi-directional fluid path to a second set of output valves; a piston contained within the first housing, the piston in operative communication with the shaft via the crank, wherein the piston is capable of travel within the first housing; an actuator configured to: open the first set of output valves and close the second set of output valves at least partly in response to: receipt of an electrical signal at the electric motor, which causes the shaft to rotate towards a first shaft position and movement of the piston towards a first piston position, wherein the shaft rotation is stopped at the first shaft position and the movement of the piston is stopped at the first piston position at least partly in response to the first lobe of the shaft interfacing with the electric circuit while the shaft is rotating, which in turn causes, at least in part, the electric motor to reduce or halt power consumption, and while the piston of the actuator is at the first position, enable, a first fluid flow from the second port to the second set of output valves, and enable, a second fluid flow from the first set of output valves to the first port; close the first set of output valves and open the second set of output valves at least partly in response to: a subsequent electrical signal at the electric motor, which causes the shaft to rotate towards a second shaft position and movement of the piston towards a second piston position which in turn causes, at least in part, the second lobe of the rotating valve shaft to interface with the electric circuit, which in turn causes, at least in part, the shaft to stop at the second shaft position and the piston to stop at the second piston position, which in turn causes, at least in part, the electric motor to reduce or halt power consumption, and while the piston is at the second position, a third fluid flow from the first port to the first set of output valves is enabled, and a fourth fluid flow from the second set of output valves to the second port is enabled; optionally the first set of output valves or the second set of output valves comprises a single output valve; optionally, the first set of output valves or the second set of output valves comprises an externally piloted diaphragm type valve; optionally, wherein the electric circuit comprises a limit switch in series with a motor power circuit; optionally, the electric circuit comprises a normally open relay in series with a limit switch; optionally the fluid comprises a gas; optionally the fluid comprises water; optionally the first housing is further configured to include a third port, the third port configured to receive the first fluid flow and third fluid flow from a source external to the actuator; the first housing is further configured to include a third port, the third port configured to output from the first housing the second fluid flow and fourth fluid flow from the output valve; optionally the crank is connected to the piston via a linkage, the linkage configured to translate rotational motion of the crank into a linear piston motion; optionally the second fluid flow comprises fluid exiting a set of diaphragm chambers corresponding to the first set of output valves; optionally the fourth fluid flow comprises fluid exiting a set of diaphragm chambers corresponding to the first set of output valves; optionally the first fluid flow and third fluid flow comprises control fluid from a source external to the actuator.

In certain embodiments, the device also employs an adapter that has a body in which there are a first and a second port. The first port is connected to one of the tubes and with a diaphragm port in the output valve such that fluid is transportable between the tube and the diaphragm port. A second port is connected to a different tube and to an exit port in the output valve such that fluid is transportable between the tube and the exit port. An adapter also has a bore that is integral with the second port. An inner seat is slideable inside the bore and is positioned by a spring so that it is spaced in alignment with the exit port.

The drive post has both a post and a cog drive spring where the spring physically interacts with the cog wheel. An anti-back rotation leaf spring stop is also in physical interaction with the cog wheel so that rotation of the cog wheel rotates unidirectionally. A flow control arm connected to the diaphragm is also provided.

An automatically controlled flow control device is provided whereby control of the servo valve is by the system having a fluid inlet port and at least one output port. A turbine is in fluid communication with the fluid inlet port and is connected to a turbine shaft drive which interacts with a speed reducing mechanism such that rotation of at least a portion of the turbine drives the speed reducing mechanism. A timing control assembly is connected to the speed reducing mechanism and transiently connected to a servo valve shaft in a servo valve. The servo valve shaft has at least one valve shaft port that provides fluid connection between a plurality of tubes. The servo valve shaft rotates in response to rotation of the turbine and the speed reducing mechanism. The tubes are also connected to at least one output valve, and in certain instances two or more output valves.

A servo activation lever is also provided connected to the valve shaft. At least one spring arm connected to the speed reducing mechanism transiently associates with the servo activation lever. The servo activation lever is provided with at least one lever rotation stop that is capable of limiting the rotation of the servo activation lever. A detent bar is provided in transient association with the spring arm so that rotation of at least a portion of the spring arm is retarded when in contact with the detent bar.

A timing control knob is also provided. The timing control knob has a color code to indicate the relative time of operation of at least one output valve. At least one color code button is also present on at least one output valve.

The device also employs an adapter that has a body in which there are a first and a second port. The first port is connected to one of the tubes and with a diaphragm port in the output valve such that fluid is transportable between the tube and the diaphragm port. A second port is connected to a different tube and to an exit port in the output valve such that fluid is transportable between the tube and the exit port. An adapter also has a bore that is integral with the second port. An inner seat is slideable inside the bore and is positioned by a spring so that it is paced in alignment with the exit port.

The output valve is provided with a flow control arm. The output valve is aligned with the servo valve.

BRIEF DESCRIPTION OF THE DRAWINGS

FIG. 40 depicts two example generalized arrangement for fluid activated actuators.

FIG. 117 is a table illustrating example states of an example Electric Motor Fluid Switch.

Figure 120:
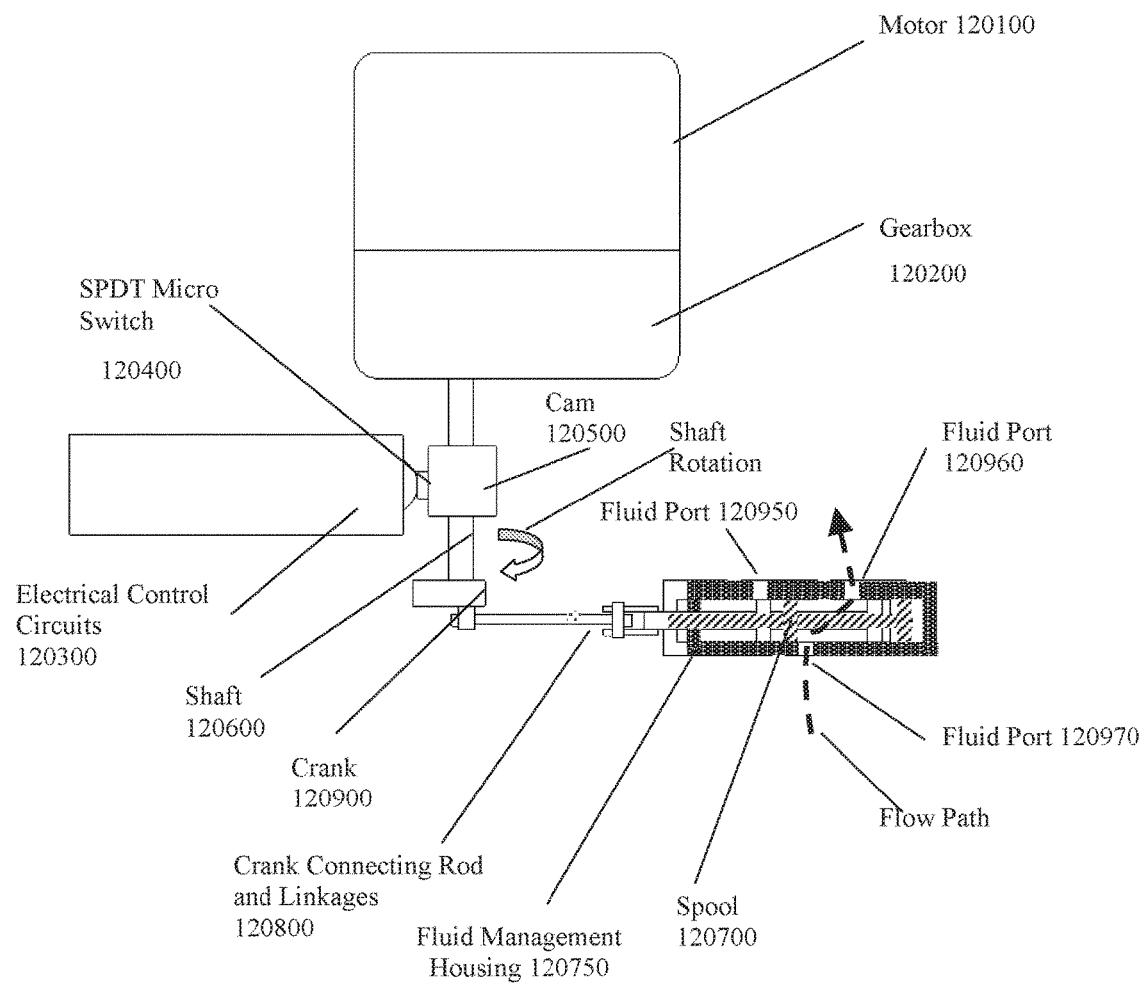

FIG. 120 further depicts an example embodiment of an Electric Motor Fluid Switch Spool, with a cross section view of the fluid control subassembly.

Figure 121:
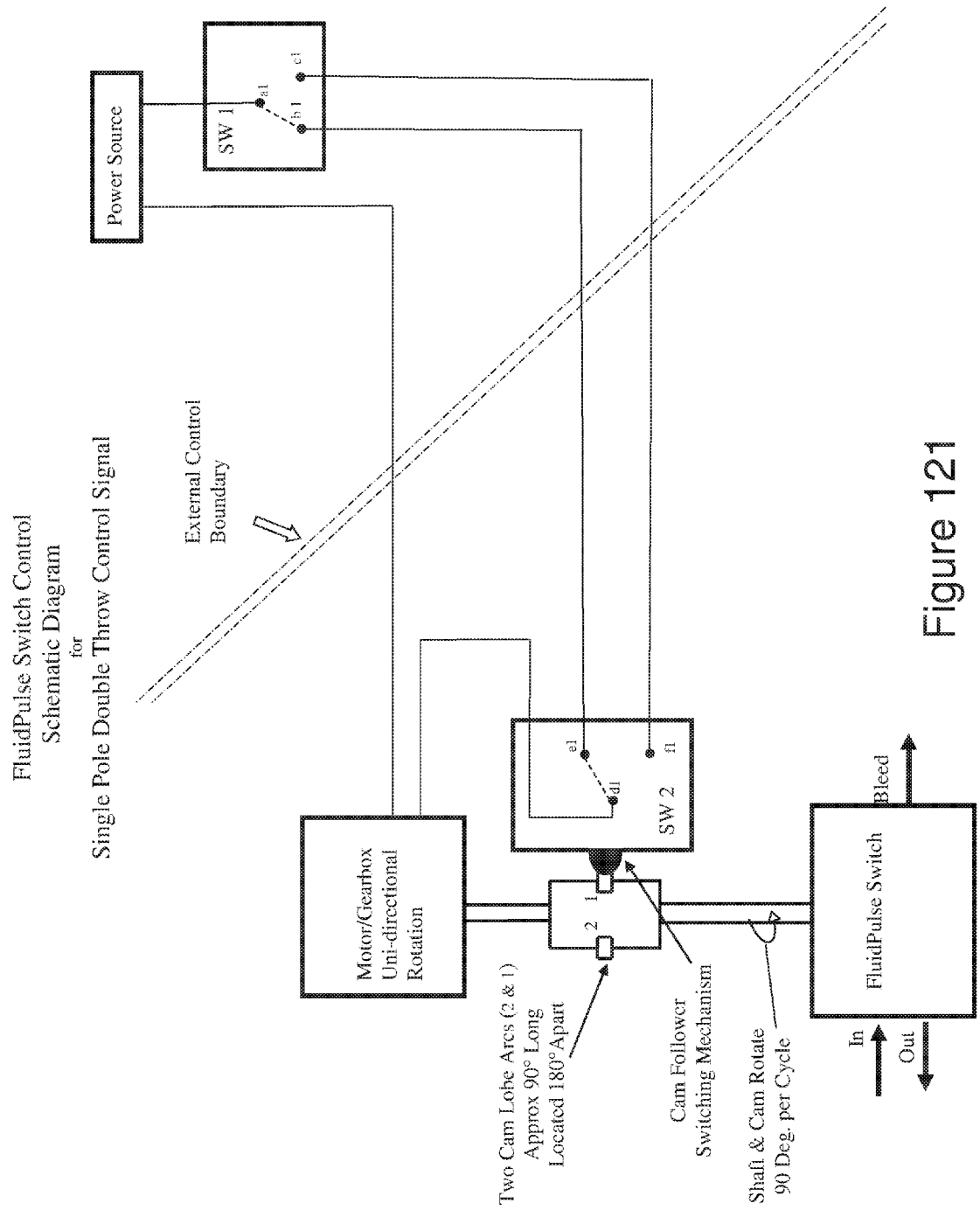

FIG. 121 illustrate an example embodiment of a relay controlled Electric Motor Fluid Switch.

Figure 122:
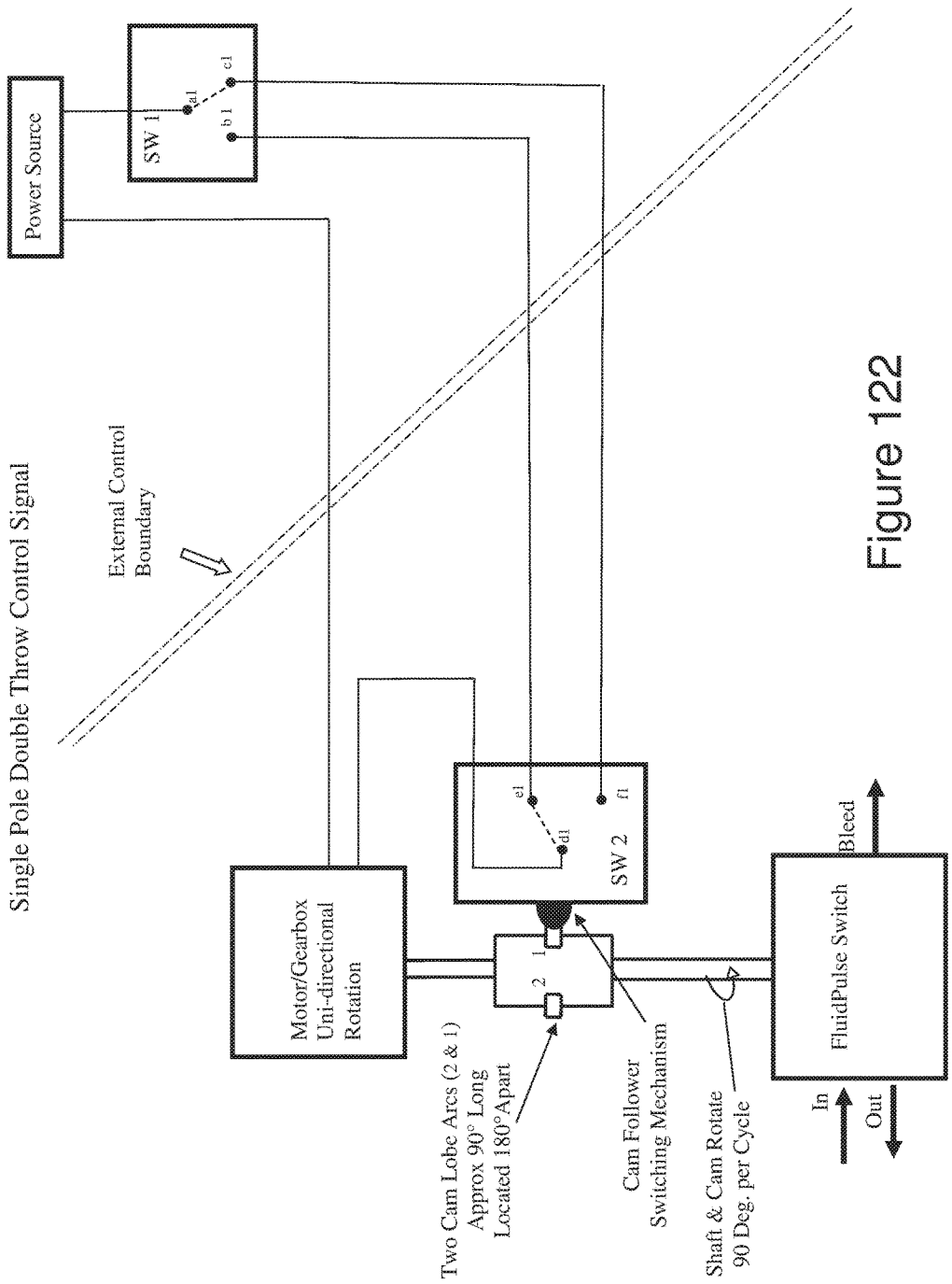

FIG. 122 illustrate an example embodiment of a relay controlled Electric Motor Fluid Switch.

Figure 123:
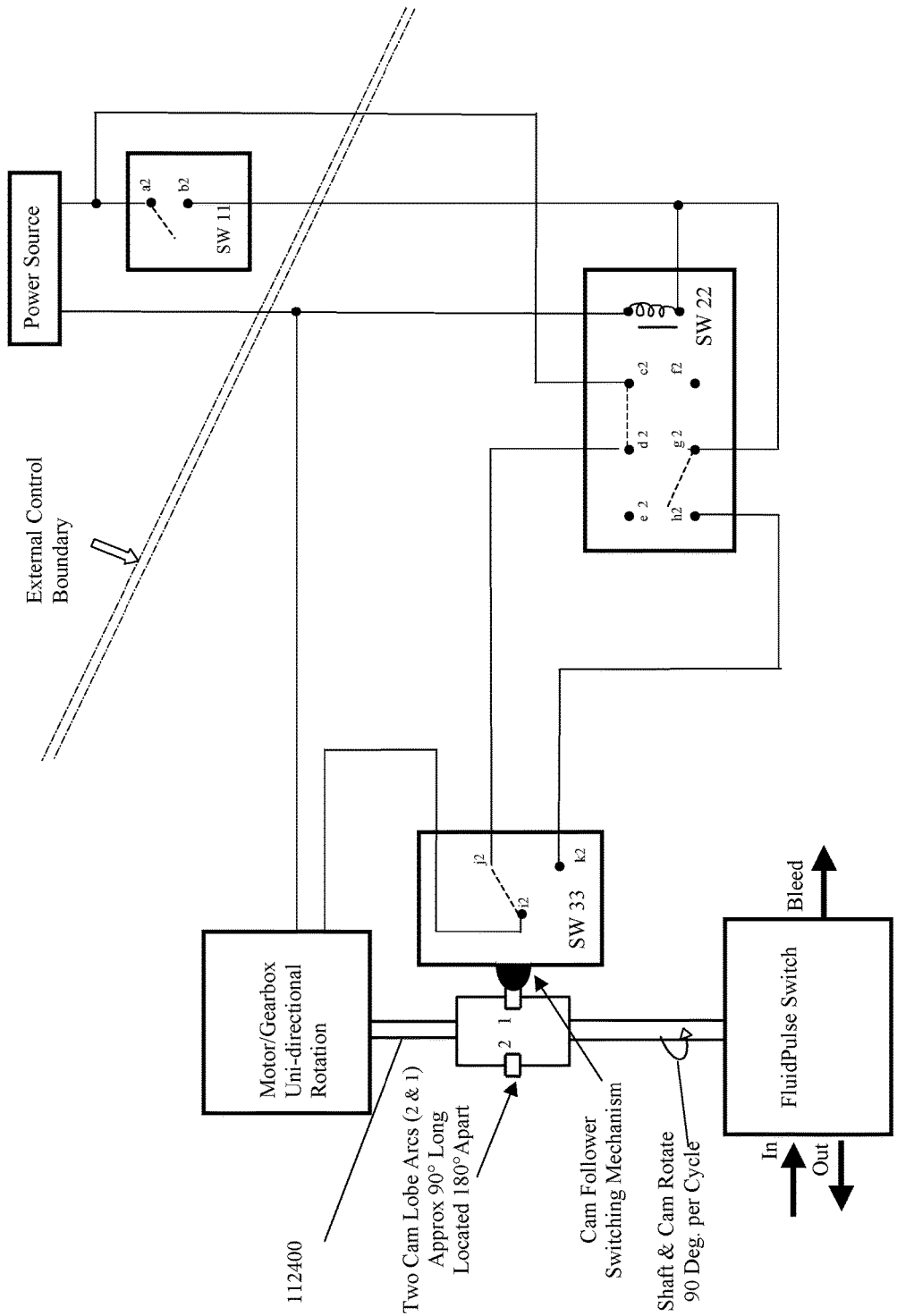

FIG. 123 illustrate an example embodiment of an on/off controlled Electric Motor Fluid Switch.

Figure 124:
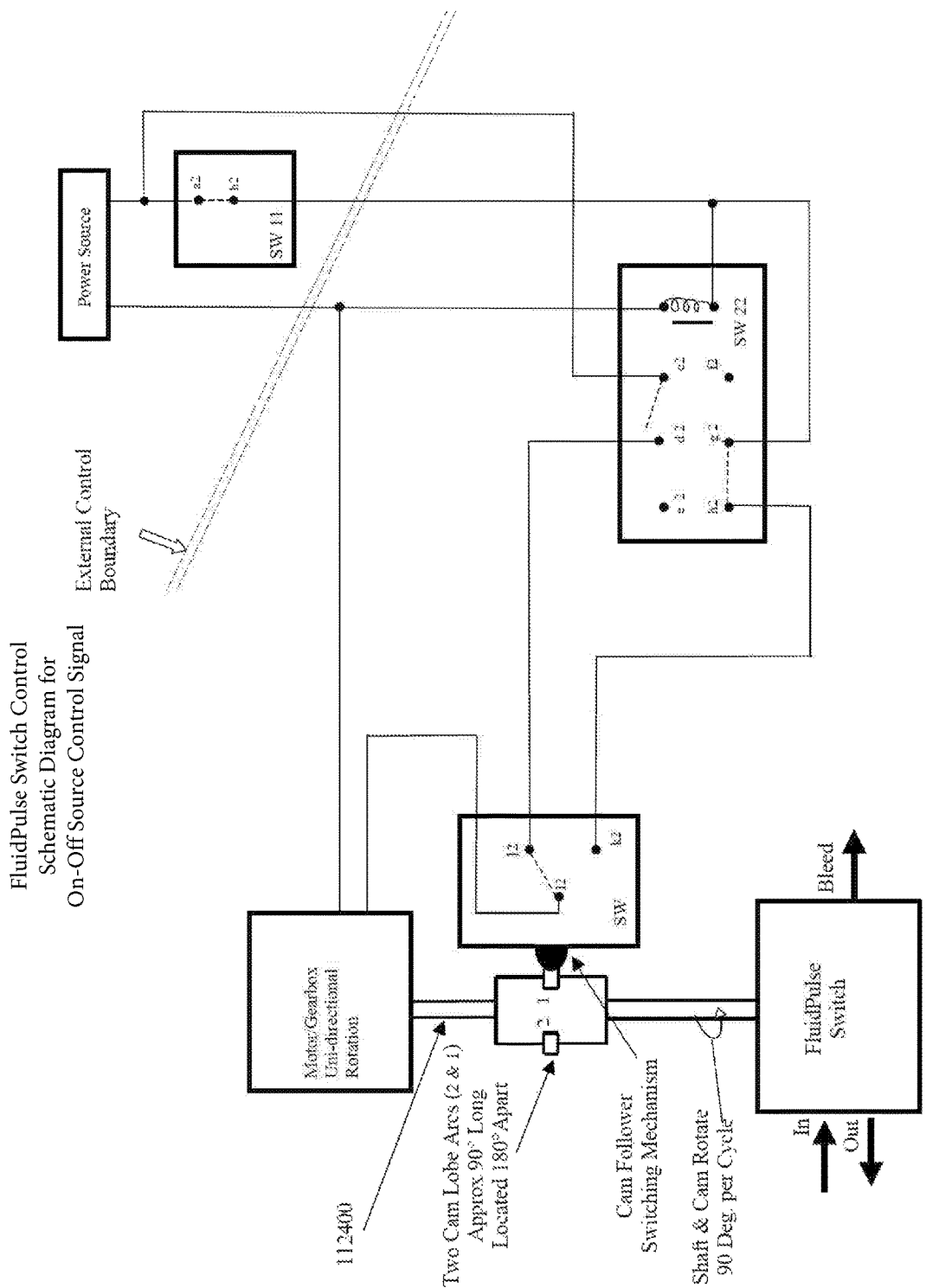

FIG. 124 illustrate an example embodiment of an on/off controlled Electric Motor Fluid Switch.

FIG. 125 illustrate an example Single Pole, Double Throw Control Signal sequence table for an example embodiment Electric Motor Fluid Switch.

FIG. 126 illustrate an example On/Off Control Signal sequence table for an example embodiment Electric Motor Fluid Switch.

Figure 127:
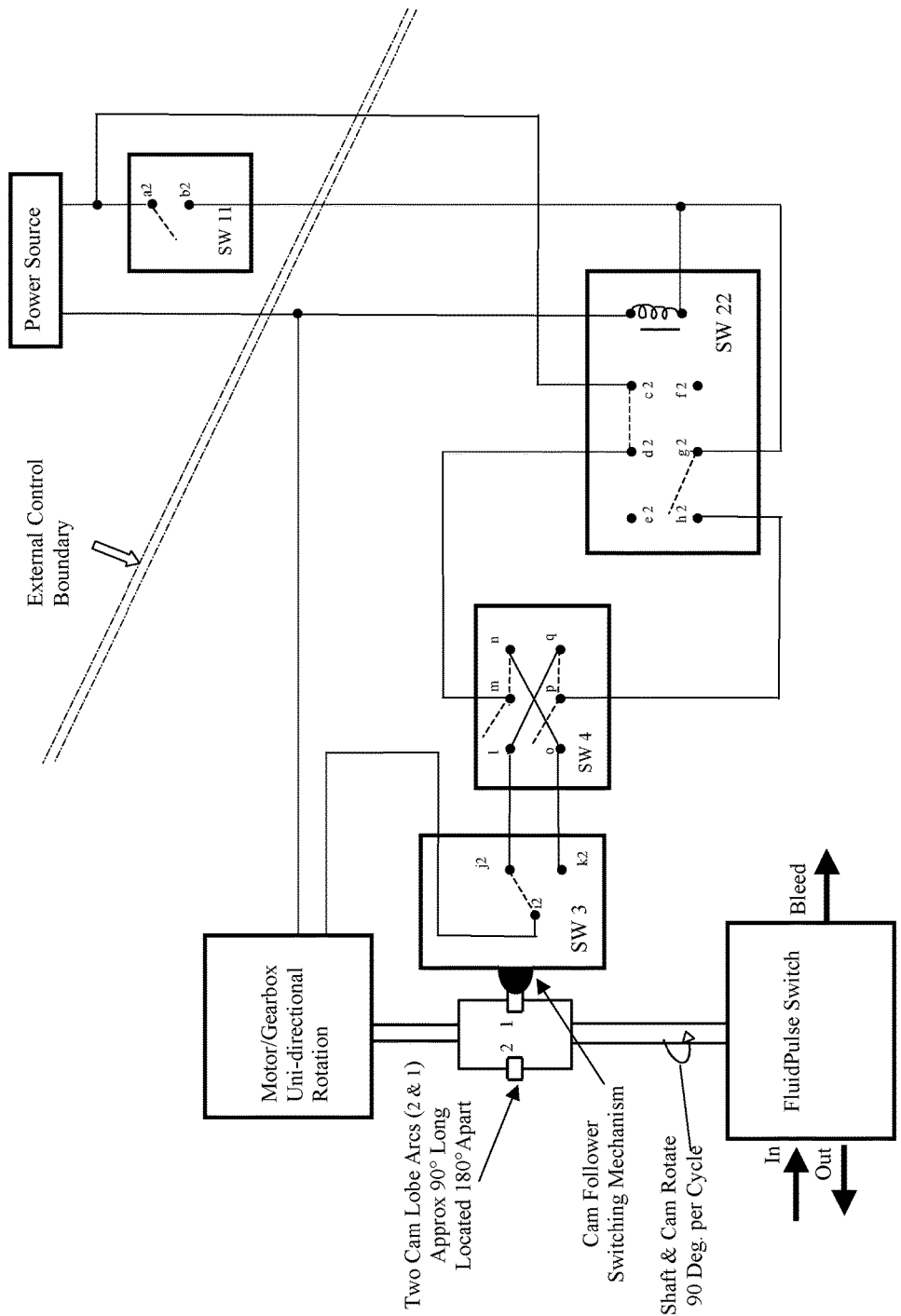

FIG. 127 depicts an example embodiment of an Electric Motor Fluid Switch.

Figure 128:
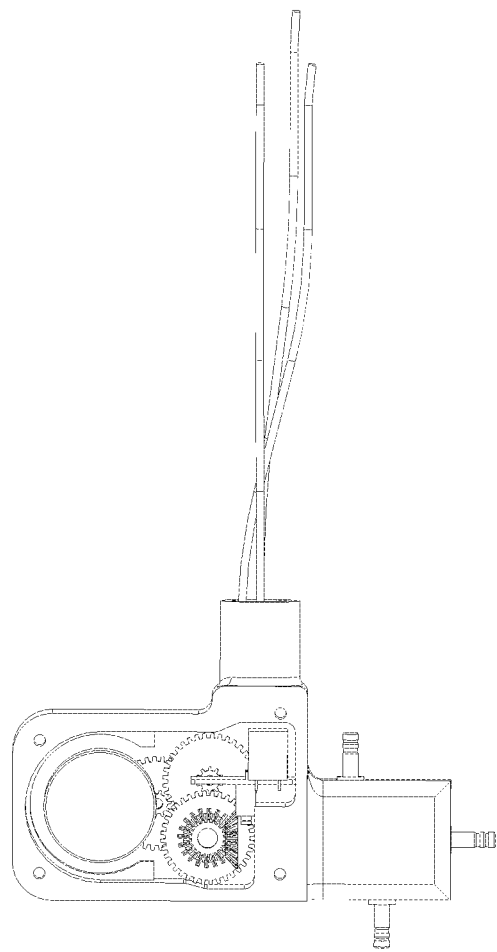

FIG. 128 depicts an example embodiment of an Electric Motor Fluid Switch, with a cutaway view illustrating an example electric motor, example gears, and an example circuit in an example enclosed housing.

Figure 129:
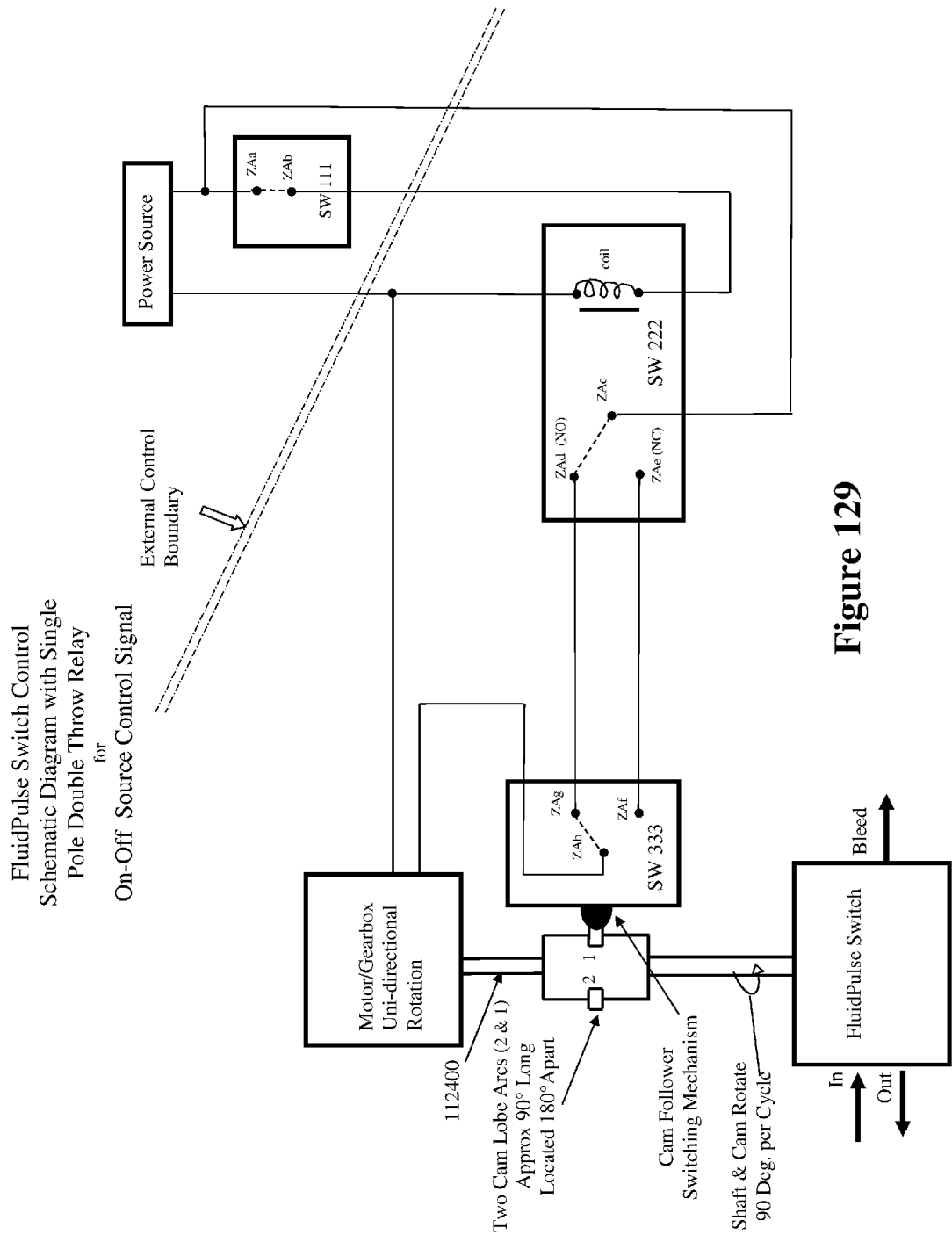

FIG. 129 illustrates an example embodiment of an Electric Motor Fluid Switch.

Figure 130:
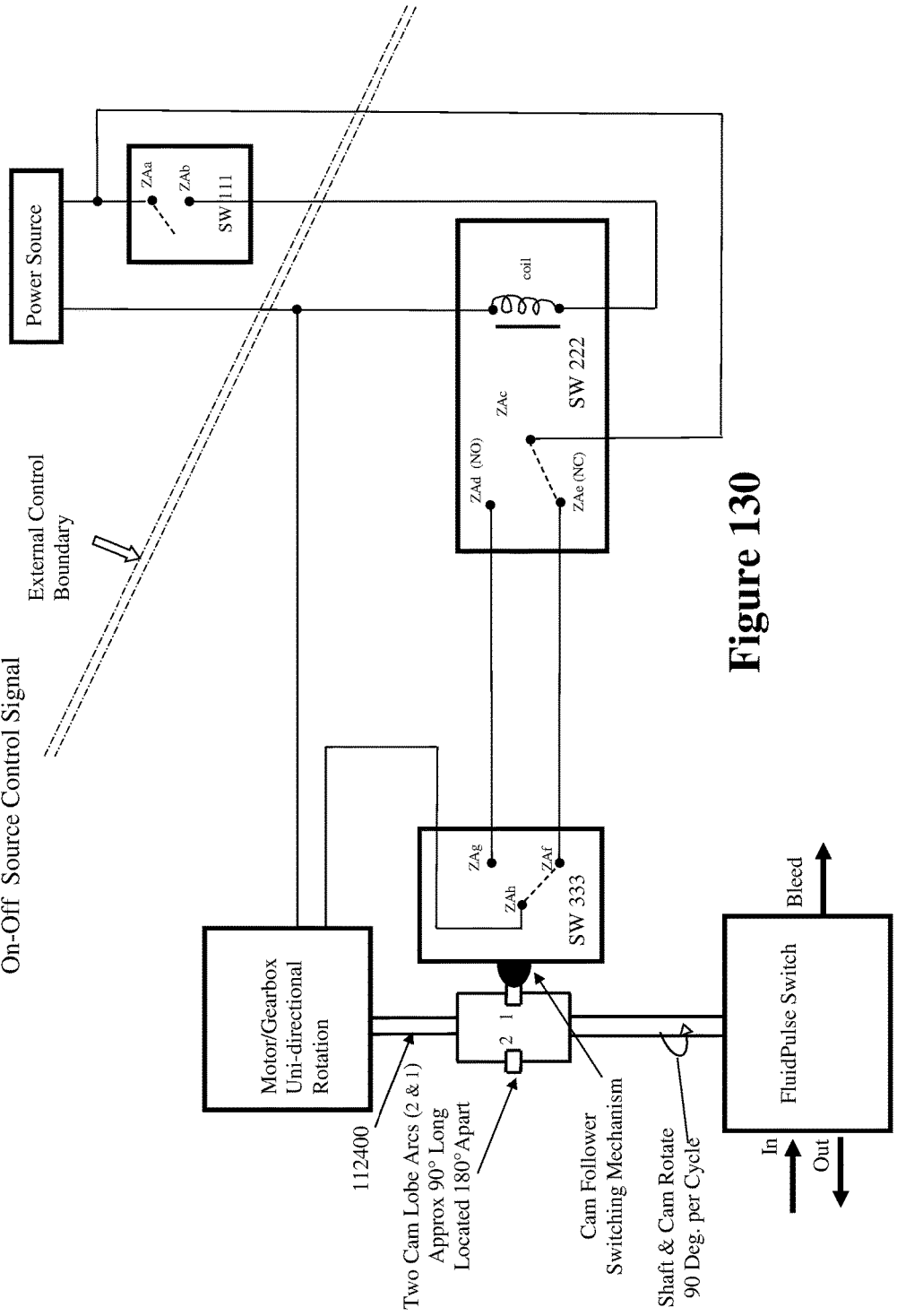

FIG. 130 illustrates an example embodiment of an Electric Motor Fluid Switch.

FIG. 131 illustrates an example Single Pole, Double Throw Control Signal sequence table for an example embodiment Electric Motor Fluid Switch.

Figure 132:
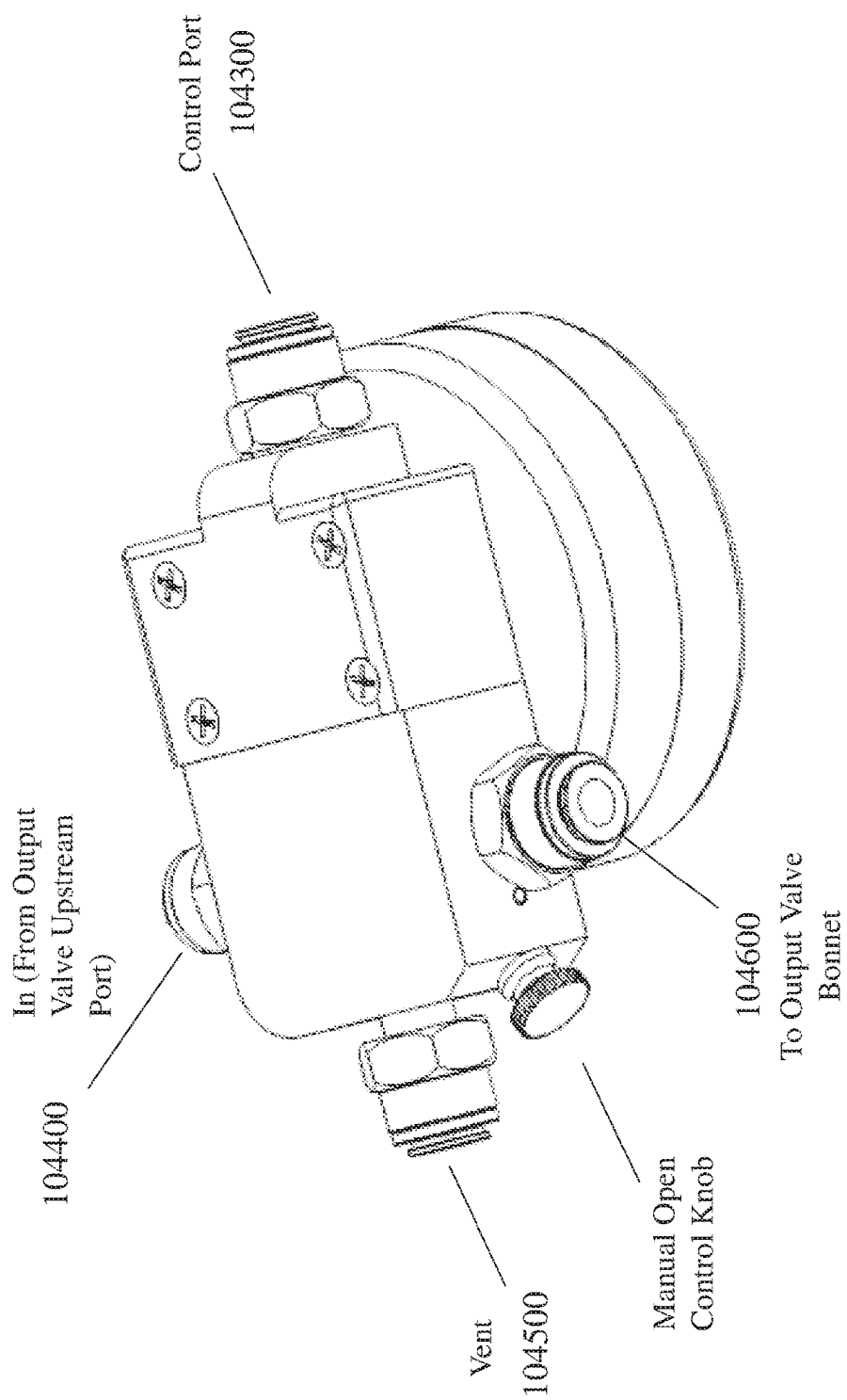

FIG. 132 illustrates an example embodiment of a fluid control pilot valve.

Figure 133:
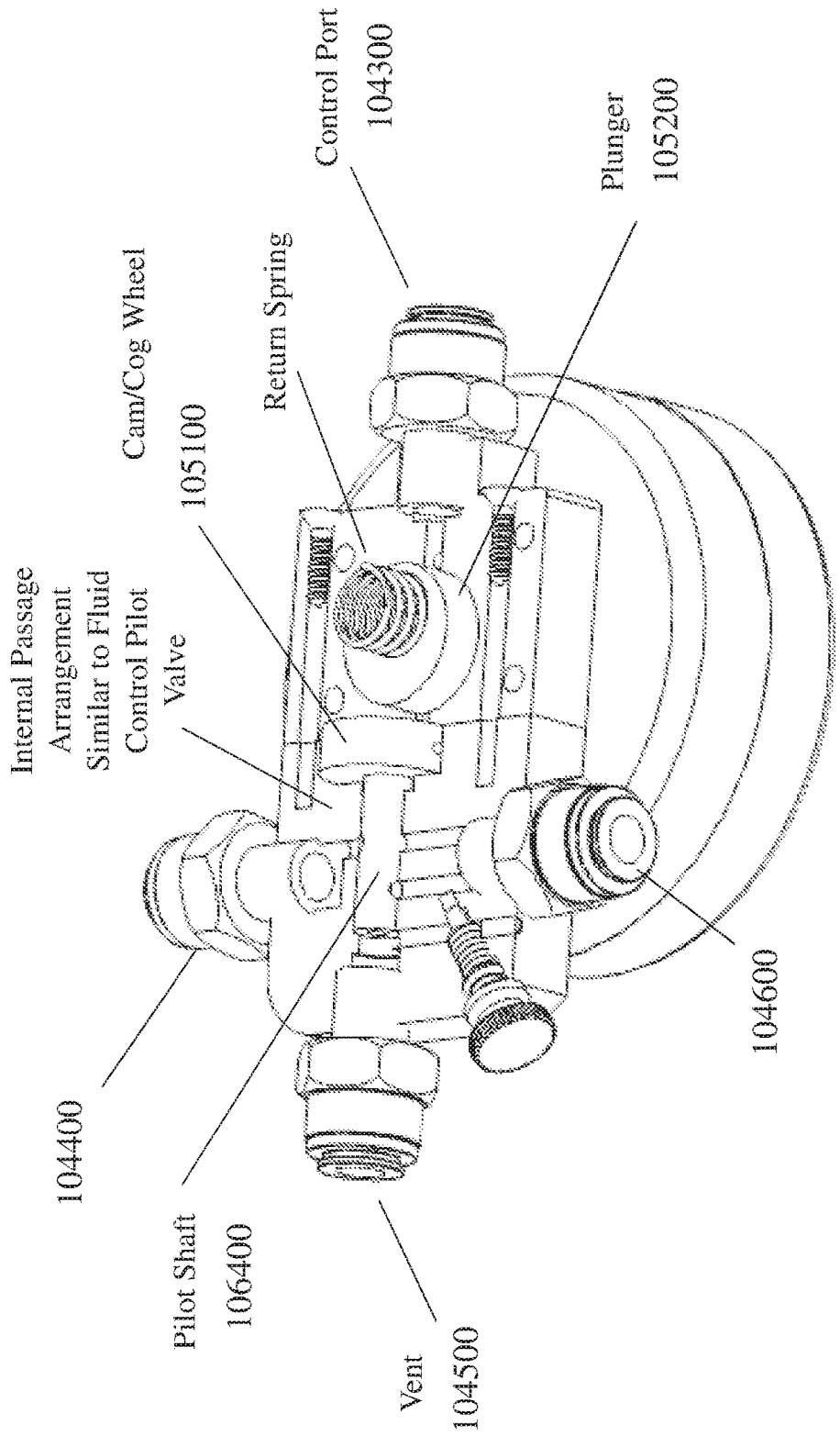

FIG. 133 illustrates a cross-sectional view of a fluid control pilot valve.

Figure 134:
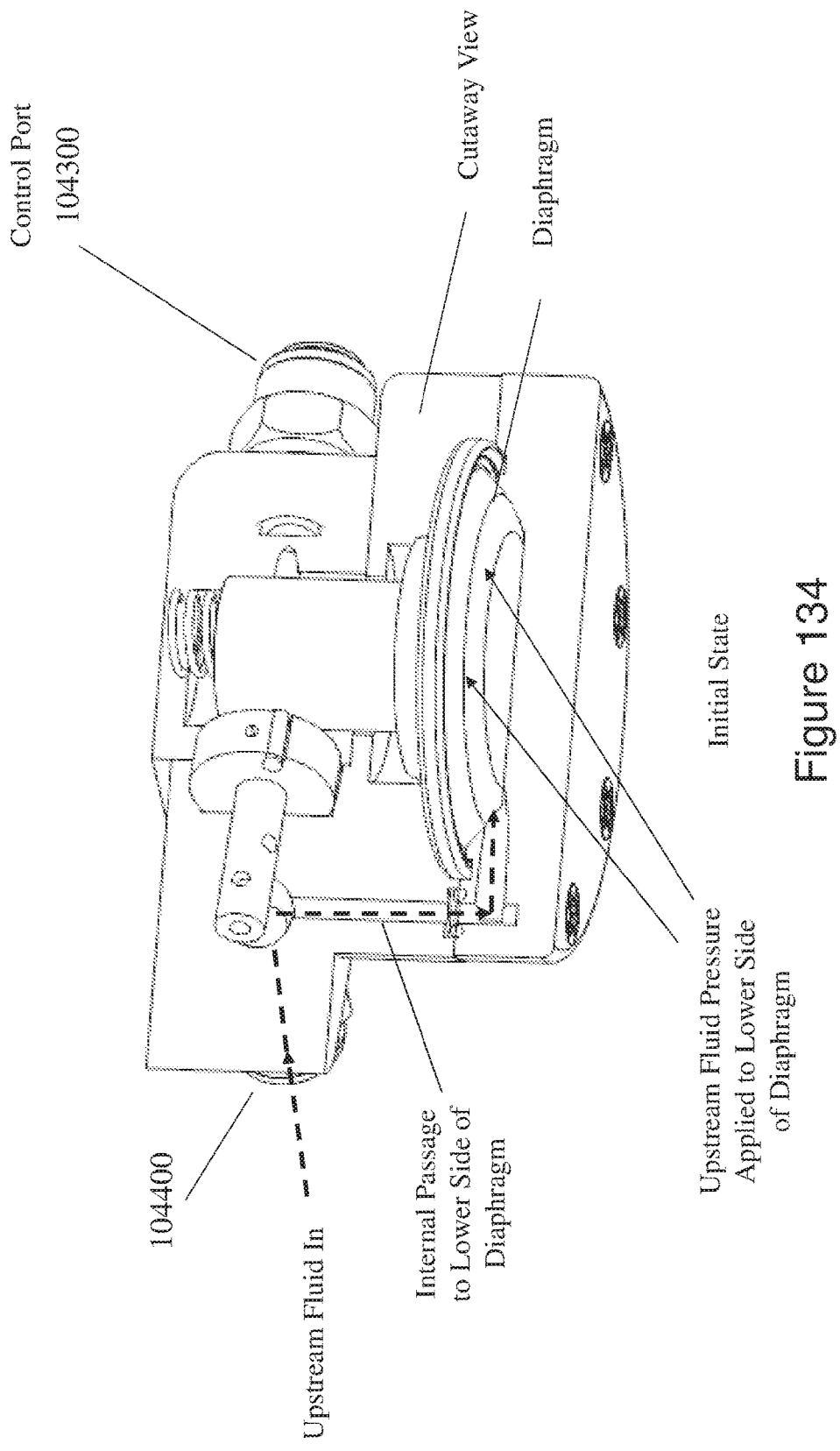

FIG. 134 illustrates a cross-sectional view of a fluid control pilot valve.

Figure 135:
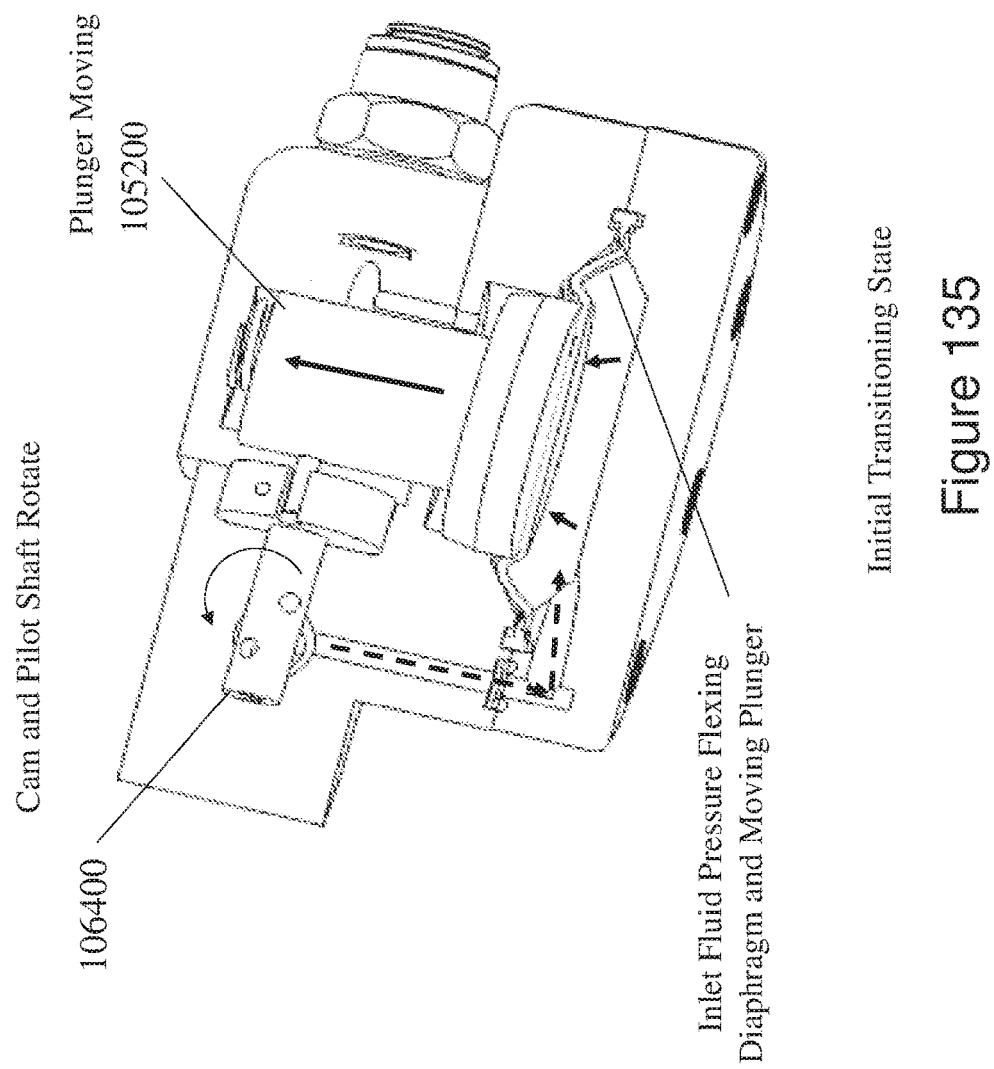

FIG. 135 illustrates a cross-sectional view of a fluid control pilot valve.

Figure 136:
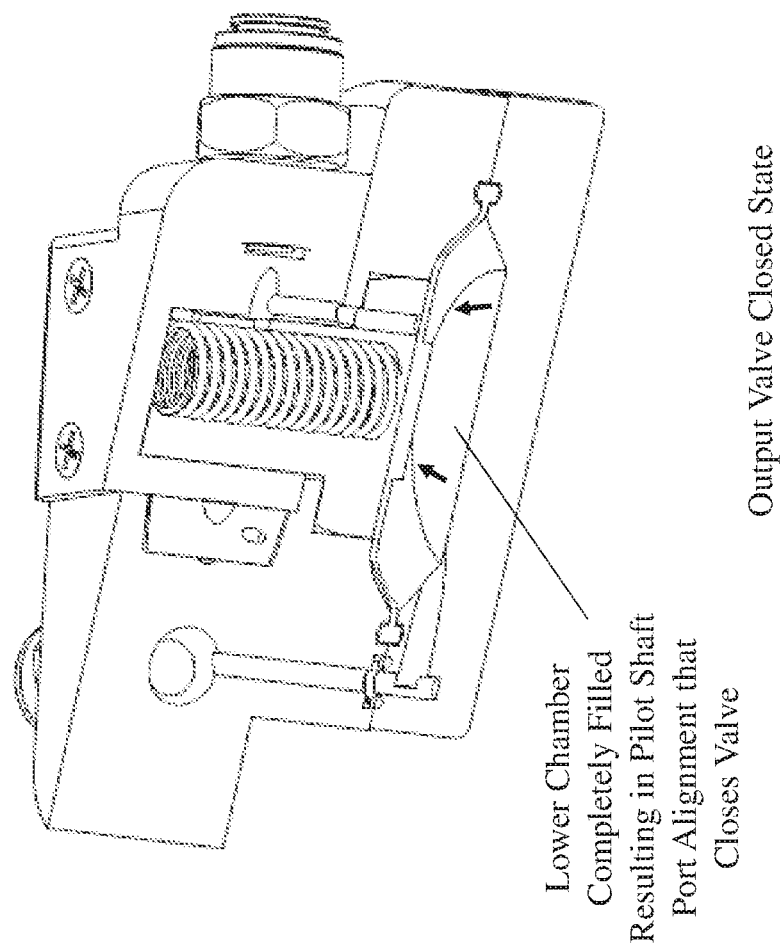

FIG. 136 illustrates a cross-section view of a fluid control pilot valve.

Figure 137:
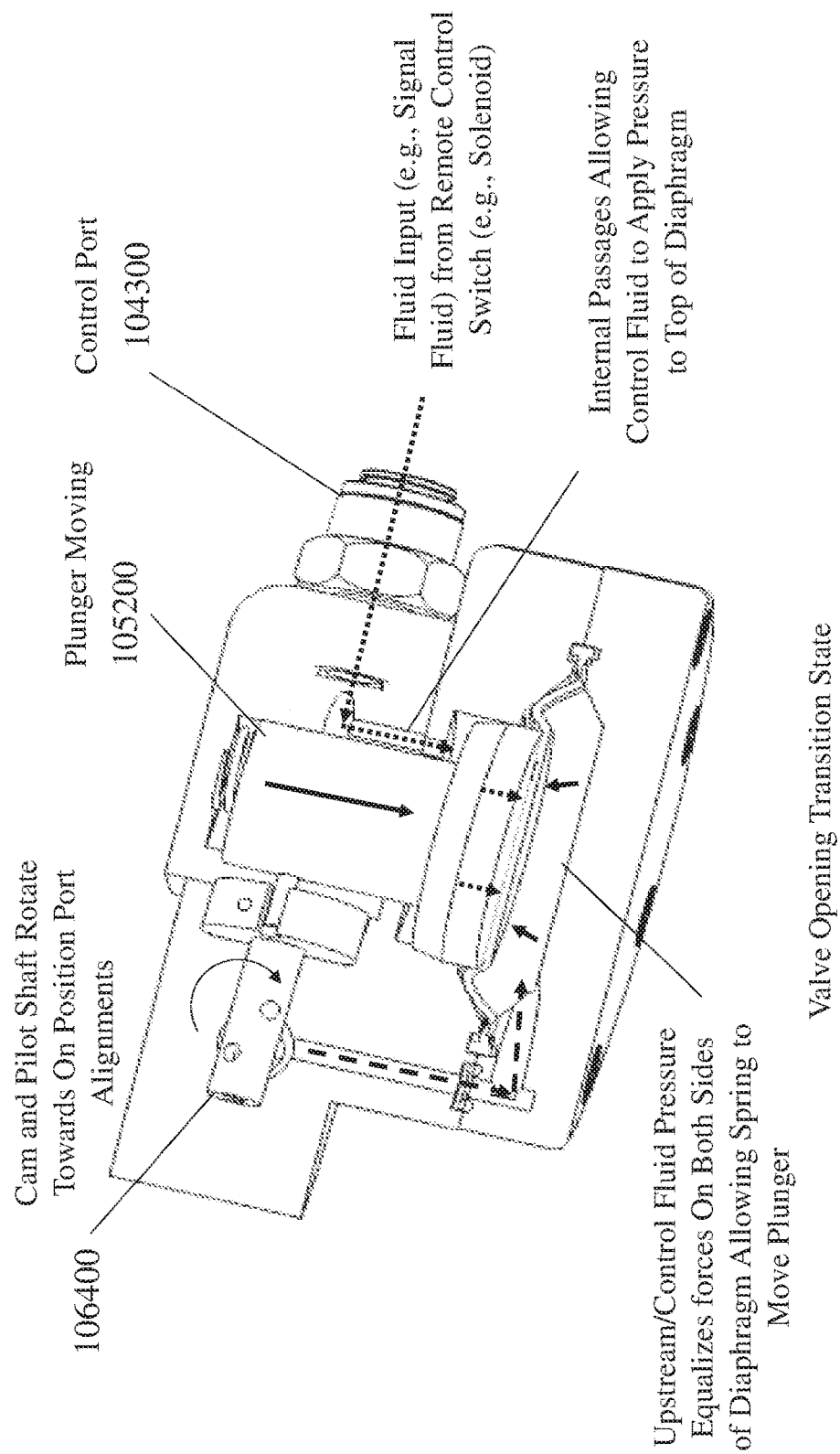

FIG. 137 illustrates a cross-sectional view of a fluid control pilot valve.

Figure 138:
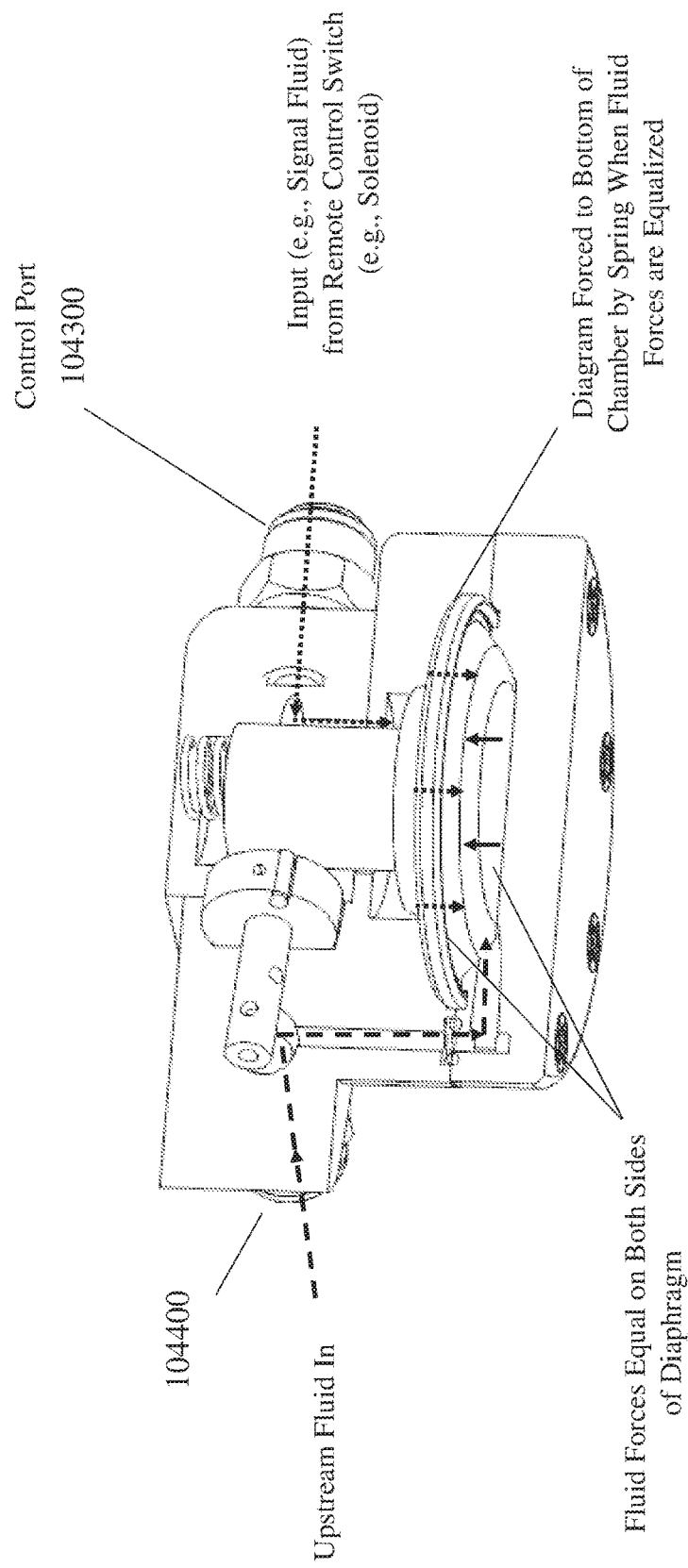

FIG. 138 illustrates a cross-sectional view of a fluid control pilot valve.

Figure 139:
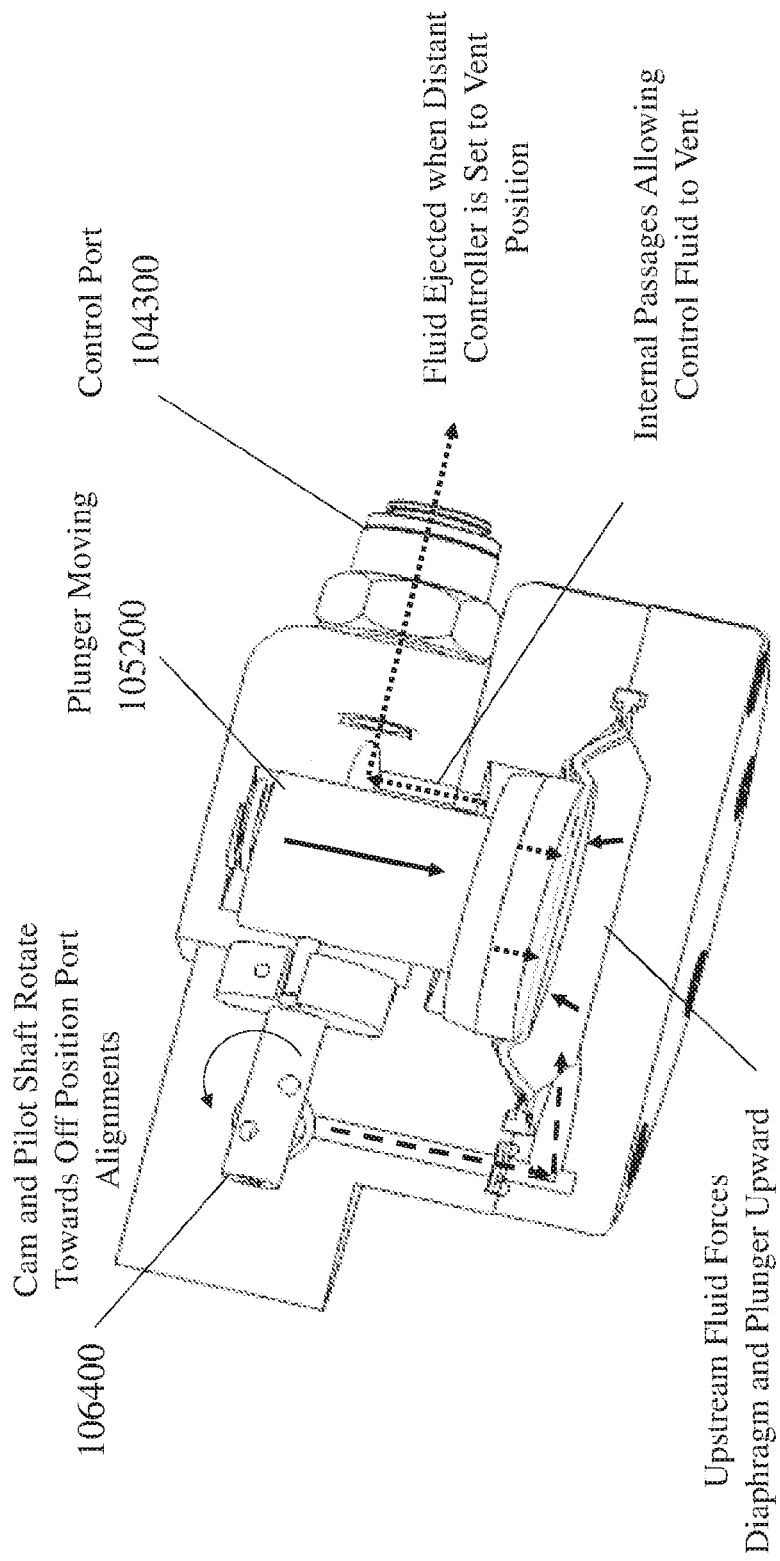

FIG. 139 illustrates a cross-sectional view of a fluid control pilot valve.

Figure 140:
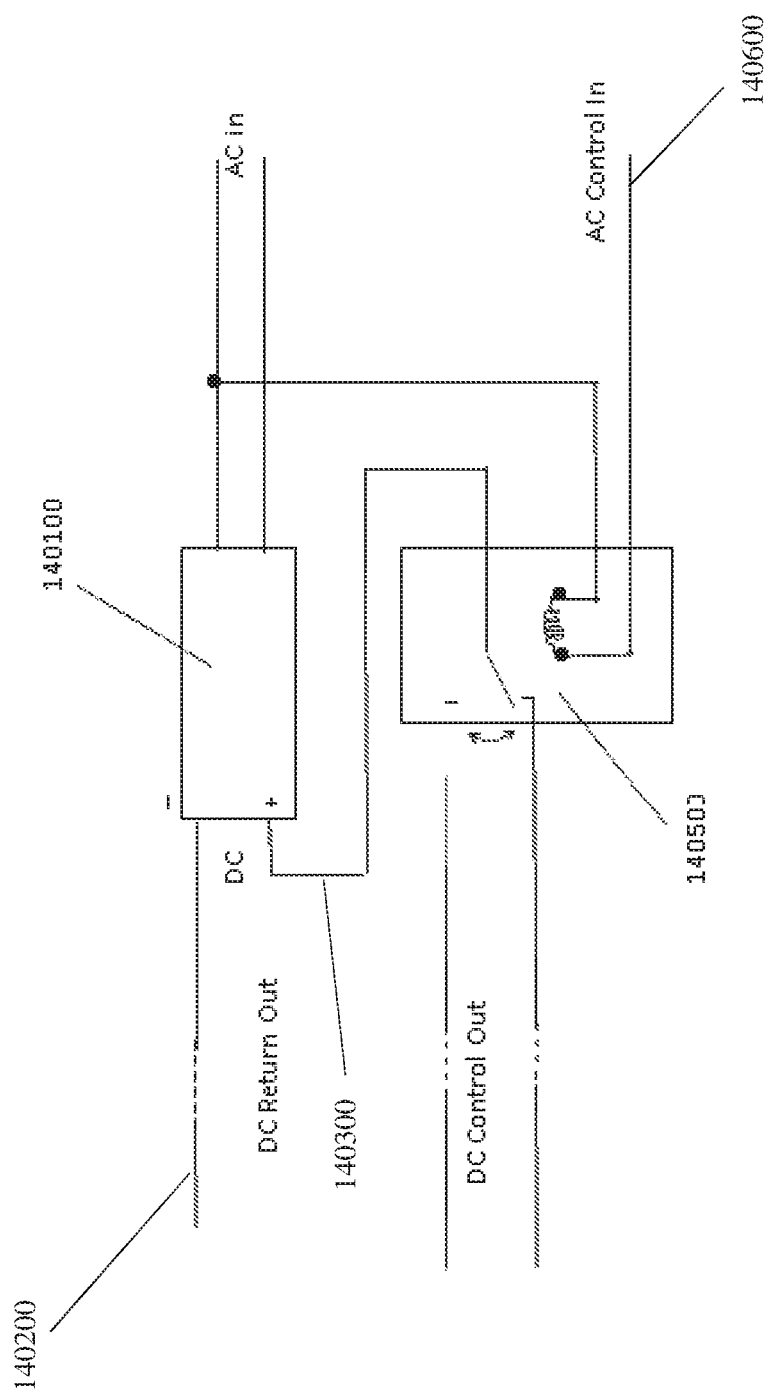

FIG. 140 illustrates a Single Pole Double Throw electric switch which may be used in conjunction with an AC/DC converter.

Figure 141:
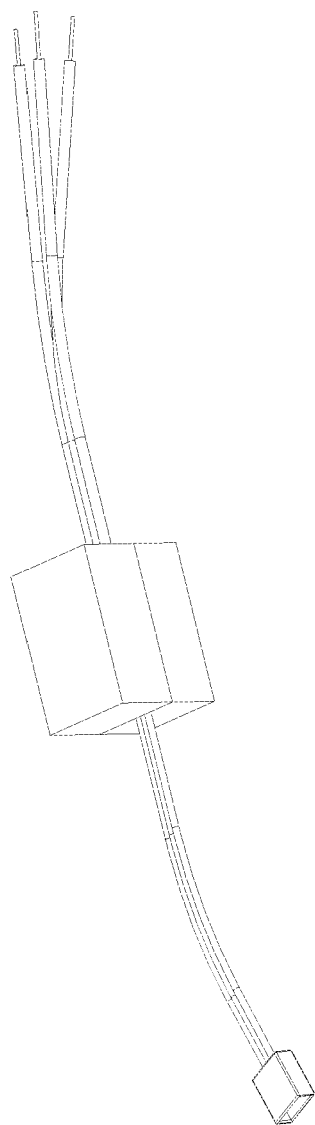

FIG. 141 illustrates an example embodiment of a Single Pole Double Throw electric switch with AC/DC converter assembly.

Figure 142:
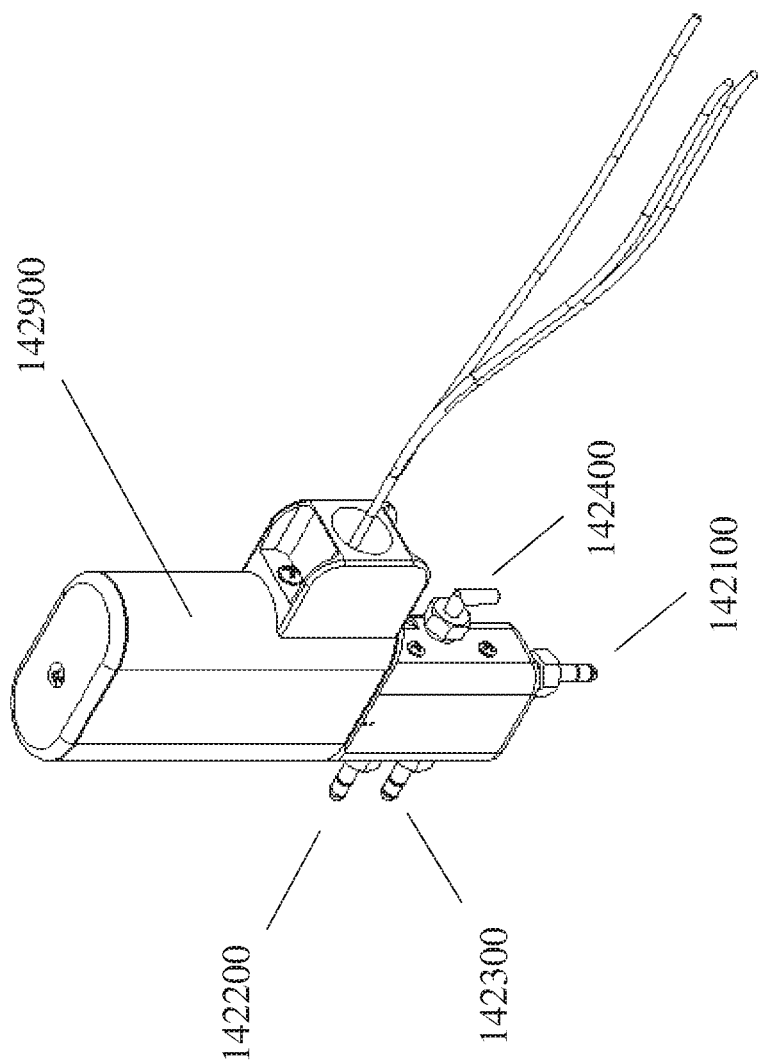

FIG. 142 illustrates an example embodiment of an electric motor, fluid control switch.

Figure 143:
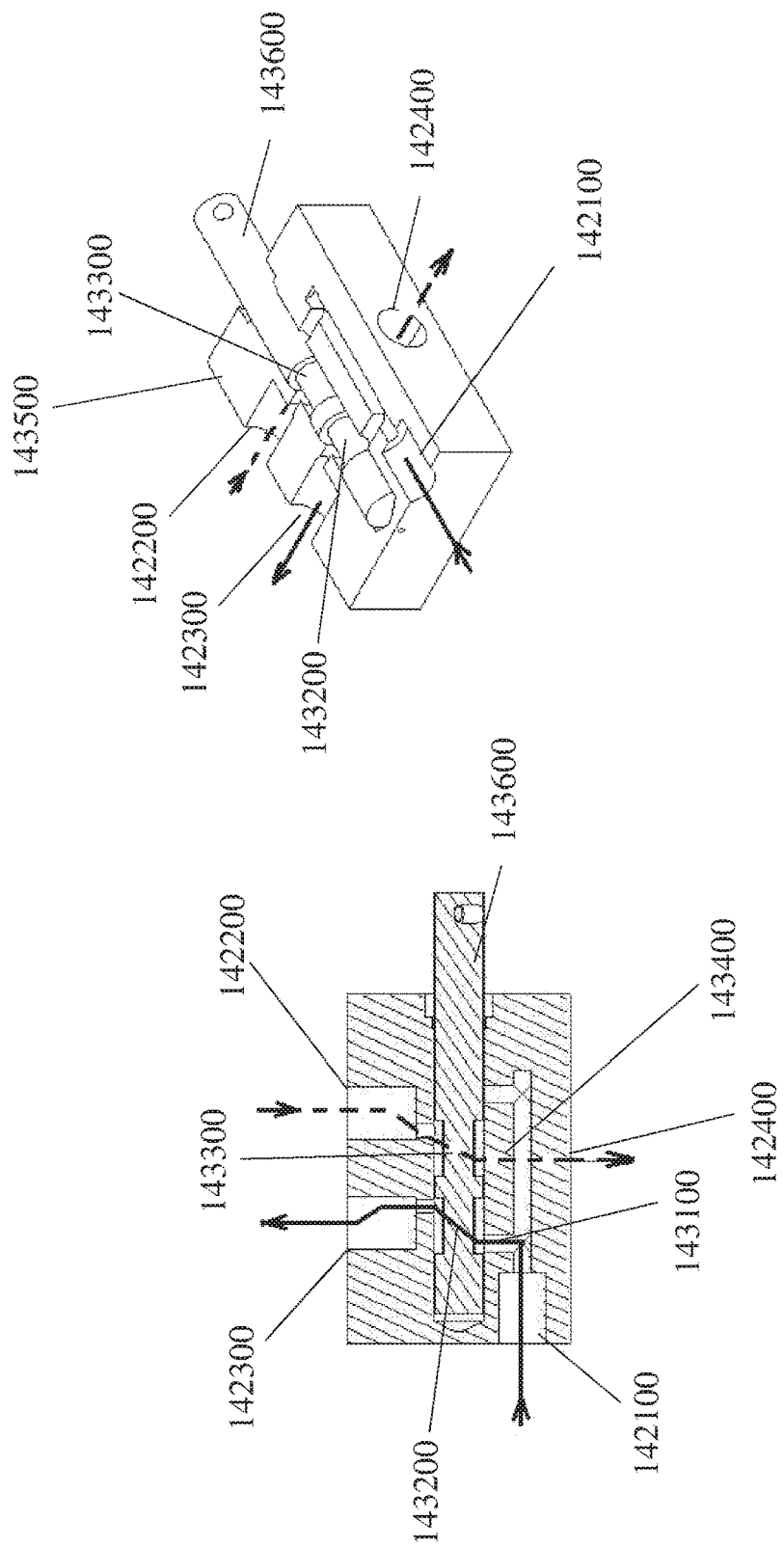

FIG. 143 illustrates a cross-sectional view of an example embodiment of a fluid switching element of a fluid control switch.

FIG. 144 illustrates a cross-sectional view of an example embodiment of a fluid switching element of a fluid control switch.

DETAILED DESCRIPTION

Certain embodiments described herein enable expanding an existing irrigation or other fluid delivery system without the need for electric regulation of flow distribution. Moreover, certain embodiments described herein are capable of regulating fluid distribution by an existing pressure control mechanism or independent of a pressure control mechanism. Certain embodiments described herein have utility for regulating fluid flow and distribution in irrigation or other fluid delivery systems.

As used herein the term fluid means any liquid capable of distribution. Illustratively, fluid is water, milk, juice, aqueous buffer, solvent, organic or inorganic liquids, gas, air, fluidized solid, slurry, liquid that contains particulate matter, solvated chemicals, or other molecule or material that requires distribution. In an example embodiment, the fluid is water. However, it is appreciated that the flow control system is independent of the fluid that is delivered, and a person having ordinary skill in the art recognizes that enablement for one liquid enables one to make and use embodiments described herein with any fluid.

Certain embodiments are suitable for use with any valve. Valve types operative herein illustratively include in-line, diaphragm, bypass, rotary in-line, slide, spool, restrictor, servo, exhaust, check, anti-siphon, ball, bibcock, stopcock, demand, double check, duckbill, flow control, foot, gas pressure regulator, leaf, pilot, poppet, sleeve, pressure reducing, pressure sustaining, back flow reducing, reed, saddle, solenoid, vacuum breaker, combinations thereof, or other valve configurations known in the art.

It is appreciated that a valve operable herein optionally includes a flow control arm that prevents complete opening of the valve. Illustratively, a flow control arm limits the movement of the diaphragm such that the valve prevents the full magnitude of source flow from reaching the output port. A flow control arm is optionally adjustable. Adjustability is optionally by a screw control or other adjustment or micro adjustment mechanism known in the art.

U.S. Provisional Application No. 60/901,055 is incorporated herein by reference as if each line and figure were explicitly set out herein. With particularity but without limitation, FIGS. 1-82 and the accompanying description of each figure are incorporated herein by reference.

Certain embodiments of flow control device components are optionally formed of a thermoplastic material and preferably are injection molded. Materials illustratively operative herein are thermoformable plastic, polyurethane, polypropylene, polyethylene, polyester, vinyl, polystyrene, rubber, die-cast metal, aluminum, steel, other suitable metals, reinforced plastic, inter fiber reinforced composite, combinations thereof, or other materials known in the art. Thermoplastic materials operative herein illustratively include but are not limited to, polystyrene, acrylonitrile, butyl styrene, and polyalkylenes.

Figure numbering is conserved between all figures. Thus, a numbered element holds the same number independent of the figure referred to.

Figure 1:
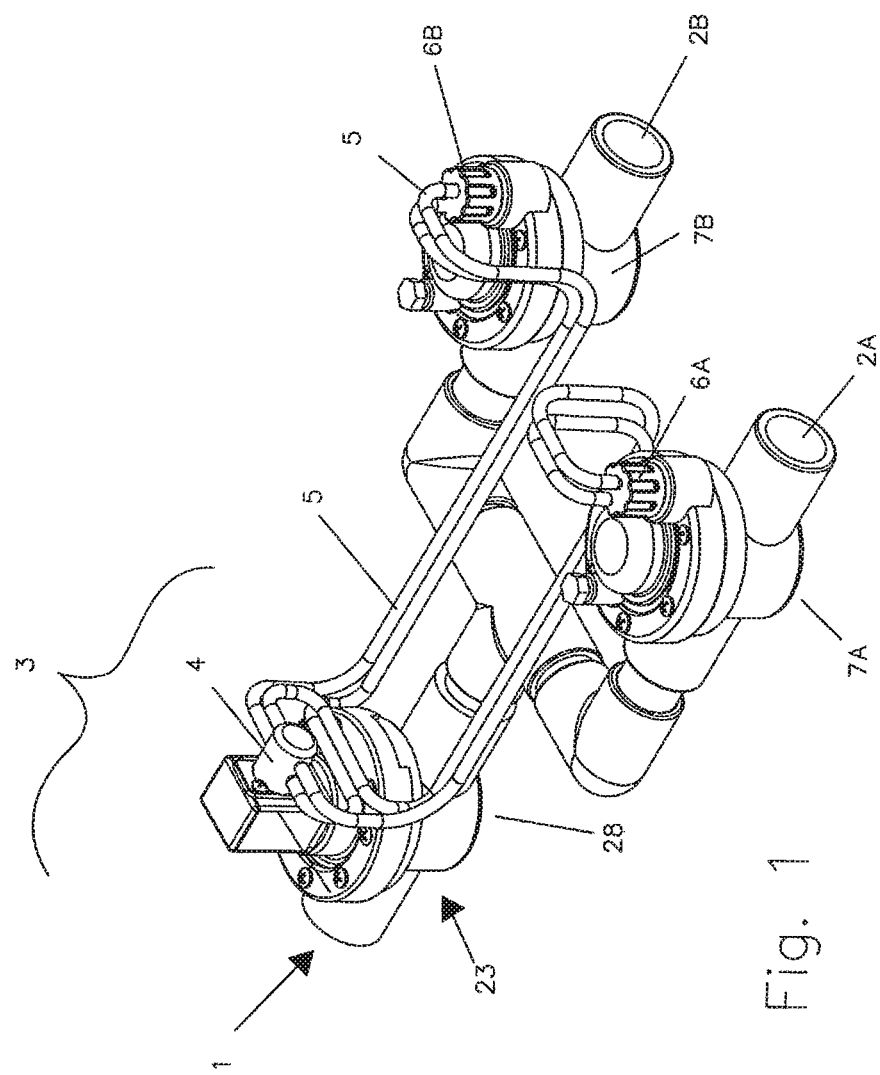
FIG. 1 depicts a general arrangement of an inventive flow control device controlled by a pressure activated servo assembly.

FIG. 1 represents a generalized arrangement for the inventive flow control device whereby a fluid inlet port 1 receives fluid from a source and the inventive device automatically determines whether one or more distribution valves 7A and 7B are activated or inactivated, thus, directing fluid out one or more of a group of fluid outlet ports 2A and 2B to a fluid distribution line.

In an example embodiment a fluid activated servo assembly 3 receives fluid from a source via an inlet port 1. Pressure, flow rate, or other parameter of the input fluid drives the fluid activated servo assembly 3 to activate or deactivate one or more output valves 7A and 7B. When more than one output valve 7A and 7B is present, activation of one output valve (e.g., 7A) occurs simultaneously, or nearly thereto, with deactivation of another output valve (e.g., 7B). Thus, fluid is directed into a particular distribution line with the same pressure and flow characteristics of the source fluid. By control from the fluid activated servo assembly 3, fluid is optionally then directed to a different distribution line by deactivation of the first output valve (e.g., 7A) and activation of another output valve (e.g., 7B). In this way multiple distribution lines are optionally served by a single source with the pressure, rate, and other flow characteristics of the original source maintained throughout the entire system (although other embodiments may include multiple sources). Thus, expansion of an existing irrigation or other fluid delivery system is optionally accomplished without requiring an additional fluid source, control device, or timing mechanism.

In an example embodiment a single fluid activated servo assembly regulates flow through two output valves. However, it is appreciated that the servo assembly is suitable for regulation of one, two, three, four, five, six, or more output valves. This is optionally accomplished by adding multiple valve shaft ports (FIG. 3, 21) at various angles each allowing fluid flow to one output valve. While certain embodiments are described with respect to two output valves, a person having ordinary skill in the art recognizes description and enablement of any number of output valves without limitation.

FIG. 1 also depicts a general communication system between the servo assembly 3 and the output valves 7. The servo assembly 3 optionally uses a servo valve 4 to allow fluid flow from one or more output valves 7A or 7B via two tubes 5. The tubes 5 communicate fluid to an output valve by an adapter (e.g., 6A) that optionally replaces the solenoid in a standard prior art solenoid controlled diaphragm valve. Thus, certain embodiments optionally incorporate the low cost and simplicity of widely used diaphragm valves with the certain embodiments of fluid activated servo devices described herein.

Figure 2:
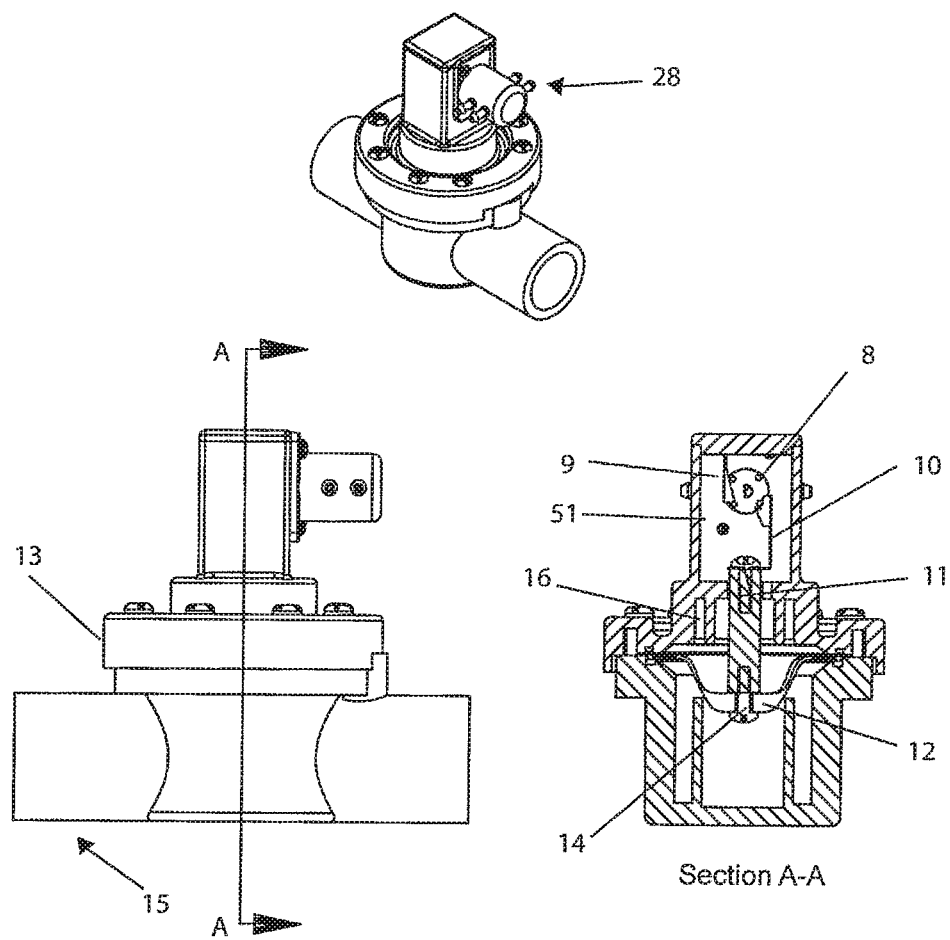
FIG. 2 depicts an arrangement of a pressure activated servo assembly.
Figure 3:
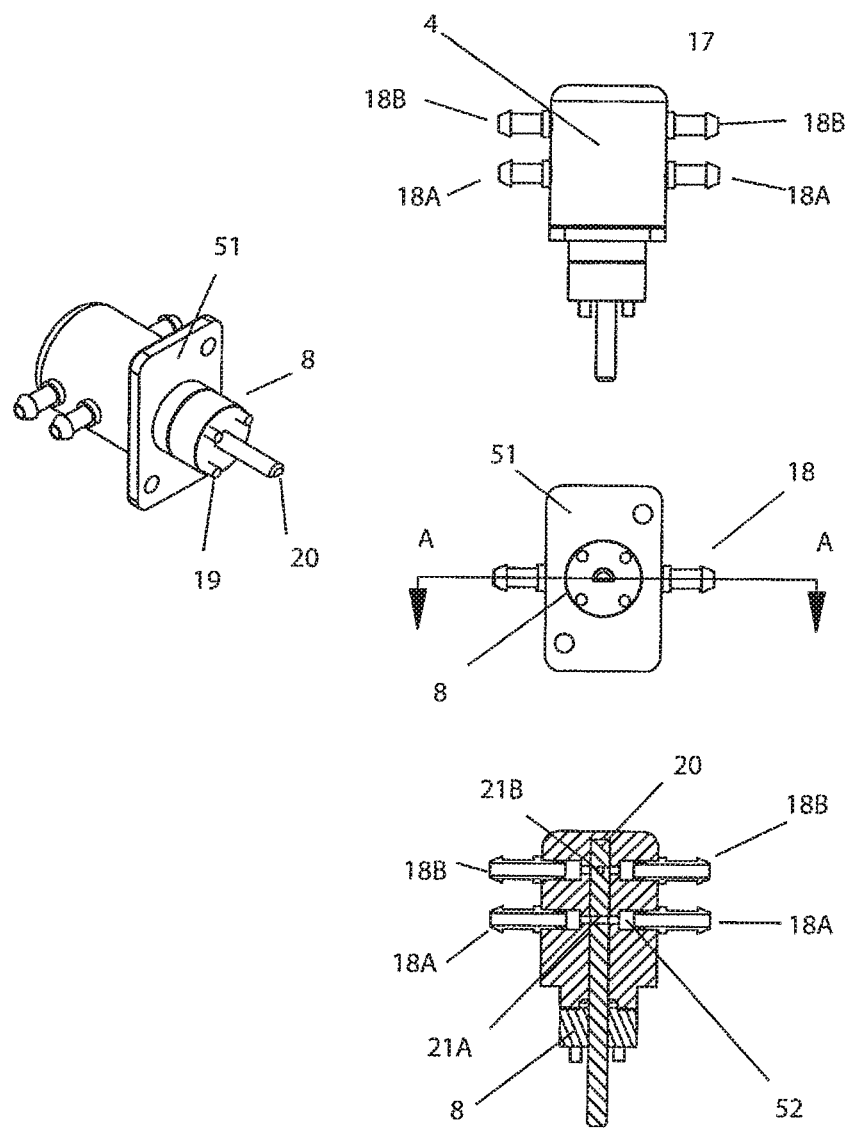
FIG. 3 depicts a servo valve as associated with a pressure activated servo assembly.

In an example embodiment as depicted in FIGS. 1-3 a fluid activated servo assembly 3 is a pressure activated servo assembly 28. The pressure activated servo assembly (PA) uses a pressure actuated mechanism to rotate a servo valve shaft 20 that switches the output valves 7A or 7B. The PA optionally alternatively distributes fluid from the original pipe into output ports 2A and 2B on a timed basis so that each output port 2A and 2B can deliver the same volume of fluid at the same pressure as is present at the inlet port 1. Thus, in an exemplary irrigation system the watering area can by doubled using one inventive fluid control device. Further, greater area is covered by employing multiple inventive fluid control devices in a cascading fashion. In the case of a pressure activated servo assembly 3, an existing system need only be modified by application of a single extra timer station. No new supply pipes, long trenches, or remote wiring is needed. Other embodiments may utilize additional timer stations, remote wiring, supply pipes and/or trenches.

An exemplary PA 28 is optionally constructed of an actuator housing 15 that is coupled with a cap 13 in such a way to form a seal sufficient to prevent fluid leakage. An existing prior art in-line diaphragm valve is optionally modified for use with certain embodiments described herein, whereby the actuator housing 15 is modified by insertion of a plug into the servo release port. It is appreciated that any method of stopping fluid entry into the servo release port is similarly suitable, or production of an actuator housing 15 without a servo release port is similarly operable. The cap 15 houses the servo actuated assembly that has a diaphragm 12 at the lower end of the system controlled by a spring 16 or series of springs that provide suitable force to extend the diaphragm 12 into the actuator housing 15 when pressure is reduced from the fluid source. Optionally, a single or dual acting piston drive is operable in place of the diaphragm and spring system. The cap 13 is mounted to a servo support block 51 that optionally supports an optional additional spring to increase the return force for activation of the cog mechanism. The cap 13 has a center hole that accepts a drive post 11 such that extension or retraction of the diaphragm 12 raises or lowers the drive post 11 relative to the cap 13. The drive post 11 is optionally mounted to the diaphragm 12 by a drive post mounting screw 14 or other attachment mechanism known in the art. At the opposite end of the drive post 11 is attached a cog drive spring 10 that interfaces with a cog wheel 8 to produce rotational force in the cog wheel 8 when the drive post is raised in response to reapplication of fluid pressure and raising of the diaphragm 12.

It is appreciated that any diaphragm, piston drive, or other means of stopping fluid flow is operable herein. Non-limiting examples include a dual bladder, single bladder with spring return, double acting diaphragms, single diaphragms with spring or other return, a dual acting piston drive, a single acting piston drive with spring or other return, combinations thereof, or other means known in the art.

Figure 12:
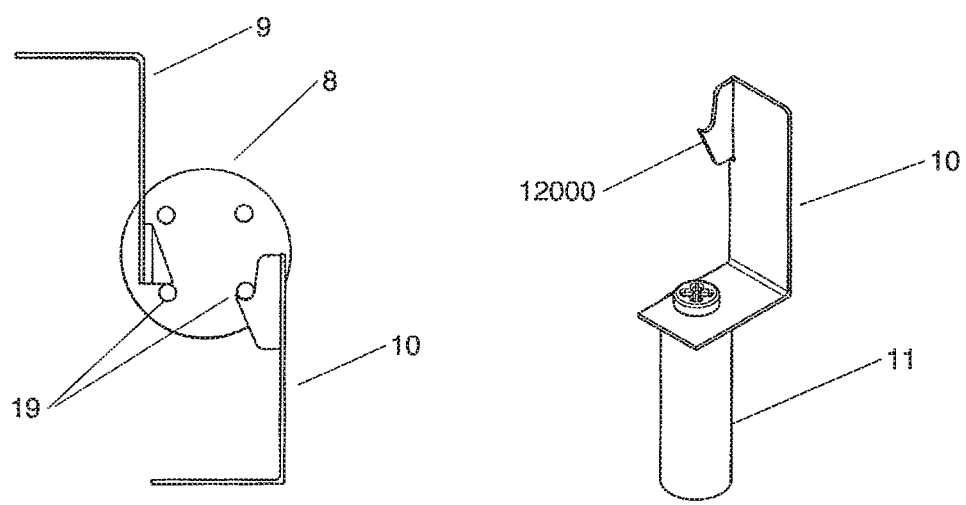
FIG. 12 depicts an example cog wheel and springs interface which is optionally used in a fluid activated actuator assembly.

FIG. 12 illustrates the example leaf spring 10 used in an example embodiment of a fluid activated servo assembly 3. FIG. 12 provides an enlarged view of the leaf spring 10 and cog wheel 8 of that shown in FIG. 2. The cog drive spring or leaf spring 10 optionally has a flange 12000 that provides a shelf that engages a cog wheel post 19 to drive the cog wheel 8 in the forward rotational direction (e.g., counter clockwise or clockwise). The leaf spring 10 is optionally flexible such that when the drive post 11 is moved downward a lower cog wheel post 19 does not impede the downward movement of the drive post and positions the next cog wheel post 19 on the shelf of the flange 12000 such that a subsequent raising of the drive post 11 will result in forward rotational direction of the cog wheel 8.

It is appreciated that the more cog wheel posts are operable on the cog wheel. The number of cog wheel posts is related to the number of valve shaft ports and output valves in the device. In a non-limiting example, a cog wheel has six (6) cog wheel posts. Thus, each phase of rotation rotates the valve shaft 60 degrees allowing control of three output valves. Other configurations are similarly operable.

The system optionally includes an anti-back rotational leaf spring stop 9 that prevents the cog wheel 8 from reversing the forward or rotational direction of the cog wheel 8. The anti-back rotation leaf spring optionally has a flange 12000 that provides a shelf that engages a cog wheel post 19 preventing back rotation. The anti-back rotation leaf spring 9 is flexible such that it does not impede the forward rotation of cog wheel 8.

FIG. 12 illustrates an example embodiment of a time-series fluid activation effect 10100 on a 4 post cog wheel 8 with the raising and subsequent lowering of an interfacing leaf spring 10 and anti-back rotational leaf spring stop 9 as similarly described above.

The cog wheel 8 optionally has a rotational resistance sufficient to prevent reverse movement of the wheel when the drive post 11 is lowered. This rotational resistance is optionally provided by an O-ring or other pressure seal that provides suitable friction to prevent unwanted reverse movement of the cog wheel 8 while not being so great as to impede forward rotation when the drive post 11 is raised.

FIG. 3 depicts an example embodiment of a servo valve assembly 4. A valve shaft 20 is rotatable with respect to the servo body 17 and a shaft that connects two or more tubing interconnect fittings 18. The valve shaft 20 is secured to the cog wheel 8 such that rotation of the cog wheel 8 produces rotation in the valve shaft 20. The valve shaft 20 is optionally cylindrical in shape. Preferably the valve shaft 20 is hemispherically shaped where it meets the cog wheel 8 such that the rotational force in the cog wheel is efficiently translated to the valve shaft 20. It is recognized in the art that other shapes for the cog wheel interface end of the valve shaft 20 are similarly suitable illustratively including square, triangle, oval, rectangle, pentagon, hexagon, and other shapes known in the art. Alternatively or additionally, the valve shaft 20 meets the cog wheel 8 in a pressure fitting such that the association of the two parts provides sufficient frictional force that rotation of the cog wheel translates to rotation of the valve shaft. It is also appreciated in the art that the cog wheel and valve shaft are optionally affixed with an adhesive or by press fit. The cog wheel 8 and valve shaft 20 are optionally formed from a single unitary piece eliminating the need for fitting a separate valve shaft 20 and cog wheel 8.

The servo valve assembly 4 preferably includes a servo body 17 that has at least one servo body shaft 52 interconnecting two tubing interconnect fittings 18. Preferably, a servo body 17 has two servo body shafts 52. However, it is appreciated that multiple other servo body shafts are similarly operable. For example, three, four, five, or six servo body shafts are operable, each serving a single output valve (or multiple output valves). The servo body 17 preferably has a cavity to accept a valve shaft 20 such that when a valve shaft port 20 aligns with servo body shaft 52 fluid flow is possible. In an optional embodiment, a valve shaft port is a slot (FIG. 8, 21) that allows communication between two adjacently positioned tubing interconnect fittings 18. It is appreciated that any method of regulating flow between two or more shafts is similarly operable herein. When two valve shaft ports 21A and 21B are present in a valve shaft 20 they are preferably positioned at 90 degrees relative to one another. Thus, a 90 degree rotation of the cog wheel aligns one valve shaft port 21 with a corresponding servo body shaft 52. The valve shaft ports 21A and 21B are preferably capable of delivering flow omnidirectionally. Thus, in this example, only one set of servo body shafts 52 are aligned at one time regulating flow to one output valve 7. This arrangement provided alternating flow through the servo body 17 for each 90 degrees of valve shaft 20 rotation as provided by four cog wheel posts 19 on the cog wheel 8.

It is appreciated that multiple configurations of a valve shaft port 21A and 21B are operable herein. In an example embodiment a valve shaft port is a straight shaft passing from one side of the valve shaft 20 to the other through a central axis. Alternatively, a valve shaft port is a notch with a length parallel to the central axis of the valve shaft. The notch forms a flow bypass zone that allows flow between two servo body shafts adjacent to each other. A valve shaft port 21A and 21B operable herein is illustratively non-linear and is optionally designed to allow fluid flow between servo body shafts 52 in any orientation. It is appreciated that a valve shaft port optionally incorporates a back flow prevention system such that fluid flow through a valve shaft port is unidirectional.

The inventive servo valve assembly 4 optionally is housed in a protective cover to reduce contamination by soil, water, or other environmental conditions. A protective cover is optionally a separate piece that is removable, or is incorporated into a single injection molded part that may be unitary or separate from the cap 13.

The inventive arrangement functions when the source fluid is pressurized by forcing the drive post 11 into its raised position extending the cog drive spring 10 to rotate the cog wheel 8 into its new position. This position aligns one of the valve shaft ports in the valve shaft 20 with its respective shaft connected to tubing interconnect fittings 18A or 18B in the servo valve. This position allows fluid to flow from an output valve (e.g., 7A or 7B) causing the output valve to open. Upon termination of the fluid pressure cycle by the control mechanism, the pressure is removed from the diaphragm 12 allowing pressure from the springs 16 to extend the diaphragm into the closed position while the leaf spring 9 prevents the cog wheel 8 from rotating in the reverse direction by the retraction of the drive spring 10.

In an example embodiment, two commercially available output diaphragm valves are connected to the fluid activated servo assembly 3 using standard PVC plumbing fittings. When fluid pressure is applied (turned on at the central control source) it enters the assembly at a fluid inlet port 1 and pressurizes a diaphragm 12 inside the servo assembly 3 that moves a drive post 11 bar and cog wheel 8 that rotates a servo valve 20 which in turn controls the output diaphragm valves 7. When fluid pressure is turned off the drive post 11 returns to its starting position. When pressure is reapplied the drive post engages a new cog wheel post 19 that rotates the servo valve 20 to a new position thereby opening the opposite output diaphragm valve 7. This alternates as determined by the fluid source control timer. Time durations are set for each output port per normal timer operation.

Each of the valves is optionally formed from a commercially existing fluid valve. Fluid valves, pipes, fittings, and other parts of commercially available fluid control systems operative as base units herein are optionally obtained from irrigation supply sources or sprinklerwarehouse.com.

A user may have an existing system in which all the timing or control stations are in prior use and no expansion of the existing control mechanism is possible. Alternatively, in a new or existing installation a control mechanism is not present or may be a simple manually operated tap. In these situations, or otherwise if desired, the inventive flow control device is configured with a fluid flow regulated flow control device.

Figure 4:
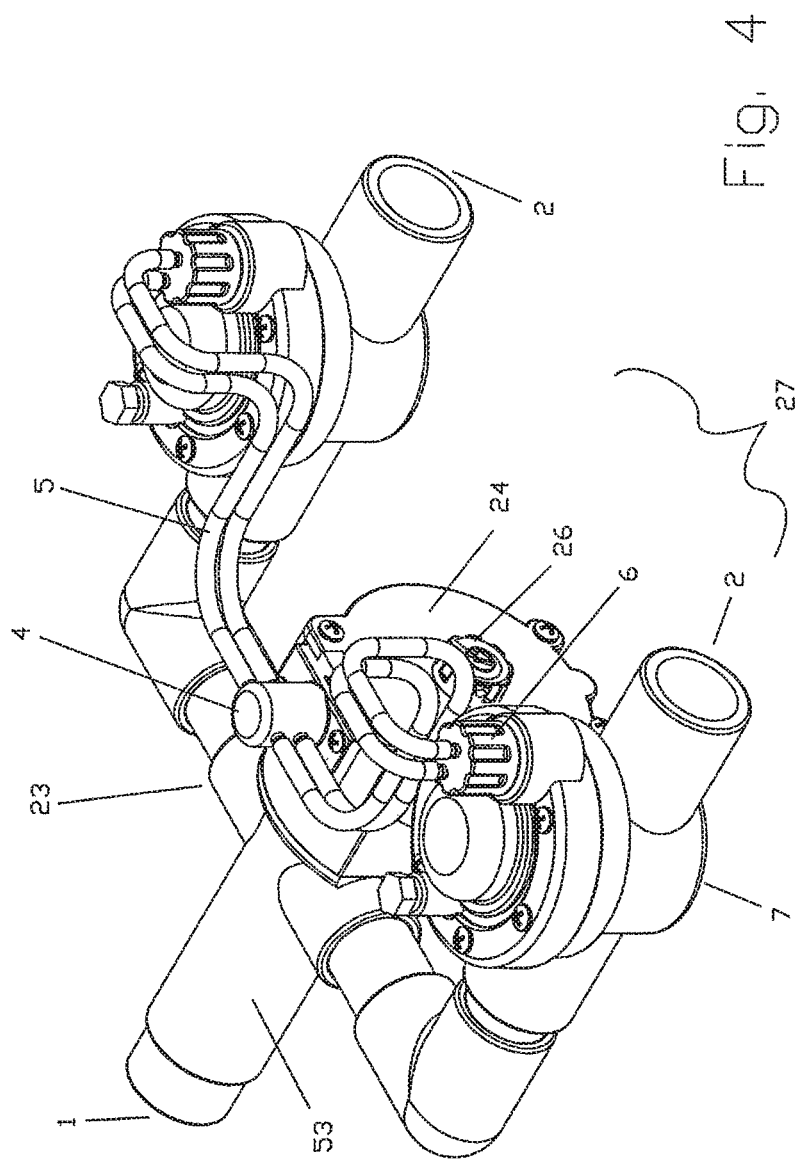
FIG. 4 depicts a general arrangement of an inventive flow control device controlled by a self-activating valve assembly.

As depicted in FIG. 4, a fluid flow regulated flow control device is generally a self-activating valve assembly 27 configured with an impeller assembly 25 housed downstream of the inlet port 1, a control assembly 23 including a gear box 24, a servo valve assembly 4, and a timing control assembly adjusted by a mechanism—illustratively a knob 26. The self-activating valve assembly 27 controls flow, via a plurality of tubes 5, between one or more adapters 6A and 6B that direct flow between the self-activating valve assembly and one or more output valves 7A and 7B that are activated or deactivated to regulate flow out a fluid output port 2. Preferably, a control assembly 23 regulates flow between two output valves 7A and 7B arranged on either side of the control assembly. It is appreciated that other configurations and number of output valves are operable in the instant inventive device. For example, the control assembly is optionally in a linear alignment with the output valves. Such a configuration optionally provides a device with no tubing and with flow regulated directly between an output valve and the control assembly by a channel or shaft. Other configurations are similarly operable to eliminate the need for tubing.

Figure 5:
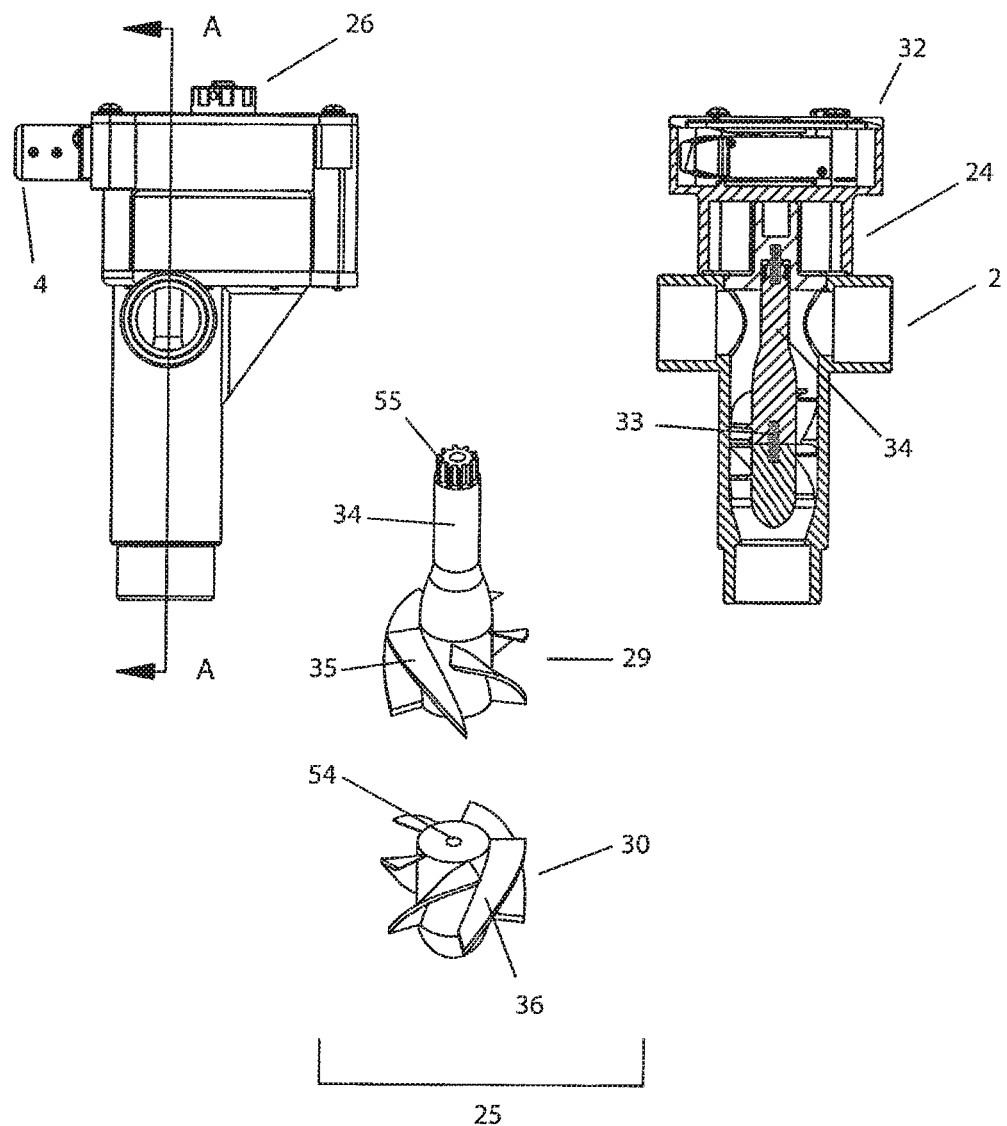
FIG. 5 depicts a self-activating valve assembly.

FIG. 5 depicts a control assembly. Downstream of an inlet port is a turbine that optionally is comprised of an impeller assembly. An impeller assembly is optionally an assembly of an impeller 29 and a stator 30. A stator 30 has a series of stator blades 36 surrounding the central shaft. The stator blades are optionally curved to direct flow in a circular fashion around the stator from the front end of the stator toward the back end. The front end of a stator is the portion facing the direction of fluid flow. The stator front end is optionally streamlined to increase efficiency of fluid flow across and beyond the stator. The stator blades 36 are dimensioned such that the stator will optionally press fit into a housing 53 surrounding the turbine. The number of stator blades is appreciated to be any number to induce a rotational flow in the fluid. The number of stator blades is illustratively 1, 2, 3, 4, 5, 6, 7, 8, 9, 10, or a greater number. A retainer cap optionally is connected to the inlet port to maintain the turbine 25 in the housing 53. It is appreciated that other methods of retaining the stator 30 stationary in a housing 53 are similarly operable illustratively including use of an adhesive.

A stator optionally has a bushing 54 in its central axis that receives a support shaft 33. The support shaft is connected to the central axis of an impeller 29 such that the impeller is rotatable about the central axis. An inventive impeller 29 optionally has a plurality of impeller blades 35 from as few as one to as many as is suitable for producing rotary force in the impeller. The number of impeller blades is illustratively 1, 2, 3, 4, 5, 6, 7, 8, 9, 10, or a greater number. The impeller blades 35 are preferably curved so that axial flow creates torsion or rotary force to produce rotational velocity and torque sufficient to power the inventive device. It is appreciated that an impeller is of any design known in the art suitable for producing rotary force around an axis when fluid flows across the impeller. Optionally the impeller blades are straight. Preferably, impeller blades are angled relative to a central axis of the impeller so that fluid flow from the stator forces against the side of an impeller blade inducing rotary motion in the impeller. It is further appreciated that other devices capable of being rotationally driven by fluid flow are similarly operable illustratively including a paddle wheel, fan blade arrangement, screw mechanism, or other configurations known in the art.

An impeller preferably has a streamlined exit shape. A support shaft 33 maintains a central axis around which the impeller will rotate. The impeller preferably has a diameter smaller than the inner diameter of the housing. Any clearance sufficient to produce a freely rotating impeller within the housing is operable. Preferably the clearance is between 0.001 and 0.05 inches. More preferably the clearance is between 0.002 and 0.04 inches. Most preferably the clearance is between 0.005 and 0.01 inches. An inventive housing 53 optionally has a larger inner diameter than the inlet port 1 such that the fluid flow is maintained independent of axial flow around the turbine. As such, turbine pressure losses are kept negligible by maintaining a flow cross section area that is larger than that of the input and output lines and by providing smooth streamlined changes in internal passage shapes.

A turbine output shaft 34 extends axially from the exit of the impeller 29. The turbine output shaft 34 translates the rotary force produced by the impeller into a gear box 24. A main pinion gear 55 is present on the turbine output shaft 34. The main pinion gear is optionally integral with the impeller output shaft, or is affixed. Preferably the turbine output shaft 34 is hemispherically shaped where it meets the main pinion gear 55 such that the rotational force in the turbine output shaft is efficiently translated to the main pinion gear 55. It is recognized in the art that other shapes for the main pinion gear interface end of the turbine output shaft 34 are similarly suitable illustratively including square, triangle, oval, rectangle, pentagon, hexagon, and other shapes known in the art. Optionally, the turbine output shaft 34 meets the main pinion gear 55 in a pressure fitting such that the association of the two parts provides sufficient frictional force that rotation of the turbine output shaft 34 translates to rotation of the main pinion gear 55.

Figure 6:
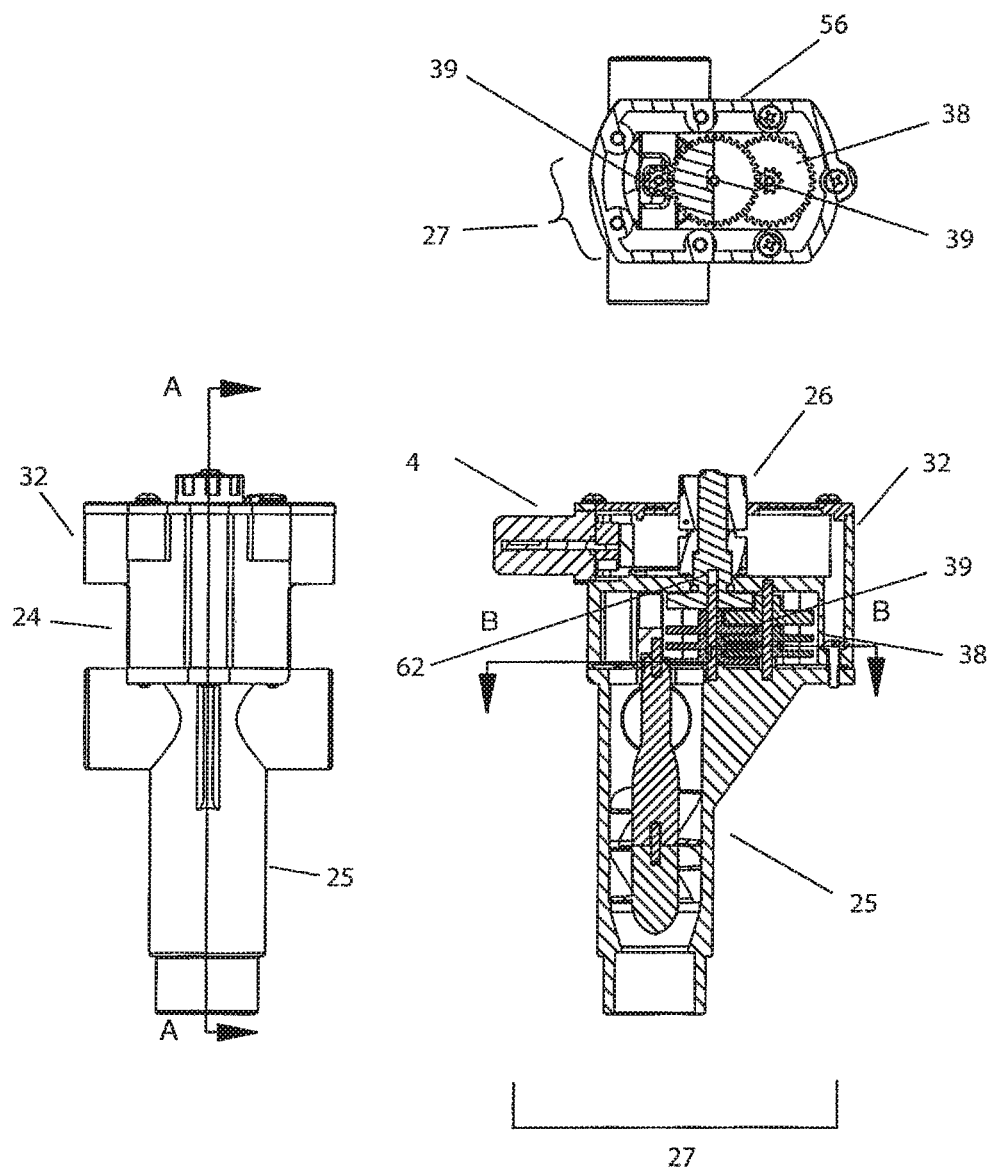
FIG. 6 provides additional detail of a self-activating valve assembly.

Rotation of the impeller 29 thereby rotationally drives the main pinion gear 55. The main pinion gear preferably associates with a family of cluster gears that form a speed reducing mechanism within the gearbox 24. FIG. 6C illustrates a cross section of a self-activating valve assembly 27. The gearbox as depicted in FIGS. 6B and C preferably is a gearbox housing 56 surrounding a speed reducing mechanism 38. In an example embodiment the speed reducing mechanism is a family of cluster gears. The cluster gears rotate about a plurality of cluster gear spindles 39. Optionally, two cluster gear spindles are present. In an example embodiment one spindle serves as a central axis for gears and the other both as a central axis for gears and as a central axis for the timing control assembly 32. The cluster gears culminate in rotation in an output gear affixed or integral with a spindle shaft. The spindle shaft on which the output gear is affixed optionally is fitted with a square shank. Preferably, an independent output shaft 62 is present and is driven by the cluster gears. In this embodiment the output shaft 62 is fitted with a square shank to interact with the timing control assembly 32. It is appreciated that other shapes for the shank are operative herein illustratively including triangle, oval, rectangle, pentagon, hexagon, and other shapes known in the art. Other means of affixing or driving rotation in an output gear are known in the art and are similarly operable herein.

The gearbox 24 also has a cover plate that when applied to the housing 56 is sealed so that fluid cannot escape the gear box. In this embodiment a spindle shaft traverses the cover plate and is sealed with an O-ring. The shank is affixed to the spindle shaft 39 at the outside of the cover plate. It is appreciated that the gearbox is optionally totally sealed from fluid by means of an O-ring surrounding the impeller output shaft 34 and a second seal surrounding the output gear spindle shaft. Thus, necessary lubricants in the gearbox are not transmitted to the fluid. It is appreciated that the gearbox is operable in fluid. Thus, there is optionally no seal around the impeller output shaft 34 such that the gearbox is accessible by fluid.

Figure 7:
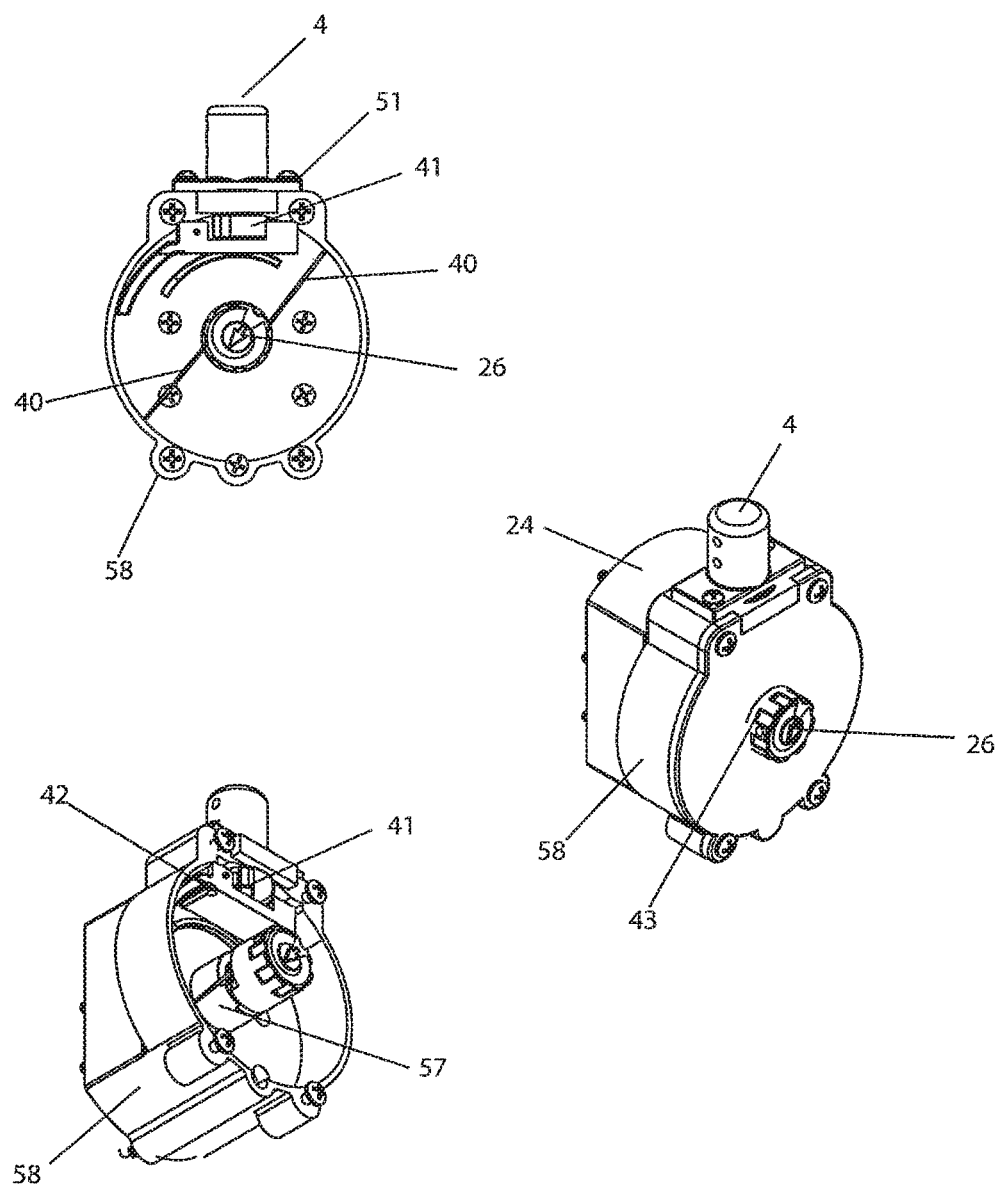
FIG. 7 depicts a timing control assembly in association with a servo valve.

FIG. 7 depicts an example embodiment of a timing control assembly 32. A timing control assembly is driven by a gearbox 24 and regulates switching between one or more output valves. A rotary force is transmitted from the gear box through the shank that is received by a gearbox socket. Thus, a drive shaft and spring arm mount 57 is rotated in response to fluid flow across the impeller. An actuator body 58 supports the drive shaft and spring arm mount 57 as well as the servo activation lever 41. The servo activation lever 41 is optionally maintained in position by a retainer clip 59 that also supports a central axis of the servo activation lever 41 such that forces applied to the lever 41 are translated to rotary motion. Movement of the servo activation lever 41 is driven by one or more spring arms 40 that translate the rotary force from the gear box to switch the servo activation lever 41. Preferably a timing mechanism has two spring arms 40. Each of two spring arms is oriented on the opposite side of a vertical axis upon which the servo activation lever 41 rotates. Thus, unidirectional rotation of the two spring arms 40 alternates the rotational direction of the servo activation lever 41. It is appreciated that multiple spring arms 41 are similarly operable. In a non-limiting example, four spring arms are operable to rotate the servo activation lever 41 at intervals smaller than that achieved by two spring arms. It is appreciated that other spring arm configurations are similarly operable.

A timing control knob 26 optionally allows adjustment of the position of the spring arm 40 relative to each other. Thus, the spring arms are illustratively at a 180 degree position relative to each other producing equal time for each position of the servo activation lever 41. Numerous other spring arm 40 configurations are operable that adjust the relative time for each position of the servo activation lever 41. Timing is adjustable to any desired ratio illustratively between the ranges of 20% to 80% for each position of the servo activation lever 41. Preferably, timing is adjustable in 10% increments ranging from 10% to 90% relative position of the servo activation lever 41. Small changes in the position of the timing control knob 26 can extend the timing to an even wider range. In an example embodiment the timing control knob has a set screw 43 that holds the timing in position between adjustments. It is appreciated that other means of maintaining position are operable illustratively including a spring loaded pressure lock, a friction fitting with or without position retaining stages, or other means of retaining rotary position known in the art. It is appreciated that other means of timing control are similarly operable. In a non-limiting example, replacement of the gears in the speed reducing mechanism 38 allows adjustment of the rate at which the drive shaft 57 rotates with each rotation of the impeller 29.

Preferably, the timing control knob has color-coded dials that indicate the percent of time that flow will discharge from the respective output ports. Preferably, each output valve is labeled by the color-coded buttons that depict settings of the timing control knob 26 so that a user can easily adjust the position of the timing control knob to the desired ratio of fluid delivery from each output port. Any color or numbering mechanism is operable for the timing control knob 26 and buttons illustratively including red, green, yellow, purple, black, white, orange, blue, or other suitable color known in the art. A numerical code is optionally employed to depict the time settings on the timing control knob. In a non-limiting example the number 8 translates to 80% of time fluid flows through that output port, 5 translates to 50%, and 2 translates to 20%. Each output valve is optionally labeled with a button of color that corresponds to one of two colors on the timing control knob 26. Each color on the timing control knob 26 is representative of a corresponding output port. Preferably, the color of the button on a particular output valve matches one on the timing control knob so that the user easily recognizes which setting represents which output valve. Thus, a user easily sets the relative time with confidence.

In an example embodiment the timing control knob 43 is also labeled with an arrow or other positional indicator to direct the user to the proper position to regulate flow as desired. Other markings illustratively include a line, dot, dash, or other operable label.

Figure 8:
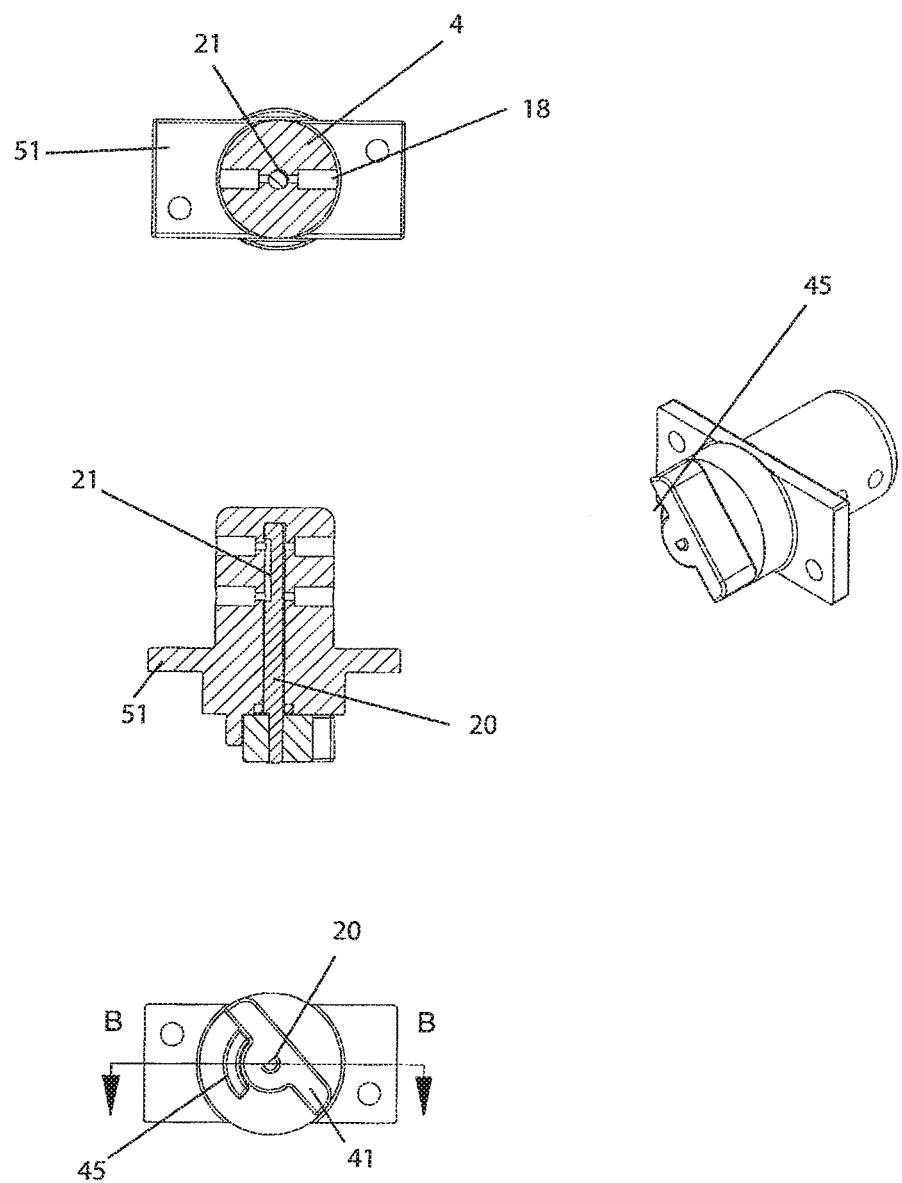
FIG. 8 depicts a servo valve as associated with a self-activating valve assembly.

Referring to FIG. 8, a preferred servo valve 4 is depicted as controlled by the position of the servo activation lever 41. The servo valve 4 is housed in a servo support block 51. The servo activation lever 41 is affixed to a servo valve shaft 20 that has one or more valve shaft ports 21. The orientation of the valve shaft ports 21A and 21B are aligned with the servo activation lever 41 such that each position of the lever correctly positions a valve shaft port 21A and 21B to allow fluid flow from one or more output valves. Preferably, a single valve shaft port aligns with two shafts connecting a single output valve. Preferably the valve shaft 20 is hemispherically shaped where it meets the servo activation lever 41 such that the rotational force in the lever is efficiently translated to the valve shaft 20. It is recognized in the art that other shapes for the servo activation lever interface end of the valve shaft 20 are similarly suitable illustratively including square, triangle, oval, rectangle, pentagon, hexagon, and other shapes known in the art. Alternatively or additionally, the valve shaft 20 meets the servo activation lever 41 in a pressure fitting such that the association of the two parts provides sufficient frictional force that rotation of the servo activation lever 41 translates to rotation of the valve shaft. It is also appreciated in the art that the servo activation lever 41 and valve shaft 20 are optionally formed from a single unitary piece eliminating the need for fitting a separate valve shaft 20 and servo activation lever 41.

In an example embodiment a servo activation lever 41 has one or more lever rotation stops 45 that prevent over rotation of the servo activation lever. FIG. 8D depicts a single lever rotation stop 45, however, it is appreciated that each servo activation lever preferably has two lever rotation stops such that the magnitude of servo activation lever rotation is controlled in each direction (more than two rotation stops may be used in certain embodiments). The lever rotation stops 45 are optionally integral with the servo activation lever. It is appreciated that other mechanisms of regulating servo activation lever rotation are operable illustratively including a bar integral with or affixed to the servo support block or other support that extends to the servo activation lever preventing rotation beyond a desired point.

Referring to FIG. 7C, a detent bar 42 optionally extends from the servo support block 51, the actuator body 58, or other support. The detent bar 42 restricts rotational movement of a spring arm 40 at the distal end. Continuous rotation at the central axis of the drive shaft and spring arm mount 57 forces rotation of the proximal end of a spring arm forcing a bend in the spring arm. As rotation of the drive shaft and spring arm mount 57 continues the spring arm 40 slides along the detent bar until the end of the spring arm is reached releasing the energy stored in the bent spring arm, which quickly turns the servo activation lever 41. This rapid turning of the servo activation lever rapidly activates an output valve and deactivates another output valve, thus, preventing fluid hammering effects.

Optionally, movement of the servo activation lever 41 drives two valve shafts each extending from the control assembly to an output valve. Thus, the valve shaft port is optionally housed within the output valve and flow between the diaphragm port and the exit port is directly controlled in the absence of a servo valve.

In an example embodiment, one or more protective shrouds are present between the spring arms 40 such that each spring arm interacts with only one side of the servo activation lever. A spring arm guide bushing is optionally placed on each spring arm that separates the spring arm from the protective shroud. In an example embodiment two protective shrouds are employed with one on each side of an actuator body support block. The thickness of the actuator body support block is sufficient to direct each spring arm to an extension on the servo activation lever. A given spring arm is separated from the other by the protective shrouds and drives rotation of the servo activation lever in one direction. Thus, in this example, a single rotary direction of both spring arms will alternate the rotational direction of the servo activation lever producing a switching fluid flow between one or more output valves. An angular offset as determined by the timing adjustment knob 26 sets the ratio of time each output valve is activated.

Referring to FIGS. 1 and 4, one or more output valves are associated with a self-actuating valve assembly 27. In an example embodiment a single control assembly 23 controls flow between two output valves (other embodiments may use multiple control assemblies). It is appreciated that a single output valve is optionally regulated by the assembly or that 3, 4, 5, 6, 7, 8, 9, or 10 valves are optionally regulated. The output valves 7A and 7B are illustratively concentrically oriented around the control assembly 23. However, when two output valves 7A and 7B are controlled by the control assembly 23 an offset linear relationship is optionally employed. It is appreciated that a linear or direct connection relationship between the control assembly 23 and the output valves 7A and 7B is operative herein.

A commercially available sprinkler valve is operative as an output valve with little or no modification. In an example embodiment an output valve is optionally modified to direct fluid flow between the output valve and the control assembly. More preferably an output valve is unmodified and an adapter is used to direct fluid flow to and from the control assembly.

Illustratively, a commercially available sprinkler valve is employed as an output valve with few modifications. The solenoid is removed exposing the solenoid mount which is threaded and houses two ports. A first port leads to a diaphragm cavity and is a diaphragm port, and a second port is an exit port that leads to the output port 2. The solenoid mount and the openings of the diaphragm and exit ports are optionally plugged. Any material suitable for plugging is operable herein illustratively including thermoformable plastic, polyurethane, polypropylene, polyethylene, polyester, vinyl, polystyrene, rubber, aluminum, steel, other suitable metals, reinforced plastic, inter fiber reinforced composite, cork, combinations thereof, or other materials known in the art. Preferably, an epoxy or polyester resin is used to plug the solenoid mount. Each output valve has a cap and a body. The cap houses the solenoid mount and has two openings whereby the diaphragm port and exit port pass. As the solenoid mount ends of the ports are plugged, a new hole is created to provide access from the diaphragm cavity to the original exit port. The output valve body of a commercial valve has a port that fits the original exit port of the cap providing access to the output port. A plug is optionally inserted in the exit port at its distal end. A hole is created in the side of the output valve body accesses the original exit port such that assembly of the valve body and the cap creates a port accessible from the outside of the body that leads to the diaphragm cavity. This converts the original exit port into diaphragm port. A new exit port is created by creating a port between the outside of the valve body and the output port. A tubing interconnect fitting is optionally mounted on the new exit port and the new diaphragm port such that these ports are capable of fluid communication with the control assembly 23. It is appreciated that modifications preferably do not hinder access to the diaphragm for servicing or replacement.

More preferably, an unmodified output valve is employed. Proper routing of fluid between the output valve (e.g., 7A) and the control assembly 23 is achieved with an adapter that replaces the solenoid of a commercially available valve.

Figure 9:
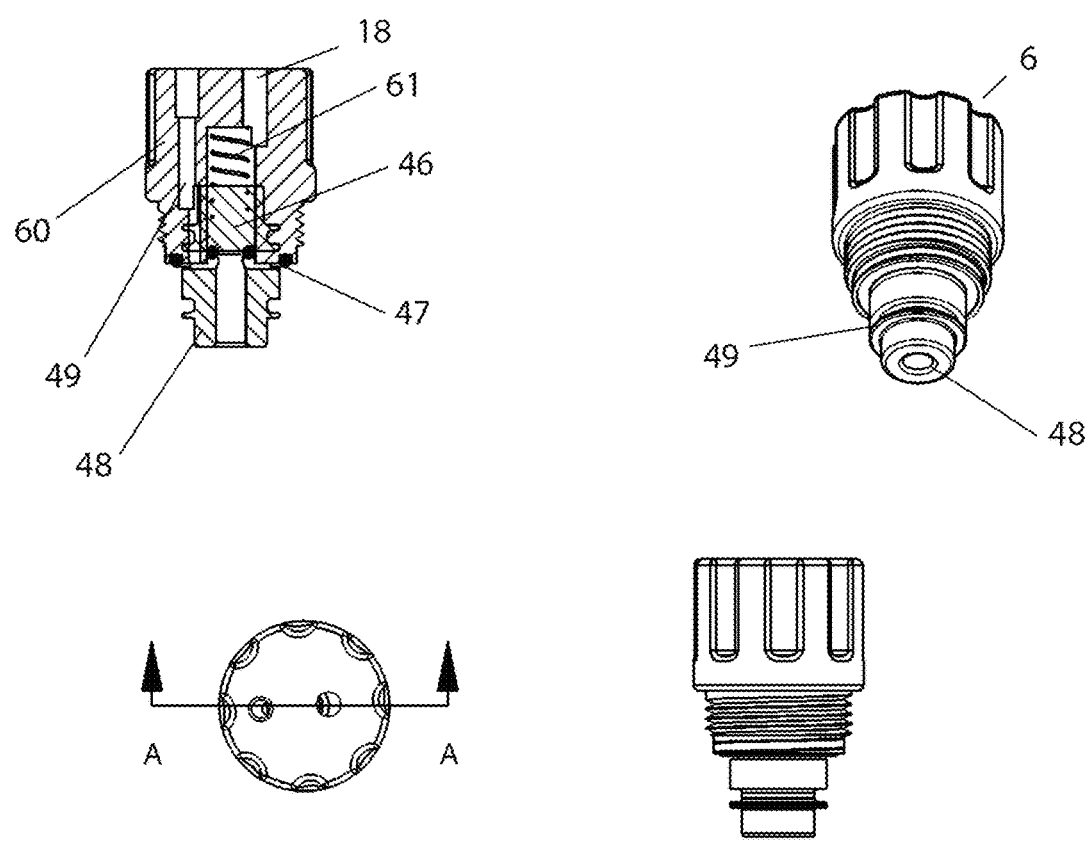
FIG. 9 depicts an adapter.
Figure 10:
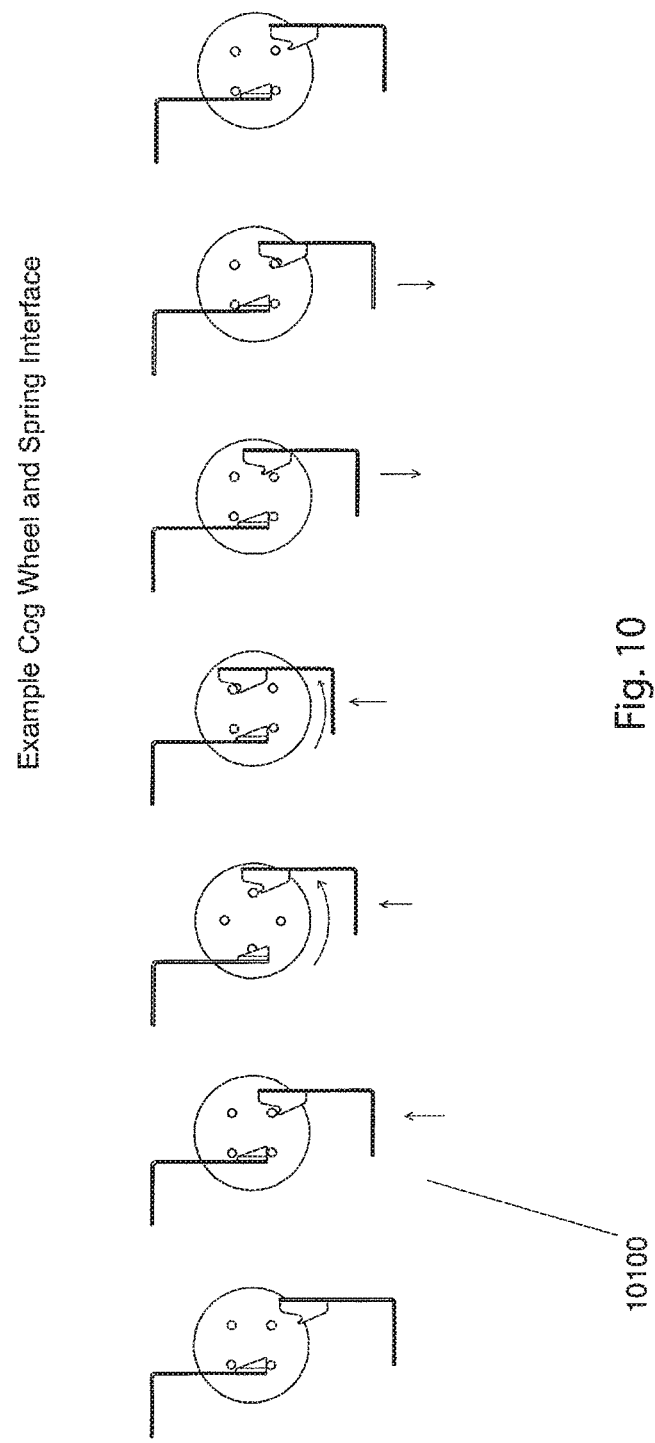
FIG. 10 depicts an example embodiment of a time sequenced cog wheel and springs interface.

It is appreciated that the directional ports are produced de novo with construction of an output valve and no modification is necessary. FIG. 9 depicts an exemplary adapter (6 in FIGS. 1 and 4). An illustrative adapter has a threaded body with two ports. A first port 49 provides access from the outside of the adapter to the diaphragm port in the output valve. The adapter body 60 also has a bore 61 that is connected to a second port providing access from the outside of the adapter to the exit port in the output valve. The bore 61 houses a spring 46 and an inner seat 48. The inner seat 48 slides relative to the adapter body and is forced outward by the spring 46. A seal is optionally achieved between the inner seat 48 and the bore 61 by an O-ring, or other sealing mechanism known in the art. A small flange is optionally present in the bore to retain the inner seat 48 when the adapter is removed from the solenoid mount in the output valve. Preferably, the inner seat has a shaft that allows fluidic connection between the second port and the exit port in the output valve. A second O-ring 47 is optionally present at the bottom of the threaded end of the adapter body 60 to prevent fluid leakage outside the adapter when inserted into the solenoid mount on the output valve. An adaptor seats in the location where the solenoid is commercially mounted in the output valve and is connected to the servo valve (4 in FIGS.

1 and 4) using small control tubes. The flow path through the servo valve is such that output valve switching is accomplished when the respective servo body shafts are opened by connection with a valve shaft port. Therefore, an unmodified commercial diaphragm valve is operative in remote locations without the need for electric control power at the remote site. Adaptors are provided to physically mate any brand of commercial valve.

When the adaptor (e.g., 6A) seats into the solenoid receptacle of an output valve, the outer O-ring seals it to the output valve cap providing access to the diaphragm port and simultaneously the center face seats over the exit port. Production accuracies of the particular output valve parts used for demonstration models allow the simultaneous mating of both surfaces.

It is appreciated that an adapter (e.g., 6A) is optionally manufactured without an inner seat 48 or seat spring 46. In this embodiment an optional protrusion is present below the adapter bore that is manufactured to fit snugly against the exit port in the output valve (e.g., 7A) when the adapter is seated in the solenoid mount of a commercial output valve. An additional O-ring is preferably employed to prevent fluid leakage from the adapter into the diaphragm cavity or exit port. Thus, fewer moving parts are necessary improving performance and reducing maintenance.

The control assembly 23 and the output valves 7A and 7B are optionally arranged in numerous configurations. In a non-limiting example, the control assembly 23 is arranged prior to a junction dividing flow between two output valves 7A and 7B as is illustrated in FIG. 1. Alternatively, the control assembly 23 is positioned between two or more output valves 7A and 7B as depicted in FIG. 4. When the control assembly is a self-activating valve assembly, the impeller is optionally in direct line with the drive shaft and spring arm mount 57, or arranged perpendicular thereto. Optionally, a right angle gear is used to translate rotational force between the impeller and the gear box. Alternatively, a right angle gear is employed between the gears of the speed reducing mechanism 38 and the drive shaft 57. Any right angle gear mechanism known in the art is operable herein. Illustratively, a worm gear is employed as the drive pinion 37. A worm gear has the advantage of translating rotational force in one direction. Alternatively, one or more helical gears are employed to configure the arrangement of the control assembly 23 relative to the output valves and the fluid inlet port 1 to any desired angle. Other gear types are operable in the speed reducing mechanism and in the interface between the impeller and the speed reducing mechanism illustratively including, but not limited to, face gear, hypoid gear, bevel gear, screw gear, planetary gears, combinations thereof, or other gear types known in the art.

A PA is illustratively used in a fluid delivery system where extra unused stations are available on the existing system watering timer. PA illustratively switches between two output valves 7A and 7B using the pressure increase of the fluid source when turn-on occurs. This activates a servo valve 4 which opens one of the output valves and closes the other. When the fluid source is turned off, the servo valve 4 remains in its last used position to keep open a path for pressure relief so that the activator diaphragm 12 can reset to the initial state. When the fluid source is turned on again the pressure increase activates the servo valve 4 to open the closed output valve and close the other. This alternating opening and closing allows one input source to serve two fluid delivery areas with equal flow and pressure. Time of use of each fluid delivery area is established at the source by the control timer. It is appreciated that by adding more ports to the servo valve shaft 20, more output valves are optionally controlled using the same concepts described above for two output valves.

It is appreciated that one or more bladder membranes are operable as a pressure activating device. In this embodiment, timing control devices are present to control filling each bladder thereby controlling output flow time. A blade is optionally placed between each bladder such that filling of one bladder moves the blade in a direction activating one output valve and deactivating another.

The existing source is optionally turned on and off by two or more fluid delivery station terminals. Most timers will operate by connecting the desired terminals to the source control valve using jumper wires between terminals. Many timers have a time delay between stations that will afford time for the servo valve to reset. However, if the time is inadequate for reset, another fluid delivery station is optionally operated between the two PA times to allow time for reset. Additionally, some timers have a second program capability, and that program can also be used to control the source valve for turn on at another time thereby eliminating the need for jumper wires. In either case, time for fluid delivery is set as desired for each station.

Operation of a self-actuating valve assembly as depicted as the control assembly 23 in FIG. 4 occurs generally by fluid entry at the fluid inlet port 1, passing through a turbine assembly, and then exit via either output port. The turbine 25 generates rotary power that drives, via a speed reducing gearbox, a servo valve 20 which opens an associated output valve. The relative time of fluid flow from either output ports is adjustable. Increasing the on-time for the original line makes it possible for the fluid delivery area to be increased accordingly since each output port provides the same flow rate and pressure as the original line. This allows each new line to cover an area equivalent to that covered by the original line.

A turbine is generally operated as fluid passes over the stator 30 and is directed into a swirl which impacts the impeller 29 at an angle causing it to rotate. The impeller's rotor blades 35 are optionally curved so that the axial flow creates additional torsion force assuring adequate torque and rotational velocity to power the servo valve 4. The turbine output shaft 34 optionally provides this power to the gearbox 24 through a low friction bearing. Turbine pressure losses are kept negligible by maintaining a flow cross section area that is larger than that of the input and output lines and by providing smooth streamlined changes in internal passage shapes. Losses due to turbine torque and friction are insignificant as well. Therefore, pressure at the output port is similar to pressure at the inlet port.

The turbine shaft 34 enters the gearbox 24 through a low friction bushing in the turbine housing. A gear is attached to, or integral with, the shaft which drives the cluster gears that reduce rotational velocity and amplify torque at the gear output shaft 62. Gears are optionally molded plastic and rotate on corrosion resistant spindle shafts. The housing is of corrosion-free plastic and the entire unit is optionally sealed. The output shaft 62 is optionally sealed with an O-ring to ensure no fluid exits the gearbox 24. This arrangement allows the turbine shaft bushing to have relatively large clearances and resultant low friction. Since there is ample torque at the gearbox output shaft 62, it easily overcomes the friction of the waterproofing O-ring. The low friction turbine bearings prevent any chance of static friction hang-up at operational start and ensure reliable turbine performance. An optional small bleed hole into the main flow path allows drainage so as to prevent freeze damage to the gearbox. The shank on the output shaft mates the servo valve 4 or timing control assembly 32.

The output shaft 62 nests into the shape matching socket of the drive shaft 57 and rotates the servo actuator spring arms 40. These spring arms 40 in turn rotate the servo activation lever 41 to activate the output valves 7. When the spring arms 40 approach the servo activation lever 41, they encounter the detent bar 42 that restrains them until sufficient force is stored in the spring 40 to quickly rotate (snap action) the servo activation lever 41. The spring arm 40 is released when the resulting radius of the bending spring arm is reduced enough to allow it to pass the detent bar. The servo valve 4 is optionally a bypass arrangement that directs a small volume of fluid through the tubes 5 to activate the internal diaphragms of either output valve. The quick snap action of the servo valve prevents water hammer pounding oscillations of output valve diaphragms that occur if the action is too slow. The servo valve 4 cannot hang-up because the valve shaft 20 and body 17 have low friction clearances. These clearances do not affect performance since small internal leakages are not large enough to trigger activation of the output valves.

Output valve timing adjustment is achieved by angularly repositioning two spring arms 40 relative to each other. This is optionally done by loosening the set screw 43 and rotating the timing control knob 26. Dials on the knob 26 indicate the relative time fluid will flow through each output port 2. Thus, the user can select fluid delivery times to each output port 2A and 2B according to his needs.

Figure 59:
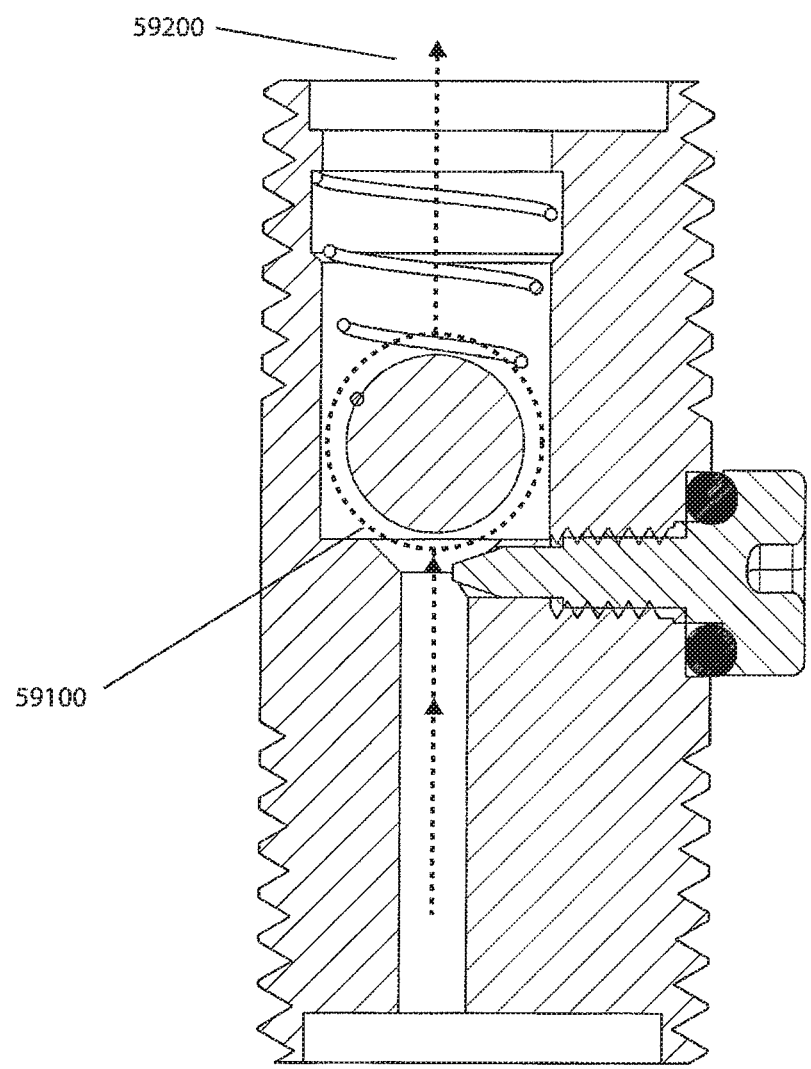
FIG. 59 depicts an internal view of certain components of an example embodiment of a fluid timing device.

It is appreciated that elements of certain embodiments are capable of independent manufacture either in themselves or as single element combinations to minimize the number of elements necessary. In a non-limiting example, the turbine housing and gearbox assembly is made to have all parts installed from the gearbox side, or control passages or tubes 5 are made integral to the housings to eliminate material and labor costs associated with external tubing as is depicted in FIG. 59a of U.S. Provisional Application No. 60/901,055.

Sequencing Actuator Description

Figure 21:
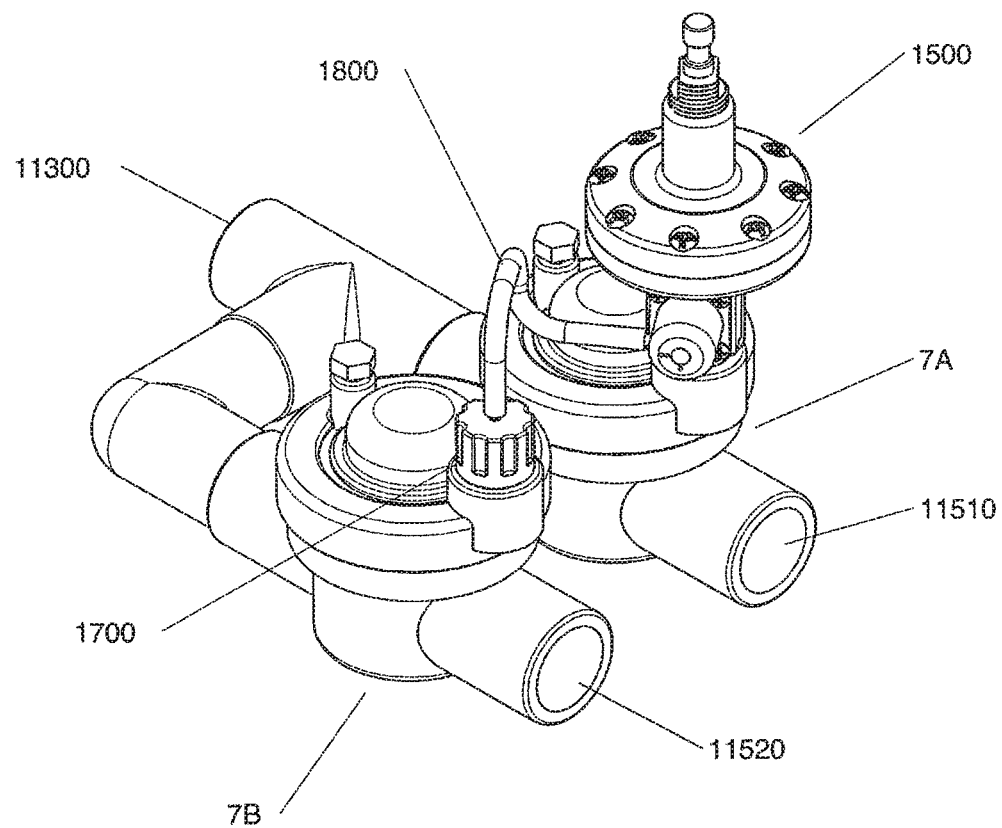
FIG. 21 depicts an example generalized arrangement for a fluid activated actuator.

FIG. 21 represents a generalized arrangement for a fluid activated servo assembly 1500 labeled a sequencing actuator. In this arrangement a fluid inlet port 11300 receives fluid from a source and the inventive device automatically determines whether one or more distribution valves 7A and 7B are activated or inactivated, thus, directing fluid out one or more of a group of fluid outlet ports 11510 and 11520 to a fluid distribution line.

In an example embodiment a sequencing actuator 1500 receives fluid from a source via an inlet port 11300. Pressure, flow rate, or other parameter of the input fluid drives the sequencing actuator 1500 to activate or deactivate one or more output valves 7A and 7B. When more than one output valve 7A and 7B are present, activation of one output valve, for example 7A, occurs simultaneously, or nearly thereto, with deactivation of another output valve, for example 7B. Thus, fluid is directed into a particular distribution line with the same pressure and flow characteristics of the source fluid. By control from the sequencing actuator 1500, fluid is optionally then directed to a different distribution line by deactivation of the first output valve 7A and activation of another output valve 7B, see FIG. 21. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In an example embodiment a single sequencing actuator 1500 regulates flow through two output valves. However, it is appreciated that the sequencing actuator 1500 is suitable for regulation of one, two, three, four, five, six, or more output valves. This is optionally accomplished by adding multiple valve shaft ports at various angles each allowing fluid flow to one output valve, see FIG. 40. While certain embodiments are described with respect to two output valves, a person having ordinary skill in the art recognizes description and enablement of any number of output valves without limitation.

In an example embodiment it is appreciated that the sequencing actuator 1500 is also suitable for regulation of multiple output valves in which one or more of the output valves are configured to deliver an outlet pressure at the same pressure while two or more other output valves in the system are configured to deliver outlet pressure at a reduced pressure. For example, in a four output valve configuration, two valves are configured for an outlet pressure that is the same as the inlet pressure and two output valves are configured for an outlet pressure half the inlet pressure. In this example configuration, the two output valves with half pressure are configured to actuate at the same time causing the inlet pressure to be divided between the two.

FIG. 21 depicts a general communication system between sequencing actuator 1500 and the output valves 7A and 7B. The sequencing actuator 1500 optionally uses a pilot valve shaft 14900 to allow fluid flow from one or more output valves 7A and 7B via interconnecting tube 1800, one per valve. The tube 1800 receive fluid from an output valve by an adapter 1700 that optionally replaces the solenoid in a standard prior art solenoid controlled diaphragm valve, see FIG. 21. Optionally, the sequencing actuator 1500 itself replaces the solenoid in a standard prior art controlled diaphragm valve, see FIG. 20. Thus, certain embodiments optionally incorporate the low cost and simplicity of widely used diaphragm valves with fluid activated actuator devices as disclosed herein.

An exemplary sequencing actuator 1500 is optionally constructed of an actuator housing 14200 to prevent fluid leakage from the actuator. In addition, the housing 14200 provides a protective cover to reduce contamination by soil, water, or other environmental conditions. A protective cover is optionally a separate piece that is removable, or is incorporated into a single injection molded part. The housing 14200 includes a diaphragm 14400 of the actuator assembly coupled to a rigid pressure disk 14100. A return spring 14550 is further coupled to the pressure disk 14100 that provides suitable force to compress the pressure disk 14100 and diaphragm 14400 when pressure is reduced from the fluid source, see FIG. 14. Optionally, a single or dual acting piston drive is operable in place of the diaphragm, pressure disk, and spring system. Attached to the pressure disk 14100 is a cog drive bar or leaf spring 16000 that interfaces with a cog wheel 8 via a cog wheel post 19, see FIG. 16. The leaf spring 16000 produce a rotational force in the cog wheel 8 when the drive post is raised in response to reapplication of fluid pressure and raising of the diaphragm 14400 and coupled pressure disk 14100. The types of cog wheels and number of cog wheel posts varies as previously described.

The sequencing actuator 1500 optionally includes an anti-back rotation leaf spring stop 16300 that prevents the cog wheel 8 from reversing rotational direction. The anti-back rotation leaf spring optionally has a flange that provides a shelf that engages a cog wheel post preventing back rotation. The anti-back rotation leaf spring 16300 is flexible such that it does not impede the forward rotation of the cog wheel 8. Optionally, other anti-back rotation features including a notched cog wheel (described later) and rotational resistance (previously described) cog wheel can optionally be employed to prevent back rotation of the cog wheel.

The sequencing actuator 1500 optionally includes a pilot valve shaft 14900. The pilot valve shaft 14900 is rotatable and connects one or more pilot valve ports 17100 and 17200 to tubing interconnect fittings 17400, see FIG. 17. The pilot valve shaft 14900 is secured to the cog wheel 8 such that rotation of the cog wheel 8 produces rotation in the valve shaft 14900. The pilot valve shaft 14900 is optionally cylindrical in shape. Preferably the pilot valve shaft 14900 is hemispherically shaped where it meets the cog wheel 8 such that the rotational force in the cog wheel is efficiently translated to the valve shaft 14900. It is recognized in the art that other shapes for the cog wheel interface end of the pilot valve shaft 14900 are similarly suitable illustratively including square, triangle, oval, rectangle, pentagon, hexagon, and other shapes known in the art. Alternatively or additionally, the pilot valve shaft 14900 meets the cog wheel 8 in a pressure fitting such that the association of the two parts provides sufficient frictional force that rotation of the cog wheel translates to rotation of the valve shaft. It is also appreciated in the art that the cog wheel and valve shaft are optionally affixed with an adhesive or by press fit. The cog wheel 8 and pilot valve shaft 14900 are optionally formed from a single unitary piece eliminating the need for fitting a separate pilot valve shaft 14900 and cog wheel 8.

The sequencing actuator assembly 1500 preferably includes one or more fluid passages that can optionally be interconnected by the pilot valve ports 17100 and 17200, each serving a single output valve. It is appreciated that any method of regulating flow between two or more pilot valve ports is similarly operable herein. When two pilot valve shaft ports 17100 and 17200 are present in a pilot valve shaft 14900 they are preferably positioned at 90 degrees relative to one another, see FIG. 17. Thus, for example, a 90 degree rotation of the cog wheel 8 aligns one valve port 17200 with a corresponding sequencing actuator passage 14950, see FIG. 14. In another example, a further 90 degree rotation of the cog wheel 8 aligns the second valve shaft port 17100 with a corresponding sequencing actuator passage 18980, see FIG. 18. The pilot valve ports 17100 and 17200 are preferably capable of delivering flow omnidirectionally. Thus, in this example configuration, only one set of sequencing actuator passages and pilot valve ports are aligned at one time regulating flow to one output valve (e.g., output valves 7A or 7B). This arrangement provided alternating flow through the sequencing actuator 1500 for each 90 degrees of valve shaft 20 rotation as provided by four cog wheel posts 19 on the cog wheel 8. It is appreciated that multiple configurations of a pilot valve port are operable herein as previously described.

Optionally, the sequencing actuator 1500 includes a manual setting knob 14650 which is coupled to the rigid pressure disk 14100. The manual setting knob 14650 enables a user to manually actuate the sequencing actuator 1500. Manually applying, for example, an outward force to the setting knob 14650 causes the coupled rigid pressure disk 14100 and attached leaf spring 16000 to move in a linear direction to the applied force (e.g., upward in FIG. 14). The leaf spring 16000, interfacing with the cog wheel post 19, applies a rotational force to the cog wheel 8. The rotation of the cog wheel 8 cause a rotation in the pilot valve shaft 14900. Each full extension of the manual setting knob results in an advancement of the pilot valve shaft 14900. In this manner, the flow to an output valve (e.g., 7A or 7B) is manually configured.

Optionally, the sequencing actuator 1500 includes a pressure head adjustment bushing 14800. Optionally, a clockwise rotation of the pressure head results in a compression of the return spring 14550. Compressing the return spring 14550 increases the compression of the return spring. Therefore, more pressure is required in the diaphragm valve chamber to overcome the spring compression. Conversely, a counter-clockwise rotation of the pressure head results in an expansion of the return spring 14550. Therefore, less pressure is required in the diaphragm valve chamber to overcome the spring compression.

The inventive arrangement functions when pressurized source fluid enters the sequencing actuator via a fluid passage into diaphragm chamber 14300. The diaphragm expansion overcomes the return spring 14550 compression and forces linear movement of the rigid pressurized disk 14100. The coupled leaf spring 16100 rotates the cog wheel 8 into its new position. This position aligns one of the pilot valve ports in the valve shaft 14900 with its respective fluid passages (e.g., to tubing interconnect fitting 17400 or to the attached diaphragm bleed port 19600). This position allows fluid to flow from the diaphragm chamber of an associated diaphragm valve (e.g., 7A or 7B) causing the output diaphragm valve to open. Upon termination of the fluid pressure cycle by the control mechanism, the pressure is removed from the diaphragm 14400 allowing pressure from the return spring 14550 to extend the diaphragm into the closed position while the anti-back rotation leaf spring 16300 prevents the cog wheel 8 from rotating in the reverse direction by the retraction of the leaf spring 16100.

In an example embodiment, two commercially available output diaphragm valves are connected using standard PVC plumbing fittings. The sequencing actuator mounts in the solenoid mounting of one of the output diaphragm valves, see FIG. 20 and FIG. 21. The one or more associated diaphragm valves solenoids are replaced with an adapter 1700 which is screwed into the solenoid mounting location. Each adapter is fluidly connected to the sequencing actuator by way of tubing 1800. When fluid pressure is applied (turned on at the central control source) it enters the actuator by way of the bleed port (e.g., 22500) of the diaphragm valve and pressurizes a diaphragm 14400 inside the actuator which in turn controls the output diaphragm valves (e.g., 7A) as described above. When fluid pressure is turned off at the source, fluid exits the diaphragm 14400 via the diaphragm bleed port (e.g., 22500) and returns to its starting position. When pressure is reapplied the leaf spring 16000 engages a new cog wheel post 19 that rotates the pilot valve shaft 14900 to a new position thereby opening the opposite output diaphragm valve (e.g., 7B). This alternates as determined by the fluid source control timer. Time durations are set for each output port per normal timer operation.

Lockstep Actuator I Description

Figure 24:
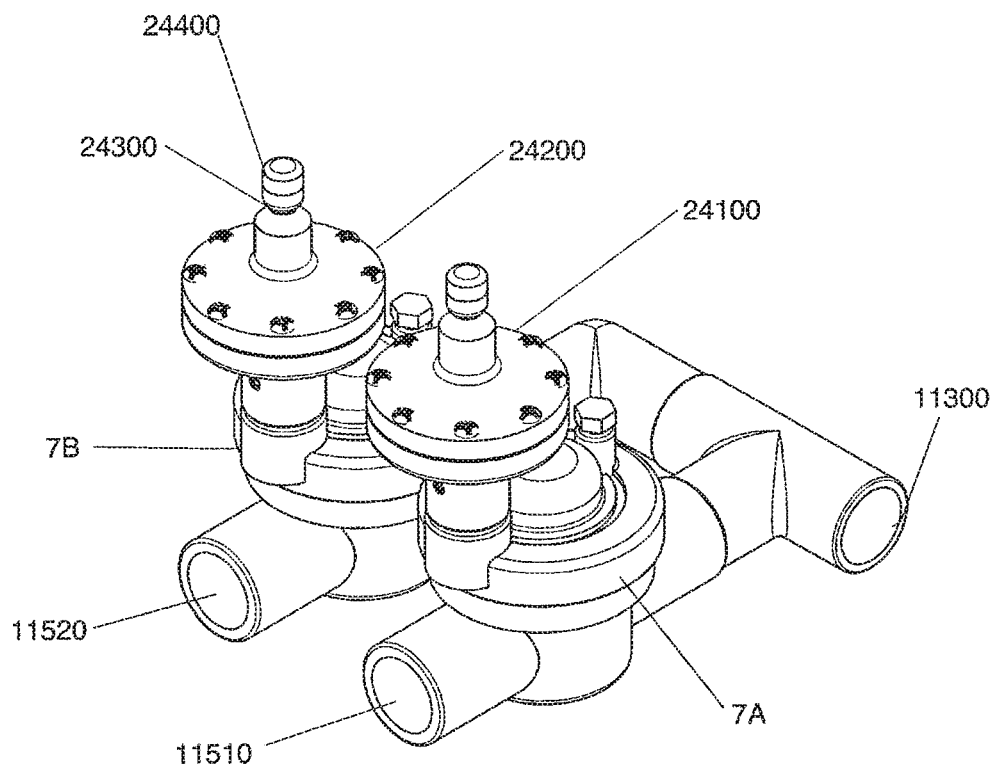
FIG. 24 depicts an example generalized arrangement for fluid activated actuators.

FIG. 24 represents a generalized arrangement for two fluid activated, actuator assemblies 24100 and 24200, labeled in this instant specification as lockstep actuators. In this arrangement a fluid inlet 11300 receives fluid from a source and the inventive device automatically determines whether one or more distribution valves 7A and 7B are activated or inactivated, thus, directing fluid out one or more of a group of fluid outlet ports 11510 and 11520. Advantageously, the lockstep actuator, as compared to the sequencing actuator for example, does not require a general communication system between the lockstep actuators 24100 and 24200. The independent lockstep actuators, when appropriately configured in a system operationally can direct fluid flow into various distribution lines with the same pressure and flow characteristics. Optionally, the actuator includes a manual setting knob 24400 and a open or closed valve indicator 24300.

In an example embodiment lockstep actuators 24100 and 24200 receives fluid from a source via an inlet line 11300. Pressure, flow rate, or other parameter of the input fluid drives the lockstep actuators 24100 and 24200 to activate or deactivate one or more output valves 7A and 7B. When more than one output valve 7A and 7B are present, activation of one output valve, for example 7A, occurs simultaneously, or nearly thereto, with deactivation of another output valve, for example 7B. Thus, fluid is directed into a particular distribution line with the same pressure and flow characteristics of the source fluid. By control from the lockstep actuators 24100 and 24200, fluid is optionally then directed to a different distribution line by deactivation of the first output valve 7A and activation of another output valve 7B, see FIG. 24. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In an example embodiment two lockstep actuators 24100 and 24200 regulates flow through two output valves as illustrated in FIG. 24. However, it is appreciated that the lockstep actuators 24100 and 24200 are suitable for regulation of one, two, three, four, five, six, or more output valves. This is optionally accomplished by configuring the number of valve shaft ports and cog wheel posts. Increasing the number of cog wheel posts reduces the degree of rotation of the valve shaft ports in response to a fluid pressure change. This coupled with a reduction in the number of valve shaft ports (e.g., to one) enables the regulation of multiple valves. While certain embodiments are described with respect to two output valves, a person having ordinary skill in the art recognizes description and enablement of any number of output valves without limitation.

Figure 20:
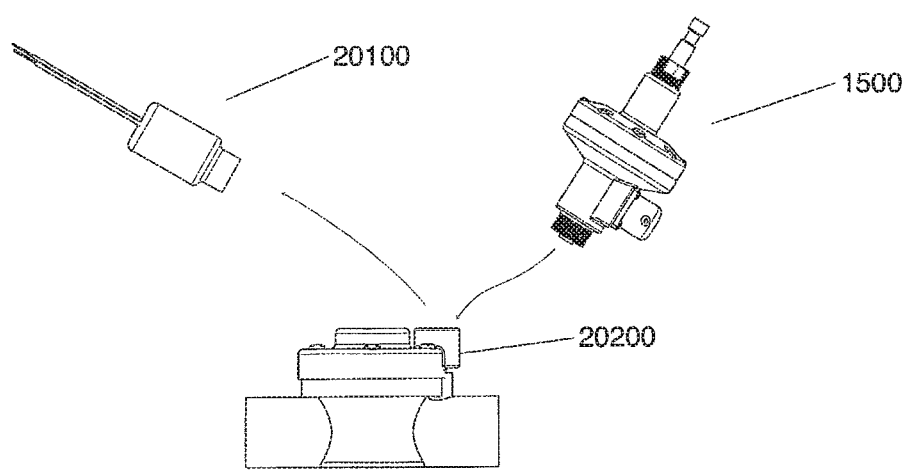
FIG. 20 depicts an example placement of a fluid activated actuator assembly within a diaphragm valve.

FIG. 24 depicts a configuration of lockstep actuators 24100 and 24200 replacing the solenoids in a standard prior art solenoid controlled diaphragm valve, see also FIG. 20. Optionally, the actuator is associated with (e.g., mounted or affixed to the diaphragm valve or placed nearby the diaphragm valve) and connective tubing is used to fluidly connect the diaphragm bleed passages (e.g., 22500 and 22600) using an adapter (e.g., the adapter 6A or 6B shown in FIG. 13) to the actuator (e.g., via actuator fittings). Thus, certain embodiments can be flexibly integrated with and optionally incorporate the low cost and simplicity of widely used diaphragm valves with embodiments of the fluid activated actuator devices disclosed herein.

An exemplary lockstep actuator 24100 is optionally constructed of an actuator housing 28500 to prevent fluid leakage from the actuator. In addition, the housing 28500 provides a protective cover to reduce contamination by soil, water, or other environmental conditions. A protective cover is optionally a separate piece that is removable, or is incorporated into a single injection molded part. The housing 28500 includes a diaphragm 28810 of the actuator assembly coupled to a rigid push plate 28555. A return spring 28550 is further coupled to the push plate 28555 that provides suitable force to compress the push plate 28555 and diaphragm 28810 when pressure is reduced from the fluid source, see FIG. 28. Optionally, a single or dual acting piston drive is operable in place of the diaphragm, pressure disk, and spring system. Attached to the push plate 28555 is a cog drive bar or leaf spring 16000 that interfaces with a cog wheel 25400 via a cog wheel post 19, see FIG. 16. The leaf spring 16000 produce a rotational force in the cog wheel 25400 when the push plate 28555 is raised in response to application of fluid pressure and expansion of the diaphragm 28810. The types of cog wheels and number of cog wheel posts varies as previously described.

The lockstep actuator 24100 optionally includes an anti-back rotation leaf spring stop 16300 that prevents the cog wheel 25400 from reversing rotational direction. The anti-back rotation leaf spring optionally has a flange that provides a shelf that engages a cog wheel post preventing back rotation. The anti-back rotation leaf spring 16300 is flexible such that it does not impede the forward rotation of the cog wheel 25400. Optionally, other anti-back rotation features including a notched cog wheel (described later) and rotational resistance (previously described) cog wheel can optionally be employed to prevent back rotation of the cog wheel.

Figure 27:
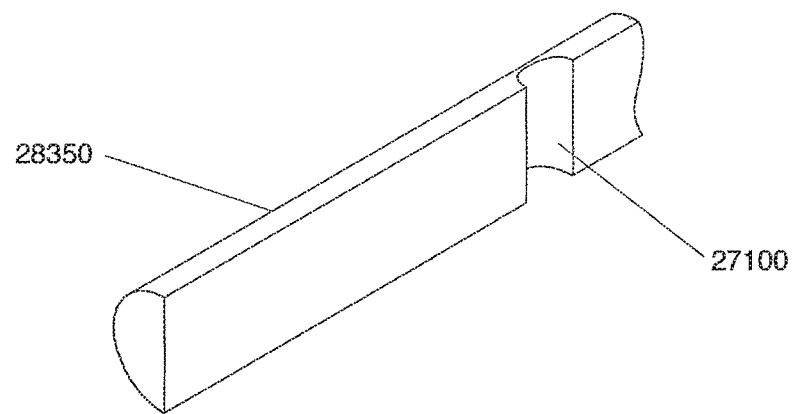
FIG. 27 depicts a cross-sectional view of an example pilot valve which is optionally used in a fluid activated actuator assembly.

The lockstep actuator 24100 optionally includes a pilot valve shaft 28350. The pilot valve shaft 28350 is rotatable and connects one or more pilot valve ports 30100 to fluid passages 28100. The pilot valve shaft 28350 is secured to the cog wheel 25400 such that rotation of the cog wheel 25400 produces rotation in the valve shaft 28350. The pilot valve shaft 28350 is optionally cylindrical in shape. Optionally, the pilot valve shaft 28350 meets the cog wheel 25400 in a pressure fitting such that the association of the two parts provides sufficient frictional force that rotation of the cog wheel translates to rotation of the valve shaft. It is also appreciated in the art that the cog wheel and valve shaft are optionally affixed with an adhesive or by press fit. The cog wheel 25400 and pilot valve shaft 28350 are optionally formed from a single unitary piece eliminating the need for fitting a separate pilot valve shaft 28350 and cog wheel 25400. The pilot valve shaft optionally includes a cylindrical fluid passage 30000 which interfaces with a fluid passage 28600 connected to the diaphragm chamber 28800. The fluid passage 28600 from the diaphragm chamber 28800 allows fluid to flow from the inlet lockstep passage 28900 through the diaphragm chamber 28800 into the pilot valve fluid passage 30000. The lockstep actuator assembly 24100 preferably includes one or more fluid passages that can optionally be interconnected by the pilot valve port 27100, each serving a single output valve. When a pilot valve shaft port 27100 as illustrated in FIG. 27 is present in a pilot valve shaft 28350, a 90 degree rotation of the cog wheel 25400 aligns the valve port 27100 with a corresponding lockstep actuator passage 28100, see FIG. 27 and FIG. 28. In another example, a further 90 degree rotation of the cog wheel 25400 blocks the actuator passage 28100. The pilot valve port 27100 is preferably capable of delivering flow omni-directionally. Thus, in FIG. 24, if the lockstep actuators 24100 and 24200 in this example are configured to be out-of-phase with each other, the lockstep actuator passage and pilot valve port are aligned in one valve and not aligned in the other. This arrangement provides alternating flow through the lockstep actuators 24100 and 24200 for each 90 degrees of valve shaft 28350 rotation as provided by four cog wheel posts 19 on the cog wheel 25400. It is appreciated that multiple configurations of a pilot valve port are operable herein as previously described.

Optionally, the lockstep actuators 24100 and 24200 include a manual setting knob 24400 which is coupled to the rigid push plate 28555. The manual setting knob 24400 enables a user to manually actuate the lockstep actuators 24100 and 24200. Manually applying, for example, an outward force to the setting knob 24400 causes the coupled rigid push plate 28555 and attached leaf spring 16000 to move in a linear direction to the applied force (e.g., upward in FIG. 16 and FIG. 28). The leaf spring 16000, interfacing with the cog wheel post 19, applies a rotational force to the cog wheel 25400. The rotation of the cog wheel 8 cause a rotation in the pilot valve shaft 28350. Each full extension of the manual setting knob results in an advancement of the pilot valve shaft 28350. In this manner, the flow to an output valve (e.g., 7A or 7B) is manually configured.

Optionally, the lockstep actuators 24100 and 24200 may be configured to include a pressure head adjustment bushing, not shown in Figures. Optionally, adjustments to the pressure head increase the compression of the return spring. With increased compression, more pressure is required in the diaphragm chamber 28800 to overcome the spring compression. Conversely, adjustments to the pressure head reduce the return spring 28550 compression. With reduced compression, less pressure is required in the diaphragm chamber to overcome the spring compression.

Optionally, a clockwise rotation of the pressure head results in a compression of the return spring. Compressing the return spring 28550 increases the compression of the return spring. Therefore, more pressure is required in the diaphragm chamber 28800 to overcome the spring compression. Conversely, a counter-clockwise rotation of the pressure head results in an expansion of the return spring 28550. Therefore, less pressure is required in the diaphragm chamber to overcome the spring compression.

The inventive arrangement functions when pressurized source fluid enters the lockstep actuator via a fluid passage into diaphragm chamber 28800. The diaphragm expansion overcomes the return spring 28550 compression and forces linear movement of the rigid pressurized disk 28555. The coupled leaf spring 16100 rotates the cog wheel 25400 into its new position. This position aligns the pilot valve port 27100 in the valve shaft 28350 with its fluid passage (e.g., the lockstep actuator fluid passage 28100, see FIG. 28). This position creates a fluid passageway from a diaphragm valve chamber in a conventional diaphragm valve through: (a) a diaphragm valve bleed fluid valve passage 22500, (b) lockstep actuator inflow passage 28900, (c) diaphragm chamber 28800, (d) actuator internal fluid passageway 28600, (e) pilot valve shaft port 27100, (f) lockstep actuator outflow passage 28100, (g) diaphragm bleed port passage 22600. This fluid passageway enables fluid in the diaphragm chamber of the conventional diaphragm valve to bleed out causing the diaphragm valve to open. Upon termination of the fluid pressure by the control mechanism, the pressure is removed from the diaphragm 28810 allowing pressure from the return spring 28555 to extend the diaphragm while the anti-back rotation leaf spring 16300 prevents the cog wheel 25400 from rotating in the reverse direction by the retraction of the leaf spring 16100. When pressurized source fluid is reapplied, the fluid enters the lockstep actuator via a fluid passage into diaphragm chamber 28800. The diaphragm expansion overcomes the return spring 28550 compression and forces linear movement of the rigid pressurized disk 28555. The coupled leaf spring 16100 rotates the cog wheel 25400 into its new position. This new position, in this example, blocks the pilot valve port 27100 in the valve shaft 28350. This effectively blocks the fluid flow in the bleed port 22500 of the conventional diaphragm valve causing the diaphragm valve (e.g., 7A or 7B) to close.

In an example embodiment, two commercially available output diaphragm valves are connected using standard PVC plumbing fittings. The one or more lockstep actuators mount in the solenoid mounting of each of the output diaphragm valves, see FIG. 24. When fluid pressure is applied (turned on at the central control source) it enters the actuator by way of the bleed port (e.g., 22500) of the diaphragm valve and pressurizes a diaphragm 28810 inside the actuator which in turn controls the output diaphragm valves (e.g., opens 7A) as described above. When fluid pressure is turned off fluid exits the diaphragm 14400 via the diaphragm bleed port (e.g., 22500) and returns to its starting position. When pressure is reapplied the leaf spring 16000 engages a new cog wheel post 19 that rotates the pilot valve shaft 28350 to a new position thereby controlling the output diaphragm valve (e.g., close 7B). This alternates as determined by the fluid source control timer. Time durations are set for each output port per normal timer operation. As previously described above, lockstep actuators 24100 and 24200 are optionally configured out-of-phase. When one valve is open the other is closed. This configuration allows the system to deliver an alternating flow of fluid to output lines with pressure equal to the pressure of the inlet. Other fluid flow options are also configurable. For example, a system of 3 actuators is configured such that all the inlet pressure is applied to line 1 (open) when lines 2 and 3 are closed. In the next cycle, line 1 is closed and lines 2 and 3 are open and half the inlet pressure is applied to line 2 and half to line 3, etc.

Lockstep Actuator II Description

Figure 36:
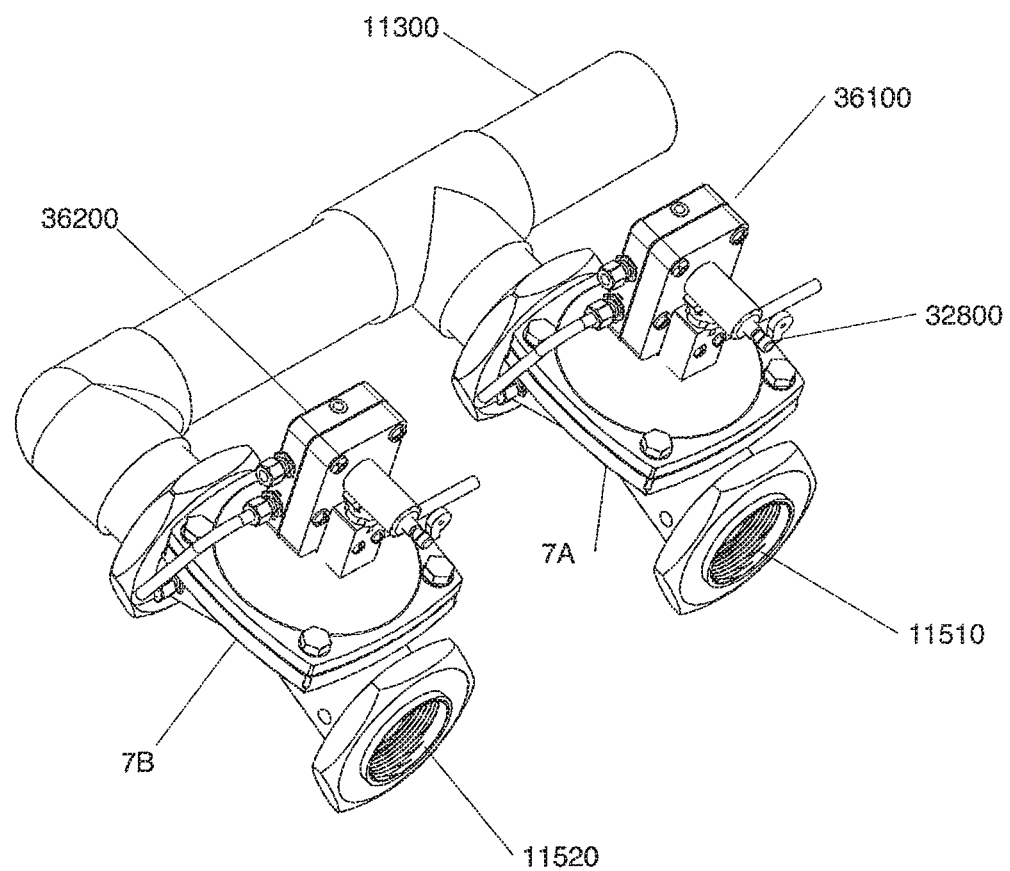
FIG. 36 depicts an example generalized arrangement for fluid activated actuators.

FIG. 36 represents a generalized arrangement for two fluid activated, actuator assemblies 36100 and 36200. This is a second type of lockstep actuator, similar to the lockstep actuator described above. In this arrangement a fluid inlet 11300 receives fluid from a source and the inventive device automatically determines whether one or more distribution valves 7A and 7B are activated or inactivated, thus, directing fluid out one or more of a group of fluid outlet ports 11510 and 11520. Advantageously, the lockstep actuator, as compared to the sequencing actuator for example, does not require a general communication system between the lockstep actuators 36100 and 36200. Advantageously, this modified lockstep actuator, as compared to the lockstep actuator described above uses a modified, notched cog wheel. The independent lockstep actuators when appropriately configured in a system operationally can direct fluid flow into various distribution lines with the same pressure and flow characteristics.

In an example embodiment lockstep actuators 36100 and 36200 receives fluid from a source via an inlet line 11300. Pressure, flow rate, or other parameter of the input fluid drives the lockstep actuators 36100 and 36200 to activate or deactivate one or more output valves 7A and 7B. When more than one output valve 7A and 7B are present, activation of one output valve, for example 7A, occurs simultaneously, or nearly thereto, with deactivation of another output valve, for example 7B. Thus, fluid is directed into a particular distribution line with the same pressure and flow characteristics of the source fluid. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In an example embodiment two lockstep actuators 36100 and 36200 regulates flow through two output valves as illustrated in FIG. 36. However, it is appreciated that the one or more lockstep actuators are suitable for regulation of one, two, three, four, five, six, or more output valves. This is optionally accomplished by configuring the number of valve shaft ports and cog wheel posts. Increasing the number of cog wheel posts reduces the degree of rotation of the valve shaft ports in response to a fluid pressure change. This coupled with a reduction in the number of valve shaft ports (e.g., to one) enables the regulation of multiple valves. While certain embodiments are described with respect to two output valves, a person having ordinary skill in the art recognizes description and enablement of any number of output valves without limitation.

FIG. 36 depicts a configuration of lockstep actuators 36100 and 36200 replacing the solenoids in a standard prior art solenoid controlled diaphragm valve, see also FIG. 20. Thus, certain embodiments optionally incorporate the low cost and simplicity of widely used diaphragm valves with embodiments of the fluid activated actuator devices disclosed herein.

An exemplary lockstep actuator 36100 is optionally constructed of an actuator housing 32810 to prevent fluid leakage from the actuator. In addition, the housing 32810 provides a protective cover to reduce contamination by soil, water, or other environmental conditions. A protective cover is optionally a separate piece that is removable, or is incorporated into a single injection molded part. The housing 32810 includes a diaphragm 32100 of the actuator assembly coupled to a rigid push plate 32300. A return spring 32400 is further coupled to the push plate 32300 that provides suitable force to compress the push plate 32300 and diaphragm 32100 when pressure is reduced from the fluid source, see FIG. 32. Optionally, a single or dual acting piston drive is operable in place of the diaphragm, push plate, and spring system. Attached to the push plate 32300 is a cog drive bar or leaf spring 32500 that interfaces with a notched cog wheel 32600 via a cog wheel post 19, see FIG. 32. The leaf spring 32500 produce a rotational force in the cog wheel 32600 when the push plate 32300 is raised in response to application of fluid pressure and expansion of the diaphragm 32100. The types of cog wheels and number of cog wheel posts varies as previously described.

The lockstep actuator 36100 optionally includes an anti-back rotation leaf spring stop that prevents the cog wheel 32600 from reversing rotational direction. The anti-back rotation leaf spring optionally is fixed to the lockstep actuator housing 32810 and in contact with the cog wheel 32600. The anti-back rotation leaf spring stop is flexible such that it does not impede the forward rotation of the cog wheel 32600. As the cog wheel 32600 advances in a forward rotation, the anti-back rotation leaf spring stop slides over the notched cog wheel 32600. As the cog wheel 32600 completes a partial rotation cycle (e.g., a cog wheel advancement in response to the raising of the drive bar/leaf spring 32500), the anti-back rotation leaf spring stop clears the cog wheel notch 33220. With the anti-back rotation leaf spring stop positioned against the cog wheel notch 33220, the cog wheel 32600 is prevented from rotating in the reverse direction.

The lockstep actuator 36100 optionally includes a pilot valve shaft 34100. The pilot valve shaft 34100 is rotatable and connects one or more pilot valve ports 34200 and 34600 to fluid passages 34500 and 34400, and 34700 and 34400, respectively. The pilot valve shaft 34100 is secured to the cog wheel 32600 such that rotation of the cog wheel 32600 produces rotation in the pilot valve shaft 34100. The pilot valve shaft 34100 is optionally cylindrical in shape. It is recognized in the art that other shapes for the cog wheel interface end of the pilot valve shaft 34100 are similarly suitable illustratively including square, triangle, oval, rectangle, pentagon, hexagon, and other shapes known in the art. Optionally, the pilot valve shaft 34100 meets the cog wheel 32600 in a pressure fitting such that the association of the two parts provides sufficient frictional force that rotation of the cog wheel translates to rotation of the valve shaft. It is also appreciated in the art that the cog wheel and valve shaft are optionally affixed with an adhesive or by press fit. The cog wheel 32600 and pilot valve shaft 34100 are optionally formed from a single unitary piece eliminating the need for fitting a separate pilot valve shaft 34100 and cog wheel 32600.

Figure 34:
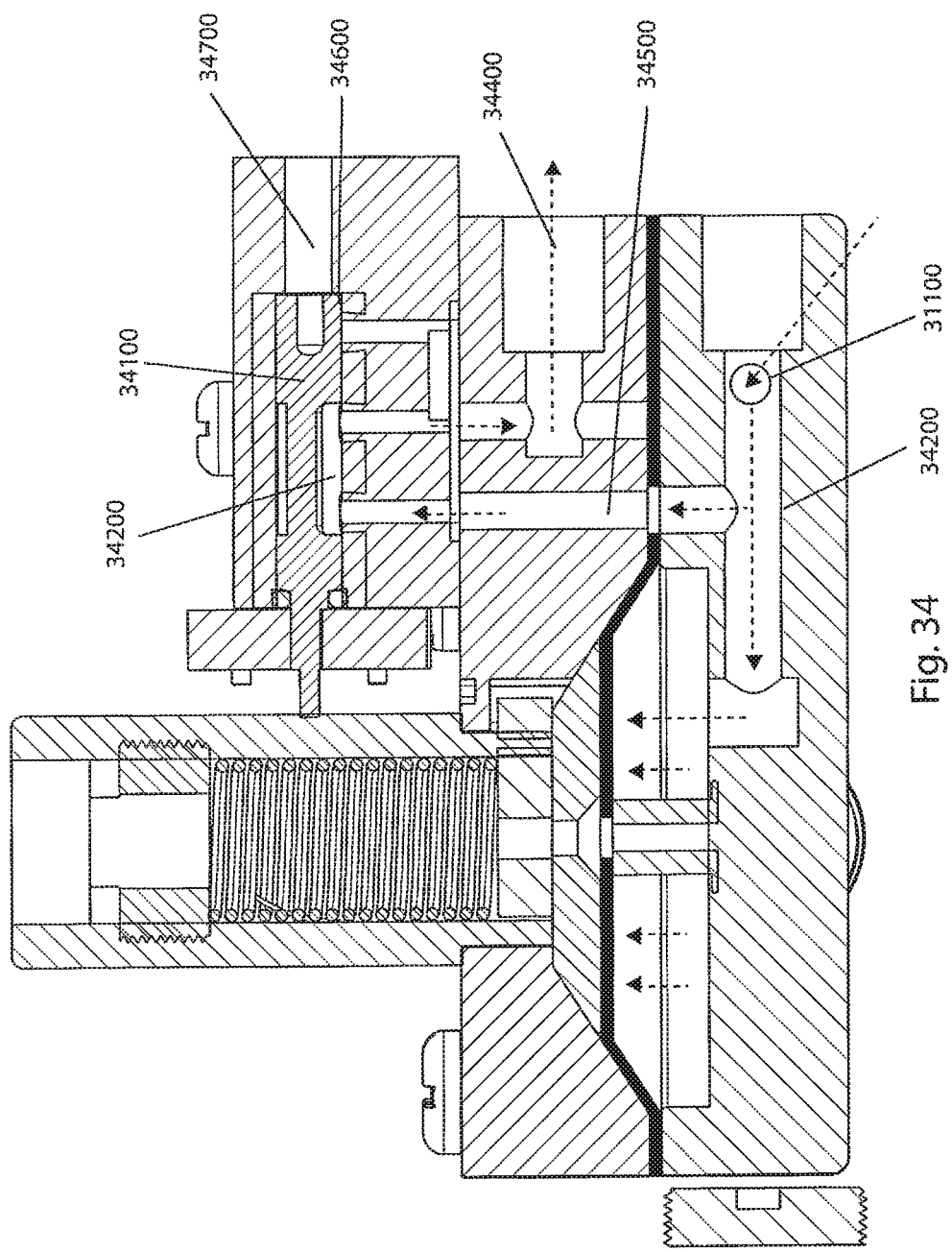
FIG. 34 depicts a cross-sectional view of an example fluid activated actuator.
Figure 37:
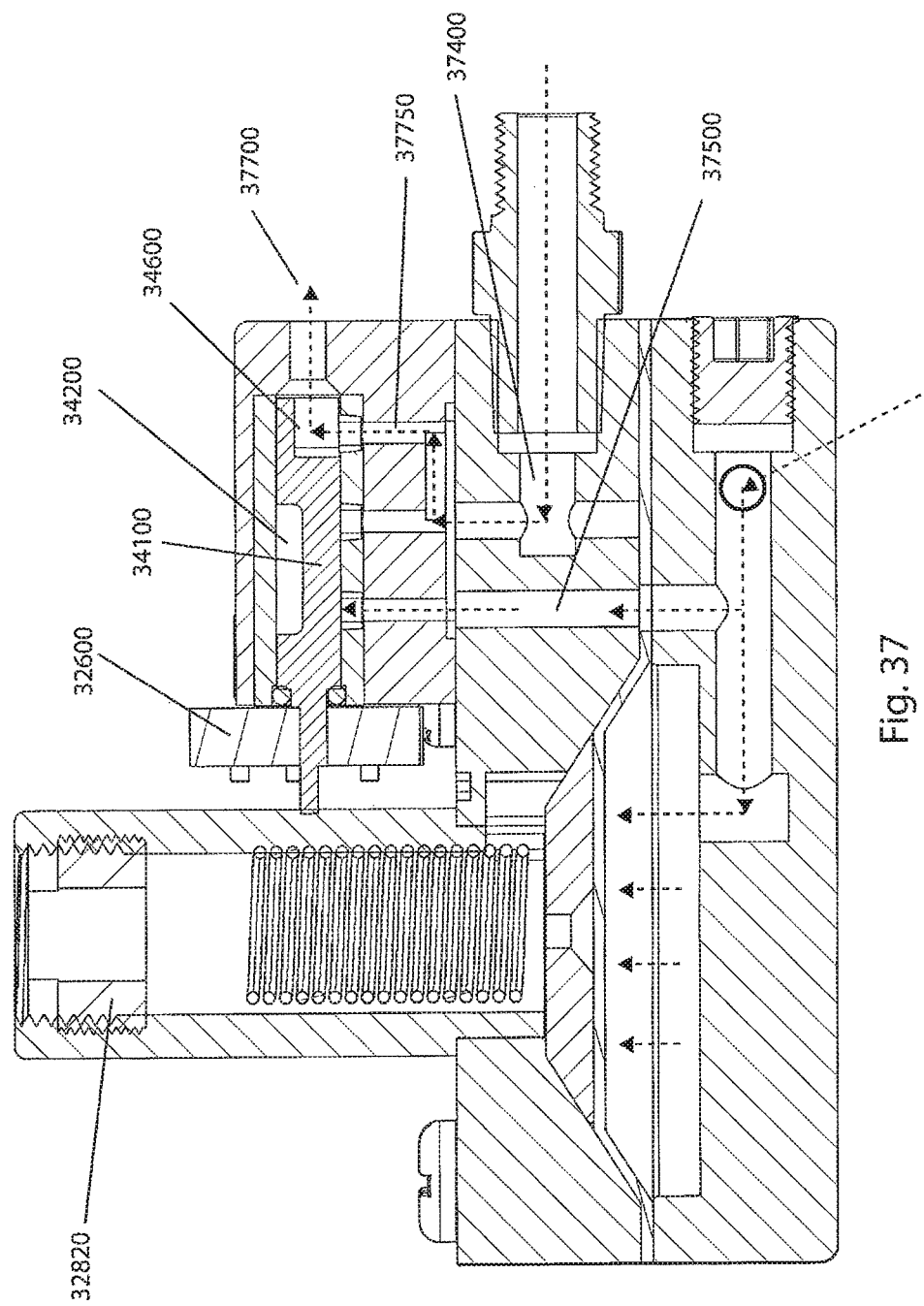
FIG. 37 depicts a cross-sectional view of an example fluid activated actuator.

The lockstep actuator assembly 36100 preferably includes one or more fluid passages (e.g., 34500 and 34400) that can optionally be interconnected by the pilot valve ports 34200 and 34600. When two pilot valve shaft ports 34200 and 34600 as illustrated in FIG. 34 and FIG. 37 are present in a pilot valve shaft 34100, a 90 degree rotation of the cog wheel 32600 aligns one valve port 34200 with a corresponding lockstep actuator passages 34500 and 34400, see FIG. 34, while the pilot valve shaft 34100 blocks the corresponding lockstep actuator fluid passages 34700 and 34400. To continue the example, a further 90 degree rotation of the cog wheel 32600 aligns the second valve shaft port 34600 with corresponding lockstep actuator fluid passages 34700 and 34400 and the pilot valve shaft 34100 blocks fluid passages 34500 and 34400, see FIG. 34 and FIG. 37. The pilot valve shaft ports 34200 and 34600 are preferably capable of delivering flow omni-directionally. Thus, in FIG. 36, if the lockstep actuators 36100 and 36200 in this example are configured to be out-of-phase with each other, the lockstep actuator passage and pilot valve port are aligned in one valve and not aligned in the other. This arrangement provides alternating flow through the lockstep actuators 36100 and 36200 for each 90 degrees of valve shaft 34100 rotation as provided by four cog wheel posts 19 on the cog wheel 32600. It is appreciated that multiple configurations of a pilot valve port are operable herein as previously described.

Optionally, each lockstep actuators 36100 and 36200 include a manual setting knob 32800 which is coupled to the rigid push plate 32300. The manual setting knob 32800 enables a user to manually actuate the lockstep actuators 36100 and 36200. Manually applying, for example, an outward force to the setting knob 32800 causes the coupled rigid push plate 32300 and attached leaf spring 32500 to move in a linear direction to the applied force (e.g., upward in FIG. 16 and FIG. 28). The leaf spring 32500, interfacing with the cog wheel post 19, applies a rotational force to the cog wheel 32600. The rotation of the cog wheel 32600 cause a rotation in the pilot valve shaft 34100. Each full extension of the manual setting knob results in an advancement of the pilot valve shaft 34100. In this manner, the flow to an output valve (e.g., 7A or 7B) is manually configured. Optionally, the position of the pilot valve and/or cam shaft is indicated by one or more markings and/or labels on the visible cog wheel 32600, see also FIG. 44.

Optionally, the lockstep actuators 36100 and 36200 include a pressure head adjustment bushing 32820. Optionally, a clockwise rotation of the pressure head results in a compression of the return spring 32400. Compressing the return spring 32400 increases the compression of the return spring. Therefore, more pressure is required in the diaphragm valve chamber to overcome the spring compression.

Conversely, a counter-clockwise rotation of the pressure head results in an expansion of the return spring 32400. Therefore, less pressure is required in the diaphragm valve chamber to overcome the spring compression.

The inventive arrangement functions when pressurized source fluid enters the lockstep actuator via a fluid passage 34200 into diaphragm chamber 32150. The diaphragm expansion overcomes the return spring 32400 compression and forces linear movement of the rigid pressurized disk 32300. The coupled leaf spring 32500 rotates the cog wheel 32600 into its new position. This position aligns the pilot valve port 34200 in the valve shaft 34100 with its fluid passage (e.g., the lockstep actuator fluid passage 34500 and 34400, see FIG. 34). This position enables a fluid passageway from: (a) a conventional diaphragm valve inlet, (b) a diaphragm valve bleed fluid valve passage tubing 31100 (e.g., connecting the inlet fluid source and actuator 36100, see FIG. 31), (c) lockstep actuator inflow passages 34200 and 34500, (d) pilot valve shaft port 34200, (e) lockstep actuator outflow passages 34400, (f) diaphragm bleed port passage 34400. This passageway enables fluid to enter the diaphragm chamber of the conventional diaphragm valve causing the diaphragm valve (e.g., 7A or 7B) to close. Upon termination of the fluid pressure by the control mechanism, the pressure is removed from the diaphragm chamber 32150 (e.g., via actuator passage 32900) allowing pressure from the return spring 32400 to extend the diaphragm while the anti-back rotation leaf spring stop prevents the cog wheel 32600 from rotating in the reverse direction by the retraction of the leaf spring 32500. When pressurized source fluid is reapplied, the fluid enters the lockstep actuator via a fluid passage 34200 into diaphragm chamber 32150. The diaphragm expansion overcomes the return spring 32400 compression and forces linear movement of the rigid pressurized disk 32300. The coupled leaf spring 32500 rotates the cog wheel 32600 into its new position. The pilot valve shaft 34100 rotates into a new position as the cog wheel 32600 rotates. In the new position, the pilot valve shaft blocks the fluid passage 34500 and 34400 in this example, and the pilot valve port 34600 connects the lockstep actuator passages 34700 and 34400 allowing fluid to exhaust from the diaphragm valve chamber 31200 causing the diaphragm valve (e.g., 7A or 7B) to open.

In an example embodiment, two commercially available output diaphragm valves are connected using standard PVC plumbing fittings (although custom output diaphragm valves may be used as well). The one or more lockstep actuators mount in the solenoid mounting of each of the output diaphragm valves, see FIG. 36. When fluid pressure is applied (turned on at the central control source) it enters the actuator by way of the interconnecting tubing (e.g., 31100) of the diaphragm valve and pressurizes a diaphragm chamber 32150 inside the actuator which in turn controls the output diaphragm valves (e.g., opens 7A) as described above. When fluid pressure is turned off fluid exits the diaphragm chamber 32150 via the diaphragm bleed port (e.g., 31100) and returns to its starting position. When pressure is reapplied the leaf spring 32500 engages a new cog wheel post 19 that rotates the pilot valve shaft 34100 to a new position thereby controlling the output diaphragm valve (e.g., close 7B) as described above. The system alternates as determined by the fluid source control timer. Time durations are set for each output port per normal timer operation. As previously described above, lockstep actuators 36100 and 36200 are optionally configured out-of-phase. When one valve is open the other is closed allowing the system to deliver an alternating flow of fluid to output lines with pressure equal to the pressure of the inlet. Other options are also configurable. For example, a system of 3 actuators is configured such that all the inlet pressure is applied to line 1 (open) when lines 2 and 3 are closed. In the next cycle, line 1 is closed and lines 2 and 3 are open and half the inlet pressure is applied to line 2 and half to line 3, etc.

Lockstep Actuator III Description

Figure 45:
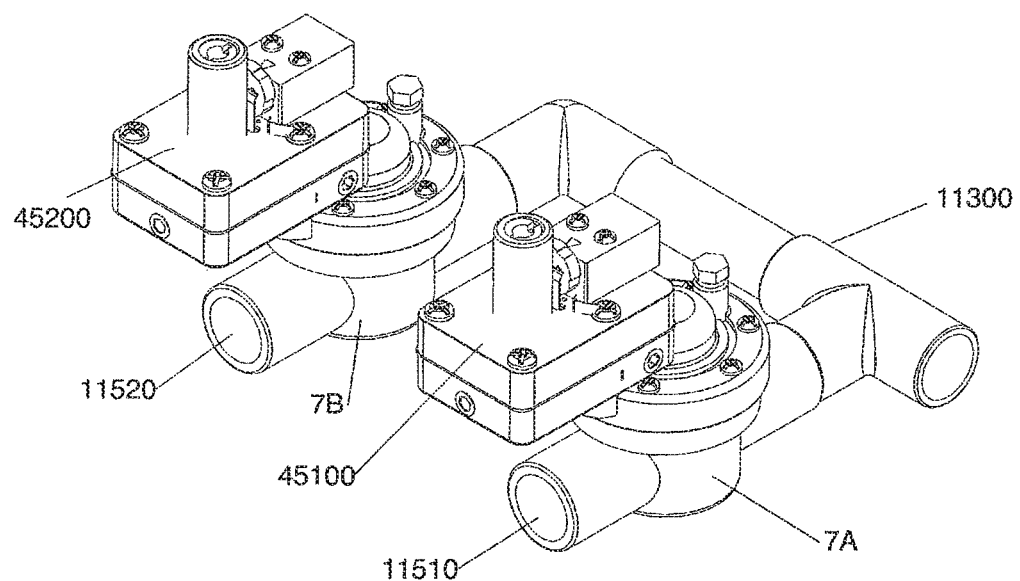
FIG. 45 depicts an example generalized arrangement for fluid activated actuators.

FIG. 45 represents a generalized arrangement for two fluid activated, actuator assemblies 45100 and 45200. This is a third type of lockstep actuator, similar to the lockstep actuators described above. In this arrangement a fluid inlet 11300 receives fluid from a source and the inventive device automatically determines whether one or more distribution valves 7A and 7B are activated or inactivated, thus, directing fluid out one or more of a group of fluid outlet ports 11510 and 11520. Advantageously, the lockstep actuator, as compared to the sequencing actuator for example, does not require a general communication system between the lockstep actuators 45100 and 45200. Advantageously, this modified lockstep actuator, as compared to the previously described lockstep actuators, has no pilot shaft ports and fewer actuator fluid passages. The independent lockstep actuators when appropriately configured in a system operationally can direct fluid flow into various distribution lines with the same pressure and flow characteristics.

In an example embodiment lockstep actuators 45100 and 45200 receives fluid from a source via an inlet line 11300. Pressure, flow rate, or other parameter of the input fluid drives the lockstep actuators 45100 and 45200 to activate or deactivate one or more output valves 7A and 7B. When more than one output valve 7A and 7B are present, activation of one output valve, for example 7A, occurs simultaneously, or nearly thereto, with deactivation of another output valve, for example 7B. Thus, fluid is directed into a particular distribution line with the same pressure and flow characteristics of the source fluid. By control from the lockstep actuators 45100 and 45200, fluid is optionally then directed to a different distribution line by deactivation of the first output valve 7A and activation of another output valve 7B, see FIG. 36. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In an example embodiment two lockstep actuators 45100 and 45200 regulates flow through two output valves as illustrated in FIG. 45. However, it is appreciated that the one or more lockstep actuators are suitable for regulation of one, two, three, four, five, six, or more output valves. This is optionally accomplished by configuring the number of cam shaft lobes and cog wheel posts. Increasing the number of cog wheel posts reduces the degree of rotation of the cam shaft in response to a fluid pressure change. This coupled with a reduction in the number of valve shaft ports (e.g., to one) enables the regulation of multiple valves. For example, a 4 post cog wheel provides a rotation of 90 degrees with each pressure application. If the cam shaft has a single lobe, this translates into a plunger transition/opening with every fourth application of pressure. Therefore, for example, a system of 4 valves, each with a 4 post cog wheel and single lobe cam shaft each is configured out-of-phase in order to deliver the full inlet pressure to each output valve in a round-robin fashion. In another example, a 6 post cog wheel provides a rotation of 60 degrees with each pressure application. If the cam shaft has a single lobe, this translates into a plunger transition/opening with every sixth application of pressure. Therefore, for example, a system of 6 valves, each with a 6 post cog wheel and single lobe cam shaft is configured out-of-phase in order to deliver the full inlet pressure to each output valve in a round-robin fashion. While certain embodiments are described with respect to two output valves, a person having ordinary skill in the art recognizes description and enablement of any number of output valves without limitation.

Optionally, the cog wheel interfaces with the cam shaft via a set of gears. Optionally, the cog wheel is configured with a fixed number of posts, for example 4 posts. With each cog wheel rotation (e.g., 90 degrees), a set of one or more gears are used to determine the rotation of the cam shaft. One set of gears is used to increase the amount of cam shaft rotation relative to the cog wheel. For example, a 90 degree rotation of the cog wheel can result in a 180 degree rotation of the cam shaft (e.g., using a large gear affixed to the cog wheel and a smaller gear affixed to the cam shaft). Similarly, another set of gears is used to decrease the cam shaft rotation relative to the cog wheel. For example, a 90 degree rotation of the cog wheel can result in a 45 degree rotation of the cam shaft (e.g., using a small gear affixed to the cog wheel and a larger gear affixed to the cam shaft). Optionally, the previously described fluid activated actuator assemblies can similarly use gears in the interface between the cog wheel and pilot valve shaft.

FIG. 45 depicts a configuration of lockstep actuators 45100 and 45200 replacing the solenoids in a standard prior art solenoid controlled diaphragm valve, see also FIG. 20. Thus, certain embodiments optionally incorporate the low cost and simplicity of widely used diaphragm valves with embodiments of the fluid activated actuator devices disclosed herein.

An exemplary lockstep actuator 45100 is optionally constructed of an actuator housing 41500 to prevent fluid leakage from the actuator. In addition, the housing 41500 provides a protective cover to reduce contamination by soil, water, or other environmental conditions. A protective cover is optionally a separate piece that is removable, or is incorporated into a single injection molded part. The housing 41500 includes a diaphragm 32100 of the actuator assembly coupled to a rigid push plate 32300. A return spring 32400 is further coupled to the push plate 32300 that provides suitable force to compress the push plate 32300 and diaphragm 32100 when pressure is reduced from the fluid source, see FIG. 32. Optionally, a single or dual acting piston drive is operable in place of the diaphragm, push plate, and spring system. Attached to the push plate 32300 is a cog drive bar or leaf spring 32500 that interfaces with a cog wheel 32600 via a cog wheel post 19, see FIG. 32. The leaf spring 32500 produce a rotational force in the cog wheel 32600 when the push plate 32300 is raised in response to reapplication of fluid pressure and expansion of the diaphragm 32100. The types of cog wheels and number of cog wheel posts varies as previously described.

The lockstep actuator 45100 optionally includes an anti-back rotation leaf spring stop that prevents the cog wheel 32600 from reversing rotational direction. The anti-back rotation leaf spring optionally is fixed to the lockstep actuator housing 41500 and in contact with the cog wheel 32600. The anti-back rotation leaf spring stop is flexible such that it does not impede the forward rotation of the cog wheel 32600. As the cog wheel 32600 advances in a forward rotation, the anti-back rotation leaf spring stop slides over the notched cog wheel 32600. As the cog wheel 32600 completes a rotation cycle (e.g., a cog wheel advancement in response to the raising of the drive bar/leaf spring 32500), the anti-back rotation leaf spring stop clears the cog wheel notch 33220. With the anti-back rotation leaf spring stop positioned against the cog wheel notch 33220, the cog wheel 32600 is prevented from rotating in the reverse direction.

The lockstep actuator 45100 optionally includes a cam shaft 41300. The cam shaft 41300 is rotatable and interfaces with a plunger 41400. The cam shaft 41300 is secured to the cog wheel 32600 such that rotation of the cog wheel 32600 produces rotation in the cam shaft 41300. The cam shaft 41300 is optionally cylindrical in shape. It is recognized in the art that other shapes for the cog wheel interface end of the cam shaft 41300 are similarly suitable illustratively including square, triangle, oval, rectangle, pentagon, hexagon, and other shapes known in the art. Optionally, the cam shaft 41300 meets the cog wheel 32600 in a pressure fitting such that the association of the two parts provides sufficient frictional force that rotation of the cog wheel translates to rotation of the valve shaft. It is also appreciated in the art that the cog wheel and cam shaft are optionally affixed with an adhesive or by press fit. The cog wheel 32600 and cam shaft 41300 are optionally formed from a single unitary piece eliminating the need for fitting a separate cam shaft 41300 and cog wheel 32600.

The cam shaft 41300 interfaces with a plunger 41400. When the plunger is raised by the cam shaft a fluid passageway is created in the associated diaphragm valve. This fluid passageway causes a pressure drop within the diaphragm valve chamber which causes the valve to open (e.g., in response to inlet fluid pressure within the valve). Similarly, when the plunger is lowered by the compression of the return spring onto the diaphragm bleed port passage, the fluid passage is blocked. Blocking the fluid passage causes a pressure increase within the diaphragm valve chamber which causes the valve to close (e.g., an internal diaphragm expands (e.g., changes the amount of its surface area) by overcoming the inlet pressure and seals the valve), see also FIG. 47.

Optionally, the lockstep actuator 45100 includes one or more fluid passages that enable fluid to enter the area enclosing the plunger. A passage 41220, for example, is created by the shape of plunger which may include a flat edge where fluid flows from the associated diaphragm valve, for example via diaphragm valve port 22500, into the enclosed plunger space. Optionally, the fluid pressure in the enclosure applied to the plunger, together with the return spring 41450 seals the fluid bleed port 22600.

Optionally, the lockstep actuators 45100 and 45200 include a manual setting knob 32800 which is coupled to the rigid push plate 32300. The manual setting knob 32800 enables a user to manually actuate the lockstep actuators 45100 and 45200. Manually applying, for example, an outward force to the setting knob 32800 causes the coupled rigid push plate 32300 and attached leaf spring 32500 to move in a linear direction to the applied force (e.g., upward in FIG. 41). The leaf spring 32500, interfacing with the cog wheel post 19, applies a rotational force to the cog wheel 32600. The rotation of the cog wheel 32600 cause a rotation in the cam shaft 41300. Each full extension of the manual setting knob results in an advancement rotation of the cam shaft 41300. Optionally, the position of the pilot valve and/or cam shaft is indicated by one or more markings and/or labels on the visible cog wheel, see also FIG. 44. In this manner, the flow to an output valve (e.g., 7A or 7B) is manually configured.

Optionally, the lockstep actuators 45100 and 45200 include a pressure head adjustment bushing 32820. Optionally, a clockwise rotation of the pressure head results in a compression of the return spring 32400. Compressing the return spring 32400 increases the compression of the return spring. Therefore, more pressure is required in the diaphragm valve chamber to overcome the spring compression. Conversely, a counter-clockwise rotation of the pressure head bushing results in an expansion of the return spring 32400. Therefore, less pressure is required in the diaphragm valve chamber to overcome the spring compression.

The inventive arrangement functions when pressurized source fluid enters the lockstep actuator (e.g., 45100 or 45200) via a fluid passage 41200 and into diaphragm chamber 32150. The diaphragm expansion overcomes the return spring 32400 compression and forces linear movement of the rigid pressurized disk 32300. The coupled leaf spring 32500 rotates the cog wheel 32600 into its new position. The rotation of the cog wheel results in a rotation of the cam shaft 41300. If the cam shaft is positioned to raise the plunger 41400, fluid can flow from the diaphragm chamber via the diaphragm bleed ports (e.g., 22500 and 22600, see FIG. 47). As described above, the reduction in pressure in the diaphragm chamber causes the diaphragm valve to open. When the plunger 41400 is lowered, the diaphragm bleed ports are blocked. The increase in pressure in the diaphragm chamber causes the diaphragm valve to close. Upon termination of the fluid pressure by the control mechanism, the pressure is removed from the diaphragm chamber 32150 allowing pressure from the return spring 32400 to extend the diaphragm while the anti-back rotation leaf spring stop prevents the cog wheel 32600 from rotating in the reverse direction by the retraction of the leaf spring 32500. When pressurized source fluid is reapplied and enters the lockstep actuator via a fluid passage 41200 and into the diaphragm chamber 41100, the diaphragm expansion overcomes the return spring 32400 compression and forces linear movement of the rigid pressurized disk 32300. The coupled leaf spring 32500 rotates the cog wheel 32600 into its new position. The cam shaft 41300 rotates into a new position as the cog wheel 32600 rotates.

In an example embodiment, two commercially available output diaphragm valves are connected using standard PVC plumbing fittings. The one or more lockstep actuators mount in the solenoid mounting of each of the output diaphragm valves, see FIG. 45. When fluid pressure is applied (turned on at the central control source) it enters the actuator by way of the diaphragm valve passages (e.g., 22300, 22500, and 41220) and pressurizes a diaphragm chamber 41100 inside the actuator which in turn controls the output diaphragm valves (e.g., opens 7A) as described above. When fluid pressure is turned off fluid exits from the diaphragm chamber 41100 via the internal passages and the actuator resets. When pressure is reapplied the leaf spring 32500 engages a new cog wheel post 19 that rotates the cam shaft 41300 to a new position thereby controlling the output diaphragm valve (e.g., close 7B) as described above. The system alternates as determined by the fluid source control timer. Time durations is set for each output port per normal timer operation. As previously described above, lockstep actuators 45100 and 45200 are out-of-phase. When one valve is open the other is closed allowing the system to deliver an alternating flow of fluid to output lines with pressure equal to the pressure of the inlet. Other options are also configurable. For example, a system of 3 actuators is configured such that all the inlet pressure is applied to line 1 (open) when lines 2 and 3 are closed. In the next cycle, line 1 is closed and lines 2 and 3 are open and half the inlet pressure is applied to line 2 and half to line 3, etc.

Lockstep Actuator IV

Figure 48:
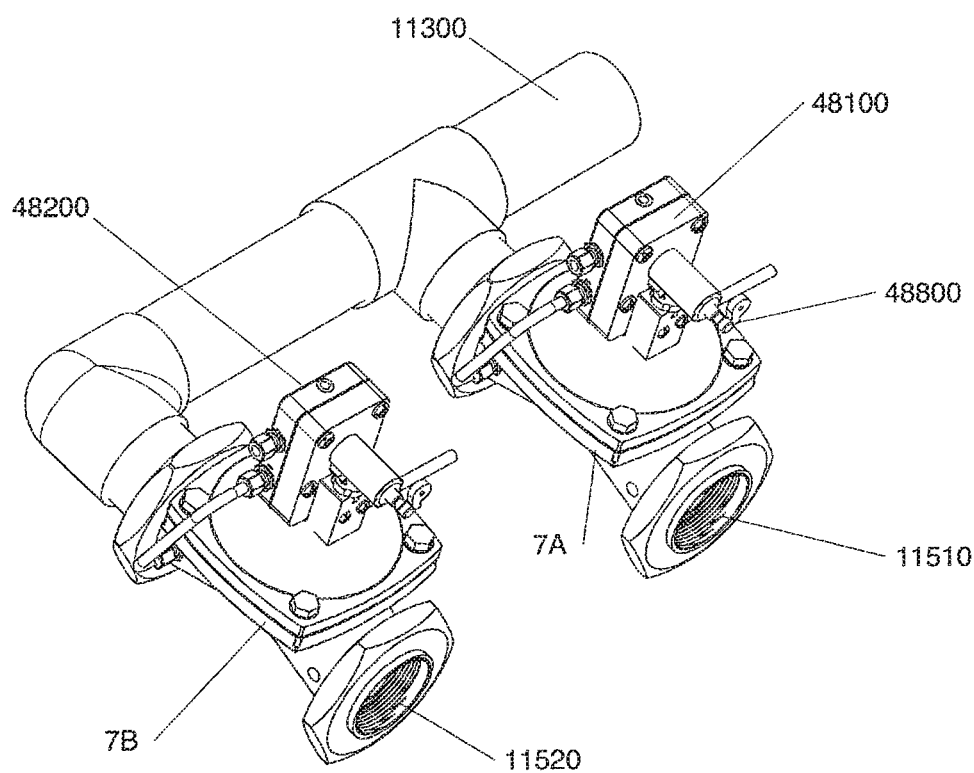
FIG. 48 depicts an example generalized arrangement for fluid activated actuators.
Figure 49:
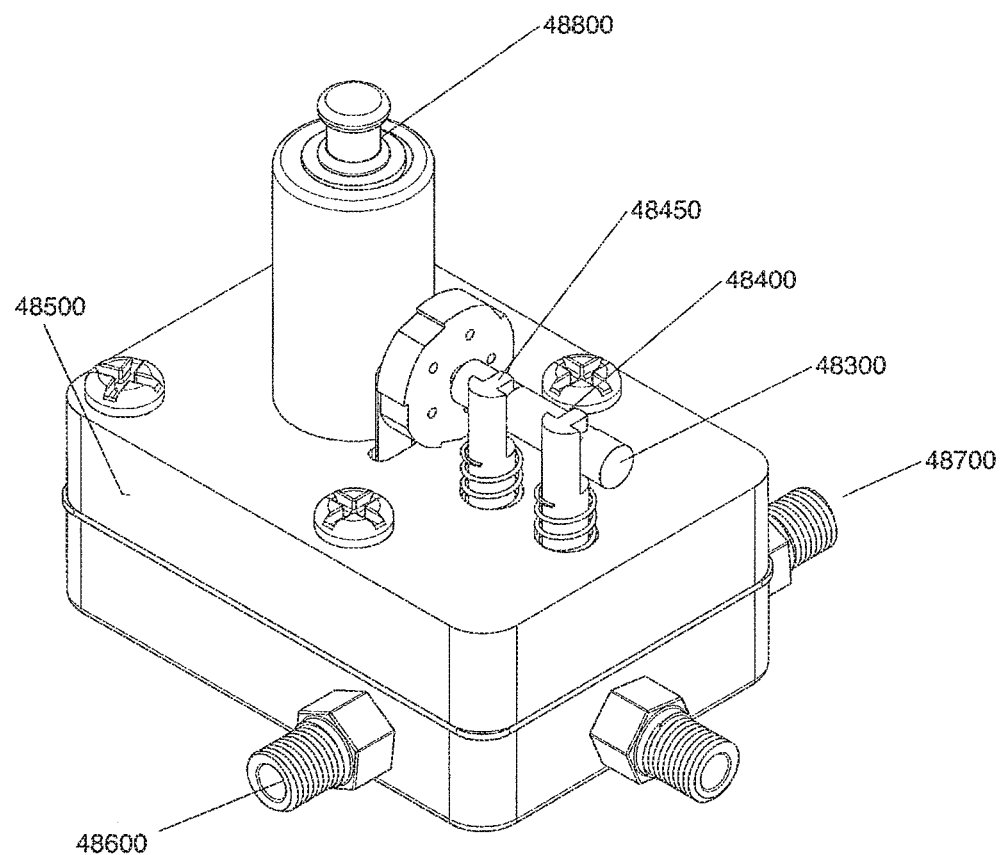
FIG. 49 depicts a view of an example fluid activated actuator assembly with part of the housing removed providing a view of the actuator's external interfaces and internal cam shaft, dual plunger configuration.

FIG. 48 illustrates a fourth type of lockstep actuator, similar to the lockstep actuators III described above. Advantageously, this fourth type of lockstep actuator can be used in conventional single port diaphragm valves 31000, see FIG. 31. Single port diaphragm valves use the same port to close the valve (e.g., using inlet fluid) as used to open the valve (exhaust path for diaphragm chamber fluid). Simply opening and closing the internal bleed ports with a single plunger mechanism as described in the Lockstep actuator case above would not by itself be sufficient to both open and close the associated diaphragm valve. Advantageously, this lockstep actuator utilizes a dual lobe cam mechanism to raise and lower two plungers as further described below.

FIG. 48 represents a generalized arrangement for two fluid activated, actuator assemblies 48100 and 48200. In this arrangement a fluid inlet 11300 receives fluid from a source and the inventive device automatically determines whether one or more distribution valves 7A and 7B are activated or inactivated, thus, directing fluid out one or more of a group of fluid outlet ports 11510 and 11520. Advantageously, the lockstep actuator, as compared to the sequencing actuator for example, does not require a general communication system between the lockstep actuators 45100 and 45200. The independent lockstep actuators when appropriately configured in a system operationally can direct fluid flow into various distribution lines with the same pressure and flow characteristics.

In an example embodiment lockstep actuators 45100 and 45200 receives fluid from a source via an inlet line 11300. Pressure, flow rate, or other parameter of the input fluid drives the lockstep actuators 45100 and 45200 to activate or deactivate one or more output valves 7A and 7B. When more than one output valve 7A and 7B are present, activation of one output valve, for example 7A, occurs simultaneously, or nearly thereto, with deactivation of another output valve, for example 7B. Thus, fluid is directed into a particular distribution line with the same pressure and flow characteristics of the source fluid. By control from the lockstep actuators 48100 and 48200, fluid is optionally then directed to a different distribution line by deactivation of the first output valve 7A and activation of another output valve 7B, see FIG. 48. In this way multiple distribution lines are optionally served by a single source with the pressure, rate, and other flow characteristics of the original source maintained throughout the entire system. Thus, expansion of an existing irrigation or other fluid delivery system is accomplished without need for an additional fluid source, control device, or timing mechanism.

In an example embodiment two lockstep actuators 48100 and 48200 regulate flow through two output valves as illustrated in FIG. 48. However, it is appreciated that the one or more lockstep actuators are suitable for regulation of one, two, three, four, five, six, or more output valves. This is optionally accomplished by configuring the number of cam shaft posts and/or cam shaft lobes, cog wheel posts, and/or gears as described above. Optionally, if a plunger is required to be in a raised position for an extended number of pressure cycles, multiple cam shaft posts and/or an extended cam shaft lobe can be employed and/or the cam can be circular with carve outs in the shaft enabling the interfacing plunger to be lowered at rotational positions of the cam shaft. While certain embodiments are described with respect to two output valves, a person having ordinary skill in the art recognizes description and enablement of any number of output valves without limitation.

FIG. 48 depicts a configuration of lockstep actuators 48100 and 48200 replacing the solenoids in a standard prior art solenoid controlled diaphragm valve, see also FIG. 20. Thus, certain embodiments optionally incorporate the low cost and simplicity of widely used diaphragm valves with embodiments of the fluid activated actuator devices disclosed herein.

An exemplary lockstep actuator 48100 is optionally constructed of an actuator housing 48500 to prevent fluid leakage from the actuator. In addition, the housing 48500 provides a protective cover to reduce contamination by soil, water, or other environmental conditions. A protective cover is optionally a separate piece that is removable, or is incorporated into a single injection molded part. The housing 48500 includes internal fluid passages, a flexible diaphragm within a diaphragm chamber, a push plate, a push plate return spring, a notched cog wheel with interfacing drive and anti-rotation springs. These actuator components operate in a manner similar to that described above with respect to lockstep actuator II.

The lockstep actuator 48100 optionally includes a cam shaft. The cam shaft 48300 is rotatable and interfaces with two plungers 48400 and 48450. The cam shaft 48300 is secured to the cog wheel (e.g., 32600) such that rotation of the cog wheel (e.g., 32600) produces rotation in the cam shaft 48300. The cam shaft 48300 is optionally cylindrical in shape. It is recognized in the art that other shapes for the cog wheel interface end of the cam shaft 48300 are similarly suitable illustratively including square, triangle, oval, rectangle, pentagon, hexagon, and other shapes known in the art. Optionally, the cam shaft 48300 meets the cog wheel (e.g., 32600) in a pressure fitting such that the association of the two parts provides sufficient frictional force that rotation of the cog wheel translates to rotation of the valve shaft. It is also appreciated in the art that the cog wheel and cam shaft are optionally affixed with an adhesive or by press fit. The cog wheel (e.g., 32600) and cam shaft 48300 are optionally formed from a single unitary piece eliminating the need for fitting a separate cam shaft 48300 and cog wheel (e.g., 32600).

The cam shaft 48300 interfaces with the plungers 48400 and 48450 to create a tandem plunger operation. If one plunger is raised, the other plunger is lowered and vice versa. With respect to the inlet plunger 48400, when the inlet plunger 48400 is raised by the inlet cam, a fluid passageway is created from the inlet side of the single port diaphragm valve, through the actuator, and into the associated diaphragm valve port. The fluid pressure through this actuator passageway causes a fluid pressure increase within the diaphragm valve chamber which causes the diaphragm valve to close, see also FIG. 31 for an illustration of a single port diaphragm valve. When the inlet plunger 48400 is in a raised position the exhaust plunger 48500 is in a lowered position (e.g., lowered by the compression of the return spring and the associated exhaust cam is in a position opposite to the inlet cam) blocking an exhaust fluid passage (described next). With respect to the exhaust plunger 48450, when the exhaust plunger 48450 is raised there is an exhaust fluid passage created from the diaphragm valve port, through an internal actuator passageway, to an actuator exhaust port. This exhaust fluid passage creates a pressure drop within the diaphragm valve chamber. The diaphragm valve inlet fluid pressure overcomes the pressure within the diaphragm valve chamber causing a contraction of the diaphragm and opening of the valve, see also FIG. 31 for an illustration of a single port diaphragm valve. When the exhaust plunger 48450 is in a raised position the inlet plunger 48500 is in a lowered position (e.g., lowered by the compression of the return spring and the associated inlet cam is in a position opposite to the exhaust cam) blocking the inlet fluid flow.

Optionally, the lockstep actuators 48100 and 48200 include a manual setting knob (e.g., 48800) which is coupled to the rigid push plate (e.g., 32300). The manual setting knob (e.g., 48800) enables a user to manually actuate the lockstep actuators 45100 and 45200 as previously described, see also manual setting knob for lockstep actuator III for example.

Optionally, the lockstep actuators 48100 and 48200 include a pressure head adjustment bushing (e.g., 32800) which operates in the same manner as the adjustment bushing for lockstep actuator III.

The inventive arrangement functions when pressurized source fluid enters the lockstep actuator via tubing 31100 connecting the inlet side of the diaphragm valve to an actuator fitting 48600 which connects to an internal fluid passage. The internal fluid passage connects to a diaphragm/diaphragm chamber (e.g., 32100). The fluid pressure expands the diaphragm (e.g., 32100) and overcomes the return spring (e.g., 32400) compression and forces linear movement of the rigid pressurized disk (e.g., 32300). The coupled leaf spring (e.g., 32500) rotates the cog wheel (e.g., 32600) into its new position. The rotation of the cog wheel results in a rotation of the dual lobe cam shaft 48300. If the cam shaft is positioned to raise the inlet plunger 41400, fluid flows into the diaphragm valve chamber 31200 via the diaphragm port 34400 causing an increase in pressure in the diaphragm chamber 31200 causing the diaphragm valve (e.g., 7A or 7B) to close. Upon termination of the fluid pressure by a control mechanism, the pressure is removed from the diaphragm (e.g., 32100) allowing pressure from the return spring (e.g., 32400) to extend the diaphragm while the anti-back rotation leaf spring stop prevents the cog wheel (e.g., 32600) from rotating in the reverse direction by the retraction of the leaf spring (e.g., 32500). When pressurized source fluid is reapplied, the fluid enters the lockstep actuator via tubing 31100 connecting the inlet side of the diaphragm valve to the actuator fitting 48200 which connects to an internal fluid passage. The internal fluid passage connects to a diaphragm/diaphragm chamber, (e.g., 32150). The fluid pressure expands the diaphragm (e.g., 32100) and overcomes the return spring (e.g., 32400) compression and forces linear movement of the rigid pressurized disk (e.g., 32300). The coupled leaf spring (e.g., 32500) rotates the cog wheel (e.g., 32600) into its new position. The rotation of the cog wheel results in a rotation of the cam shaft 48300. If the cam shaft is positioned to raise the exhaust plunger 41400, fluid flows from the diaphragm valve chamber 31200 via the diaphragm port 34400, through the actuator, and exits the actuator at the actuator fitting 48700 causing a drop in pressure in the diaphragm chamber further causing the diaphragm valve (e.g., 7A or 7B) to open.

In an example embodiment, two commercially available output diaphragm valves are connected using standard PVC plumbing fittings. The one or more lockstep actuators mount in the solenoid mounting of each of the output diaphragm valves, see FIG. 20. When fluid pressure is applied (turned on at the central control source) it enters the actuator by way of the inlet connected tubing (e.g., 31100) of the diaphragm valve and pressurizes a diaphragm chamber (e.g., 32150) inside the actuator which in turn controls the output diaphragm valves (e.g., closes 7A) as described above. When fluid pressure is turned off, fluid exits the diaphragm chamber 32150 via the diaphragm control tube (e.g., 31100) and returns to its starting position. When pressure is reapplied the leaf spring (e.g., 32500) engages a new cog wheel post 19 that rotates the cam shaft 48300 to a new position thereby controlling the output diaphragm valve (e.g., opens 7B) as described above. The system alternates as determined by the fluid source control timer. Time durations are set for each output port per normal timer operation. As previously described above, lockstep actuators 48100 and 48200 are optionally configured out-of-phase. When one valve is open the other is closed allowing the system to deliver an alternating flow of fluid to output lines with pressure equal to the pressure of the inlet. Other options are also configurable. For example, a system of 3 actuators is configured such that all the inlet pressure is applied to line 1 (open) when lines 2 and 3 are closed. In the next cycle, line 1 is closed and lines 2 and 3 are open and half the inlet pressure is applied to line 2 and half to line 3, etc.

Optional System Sync Feature

Optionally, the fluid activated actuator is equipped with or is fitted with (e.g., after operational installation in a diaphragm valve) optional components including a timing mechanism, a solenoid-based actuator, a sensor, transmitter, receiver, and/or a power source (e.g., battery). One or more of these components is associated and/or configured with the system of actuators in order to determine the state of one or more actuators and/or return a system of fluid activated actuators to a configurable home setting based on a timing event or other condition. For example, to improve the robustness of an irrigation system, a user might choose to configure each night a home setting reset for each fluid activated actuator. Optionally, if the expected configuration is the home setting for the actuator, a resetting is unlikely to occur and battery usage will be minimal. Optionally, these optional components are configured into the actuator to determine and report the operation of the actuator and/or associated valve.

Optionally, there are a variety of timing mechanisms that are used with the fluid activated actuator. Optionally, a simple duration based (e.g., 1 hour, 24 hours, x days, 1 month, etc.) timing mechanism is used. Optionally, a more sophisticated timing mechanism is used in which multiple triggering events are scheduled on a given user specified time (e.g., time of day, day of week, day or month, etc.). Optionally, the timing mechanism is used in association with one or more actuators or a system of actuators. Optionally, when a scheduled timing event occurs, only the state of a sensor is determined. Optionally, when a scheduled timing event occurs, the system resets the actuator(s) to a home or user specified configuration.

Figure 38:
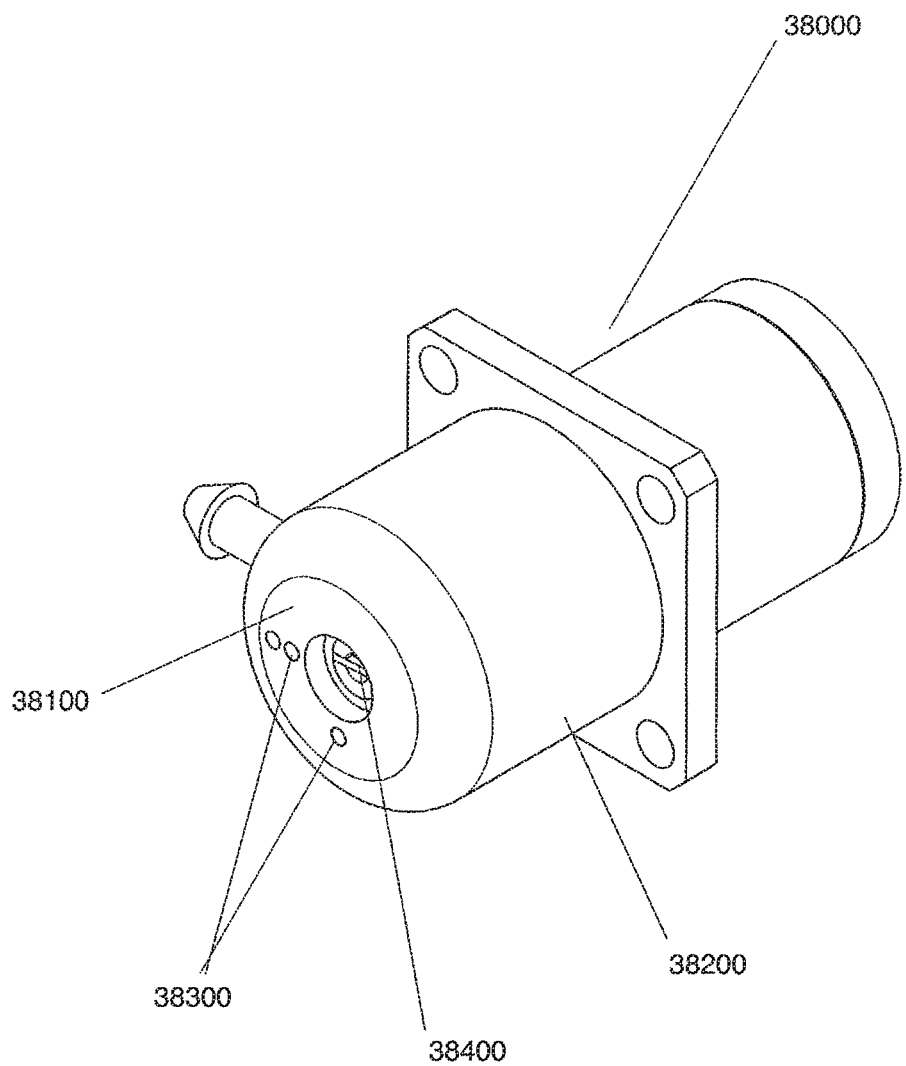
FIG. 38 depicts an example fluid activated actuator indicator.

FIG. 38 illustrates an example fluid activated actuator indicator 38000 user control for configuring a home position. Optionally, a view window is provided which enables the user to determine the position of the pilot valve shaft via a visible indicator 38400. Optionally, the pilot valve shaft is encased in a housing 38200 which is rotated manually by a user into fixed positions which correspond to available positions of the valve shaft. Optionally, the fluid activated actuator is manually activated/cycled by the user pulling (e.g., outward) on the manual activator knob (e.g., 14650). Optionally, there are one or more markings 38300 on the actuator housing 38200 which indicate a user configurable home position. Optionally, the markings 38300 indicate an associated valve on or off position. Optionally, housing 38200 includes a position sensor which is capable of detecting when the actuator is in a configured home position, not in a home position, and/or if not in a home position, the rotation position of the pilot valve shaft.

Optionally, the fluid activated actuator includes a solenoid. Optionally, the solenoid is configured into the actuator unit in a manner which compliments and does not replace the manual setting knob. For example, in the sequencing actuator, the solenoid is configured into the upper housing 14550 and/or the upper housing 14550 is extended to accommodate the solenoid. Optionally, power is applied to the solenoid which causes the actuator to advance to the next position (e.g., advance 90 degrees in a 4 post cog wheel).

Optionally, the fluid activated actuator system includes a radio transmitter. Optionally, the radio transmitter is used to transmit signals related to the operation of the actuator and/or sensor position of the actuator. For example, the radio transmitter is used to transmit a signal if the actuator is not in a configured home setting. In another example, the radio transmitter is used to transmit a signal if the actuator is not in a configured home setting at a timed event.

Optionally, the fluid activated actuator system includes a radio receiver. Optionally, the radio receiver is used to receive signals and/or signal commands related to the operation of the actuator and/or sensor position of the actuator. For example, the radio receiver is used to receive a signal to cycle the actuator or to cycle the actuator to a home setting.

Optionally, the fluid activated actuator system includes one or more electrical power sources. The power source is configured to power one or more solenoids within the system, one or more timing mechanisms, transmitter, receiver, and one or more position sensors per actuator.

Optionally, there are multiple combinations of the optional components described above and all combinations should be considered herein.

Optional Actuator Reset Control Monitor

Optionally, the fluid activated actuator system is equipped with or is fitted with (e.g., after operational installation in a diaphragm valve) optional components including an Actuator Reset Control Monitor (ARCM). In an operating environment, the system may encounter pressure spikes, pulses, dips, etc. These pressure fluctuations can be caused, for example, by a power brown out or a lighting strike affecting the controller/timing mechanism fluid pressure source. Regardless of the cause of fluid pressure fluctuation, the fluid activated actuators are generally robust to these types of fluctuations. However, the ARCM further increases the system reliability as further described below. In addition, as previously described, the fluid activated actuator system relies upon a timing mechanism or controller to manage the fluid pressure changes. The timing mechanism requires the inlet fluid pressure to be sufficiently decreased for a fixed and/or configurable period of time in order for an actuator or the system of actuators to reset. Therefore, with one or more of the actuators described herein, the timing mechanism needs to sufficiently reduce fluid pressure (e.g., by turning off the master valve) wait an interval of time, and then reapply pressure (e.g., by turning on the master valve). This cycle of master valve off, pause, and on, conventionally requires user programming of the controller. Therefore, advantageously, in certain embodiments the ARCM simplifies user programming of the controller by removing the need to program the cycle. As is further described below, with an ARCM, a user merely programs valve on/off timing.

In an example operating environment one or more master control valves are used to regulate pressure changes to the downline fluid controlled actuators and associated diaphragm valves (see example embodiments below). Conventionally, the master valve is controlled by a timer. The timer or controller is electrically connected to a solenoid-based actuator used to control the master diaphragm valve. In response to an activate signal (e.g., voltage) from the controller, the solenoid in the control panel actuates and opens the master diaphragm valve. In response to a deactivate signal (e.g., voltage off) from the control timer, the solenoid deactivates and closes the master diaphragm valve. In an example embodiment, an ARCM is mounted on the master diaphragm valve. Optionally, the ARCM is electrically spliced between the control timer and the master diaphragm valve solenoid. Optionally, the ARCM includes a pressure sensor which is connected to the output end of the master valve (e.g., via a diaphragm port or by boring a hole into the output line). Optionally, the ARCM includes a timing mechanism. Optionally, the ARCM is powered from an external power source including, for example, a battery, and/or the controller.

Optionally, there are one or more configurations and/or features of the ARCM. In an example embodiment of a basic version of the ARCM, which does not include a pressure sensor, the ARCM measures the time period between the receipt of a controller signal to deactivate the solenoid (and consequently turn off the master control valve) and subsequent receipt of the controller reactivation of the solenoid (and consequently turn on the master control valve). This time period is labeled the master valve downtime period or downtime period. Optionally, if the downtime period exceeds a system configurable time period, the ARCM allows the solenoid actuation signal to be applied and fluid is released to the downline fluid activated actuators and associated valves. If the downtime period is less than or equal to the system configurable time period the ARCM delays the solenoid actuation signal application until the system configurable time period has been exceeded. For example, if the downtime period is 45 seconds, and the ARCM detects a signal to reactivate the solenoid after 15 seconds, the ARCM will delay the signal for an additional 30 seconds. This fixed and/or guaranteed minimum delay ensures that each downline fluid activated actuator has a sufficient time period to reset before the reapplication of fluid pressure.

In another example embodiment the ARCM measures both the time and pressure during the downtime period. For example, in response to a close valve signal, the ARCM begins to measure the output pressure on the master control valve. When the pressure drop and/or the measured pressure reaches a threshold level (e.g., 5 psi) the ARCM initiates a timer and the start of the downtime period begins. The downtime period ends with the receipt of the open valve signal from the master controller. Optionally, if the downtime period exceeds a system configurable time period, the ARCM allows the valve activation signal to be applied and fluid is released to the downline fluid activated actuators and associated valves. If the downtime period is less than or equal to the system configurable time period the ARCM delays the valve activation signal until the system configurable time period has been exceeded. For example, if the downtime period is 45 seconds, and the ARCM detects a signal to open the valve after 15 seconds of measured downtime (e.g., from the time the pressure in the output line dropped below the configured threshold) the ARCM will delay the signal for an additional 30 seconds. This fixed and/or guaranteed minimum delay and/or associated pressure drop ensures that each downline fluid activated actuator has a sufficient period of time to reset before the reapplication of fluid pressure.

Local Control Toggle

Optionally, the fluid activated actuator is equipped with a local control mechanism which enables a user to disable the actuator. When the actuator is in a disabled state, the on or off position of the current valve does not change in response to input fluid pressure changes. Optionally, the local control mechanism is managed manually (e.g., by a user toggling a switch) or electronically (e.g., by an electrical switch and/or via remote control using a wireless connection).

A local control mechanism is used, for example, to disable one or more zones in a multiple zone irrigated field. For example, a user may want to stop the irrigation of the third zone in a four zone field. In this example, the user can manually disable the third zone by toggling a disable switch on the zone 3 actuator. When the user wants to resume the irrigation of zone 3, the user simply toggles the switch to the on position and the fluid activated actuator is again enabled. Advantageously, this local control mechanism allows the user, for example, to avoid reprogramming a master controller.

There are a number of different manual or electronic methods for disabling/enabling a fluid activated actuator. For example, an external switch can open or close a fluid passage connected to the diaphragm chamber(s) of the actuator. In the open fluid passage position leading to the diaphragm chamber, the inlet fluid pressure normally fills the diaphragm chamber and expands the diaphragm of the fluid activated actuator is insufficient. In another example embodiment, a mechanical switch can be used to activate a cog wheel braking mechanism. In another example embodiment, a mechanical switch can be used to activate a pilot valve shaft or cam shaft braking mechanism. In another example embodiment, a barrier slides between the cog wheel and the drive spring and/or drive spring interface with push plate, thus preventing engagement of the cog wheel. In another example, a mechanical switch can be used to open or close a fluid passage leading to or from the associated output valve (in this example, the actuator still advances in response to fluid pressure changes but the associated output valve position is not affected). Optionally, the mechanical switch described above can be controlled with an electronic switch. Optionally, the mechanism itself (e.g., the braking mechanism, fluid passage opening or obstruction, etc.) can be electronically powered and controlled.

FIG. 12 illustrates an expanded view of the cog drive spring 10 and the interface between the leaf drive bar mechanism and cog wheel 8. The cog drive spring 10 and anti-back rotation leaf spring 9 include a flange shelf 12000. The cog drive spring 10 is attached to drive post 11. The anti-back rotation leaf spring 9 and cog drive spring 10 interfaces with the cog wheel 8 via cog wheel posts 11.

Figure 13:
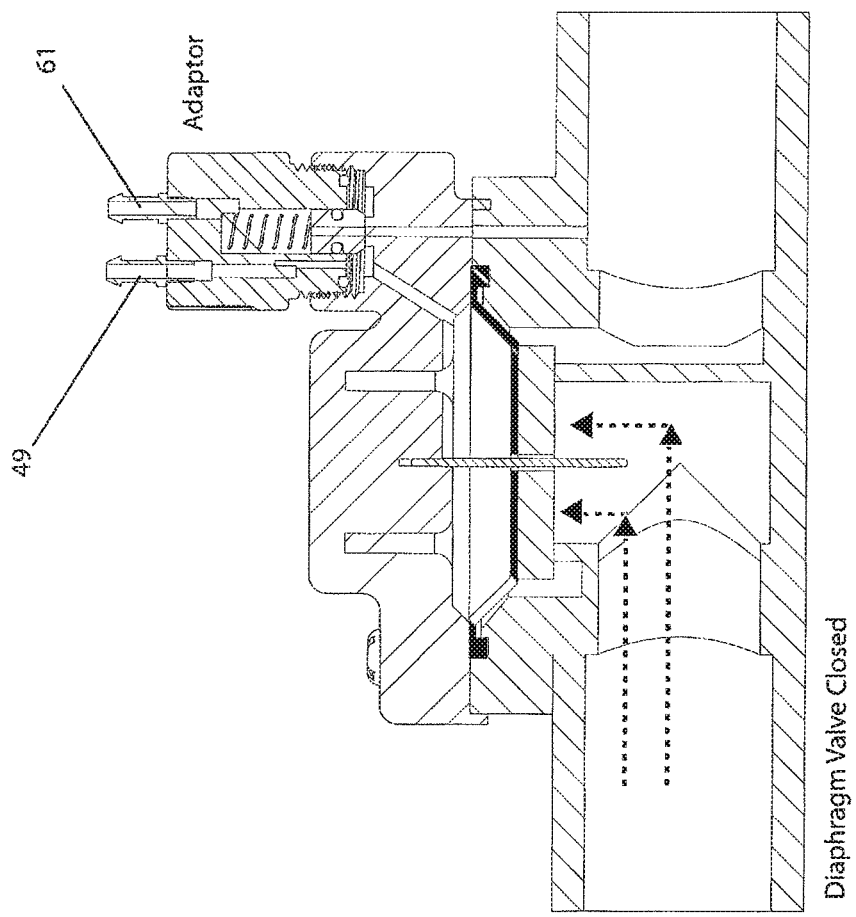
FIG. 13 depicts an example cross-sectional view of an adaptor used in a fluid activated actuator assembly mounted into a closed diaphragm valve.
Figure 15:
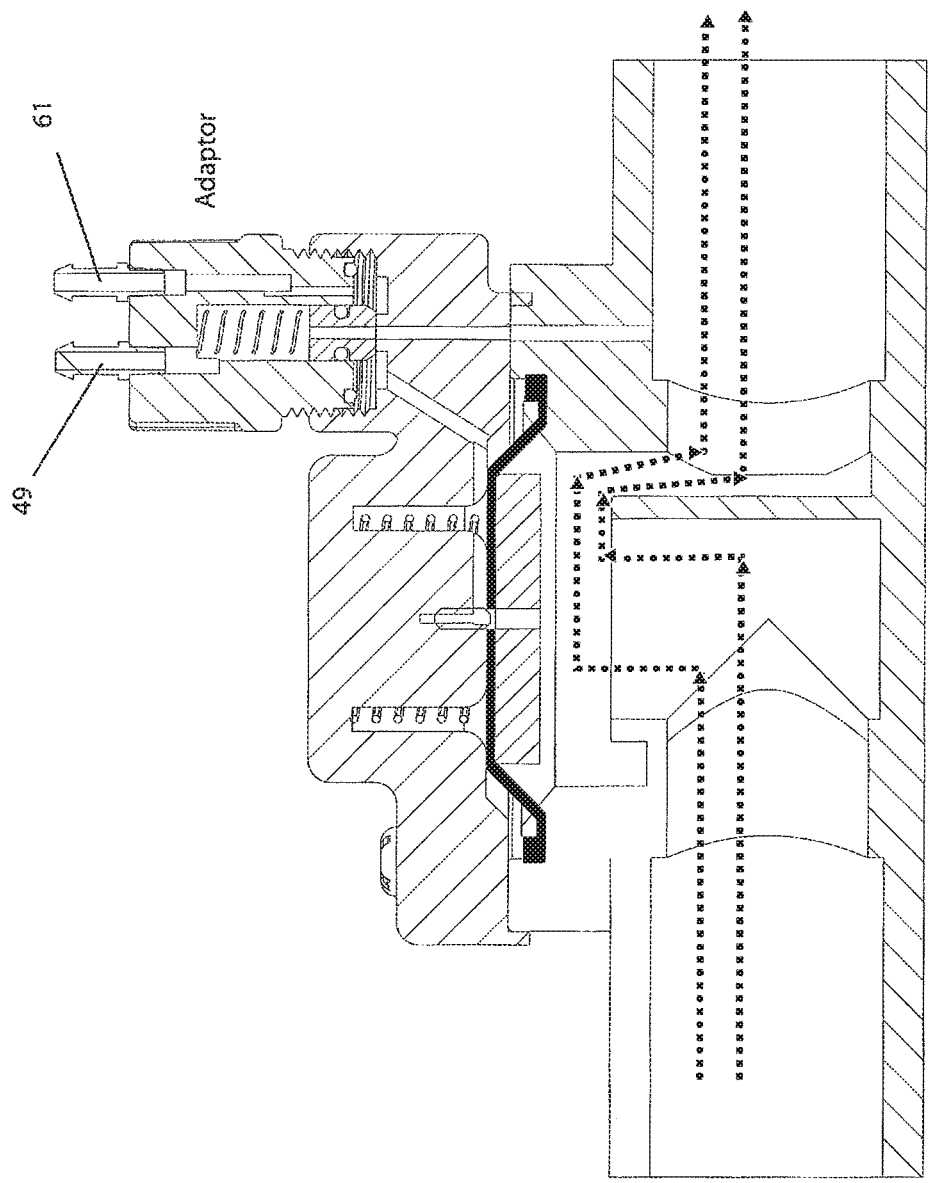
FIG. 15 depicts a cross-sectional view of an example fluid activated actuator mounted into a conventional diaphragm valve with the diaphragm valve in the open position.

FIGS. 13 and 15 illustrates a cross-section view of exemplary adaptors 6A or 6B connected to a conventional diaphragm valve (e.g., 7A or 7B) seated in the solenoid mount position. Adaptors 6A and 6B interwork with fluid activated servo assembly 3. Optionally, the adapters 6A or 6B are mounted into the diaphragm valve in a manner which allows fluid to flow from the diaphragm bleed port passage 22500 into the adapter passage 49, see also FIG. 22. Optionally, the adapter includes a passage 61 in which fluid can flow to the diaphragm bleed port passage 22600, see also FIG. 22. Optionally, the adaptor fittings 49 and 61 are connected to a fluid activated servo assembly 3 via, for example, flexible tubing 5. FIG. 13 illustrates the adaptor mounted on a closed conventional diaphragm valve. FIG. 15 illustrates the adaptor mounted on an open conventional diaphragm valve.

Figure 14:
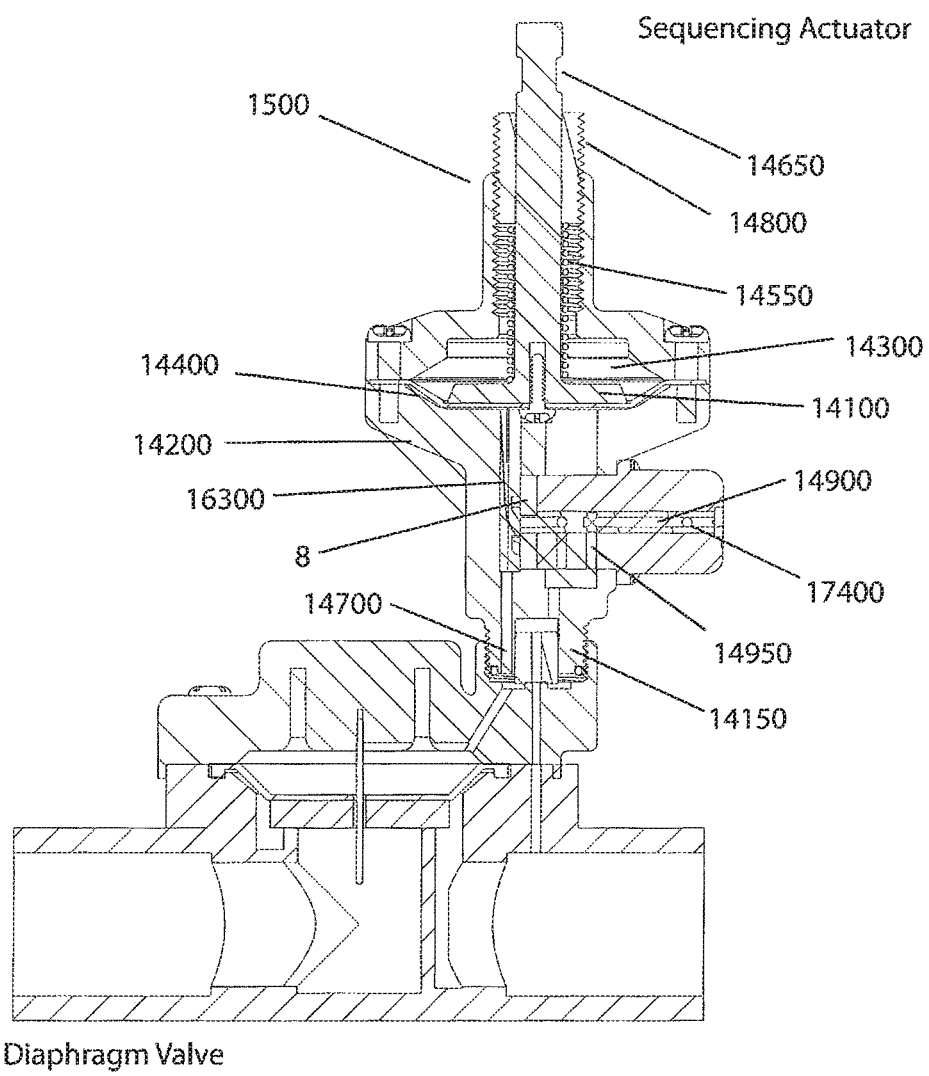
FIG. 14 depicts a cross-sectional view of an example fluid activated actuator mounted into a conventional diaphragm valve with the diaphragm valve in the closed position.

FIG. 14 illustrates a cross-section view of an exemplary fluid activated lockstep actuator assembly mounted into the solenoid position of a conventional diaphragm valve 7A. The lockstep actuator components and operation are described above. The cross-sectional view, in particular, illustrates the interface between the diaphragm valve fluid passage 22500, lockstep sequencing passages 14700 and 14950, and diaphragm valve fluid passage 22600, see also FIG. 22. As illustrated in FIG. 14, with the blockage of fluid through the sequencing actuator at the pilot valve port 17100, the diaphragm valve 7A is closed.

Figure 16:
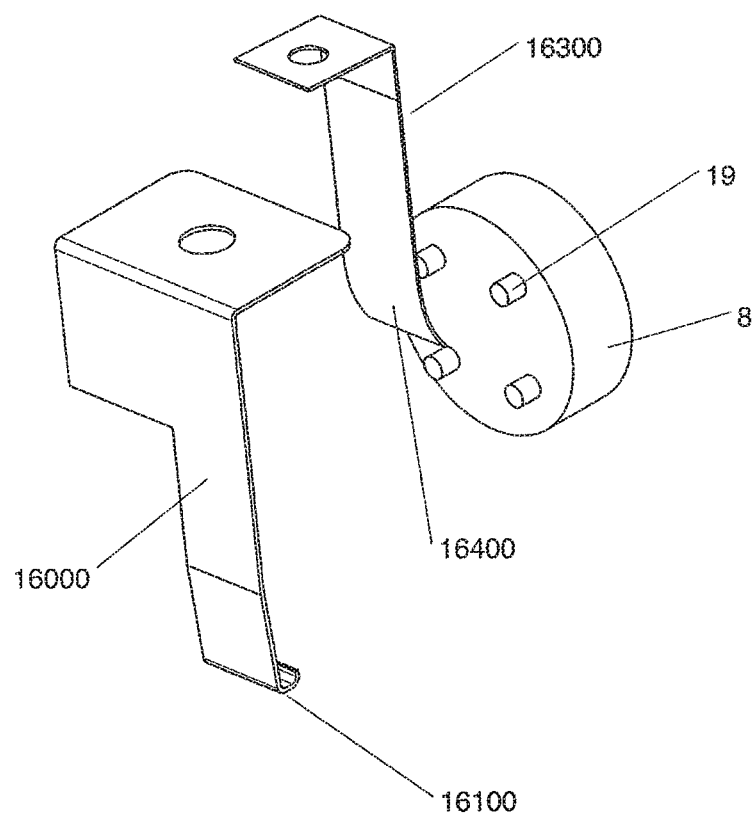
FIG. 16 depicts an example cog wheel and springs interface which is optionally used in a fluid activated actuator assembly.

FIG. 16 illustrates the example drive or leaf spring 16000 used in an example embodiment of a fluid activated sequencing actuator 1500. FIG. 16 provides an enlarged view of the drive spring 16000 and cog wheel 8 of that shown in FIG. 14. The hooked end 16100 of the drive spring engages a cog wheel post 19 to drive the cog wheel 8 in the forward rotational direction (e.g., counter clockwise). The drive spring 16000 is optionally flexible such that when the spring moves downward a lower cog wheel post 19 does not impede the downward movement of the drive post but causes the hooked end of the drive spring 16100 to bend outward until the hooked end has cleared the next cog wheel post 19. A subsequent raising of the drive spring 16100 results in another forward rotational direction of the cog wheel 19.

The system optionally includes an anti-back rotational leaf spring stop 16300 that prevents the cog wheel 8 from reversing the forward or rotational direction of the cog wheel 8. The anti-back rotation leaf spring optionally has a bend 16400 that enables the cog post 19 to slide underneath the anti-back rotational leaf spring stop as the cog wheel rotates. During a rotation, the cog wheel post 19 bends the anti-back rotation leaf spring outward until the cog wheel post clears the end of the leaf spring. When the cog wheel post 19 engages the end of the leaf spring 16300, the cog wheel 8 is prevented from rotating in the reverse direction.

Figure 17:
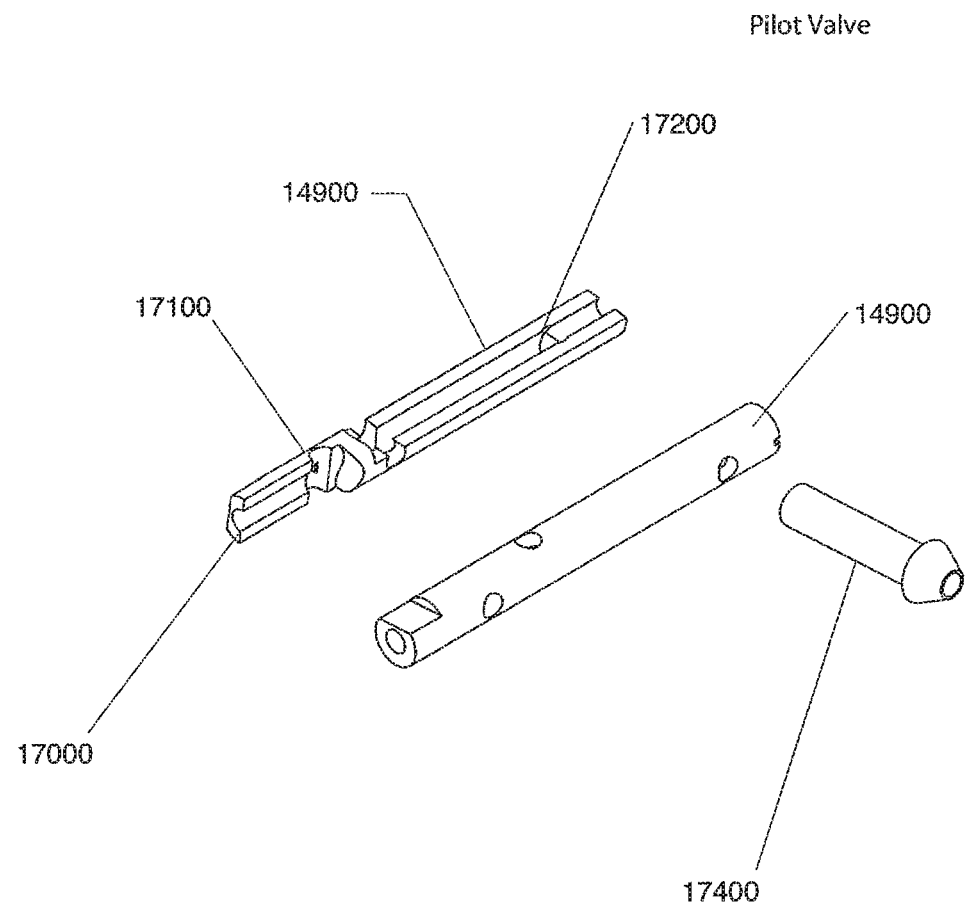
FIG. 17 depicts a cross-sectional view of an example pilot valve which is optionally used in a fluid activated actuator assembly.

FIG. 17 illustrates an exemplary pilot valve shaft 14900 with two pilot valve ports 17100 and 17200. In an example embodiment, the two pilot valve ports 17100 and 17200 are perpendicular to each other. Optionally, a 90 degree rotation of the pilot valve shaft 14900 aligns one of the two pilot valve ports (e.g., 17100 or 17200) to open a bleed port passage for an associated diaphragm valve.

Figure 18:
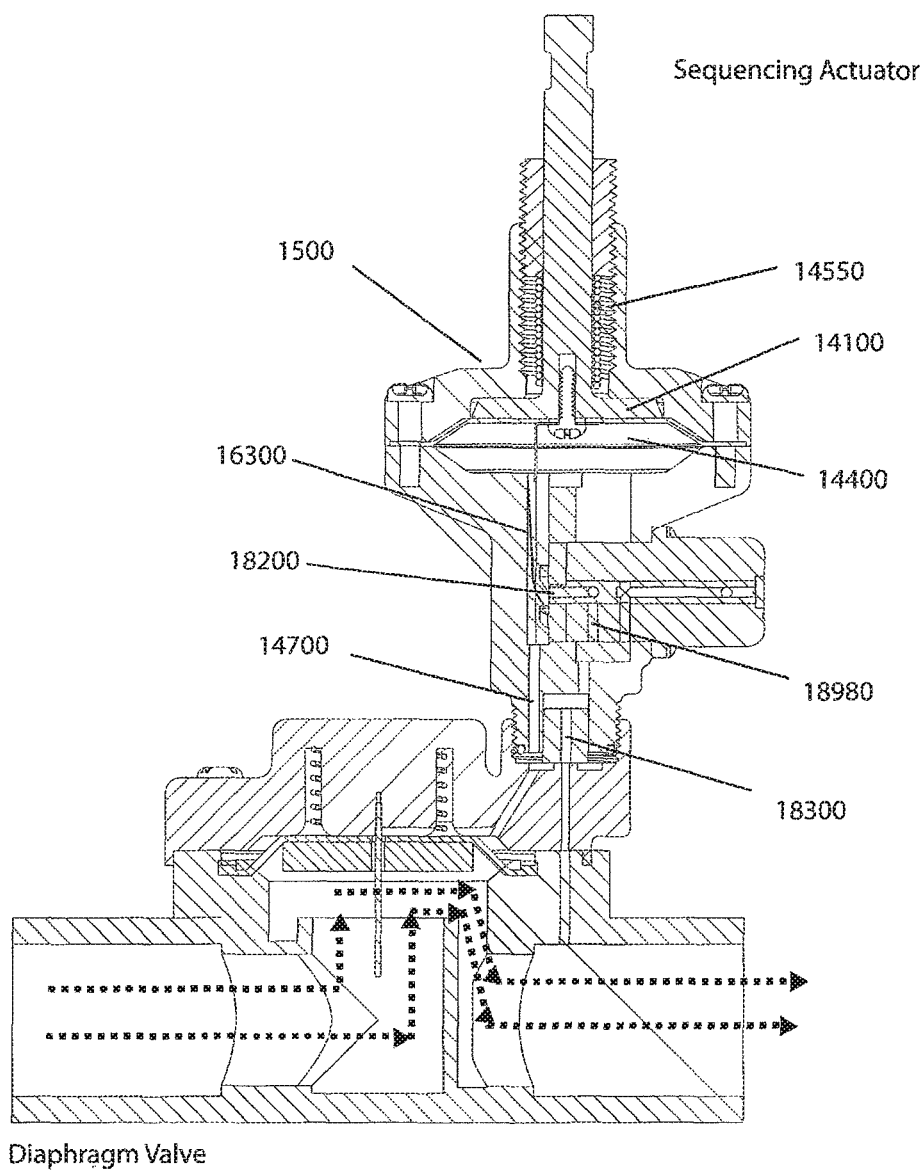
FIG. 18 depicts a cross-sectional view of an example fluid activated actuator mounted into a conventional diaphragm valve with the diaphragm valve in the open position.

FIG. 18 illustrates a cross-section view of an exemplary fluid activated sequencing actuator assembly 1500 mounted into the solenoid position of a conventional diaphragm valve 7A. The sequencing actuator components and operation are described above. The cross-sectional view, in particular, illustrates the fluid connections between the diaphragm valve fluid passage 19500, lockstep actuator passages 14700 and 18300, and diaphragm valve fluid passage 19600, see also FIG. 19. As illustrated in FIG. 18, with the free flow of fluid through the lockstep actuator including the pilot valve port 17100, the diaphragm valve is open.

Figure 19:
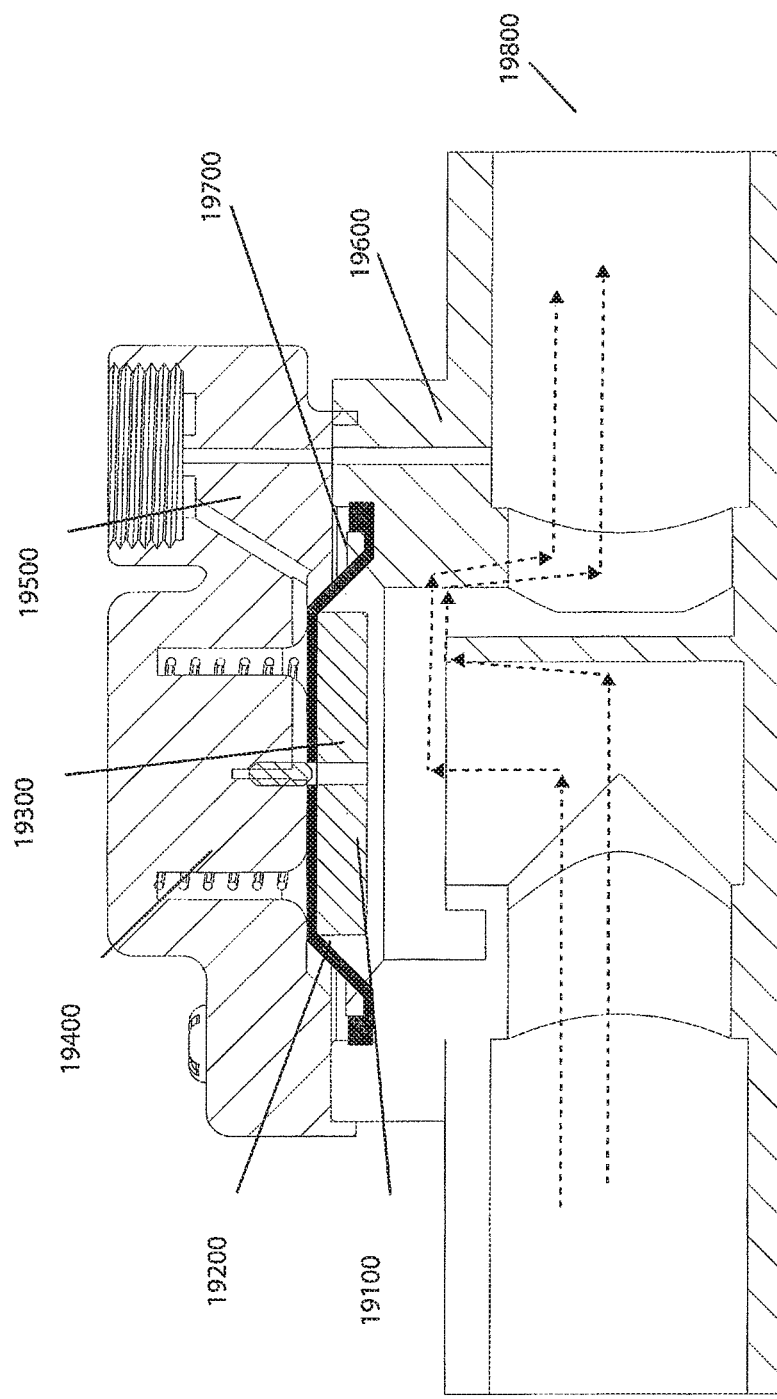
FIG. 19 depicts a cross-sectional view of a conventional diaphragm valve in the open position.

FIG. 19 illustrates a cross-section view of an exemplary diaphragm valve 19000 in the on or open position. Source fluid enters the diaphragm valve on the inlet port 1 of the diaphragm valve (e.g., 7A or 7B) and exits on the outlet 19800. The illustrative diaphragm valve includes a flexible diaphragm 19700 and associated diaphragm fluid chamber 19200.

Optionally, conventional diaphragm valves (e.g., 7A or 7B) include a spacer 19100 coupled to the diaphragm 19700 which moves linearly in response to fluid pressure from the inlet port 1, diaphragm 19700 expansions and contractions, and return spring 19400 compressions. Optionally, the diaphragm spacer 19100 includes a center passage 19300 through which source fluid from the inlet port 1 can flow into the diaphragm chamber 19200. Optionally, conventional diaphragm valves include a return spring 19400 which applies a compression force against the diaphragm 19700 and spacer 19100. Optionally, conventional diaphragm valves include a bleed port fluid passage 19500 which connects to a mounted solenoid, adapter (e.g., adapter 6A), or in certain embodiments, a fluid activated actuator assembly. Optionally, a conventional valve 19000 includes a bleed port fluid passage 19600 which is connected to the outlet port 19800. A device (e.g., a solenoid) is used to regulate the fluid flow between the passage 19500 and 19600. If the passage 19500/19600 is open, the fluid in the diaphragm chamber 19200 can exhaust through the passage 19600 and there is a resulting loss of pressure in the diaphragm chamber 19200. Inlet source fluid pressure exerted against the spacer overcomes the return spring 19400 compression and fluid flows unobstructed from the inlet port 1 to the outlet port 19800.

Certain optional embodiments enable an existing fluid control device to be retrofitted using a minimum or relatively small number of steps. FIG. 20 illustrates an example removal of a solenoid 20100 and the replacement with a fluid activated actuator assembly (e.g., 1500) in a conventional diaphragm valve. The solenoid 20100 is unscrewed from the solenoid mounting location 20200. The fluid activated actuator assembly (e.g., 1500) is screwed into the solenoid mounting location 20200. Optionally, one or more gaskets and/or separate adaptors are used to interface the fluid activated actuator assembly into the solenoid mount position. Optionally, an adaptor can be used to change the dimensions of the receiving solenoid mount position (e.g., ¾" thread to ½" thread), to change the thread direction (e.g., counter clockwise or clockwise), etc. It is appreciated that the coupling of the actuator with the receiving solenoid mount position can be accomplished in a number of different embodiments and a person having ordinary skill in the art recognizes that enablement of this coupling is not limited to those examples above. Optionally, no gaskets and/or adaptors are required to interface the fluid activated actuator assembly into the solenoid mount position. Optionally, one or more fluid activated actuator assemblies are each separately designed to interface within the solenoid mount position of different output valves without the use of adaptors. Optionally, no machining of the pre-existing diagraph valve is required for the retrofit and no electrical wiring to the fluid activated actuator assembly is required for the retrofit.

Figure 22:
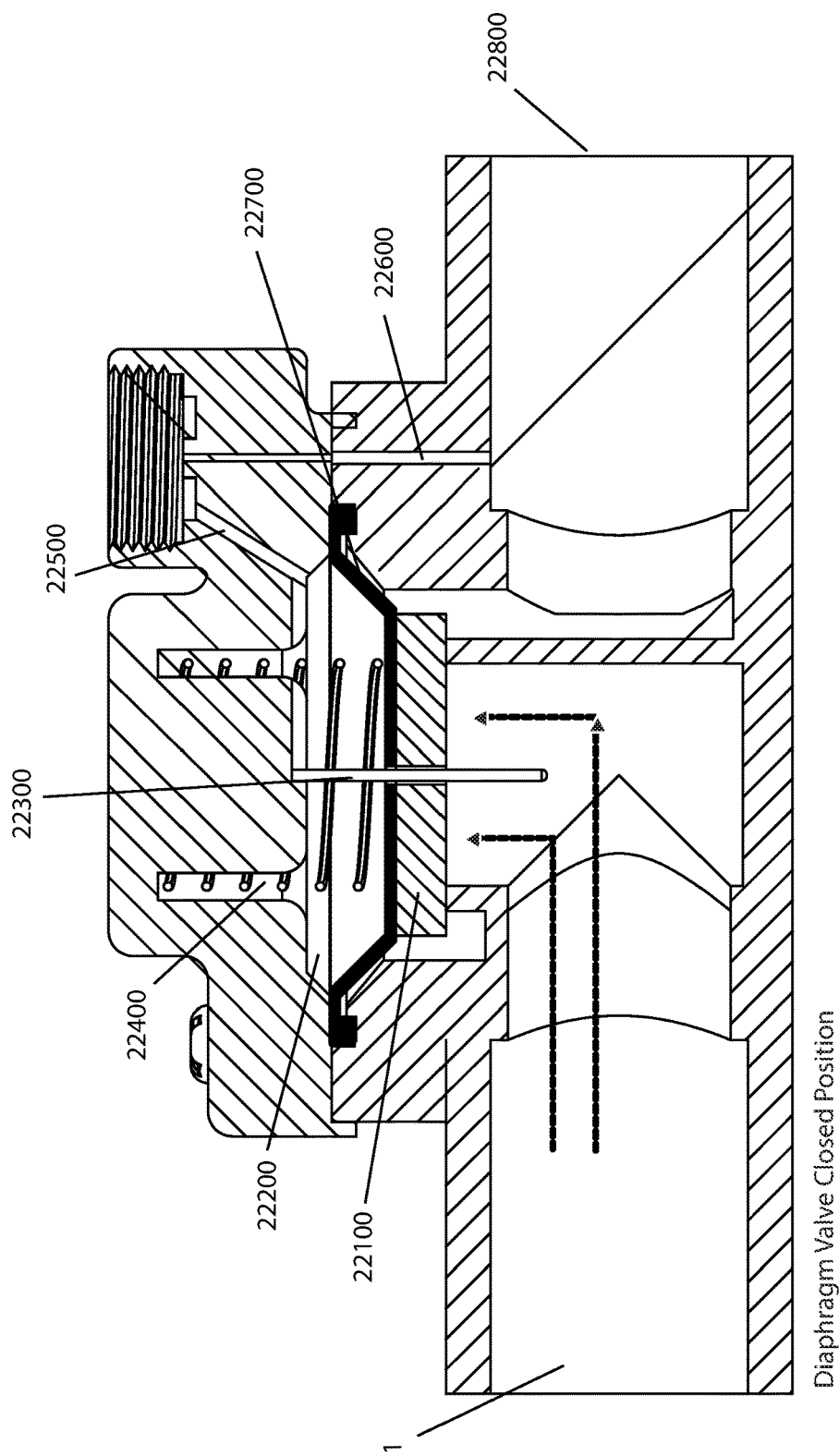
FIG. 22 depicts a cross-sectional view of a conventional diaphragm valve in the closed position.

FIG. 22 illustrates a cross-section view of an exemplary diaphragm valve 22000 in the off or closed position. Source fluid enters the diaphragm valve on the inlet port 1 of the diaphragm valve (e.g., 7A or 7B) and exits on the outlet 22800. The illustrative diaphragm valve includes a flexible diaphragm 22700 and associated diaphragm fluid chamber 22200. Optionally, conventional diaphragm valves (e.g., 7A or 7B) include a spacer 22100 coupled to the diaphragm 22700 which moves linearly in response to fluid pressure from the inlet port 1, diaphragm 22700 expansions and contractions, and return spring 22400 compressions. Optionally, when the diaphragm 22700 is extended, the spacer 22100 contacts the internal structure of the valve and blocks/seals the flow of fluid from the inlet port 1 to the outlet port 22800. Optionally, the diaphragm spacer 22100 includes a center passage 22300 through which source fluid from the inlet port 1 can flow into the diaphragm chamber 22200. Optionally, conventional diaphragm valves include a return spring 22400 which applies a compression force against the diaphragm 22700 and spacer 22100. Optionally, conventional diaphragm valves include a bleed port fluid passage 22500 which connects to a mounted solenoid, adapter (e.g., adapter 6A), or in certain embodiments, a fluid activated actuator assembly. Optionally, a conventional valve 22000 includes a bleed port fluid passage 22600 which is connected to the outlet port 22800. A device (e.g., a solenoid) is used to regulate the fluid flow between the passage 22500 and 22600. In conventional diaphragm valves, if the fluid flow through the bleed port 22500 is blocked, the compression in the return spring 22400 and fluid pressure entering the diaphragm chamber 22200 seats the spacer 22100 over the source fluid inlet and prevents fluid from flowing to the outlet 22800.

Figure 25:
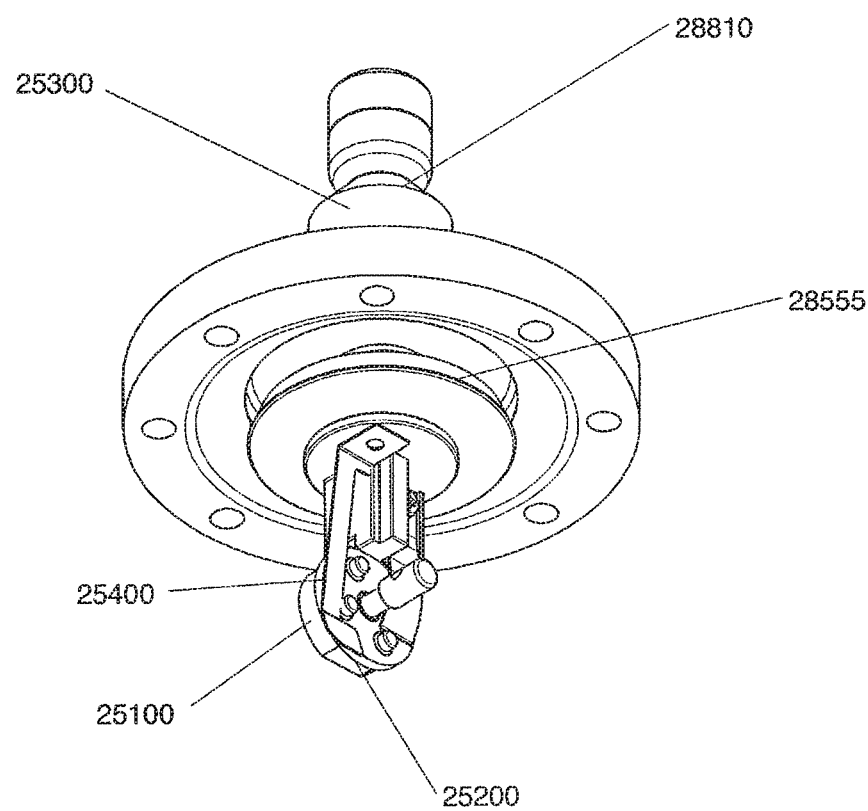
FIG. 25 depicts an internal view of some of the components of an example fluid activated actuator.

FIG. 25 illustrates a cog wheel 25400 variant used in the lockstep actuator 24100 and 24200 which is used to create a cog wheel position indicator feature. The circular cog wheel 25400 is modified to include two opposing flat edges. Two ends of the cog wheel 25400 across the plane are circular 25100 and the two ends of the cog wheel vertical to the plane (or 90 degrees off the plane) have flat edges 25200 (e.g., as in a flat tire). This edge flattening causes the push plate 28555 to descend further when the cog wheel 25400 is in the position illustrated in FIG. 25. Similarly, when the cog wheel 25400 is advanced 90 degrees, the circular edge of the cog wheel 25400 will cause the contacting push plate 28555 to be raised or in a higher position relative to the flat edge position. The elevated position of the push plate and associated manual adjusting knob inform the user of the position of the cog wheel 25400. Optionally, the post 25300 attached to the push plate 28555 is a different color (e.g., red) than the housing 28500 (e.g., black). When the post 25300 is in the raised position (e.g., push plate is in contact with the circular edge 25100), the color of the post 25300 is visible to a user. When the post 25300 is in the lower position (e.g., push plate is in contact with the flat edge 25200), the color of the post 25300 is not visible to a user. Therefore, the user can determine the position of the internal cog wheel by viewing the push plate post. Knowing the position of the cog wheel informs the user of the pilot valve shaft 28350 and thus the user, can determine whether the associated diaphragm valve is in the open or closed position.

Figure 26:
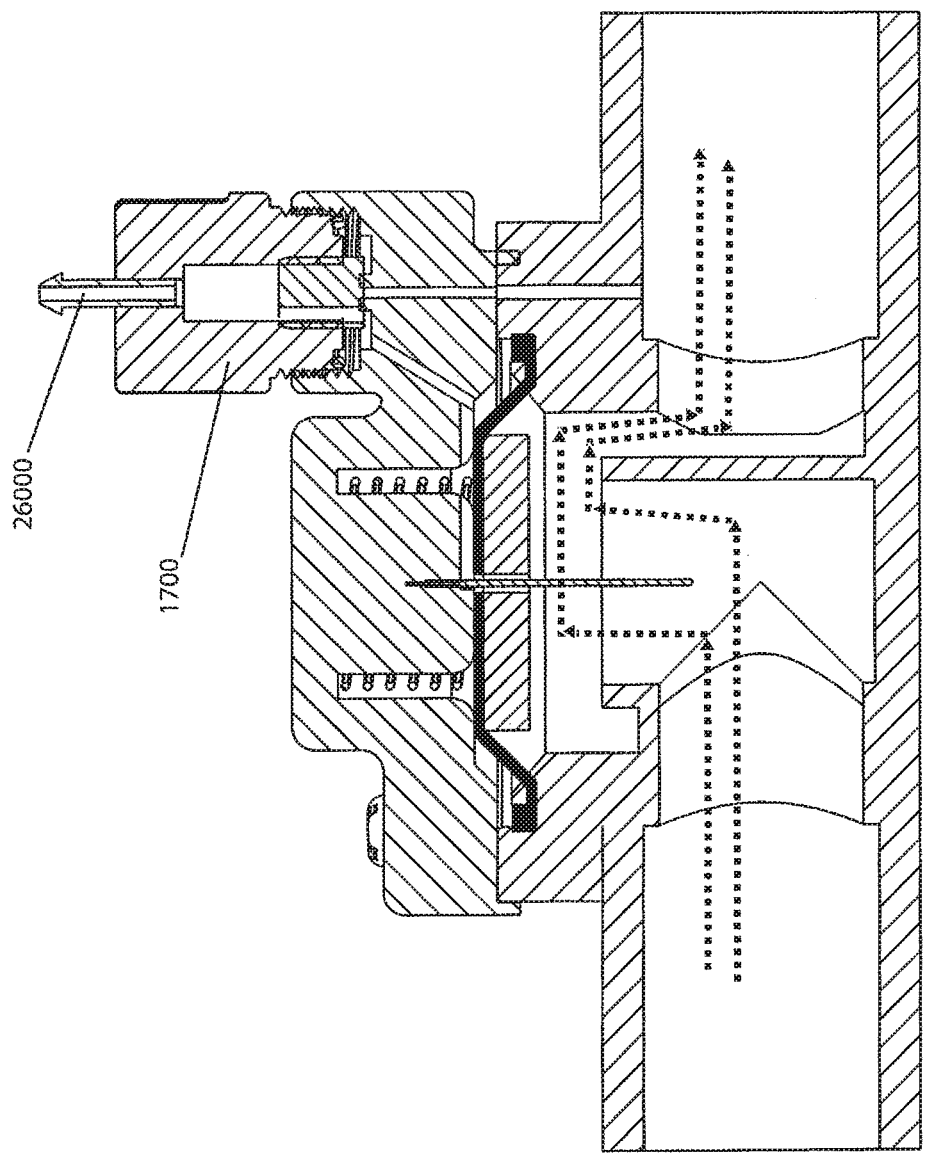
FIG. 26 depicts an example cross-sectional view of a single channel adaptor used in a fluid activated actuator assembly mounted into an open diaphragm valve.

FIG. 26 illustrates a cross-section view of an exemplary adaptor 1700 connected to a conventional diaphragm valve 7B seated in the solenoid mount position. Adaptor 1700 interworks with an example sequencing adaptor 1500. Optionally, the adapter 1700 is mounted into the diaphragm valve in a manner which allows fluid to flow from the diaphragm bleed port passage 19500 into the adapter passage 49, see also FIG. 19. Optionally, when the passage 26000 through the adapter 1700 is blocked, for example, at the fluidly connected (e.g., via 1800) pilot valve port 17200, the associated diaphragm valve 7B is closed. Optionally, when the passage 26000 through the adapter 1700 is open, for example, at the fluidly connected (e.g., via 1800) pilot valve port 17200, the associated diaphragm valve 7B is open.

Figure 28:
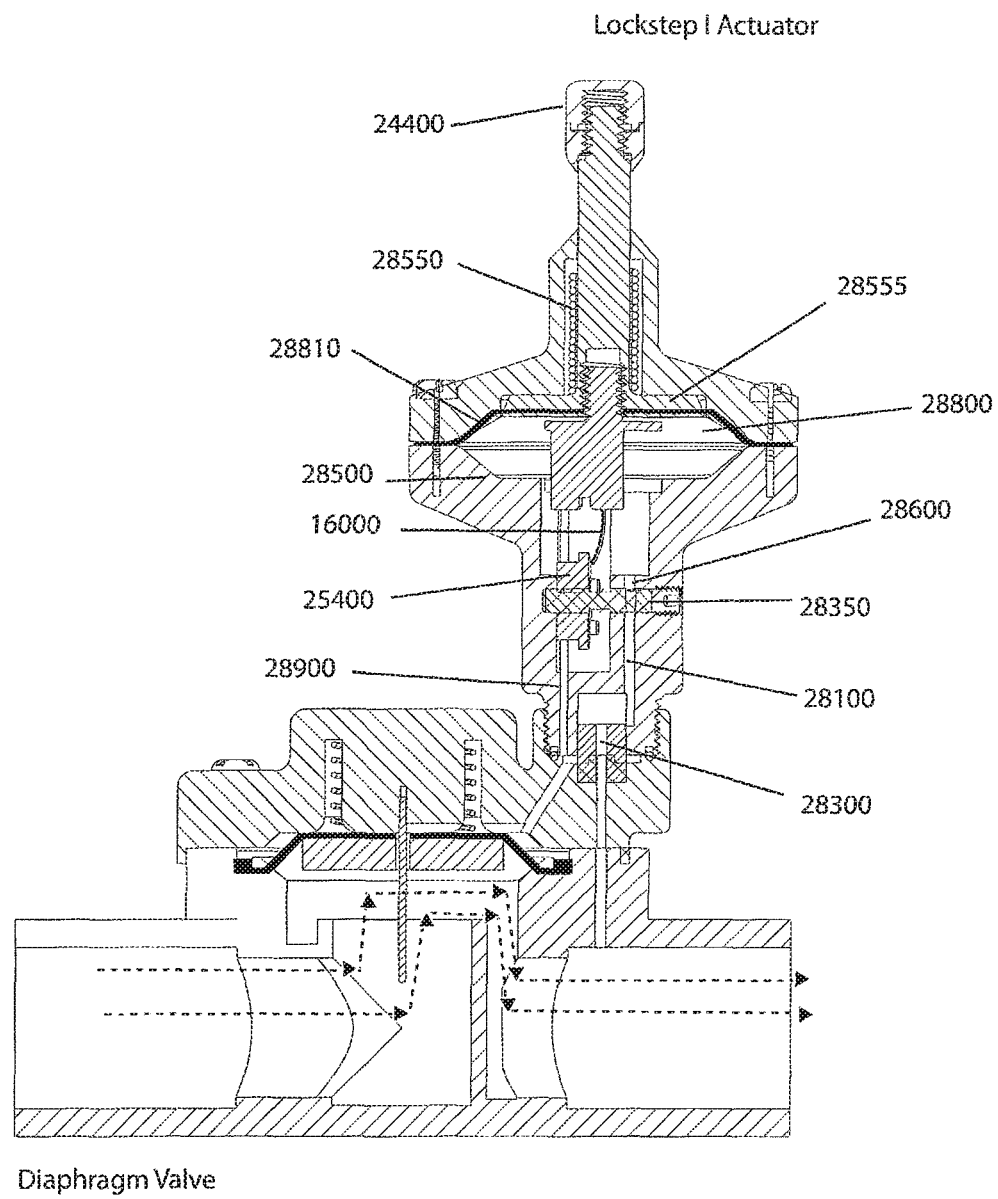
FIG. 28 depicts a cross-sectional view of an example fluid activated actuator mounted into a conventional diaphragm valve with the diaphragm valve in the open position.

FIG. 28 illustrates a cross-section view of an exemplary fluid activated lockstep assembly 24100 or 24200 mounted into the solenoid position of a conventional diaphragm valve 7A or 7B. The lockstep actuator components and operation are described in detail above. The cross-sectional view, in particular, illustrates the fluid connections between the diaphragm valve fluid passage 19500, lockstep actuator passages 28900 and 28300, and diaphragm valve fluid passage 19600, see also FIG. 19. As illustrated in FIG. 28, with the free flow of fluid through the lockstep actuator including the pilot valve port 27100, the diaphragm valve is open.

Figure 29:
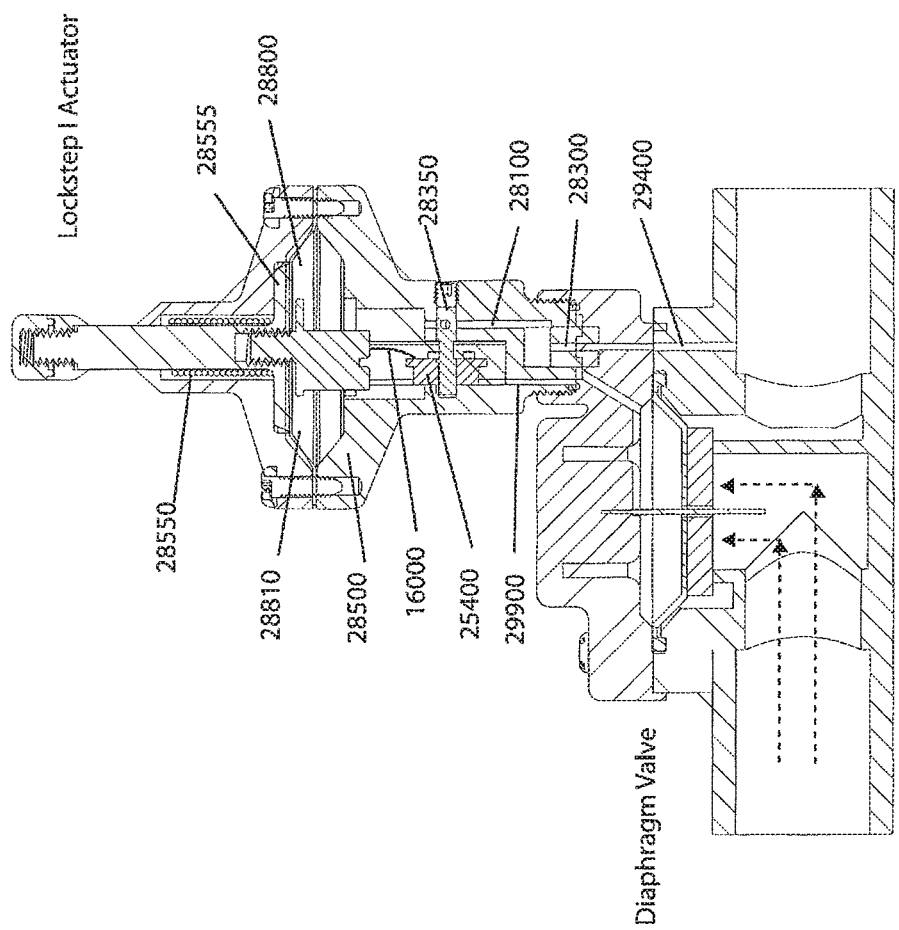
FIG. 29 depicts a cross-sectional view of an example fluid activated actuator mounted into a conventional diaphragm valve with the diaphragm valve in the closed position.

FIG. 29 illustrates a cross-section view of an exemplary fluid activated lockstep assembly 24100 or 24200 mounted into the solenoid position of a conventional diaphragm valve 7A or 7B. The lockstep actuator components and operation are described in detail above. The cross-sectional view, in particular, illustrates the fluid connections between the diaphragm valve fluid passage 22500, lockstep actuator passages 29900 and 28300, and diaphragm valve fluid passage 22600, see also FIG. 22. As illustrated in FIG. 29, with blockage of fluid through the lockstep actuator at the pilot valve port 27100, the diaphragm valve is closed.

Figure 30:
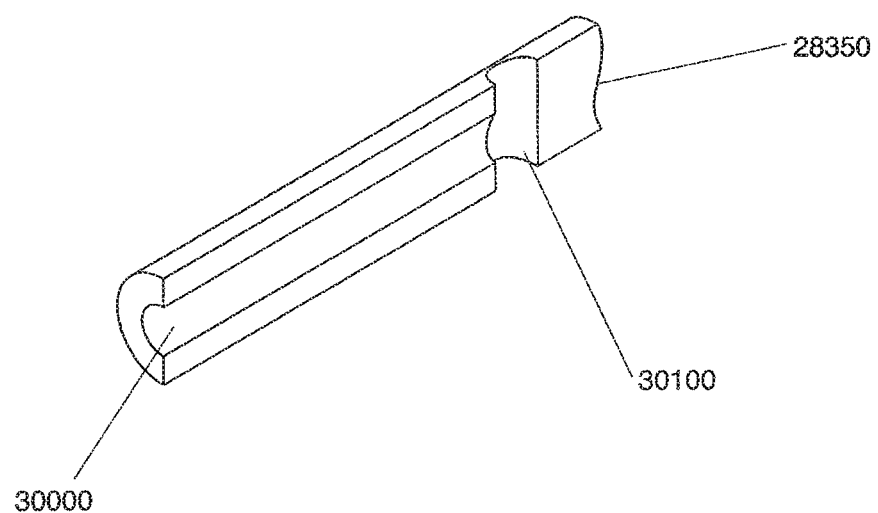
FIG. 30 depicts a cross-sectional view of an example pilot valve which is optionally used in a fluid activated actuator assembly.

FIG. 30 illustrates an exemplary pilot valve shaft 28350 with a single pilot valve port 30100. In an example embodiment, a fluid passage 30000 interfaces with a bore hole in the cog wheel 25400. A 90 degree rotation of the pilot valve shaft 28350 aligns the pilot valve port 30100 with a fluid passageway 28100, see FIG. 28. A further 90 degree rotation of the pilot valve shaft 28350 blocks the pilot valve port 30100 from the lockstep actuator fluid passageway 28300, see FIG. 28.

Figure 31:
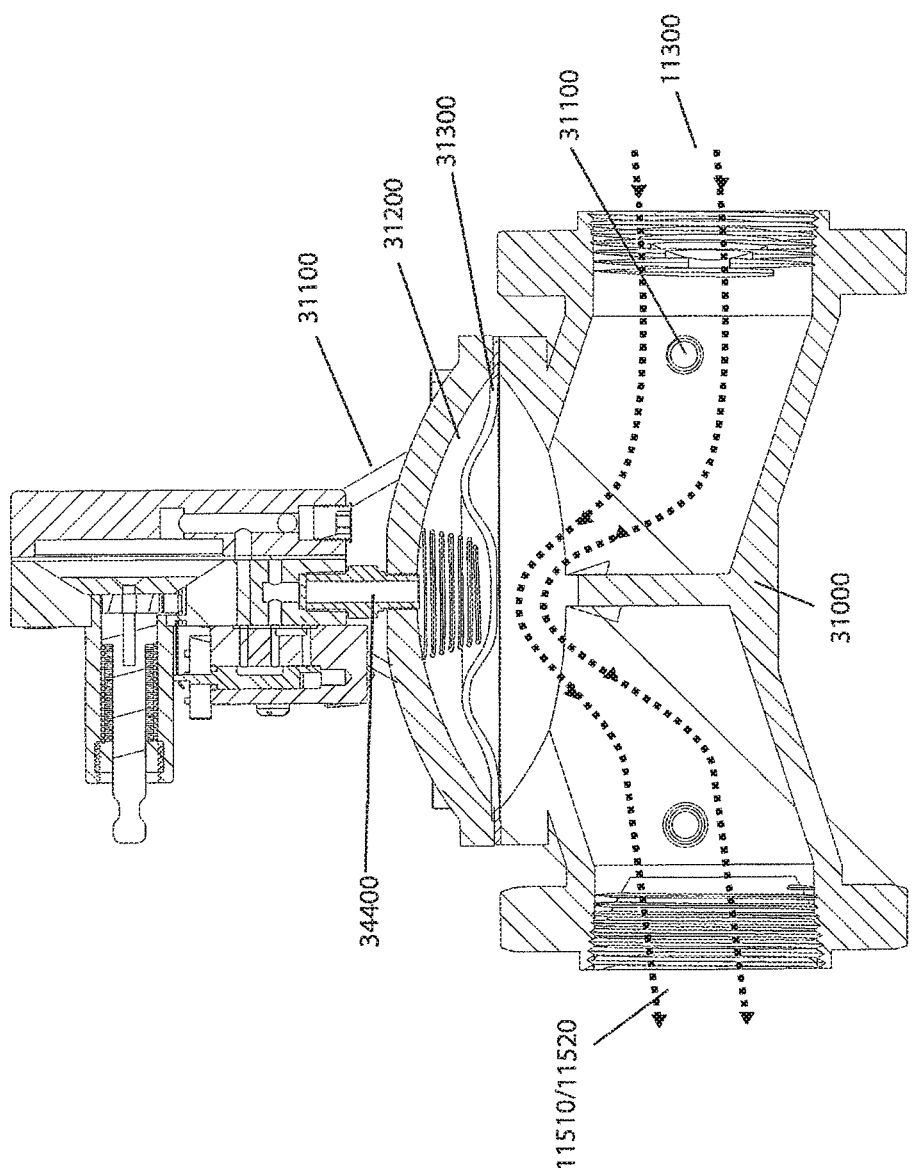
FIG. 31 depicts a cross-sectional view of an example fluid activated actuator mounted into a conventional domed diaphragm valve with the diaphragm valve in the open position.

FIG. 31 illustrates a cross-section view of an exemplary fluid activated lockstep assembly 36100 or 36200 mounted into the solenoid position of a conventional diaphragm valve 7A or 7B. The lockstep actuator components and operation are described in detail above. The cross-sectional view, in particular, illustrates the operation of a second type of conventional diaphragm valve. In the diaphragm valve open position, the fluid pressure from the inlet 11300 applies a force to the diaphragm 31300. If there is an exhaust path for the fluid in the diaphragm chamber 31200, the diaphragm will collapse into the diaphragm chamber and the inlet fluid flows freely past the diaphragm and into the outlet 11510 or 11520. In the closed diaphragm valve position, there is a fluid passageway from inlet fluid source via 31100, into the actuator 36100 or 36200, into the bleed port 34400, and into the diaphragm chamber 31200. The shape of the diaphragm chamber and the force of the fluid pressure from the source 31100 cause the diaphragm to expand into the primary fluid passageway. The diaphragm, when in an expanded state, blocks the fluid flow and the valve closes.

Figure 32:
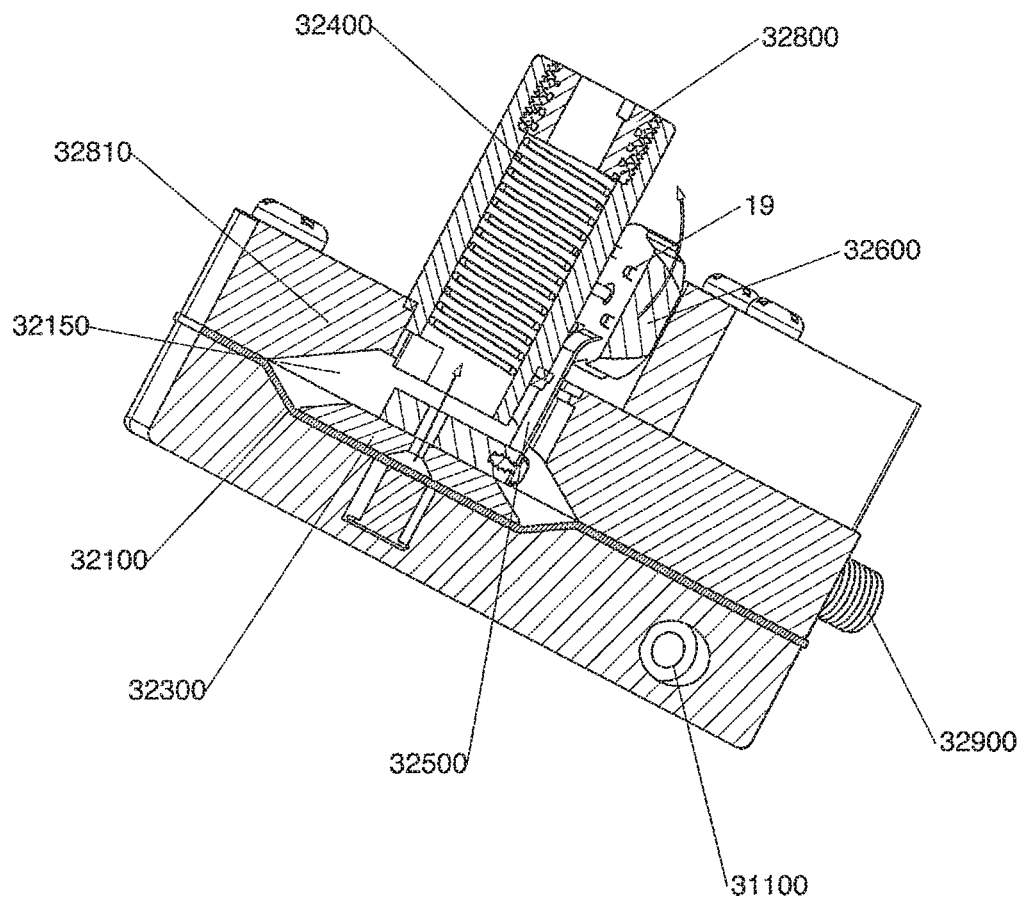
FIG. 32 depicts a cross-sectional view of an example fluid activated actuator.

FIG. 32 illustrates a cross-section view of an exemplary fluid activated lockstep assembly 36100 or 36200 mounted into the solenoid position of a conventional diaphragm valve 7A or 7B. The lockstep actuator components and operation are described in detail above. This cross-sectional view, in particular, illustrates the lockstep actuator in an inactive state. Optionally, fluid is allowed to leak from the actuator diaphragm chamber 32150 during normal operation and during the actuator reset period via fluid passageway 32900.

Figure 33:
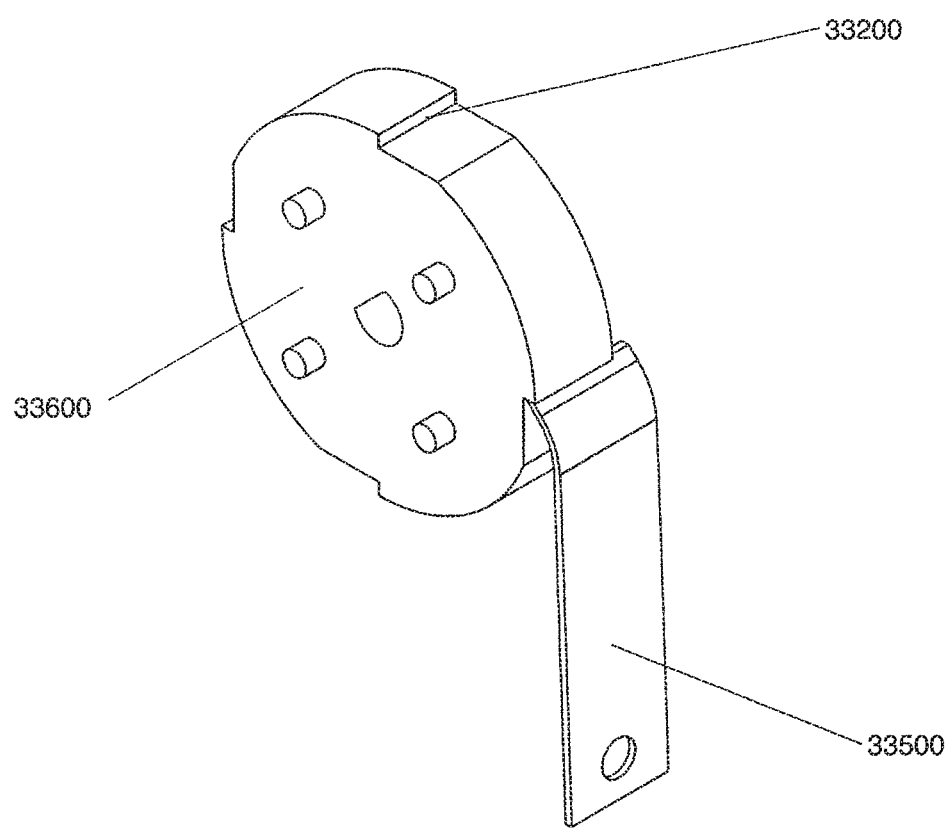
FIG. 33 depicts a notched cog wheel and leaf spring interface.

FIG. 33 illustrates a third example variant of the cog wheel/leaf spring mechanism. In this example embodiment, the cog wheel 32600 is notched to prevent back rotation as described in detail above (see second example lockstep actuator). A leaf spring 32500 engages the cog wheel posts 19 to advance the rotation of the cog wheel 32600. A second anti-back rotation leaf spring engages the one or more notches in the cog wheel to prevent the back rotation of the cog wheel 32600 as the actuator resets and/or the leaf spring 32500 travels down (in FIG. 32) and over the cog wheel post 19.

FIG. 34 illustrates a cross-section view of an exemplary fluid activated lockstep assembly 36100 or 36200 mounted into the solenoid position of a conventional diaphragm valve 7A or 7B. The lockstep actuator components and operation are described in detail above. The cross-sectional view, illustrates the fluid connections between the diaphragm valve inlet fluid passage 31100, lockstep actuator passages 34500, pilot valve port 34200, and lockstep actuator passage 34400. The free flow of fluid through the lockstep actuator into the diaphragm chamber 31200 via passageway 34400 causes the diaphragm valve to close.

FIG. 37 illustrates a cross-section view of an exemplary fluid activated lockstep assembly 36100 or 36200 mounted into the solenoid position of a conventional diaphragm valve 7A or 7B. The lockstep actuator components and operation are described in detail above. The cross-sectional view, illustrates a rotation of the pilot valve shaft 34100 in which the pilot valve shaft port 34200 is blocked and the exhaust pilot valve port 34600 is open. The blocking of the pressurized inlet fluid and the opening of exhaust passageway 34400 via pilot valve shaft port 34600 causes the diaphragm 31300 to collapse and the diaphragm valve (e.g., 7A or 7B) to open.

FIG. 40 illustrates an example sequencing actuator fluidly coupled to the diaphragm valves via tubing. The actuator system of 40100 regulates the output of fluid to three separate output lines. FIG. 40 also illustrates an example sequencing actuator fluidly coupled to four valves via tubing. The actuator system of 40200 regulates the output of fluid to four separate output lines.

Figure 41:
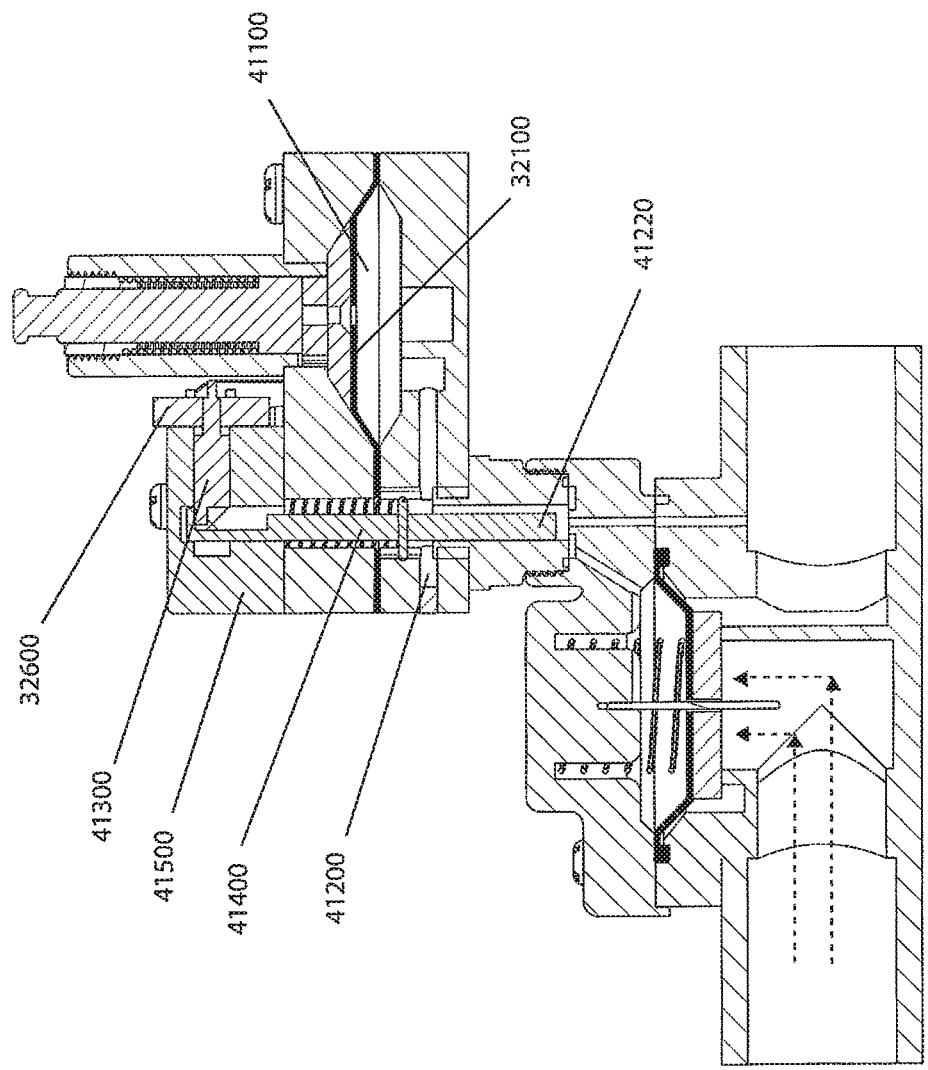
FIG. 41 depicts a cross-sectional view of an example fluid activated actuator mounted into a conventional diaphragm valve with the diaphragm valve in the closed position.

FIG. 41 illustrates a cross-section view of an exemplary fluid activated lockstep assembly 45100 or 45200 mounted into the solenoid position of a conventional diaphragm valve 7A or 7B. The lockstep actuator components and operation are described in detail above. The cross-sectional view illustrates the use of a cam shaft mechanism as an alternative to a pilot valve shaft. The cross-sectional view also illustrates the effect of raising and lowering the plunger 41400 onto the associated diaphragm bleed port passages.

Figure 42:
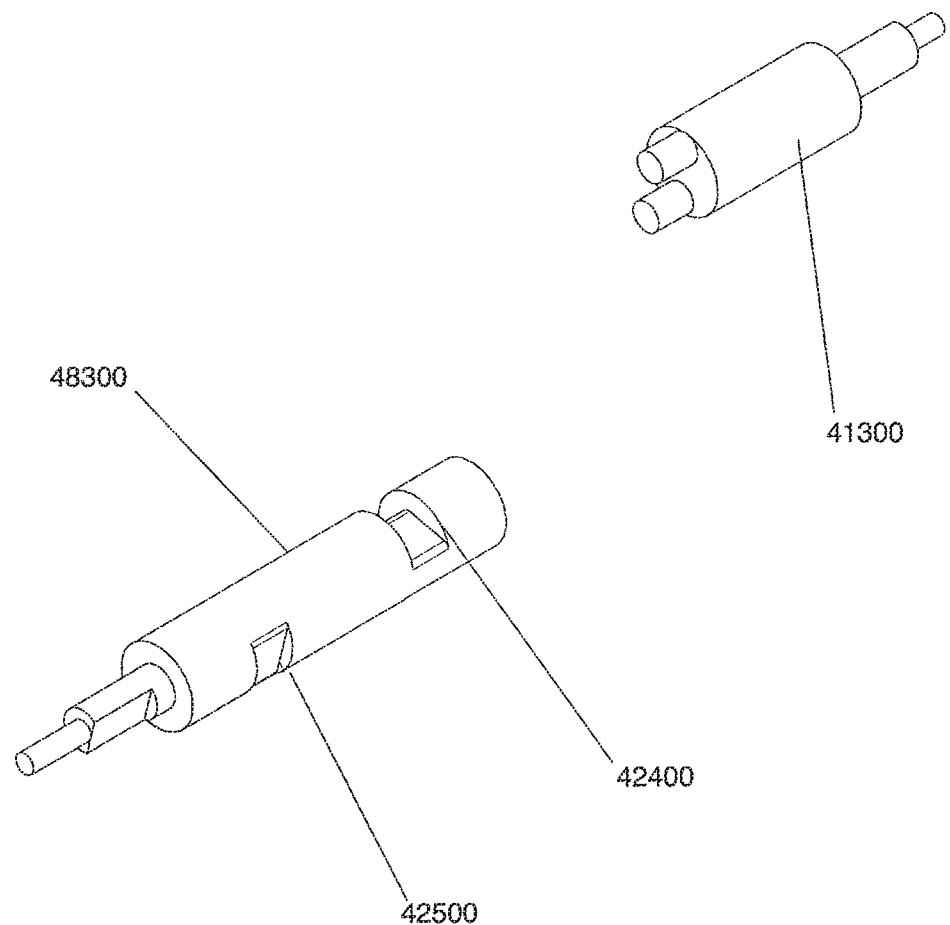
FIG. 42 depicts an example embodiment of a dual post cam shaft and a dual lobe cam shaft.

FIG. 42 illustrates an example two post cam shaft 41300 used in the fifth example embodiment. A 90 degree rotation of an interconnected 4 post cog wheel causes one of the two posts to interface and/or raise the plunger 41400 with every 180 degree rotation. FIG. 42 also illustrates a dual lobe cam shaft 48300 used in the description of the dual lobe cam shaft actuator 48100. A 90 degree rotation of an interconnected 4 post cog wheel causes one of the two plungers, for example 48400, to interface and/or raise the plunger in tandem with the lowering of the companion plunger 48450. In a similar manner, another 90 degree rotation of the interconnected 4 post cog wheel causes the raised plunger, for example 48400, to descend in response to the force of the return compression spring and the groove 42400 in the dual lobe cam shaft 48300, and a raising of the companion plunger 48450.

Figure 43:
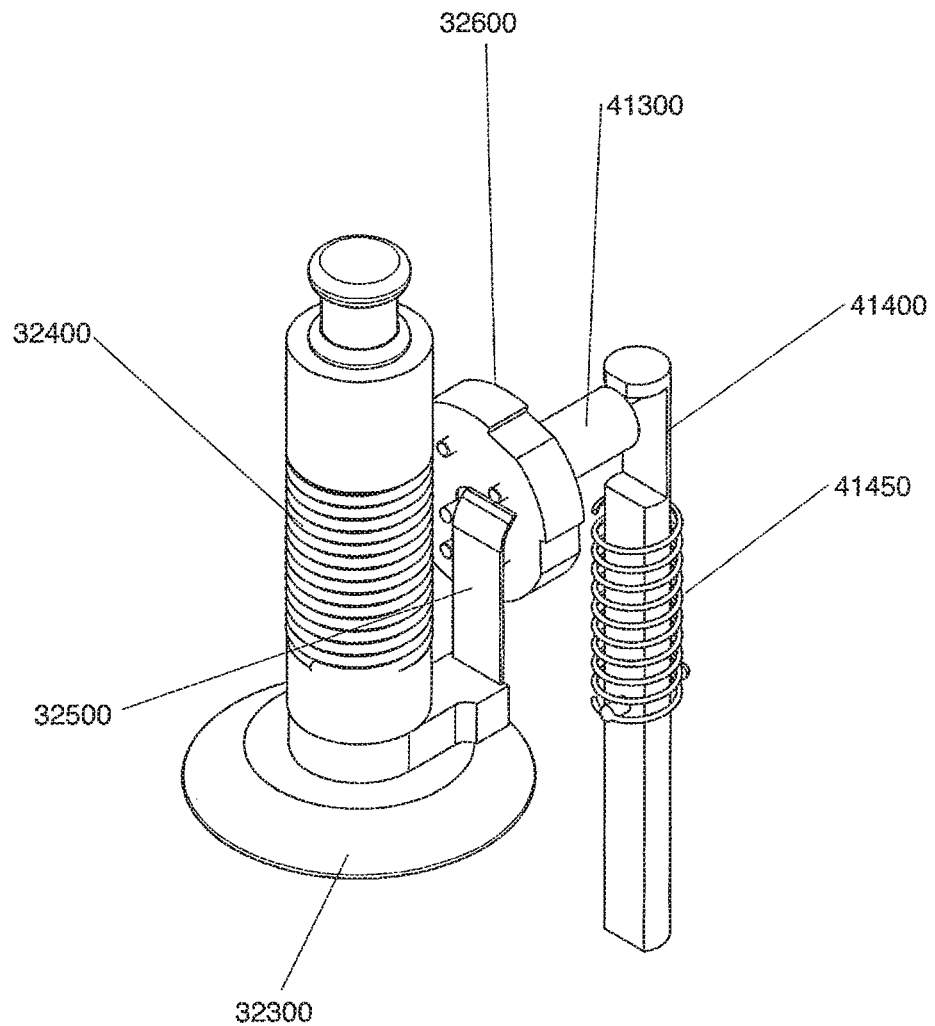
FIG. 43 depicts an internal view of some of the components of an example fluid activated actuator.

FIG. 43 illustrates an expanded view of an exemplary cam shaft 41300 interface with a plunger 41400.

Figure 44:
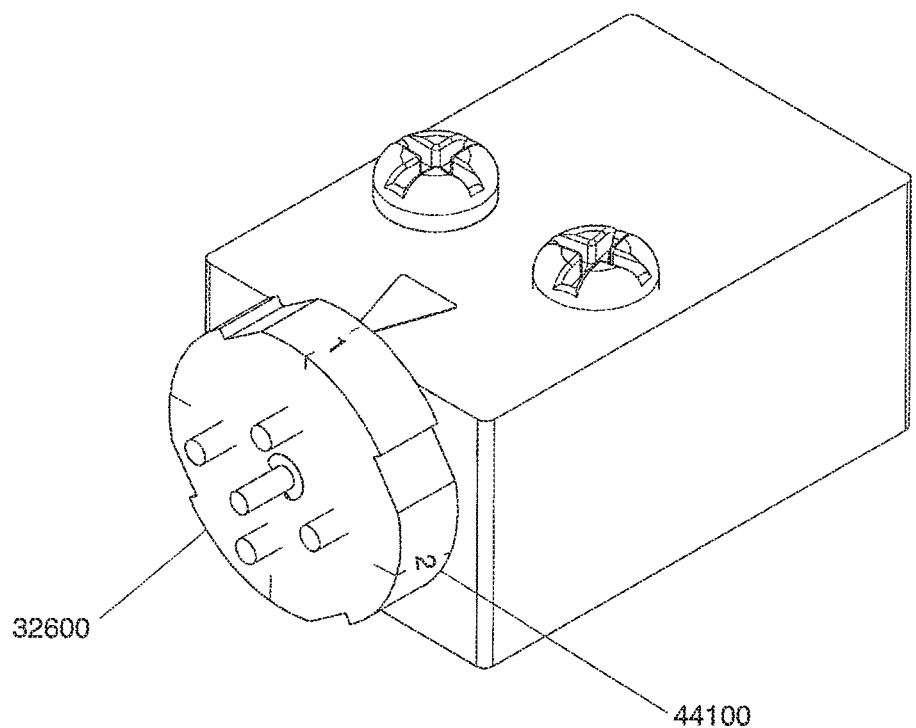
FIG. 44 depicts an example fluid activated actuator indicator.

FIG. 44 illustrates another example fluid activated actuator indicator display. In this example embodiment, the cog wheel (e.g., 32600) includes one or more markings 44100 (e.g., numbers and/or characters). The markings on the cog wheel indicate to the user the position of the pilot valve and/or cam shaft. Advantageously, the user does not have to open the actuator housing to view the pilot valve and/or cam shaft position. Optionally, the user manually advances or cycles the actuator using fluid pressure to a desired position. Optionally, this marked cog wheel indicator is used in those actuator designs in which the cog wheel is viewable by the user.

Figure 47:
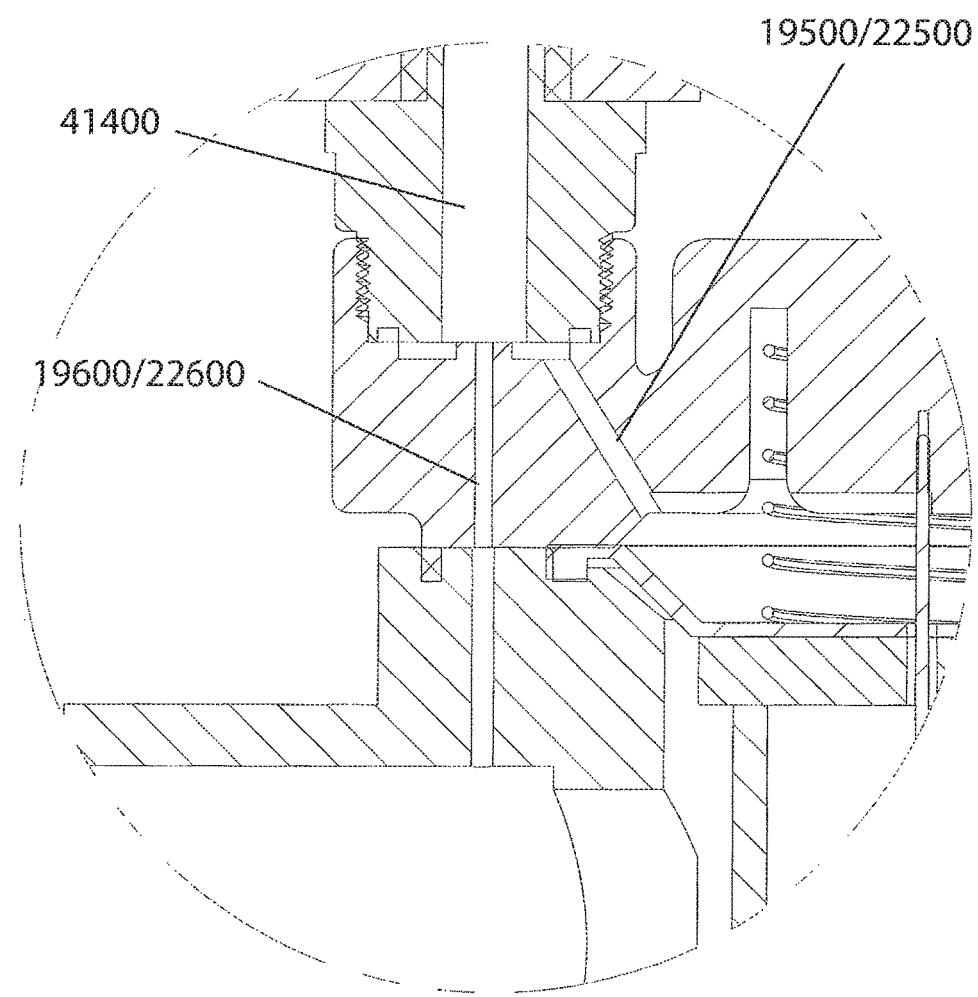
FIG. 47 depicts the plunger interface in a cam shaft-based fluid activated actuator assembly with a conventional diaphragm bleed port passages.

FIG. 47 illustrates a cross-sectional view of the lockstep actuator (cam shaft version) assembly 45100 or 45200 interface with a conventional diaphragm valve (e.g., 7A or 7B). The expanded view illustrates the plunger 41400 interface with the diaphragm bleed port fluid passages and how these passages are opened and blocked with the raising and lowering of the plunger, respectively.

Figure 50:
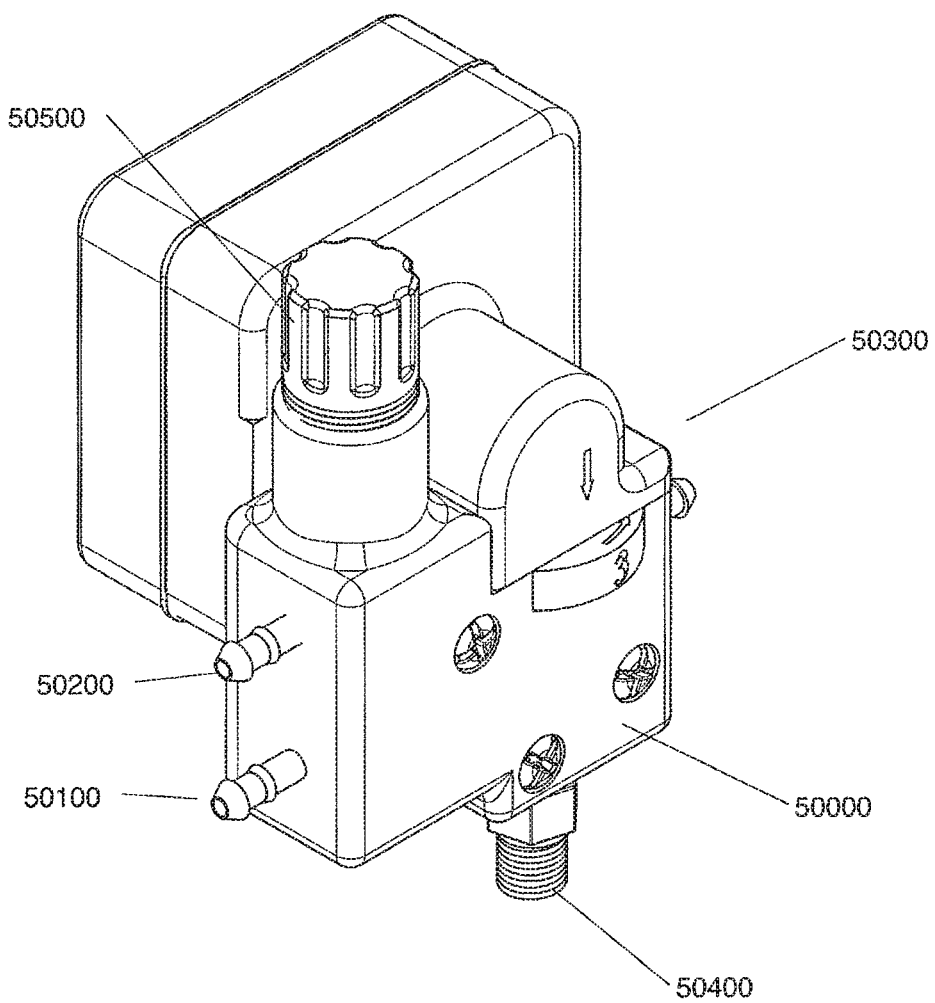
FIG. 50 depicts an external view of an example embodiment of a fluid activated actuator.

In an example embodiment, a fluid control device, such as the example fluid control device 50000 of FIG. 50, controls one or more output valves, such as an example externally ported diaphragm valve 31000 illustrated in FIG. 31. Optionally, the fluid control device 50000 operates in a manner similar to the fluid control devices described with respect to FIG. 34. Optionally, the input control fluid passages 34200 is modified to house one or more components including for example, springs, gaskets, diaphragms, and pistons to improve the performance of the fluid control device under dynamic fluid pressure environments in which the inlet control fluid pressure is not shut off to affect a state transition. For example, during normal operation and, in particular, during a valve state transition, the input fluid pressure applied to the device is not reduced to near zero or shut off before pressure is reapplied. Thus for example, to affect a state change (e.g., turning an associated valve off), a lowering of input fluid pressure followed by an increase in fluid pressure is sufficient to cause a diaphragm valve state change. Optionally, this enables the total system of valves to continue operating, albeit at a reduced pressure, even during valve state transitions.

Optionally, the fluid control device 50000 has one or more external ports. In this example embodiment the control device 50000 includes a control water inlet 50100, an actuator diaphragm exhaust vent to ambient outlet 50200 (which vents external to the device 50000), a bleed port 50300, and an optionally threaded diaphragm valve interface port 50400. The external ports on the fluid control device 50000 generally correspond to the corresponding external ports of the lockstep actuator 36100 illustrated in FIG. 36, as described above. For example, the control water inlet 50100 generally corresponds to the control water inlet 31100; the diaphragm exhaust vent to ambient 50200 generally corresponds to 31100 (the diaphragm bleed port in FIG. 34 is also the inlet port 31100—the water exits back into the input line when the pressure is turned off); the bleed port 50300 generally corresponds to 34700; and the threaded interface port 50400 generally corresponds to 34400. Optionally, one or more O-rings or gaskets or other sealing mechanisms may be used to improve the seal between the solenoid mount position of the diaphragm valve and the interface port 50400 of the fluid control device. Optionally, other adaptors are provided to physically mate any brand of commercial valve with the fluid control device. For example, flanges and/or compression fittings can be used to mate the two devices.

Figure 51:
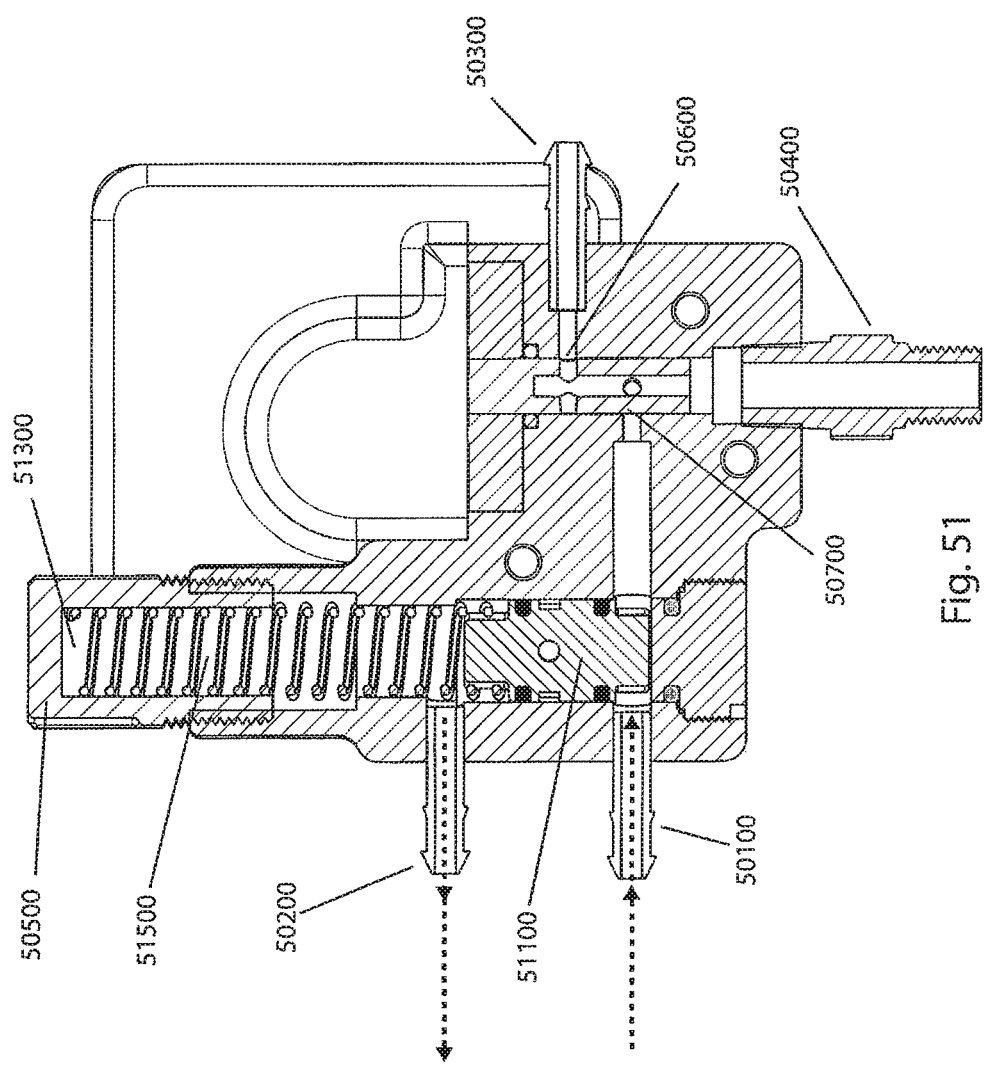
FIG. 51 depicts an internal view of certain components of an example fluid activated actuator.

FIG. 51 illustrates a cut-away, cross-sectional view of certain example components in the modified lockstep actuator 50000. In FIG. 51, the spool valve/piston is in the extended position, for example, in response to a reduction in pressure. The modified lockstep actuator 50000 components include a spool valve/piston 51100 which is configured to travel within a spool piston chamber 51300, one or more fluid channels, a spring 51500 which exerts a downward tension force against the spool valve/piston, and, an adjustment knob 50500. Optionally, a clockwise rotation of the adjustment knob 50500 causes a compression of the spring 51500. Compressing the spring 51500 increases the force of the spring 51500. Therefore, more pressure is needed in the control flow water inlet 50100 to overcome the increased spring compression. Conversely, a counter-clockwise rotation of the pressure head adjustment knob 50500 causes an expansion of the spring 51500. Therefore, less pressure is needed in the in the control flow water inlet 50100 to overcome the reduced spring compression. In another example embodiment, one or more springs and/or diaphragms can be used in place of, or in addition to the example spool piston and springs illustrated in FIG. 51.

Figure 52:
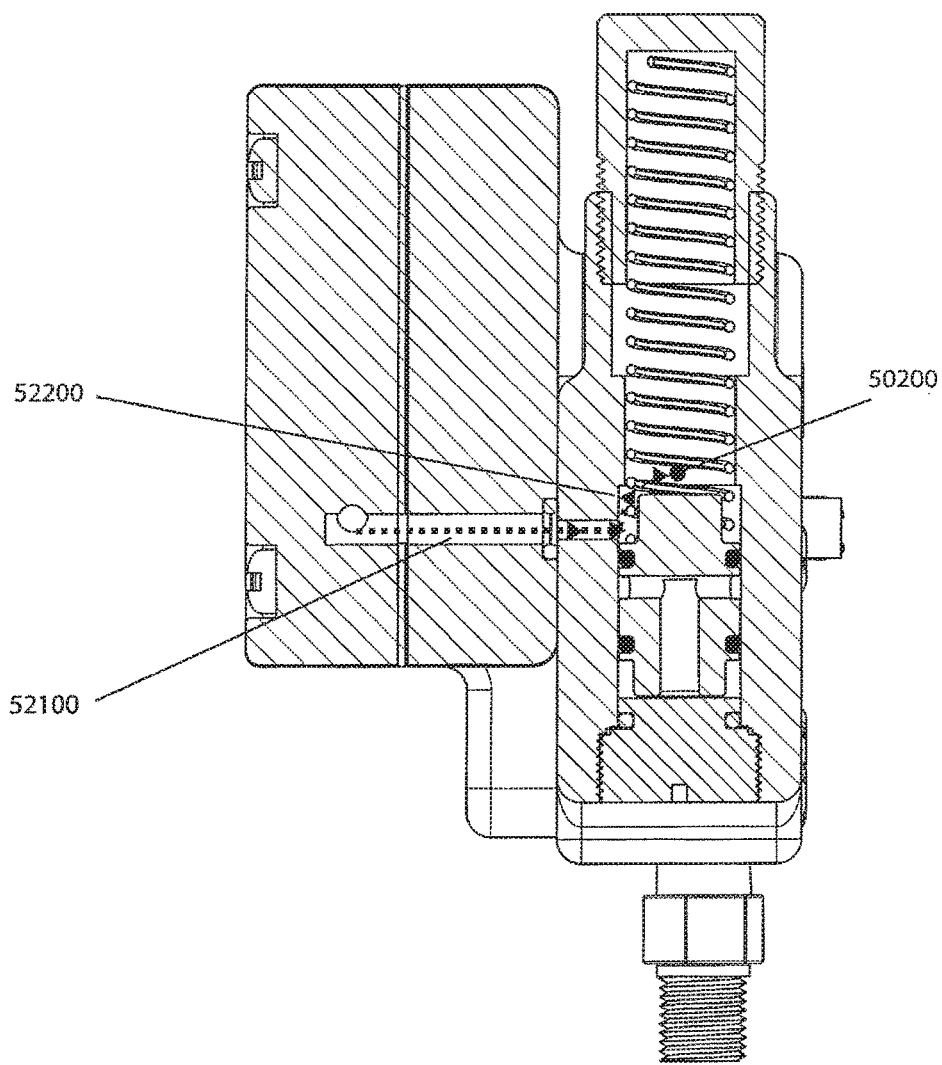
FIG. 52 depicts an internal view of certain components of an example fluid activated actuator.

FIG. 52 illustrates another cut-away, cross-sectional view of certain example components in the modified lockstep actuator 50000, where the actuator is rotated counter clockwise 90 degrees relative to its position as illustrated in FIG. 51. FIG. 52 further illustrates an example fluid channel 52100 leading from the actuator diaphragm chamber to the spool piston chamber 51300 and then to ambient outlet 50200 via the spool piston chamber 51300.

Figure 53:
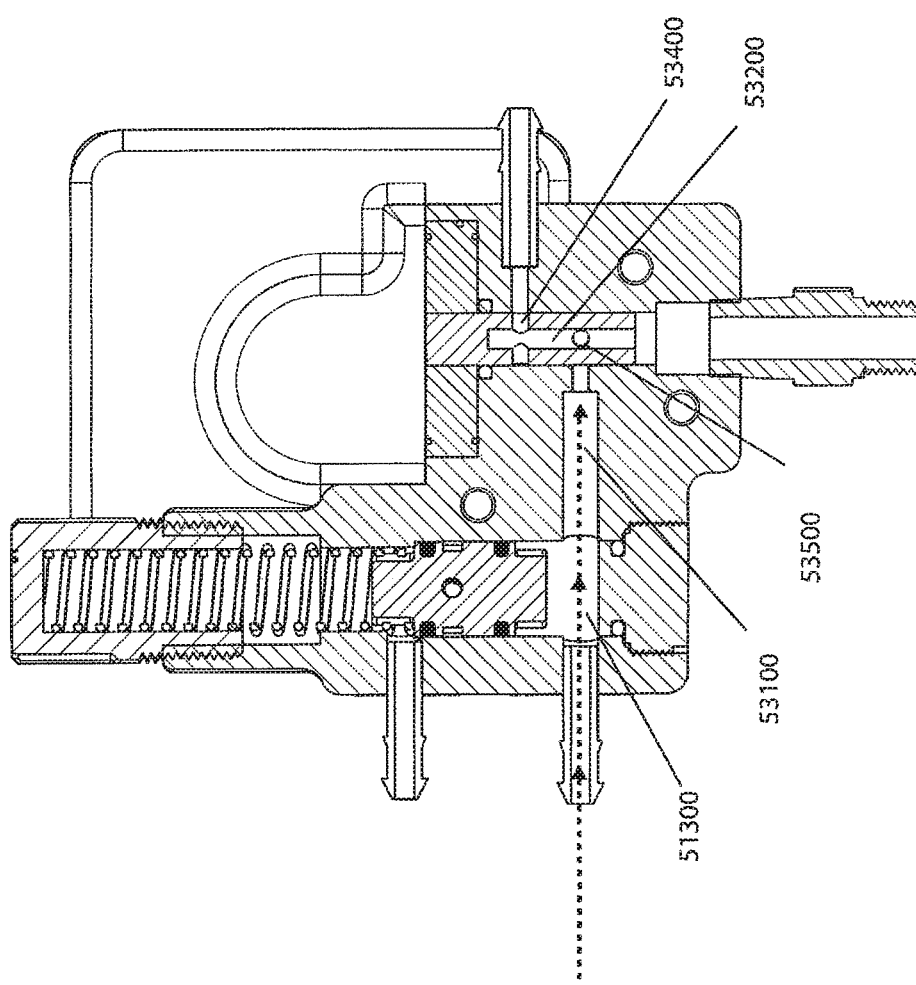
FIG. 53 depicts an internal view of certain components of an example fluid activated actuator.

FIG. 53 illustrates a cut-away, cross-sectional view of certain example components in the modified lockstep actuator 50000. In FIG. 53, the example spool valve/piston is in the retracted position, for example, in response to an increase in pressure. FIG. 53 further illustrates a fluid channel leading from the control fluid inlet 50100, through the spool piston chamber 51300, through a fluid channel 53100, through the port 53500, and to the pilot valve 53200.

Figure 54:
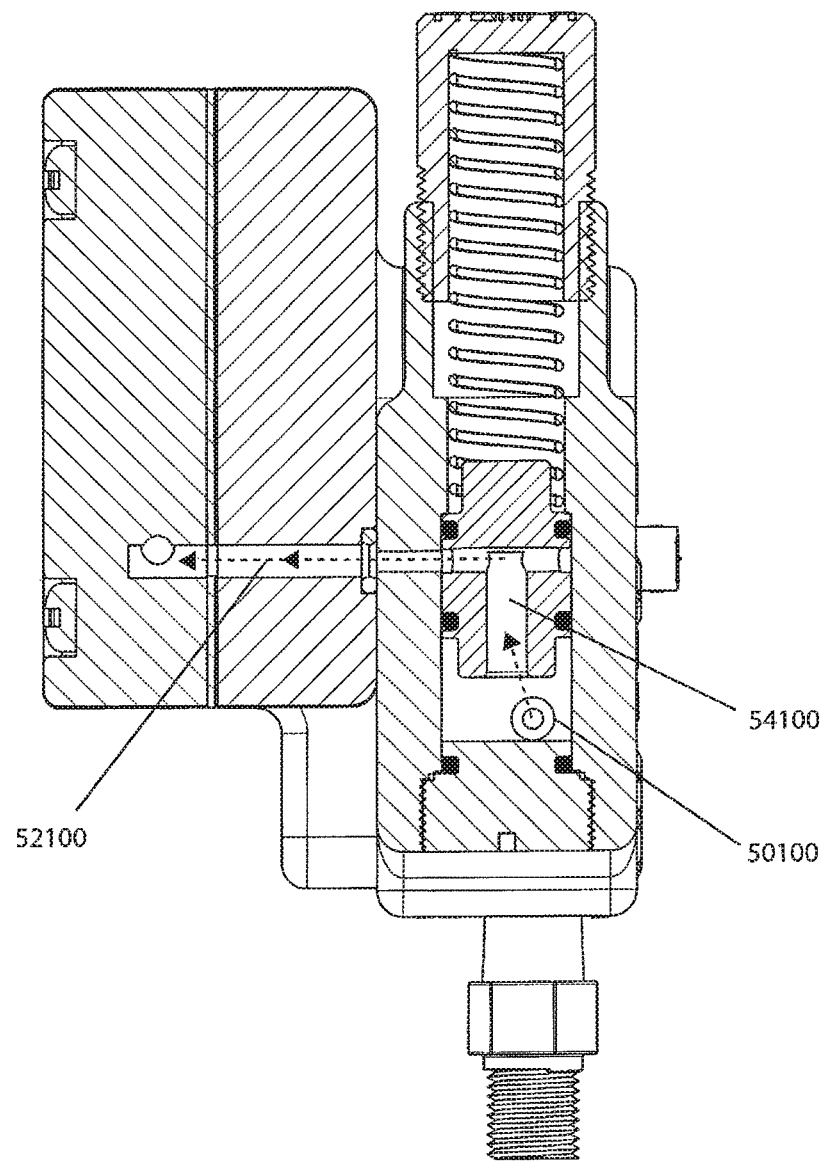
FIG. 54 depicts an internal view of certain components of an example fluid activated actuator.

FIG. 54 illustrates another cut-away, cross-sectional view of certain example components in the modified lockstep actuator 50000 where the actuator is rotated counter clockwise 90 degrees relative to its position as illustrated in FIG. 51 or FIG. 53. FIG. 54 further illustrates an example fluid channel leading from the control fluid inlet 50100, through the spool piston chamber 51300, through a fluid channel 54100 inside the spool valve/piston 51100, and to an interfacing fluid channel 52100, which leads to the actuator diaphragm chamber.

In an example embodiment, a pressure delta lockstep actuator 55100 receives fluid from a source via an inlet line 55200. Pressure, pressure changes, flow rate, and/or other parameters of the input fluid cause the lockstep actuator 55100 to activate or deactivate one or more output valves 31000. In an example embodiment, a change in pressure exceeding a threshold amount in the source line is sufficient to cause the actuator 55100 to transition the state of the output valve 31000, as described below. Thus, expansion or retrofit of an existing irrigation or other fluid delivery system is accomplished without the need for an additional fluid source, timing mechanism, and/or electrical power (e.g., voltage) at the valve 31000.

Figure 55:
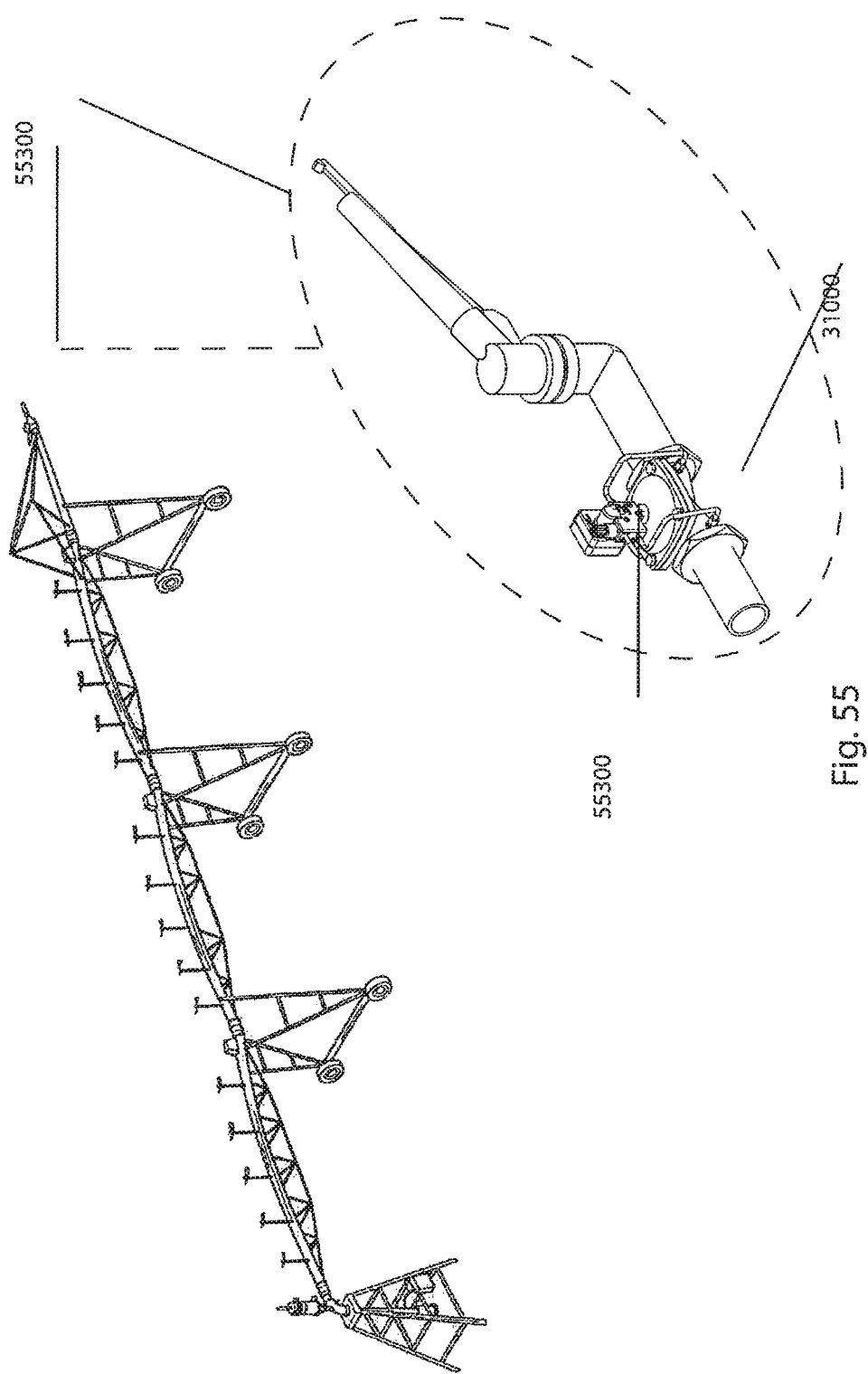
FIG. 55 depicts an example generalized arrangement for a fluid activated actuator.

In an example embodiment, a single pressure delta lockstep actuator 55100 regulates flow through a single output valve as illustrated in FIG. 55. However, it is appreciated that one or more lockstep actuators may be utilized to regulate one, two, three, four, five, six, or more output valves. In this example embodiment, the output valve drives an "end gun" sprinkler 55300 in a rotating center pivot system of sprinklers and valves. In the example operation below, the diaphragm valve 31000 is initially in the open state with the end gun on. Optionally, the pressure delta lockstep actuator replaces electrical solenoids in a conventional or unconventional solenoid controlled diaphragm valve, see also FIG. 20. Thus, certain embodiments optionally incorporate the low cost and simplicity of widely used diaphragm valves with embodiments of the fluid activated actuator devices disclosed herein.

In this example embodiment, the arrangement responds to a reduction in pressurized control fluid. Inlet control fluid is directed from the working fluid of the associated diaphragm valve 31000 via external port 31100 (see also FIG. 31) and enters the lockstep actuator via the inlet fluid passage 50100. In response to a reduction in fluid pressure at the control water inlet 50100, the tension spring force overcomes the reduced fluid pressure and the spool valve/piston travels in the direction of the spring force (e.g., downward with respect to the example embodiment illustrated in FIG. 51). Optionally, once the reduction in pressure exceeds a user configurable threshold, the spool valve/piston 51100 seats against the base of the spool valve chamber 51300, as illustrated in FIG. 51. With the spool valve/piston 51100 in the seated position and the spring 51500 in an extended position, a fluid passage is provided comprising: a fluid passage leading from the actuator diaphragm chamber 52100, a fluid passage between the spool valve/piston and chamber wall 52200, the spool piston chamber 51300, and the vent port 50200, see also FIGS. 50, 51, and 52. Fluid in the actuator diaphragm chamber exhausts to ambient through this fluid passage. Optionally, the venting of the diaphragm chamber resets or repositions the cog wheel as previously described above. When the fluid pressure is subsequently increased, the control fluid pressure applies a force to the spool valve/piston which exceeds the spring force, causing the spool valve/piston to travel in the direction opposed to the spring force (e.g., in the upward direction with respect to the embodiment illustrated in FIG. 53). As illustrated in FIG. 53, the spool valve/piston moves vertically until the center fluid channel 54100 of the spool valve/piston interfaces with the fluid passage leading to the actuator diaphragm chamber 52100. The vertical state change (upward in this example) in the spool valve/piston creates a first fluid passage comprising: the control fluid inlet 50100, the spool piston chamber 51300; the spool valve/piston center fluid channel 53200; and the fluid passage to the actuator diaphragm chamber 52100, see also FIG. 54. Control fluid enters the diaphragm chamber via the first fluid passage causing the actuator diaphragm to expand, the cog wheel to rotate (e.g., 90 degrees), and the interfacing pilot valve 53200 to rotate (e.g. 90 degrees). In this example, the pilot valve rotation aligns a first pilot valve fluid port 53500 with a fluid passage 53100 connected to the spool piston chamber 53300 and closes a second pilot valve fluid port 53400. Therefore, the vertical state change in the spool valve/piston coupled with the pilot valve rotation creates a second fluid passage defined by: the control fluid inlet 50100, the spool piston chamber 53300; the internal fluid passage 53100; the pilot valve port 53500, the pilot valve fluid passage 53200; the diaphragm valve interfacing port 50400, and the diaphragm valve port 34400. The control fluid flows through the second fluid passage (51000, 51300, 53100, 53500, 53200, 50400, and 34400) into the diaphragm valve causing the diaphragm valve to change state to a closed position. With the diaphragm valve in a closed position, the "end gun" sprinkler 55300 turns off.

Continuing the example above, the device responds again when there is a second reduction in pressurized control fluid. In response to the reduction in fluid pressure at the control water inlet 50100, the tension spring force overcomes the fluid pressure and the spool valve/piston travels in the direction of the spring force (e.g., downward in FIG. 51). Optionally, once the reduction in pressure exceeds the user configurable threshold the spool valve/piston 51100 seats against the base of the spool piston chamber 51300 as illustrated in FIG. 51. With the spool valve/piston 51100 in the seated position and the spring 50500 in the extended position, fluid in the actuator diaphragm chamber exhausts to ambient through the fluid passage comprising: a fluid passage leading from the actuator diaphragm chamber 52100, a fluid passage between the spool valve/piston and chamber wall 52200, the spool piston chamber 51300, and the vent port 50200, see also FIGS. 50, 51, and 52. Optionally, the venting of the diaphragm chamber resets the cog wheel as described above. When the inlet fluid pressure is increased, the control fluid pressure applies a force to the spool valve/piston which exceeds the spring force causing the spool valve/piston to travel in the direction opposed to the spring force (e.g., upward with respect to the embodiment illustrated in FIG. 53). As illustrated in FIG. 53, the spool valve/piston moves vertically until the center fluid channel of the spool valve/piston substantially interfaces with the fluid passage leading to the actuator diaphragm chamber 52100. The vertical state change (upward in this example) in the spool valve/piston creates a first fluid passage comprising: the control fluid inlet 50100, the spool piston chamber 51300, the spool valve/piston center fluid channel 54100, and the passage connecting to the actuator diaphragm chamber 52100. Control fluid enters the diaphragm chamber via the first fluid passage causing the actuator diaphragm to expand, the cog wheel to rotate (e.g., 90 degrees), and the pilot valve 53200 to rotate (e.g. 90 degrees). In this example, the pilot valve rotation closes the pilot valve fluid port 53500 with the interfacing fluid passage 53100 and opens through a second pilot valve port 53400 a third fluid passage. The third fluid passage is defined by: the associated diaphragm valve port 34400, the diaphragm valve interfacing port 50400, the pilot valve 53200, the pilot valve port 50400, and bleed port 50300. The fluid in the diaphragm valve chamber exhausts through the third fluid passage causing the diaphragm valve to change state to an open position. With the diaphragm valve in an open position, the "end gun" sprinkler 55300 turns on Optionally, the spring valve/piston is configured to enable associated valve state transitions in response to an increase in fluid pressure from a baseline. For example, an increase in pressure from a baseline (e.g., 0 PSI or 30 PSI) causes the spool valve/piston to advance, opening a fluid passage to expand the actuator diaphragm as described above. In an example embodiment, the diaphragm expansion causes the pilot valve to rotate resulting in an associated valve state transition as described above. A reduction in pressure back to the baseline resets the cog wheel.

Advantageously, the diaphragm valve control device described above operates in both a fluid pressure on/off environment and a fluid pressure delta (e.g., up/down or down/up) environment.

Mechanical Timing Device

There are operating environments in which a number of valves and associated sprinklers and/or sprinkler systems connect to a very high pressure and flow rate master fluid line {do you have example pressures and flow rate ranges?}. In addition, these valves may be distributed over a broad geographic area. In these high fluid pressure environments, rapid valve state changes, off or on, can result in water hammer, significantly reducing the life of the pipes and associated components (e.g., valves). Although not as common, water hammer can also occur in low pressure environments in response to sudden valve state changes, for example, when you have a large mass of water. Certain embodiments address such issues by providing an operating environment with tunable, orderly, and predictable gradual diaphragm valve state transitions.

With respect to the foregoing issues, in an example embodiment a fluid control device can be configured or integrated with a timing device (which is optionally purely mechanical) which delays the onset of a state change from a first position (e.g., open) to a second position (e.g., closed) while the same device only negligibly delays the state change in the opposite direction.

Figure 56:
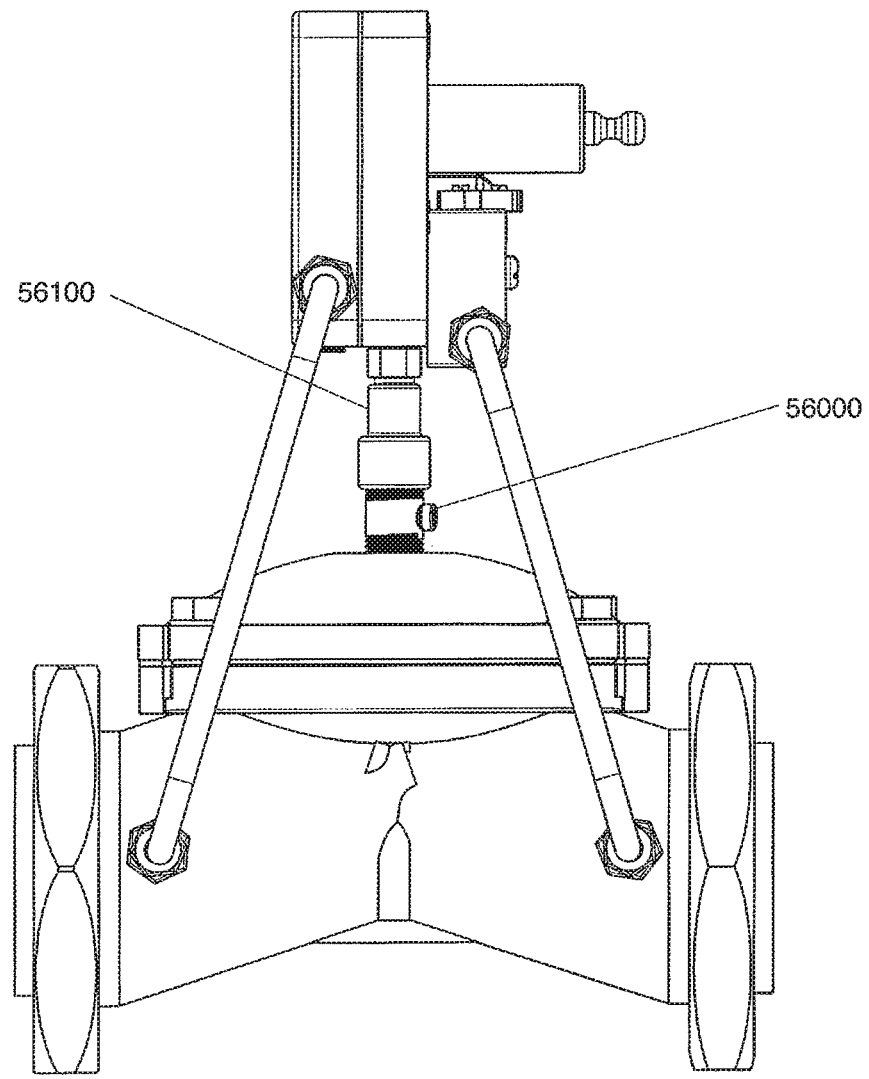
FIG. 56 depicts an example embodiment of a fluid activated actuator interfacing to an example embodiment timing device and a conventional diaphragm valve.

In an example embodiment, a timing device (e.g., mechanical timing device) is optionally configured with male threads at both ends enabling the timing device to be threadedly inserted into a solenoid mount position of a diaphragm valve (e.g., a conventional diaphragm valve) on one end and threadedly inserted into a receiving area of an actuator on the other end. Optionally, the mechanical timing device is configured with a male threaded end to be threadedly inserted into a solenoid position and the other end is capable of receiving a threaded male actuator. Optionally, coupling mechanisms can be used to connect mail ends to female ends and vice versa. Optionally, when the mechanical timing device is threaded into the solenoid mount position of a diaphragm valve (e.g., a conventional diaphragm valve), one or more fluid channels are formed in which fluid can pass bi-directionally between the timing device and diaphragm valve. Similarly, when the mechanical timing device is threaded into the actuator mount position, one or more fluid channels are formed in which fluid can pass bi-directionally between the timing device and actuator. FIG. 56 illustrates an example installation of the mechanical timing device in a diaphragm valve (e.g., a conventional diaphragm valve). The installed mechanical timing device 56000 provides a union between the actuator device and the associated conventional diaphragm valve. Optionally an interface coupler 56100 is used to enable a connection from a male threaded timing device and male threaded actuator. Optionally, the mechanical timing device is physically integrated into the housing of the actuator device or the diaphragm valve itself. Optionally, one or more gaskets and/or separate adaptors are used to interface the mechanical timing device into the actuator/solenoid mount position. Optionally, an adaptor can be used to change the dimensions of the receiving actuator/solenoid mount position (e.g., ¾" thread to ½" thread), to change the thread direction (e.g., counter clockwise or clockwise), etc. It is appreciated that the coupling of the mechanical timing device with the receiving actuator/solenoid mount position can be accomplished in a number of different embodiments and a person having ordinary skill in the art recognizes that enablement of this coupling is not limited to those examples above. Optionally, no gaskets and/or adaptors are required to interface the mechanical timing device assembly into the actuator/solenoid mount position. Optionally, one or more mechanical timing device assemblies are each separately designed to interface within the actuator/solenoid mount position of different output valves without the use of adaptors. Optionally, no machining of the pre-existing diagraph valve is required for the retrofit.

Figure 57:
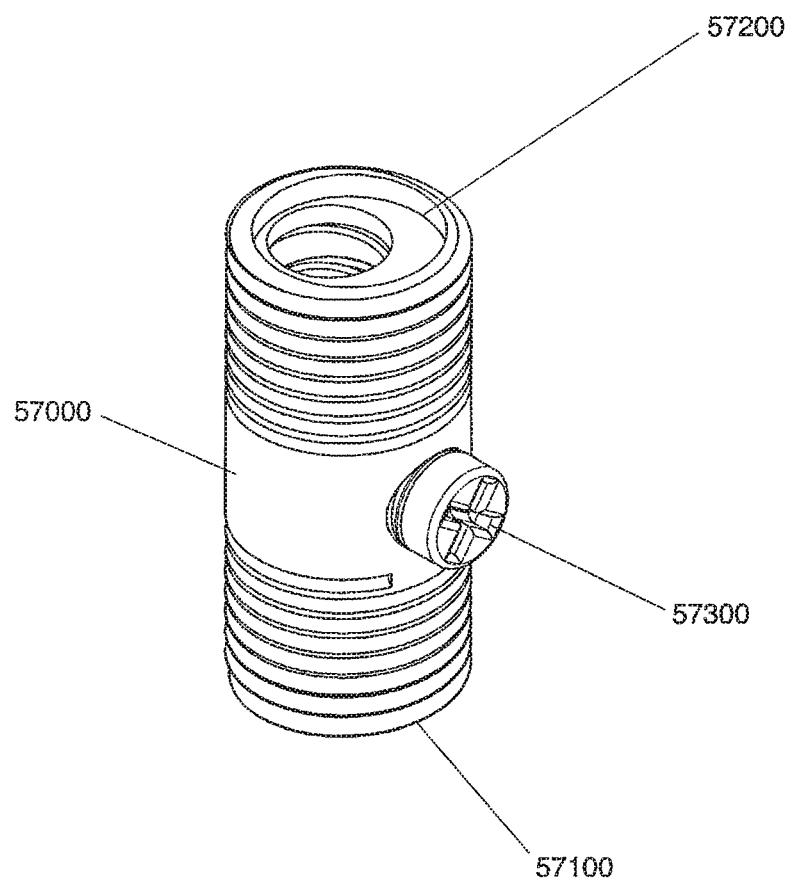
FIG. 57 depicts an external view of an example embodiment of a fluid timing device.

Optionally, the mechanical timing device includes two ports 57100 and 57200 (or additional ports) and a flow rate control mechanism (e.g., control screw 57300) to set the desired flow rate and related valve actuation timing, as illustrated in FIG. 57.

Figure 58:
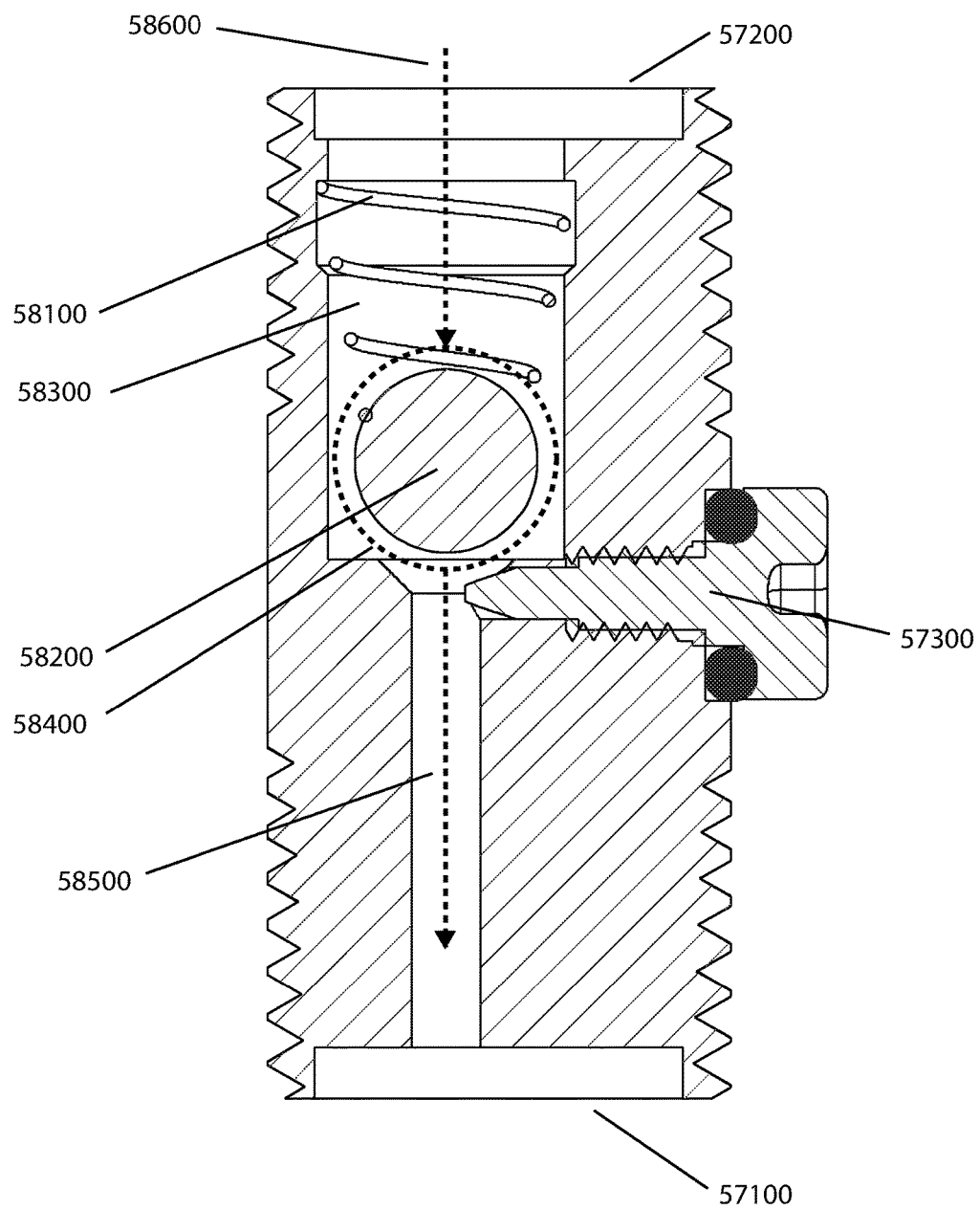
FIG. 58 depicts an internal view of certain the components of an example embodiment of a fluid timing device.

FIG. 58 illustrates a cut-away, cross-sectional view of an example mechanical timing device. The mechanical timing device includes a motivation element (e.g., spring 58100) and a sealing mechanism (e.g., ball 58200) within a chamber 58300. The chamber optionally includes a first port 57200 and second port 57100. Optionally, the first port 57200 is open to an associated actuator. Optionally, the second port 57100 is open to an associated conventional diaphragm valve. The example mechanical timing device includes a control screw 57300 which optionally interfaces with the chamber 58300 and, depending upon the direction of fluid flow, also with the ball 58200. Optionally, the control screw 57300 can be screwed inward with a clockwise rotation and screwed outwardly with a counter-clockwise rotation. Optionally, as the control screw 57300 is screwed inward, the tip of the screw lifts the ball away from a fluid passage 58500 enabling an increase in fluid flow from the chamber 58300 into the fluid passage 58500. Conversely, as the control screw 57300 is screwed outward, the ball (in conjunction with the spring force) restricts the fluid flow from the chamber 58300 into the fluid passage 58500. Optionally, the chamber 58300 includes one or more additional ports (not illustrated in the figure) connecting the chamber 58300 with the fluid passage 58500. Optionally, these additional ports are not restricted by the ball 58200.

In an example embodiment of a mechanical timing device, the mechanical timing device is incorporated into an actuator and diaphragm valve system in order to slow the valve's state change from open to close, thus, mitigating the potential for water hammer. In the example embodiment described below, the timing device 56000 is installed as illustrated in FIG. 56.

The device responds when pressurized control fluid is directed into the port 57200 from the associated actuator. Fluid traveling from the actuator to the associated diaphragm valve travels in the direction of the arrow 58600 or, in this example, in a southerly direction. When the fluid flows in the direction of the diaphragm valve, the fluid pressure applied to the ball 58200 coupled with the spring force causes the ball 58100 to partially restrict the fluid passage 58400 between the chamber wall 58300 and the ball 58200. Adjustments to the interfacing screw enable the user to change the size of the fluid passage 58400. As previously described above, a pressurized fluid flow into the associated diaphragm valve chamber will cause a closure of the valve. Thus, the restricted flow enabled by the timing device slows the closure of the diaphragm valve and mitigates the potential for water hammer. When an open fluid passage is enabled through the actuator, the fluid direction reverses and fluid travels in the direction opposite of 58600 or, in this example, in an upward direction 59200. When the fluid flows in the direction of the actuator, the fluid pressure applied to the ball causes the ball 58200 to move away from the chamber wall 58300 and consequently, increases the size of the fluid passage 59100. Fluid exiting the associated diaphragm chamber causes, at least in part, the diaphragm valve to open as discussed above. Therefore, in this example embodiment, the inclusion of the mechanical timing device causes the diaphragm valve to transition to a closed position at a rate slower than the transition to an open state.

In another example embodiment, the mechanical timing device can be installed in an inverted position (that is, inverted relative to the position described above). The operation is similar to that described above except in an inverted position the timing device causes the associated diaphragm valve to actuate to a closed position at a normal rate and an open position at a slower than normal rate (e.g., restricted fluid flow exiting the diaphragm chamber). Advantageously, the timing device may be configured in the inverted position in low pressure environments in which it is desirable to quickly shutoff a valve set and use the additional pressure to open a second set of valves.

Figure 62:
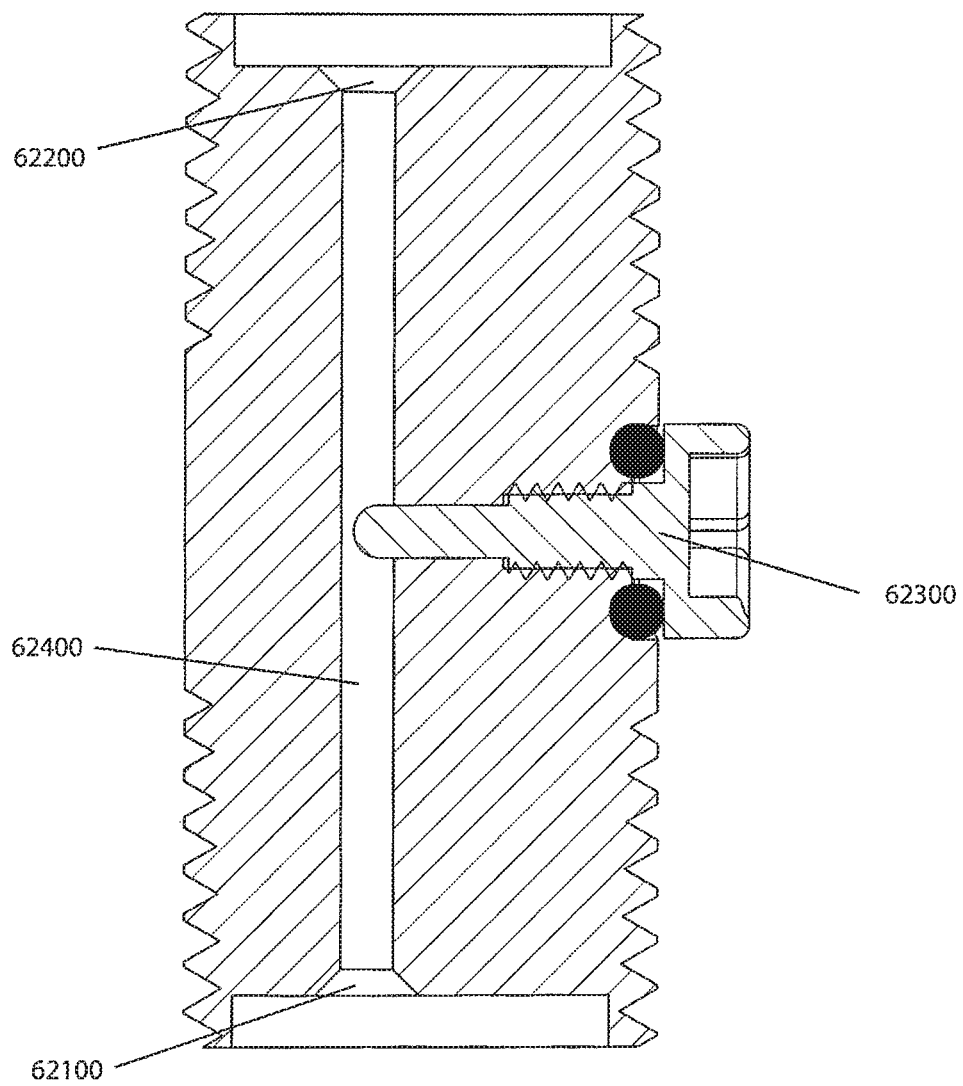
FIG. 62 depicts an internal view of certain components of an example embodiment of a fluid timing device.

FIG. 62 illustrates a cut-away, cross-sectional view of another example mechanical timing device. The mechanical timing device of FIG. 62 restricts flow bi-directionally. The mechanical timing device includes two ports 62100 and 62200 and a flow control mechanism (e.g., screw 62300) to set the desired flow rate and related valve actuation timing. Optionally, a first port 62200 is open to an associated actuator. Optionally, a second port 62100 is open to an associated diaphragm valve (e.g., a conventional diaphragm valve). The mechanical timing device includes a control screw 62300 which optionally interfaces with a fluid passage 62400. Optionally, the control screw 62400 can be screwed inward with a clockwise rotation and screwed outwardly with a counter-clockwise rotation. Optionally, as the control screw 62400 is screwed inward the fluid passage is restricted and the flow rate is reduced. Conversely, as the control screw 57300 is screwed outward, the fluid passage is increased and the fluid flow rate is increased. As previously described above, a restricted flow slows the associated diaphragm valve state transition which can, for example, mitigate water hammer.

Precision Dome

Figure 60:
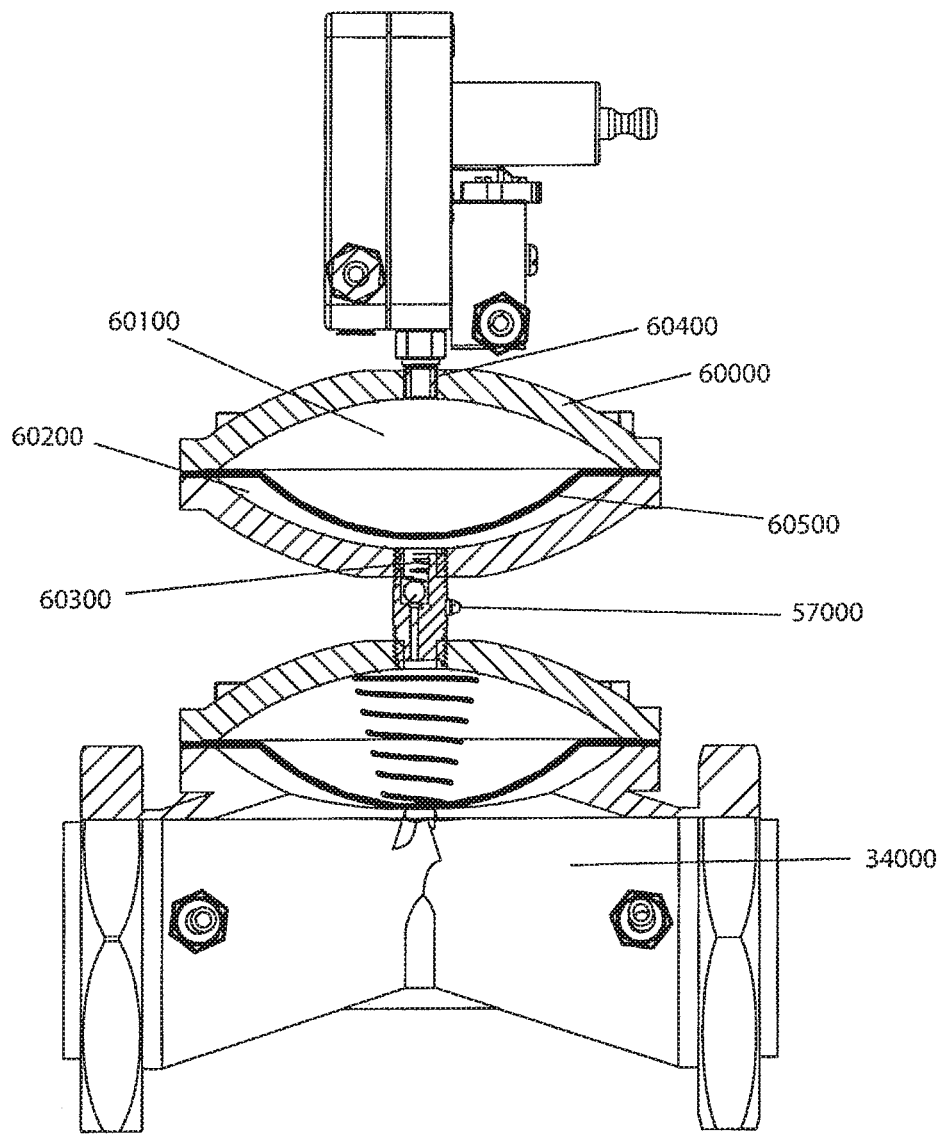
FIG. 60 depicts an internal view of certain components of an example embodiment of a precision dome device interfacing with an example embodiment of a fluid timing device and a conventional diaphragm valve.
Figure 61:
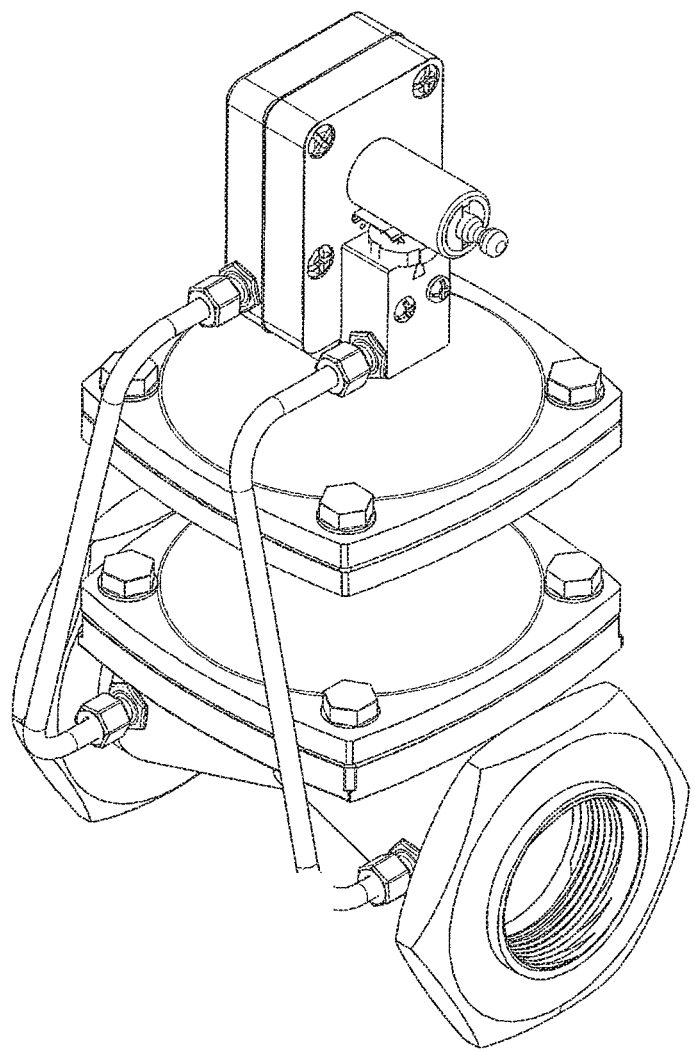
FIG. 61 depicts an example generalized arrangement for an example embodiment of a precision dome device.

In another example embodiment, the mechanical timing device operation described above can be further improved by the inclusion of a precision dome, an example embodiment of which is illustrated in FIG. 60. The mechanical timing device described above, because of the restricted passage, is subject to clogging in dirty or contaminated working fluid environments. Thus, there is a need to improve the robustness of actuator control mechanisms (including for example, solenoid-based actuators) and mechanical timing devices if the control fluid includes particulates which may clog one or more fluid passages and/or ports.

With respect to these needs, in an example embodiment a fluid control device can be configured or integrated with a precision dome which isolates control fluid from contaminated fluids. In addition, the precision dome enables the actuator and associated diaphragm system to reliably perform slower state changes than those described above.

In an example embodiment as illustrated in FIG. 60, a precision dome includes separate fluid chambers 60100 and 60200, a flexible diaphragm 60500, a threaded timing device port 60300, a threaded actuator port 60400, and an optional fluid input port (not shown in FIG. 60). FIG. 60 also illustrates an example installation of the mechanical timing device 57000 in association with a conventional diaphragm valve. A mechanical timing device 57000 is threadedly inserted into a solenoid mount position of a conventional diaphragm valve on one end and threadedly inserted into the precision dome on the other end (the upper end of the embodiment illustrated in FIG. 60). The mechanical timing device 57000, as previously described, provides a fluid channel between the precision dome 60000 and associated diaphragm valve 34000. Optionally a fluid pressure controlled actuator or solenoid-based actuator is threadedly inserted into a mount position 60400 of the precision dome. Optionally, the precision dome is user or professionally assembled from off-the-shelf diaphragm valve parts. Optionally, the chamber 60200 interfacing with the diaphragm valve includes a sealable input port (not illustrated in the figure). Optionally, a user or professional can fill or inject a clean fluid into the sealed chamber. Optionally, the fluid injected into the sealed chamber is a pure, low viscosity fluid such as low viscosity synthetic motor oil. Optionally other fluids can be used including, for example, distilled water, purified water, alcohol, etc. Optionally and advantageously, the precision dome structure is dome shaped in the embodiment described in order to assemble the device using off-the-shelf diaphragm valve parts. However, any suitable type/shape chamber can be used including for example a square chamber, circular chamber, rectangular chamber, irregularly shaped chamber, etc.

In an example embodiment of a precision dome, the precision dome is included in an actuator and diaphragm valve system in order to slow the valve's state change from open to close, thus, mitigating the potential for water hammer. In the example embodiment described below, the precision dome is installed as illustrated in FIG. 60.

The device functions when pressurized control fluid is directed into the actuator facing chamber 60100. The pressurized control fluid depresses the diaphragm downward forcing the clean fluid in the lower chamber 60200 through the timing device into the diaphragm valve chamber causing the valve to transition to a closed state. Advantageously, the fluid flowing between the precision dome and diaphragm valve is a clean fluid isolated from the control fluid and main line fluid and therefore the flow rate can be controlled with a higher degree of precision and without clogging, see also timing description above.

Continuing with the example embodiment, if the actuator port 60400 is opened, the fluid in the upper chamber 60100 exhausts from the chamber through the actuator and the fluid in the diaphragm valve exhausts into the lower chamber 60200 enabling the diaphragm valve 34000 to open. Advantageously, the working fluid entering the diaphragm valve and actuator can be dirty fluid because the fluid passages and ports can be configured large enough to tolerate the dirty fluid. Thus, the actuator diaphragm configuration illustrated above can be installed in various environments including those environments in which the working fluid is dirty and/or contaminated and water hammer can still be mitigated.

Viscous Dampening

Figure 65:
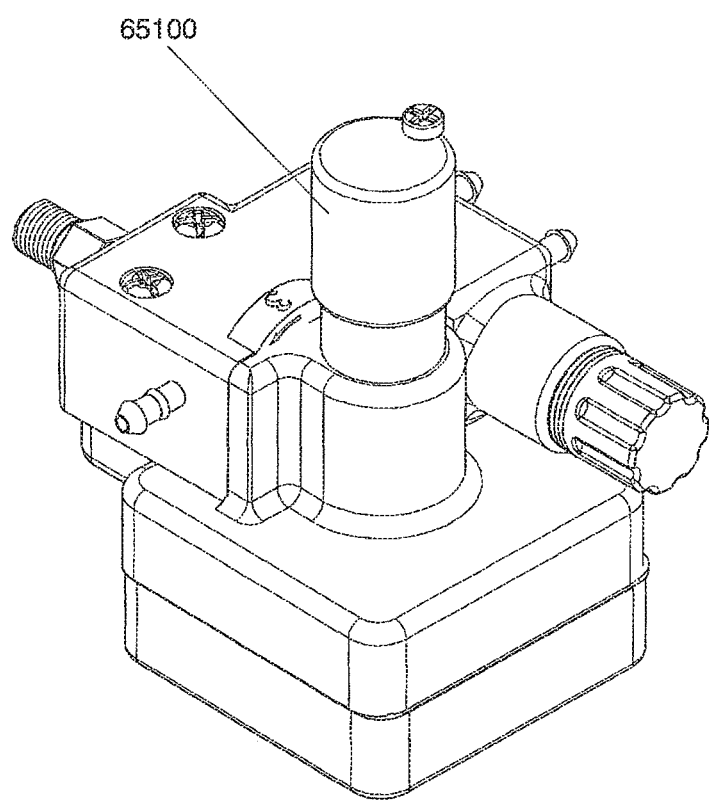
FIG. 65 depicts an example embodiment of a fluid activated actuator with an installed dampening unit.

In another example embodiment, the fluid regulating devices described above can optionally include a viscous dampening unit 65100, an example embodiment of which is illustrated in FIG. 65. The pressure controlled regulators illustrated above optionally are utilized in fluid environments that may be subject to random and periodic pressure spikes. These inadvertent or unintended rapid changes in pressure, generally a change in pressure of short duration (e.g., less than about a second), create a noisy environment and in some cases it is difficult to separate the fluid communicated signal (e.g., an intentional pressure change) from the fluid communicated noise (e.g., an unintended pressure change). Thus, there is a need to provide a pressure controlled actuator mechanism that is resistant to or impervious to unintended pressure changes.

To address the noise issue presented by changes in pressure that are not intended to communicate signal information to the fluid control device, in an example embodiment the fluid control device can optionally include a viscous dampening unit which retards the expansion of the actuator's diaphragm and associated push plate. In this example embodiment, retarding or slowing the expansion of the actuator eliminates and/or reduces unintended pressure changes (e.g., a pressure spike) from causing a state change (e.g., open to close) in the associated diaphragm output valve. Optionally, the dampening unit is designed to retard the expansion of the diaphragm of the actuator but to have minimal to no dampening effect on the retraction of the diaphragm, thus for example, not delaying the reset of the cog wheel spring mechanism discussed herein or its equivalent.

Figure 63:
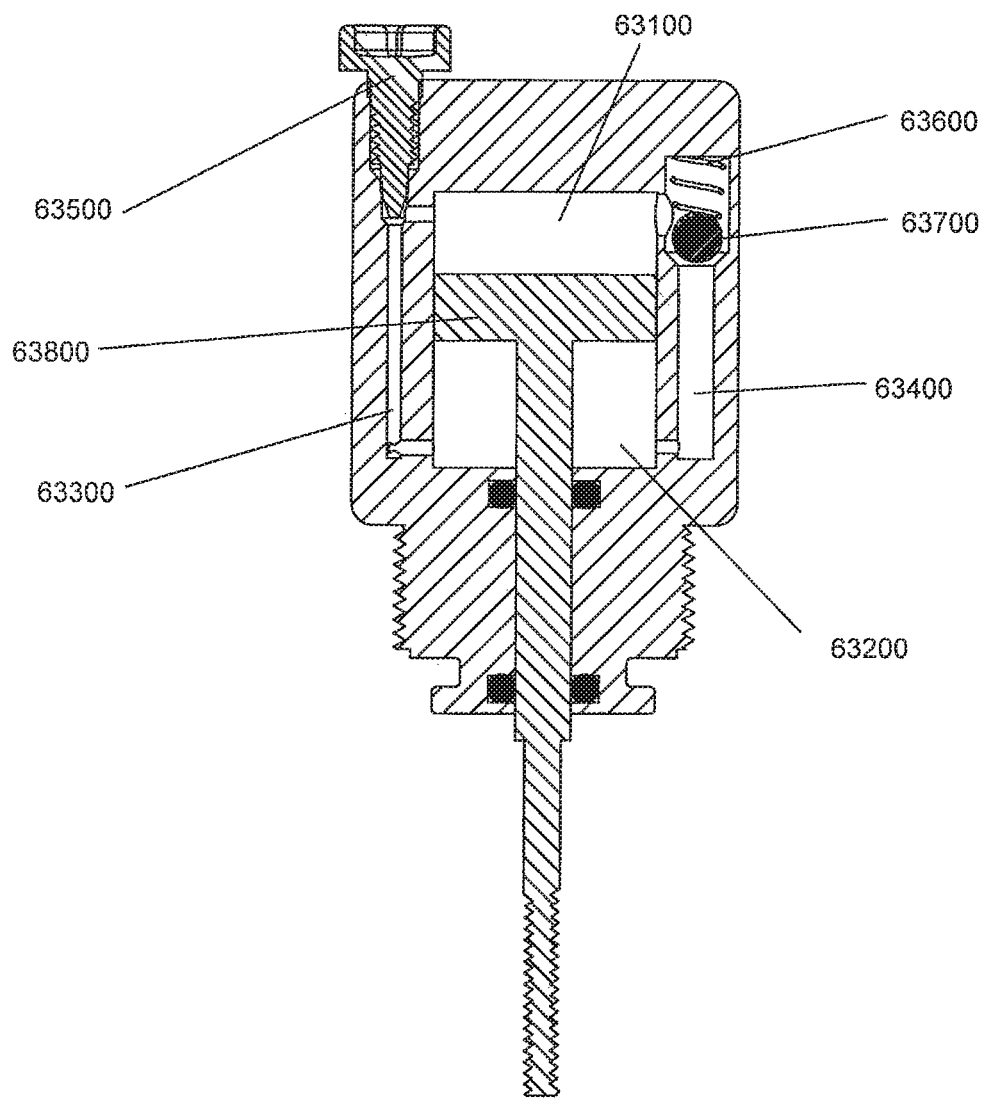
FIG. 63 depicts an internal view of certain components of an example embodiment of a viscous dampening device.
Figure 64:
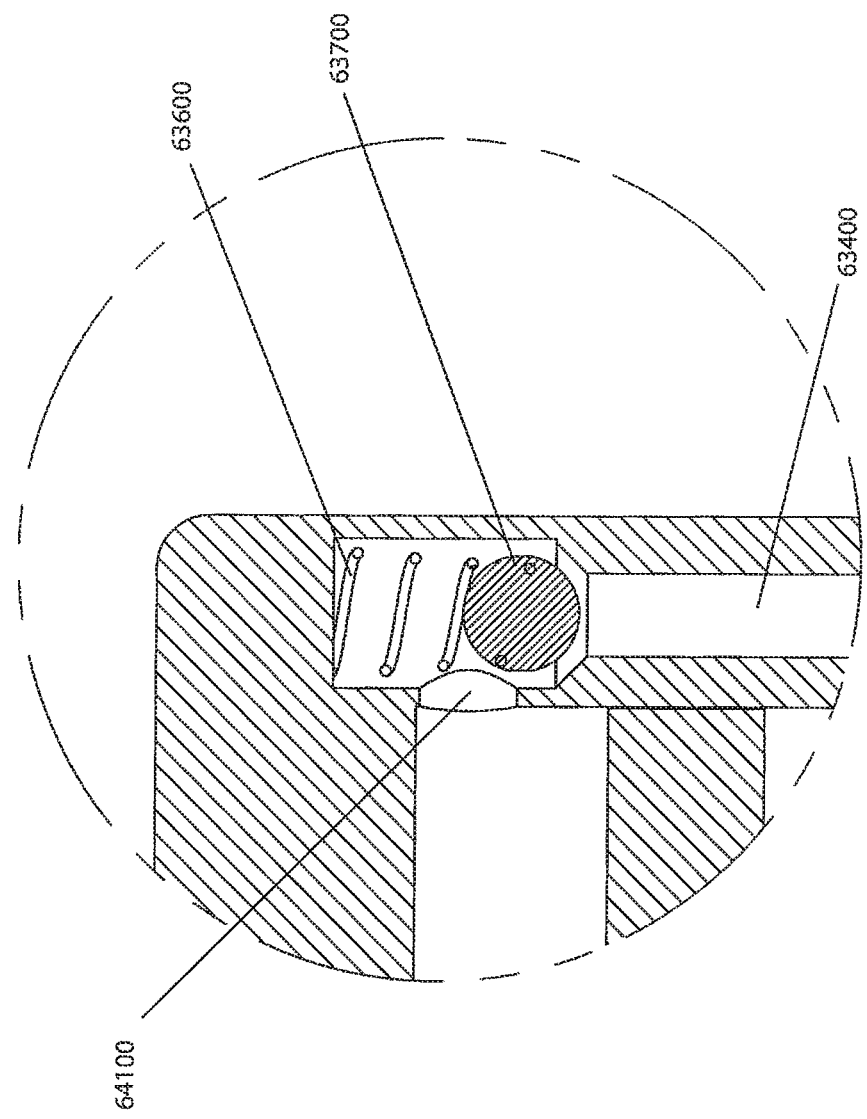
FIG. 64 depicts an exploded view of a mechanism within a fluid passage of an example embodiment of a viscous dampening device.
Figure 66:
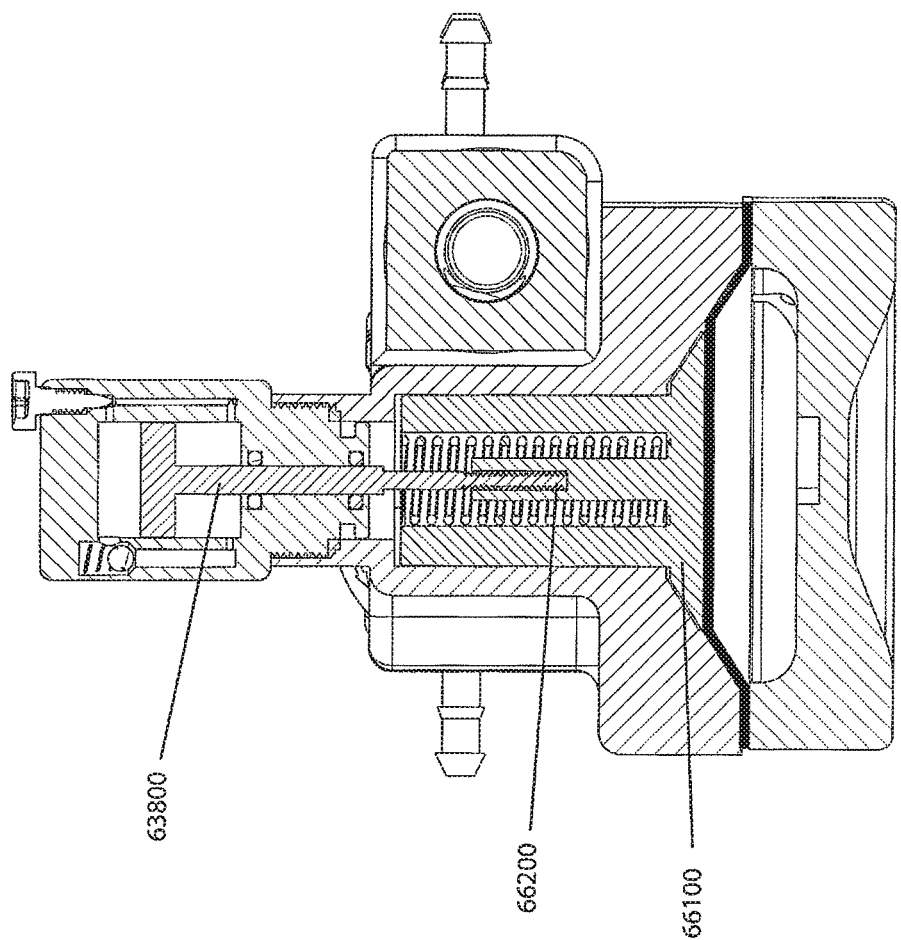
FIG. 66 depicts an internal view of certain components of an example embodiment of a viscous dampening device and fluid activated actuator.
Figure 67:
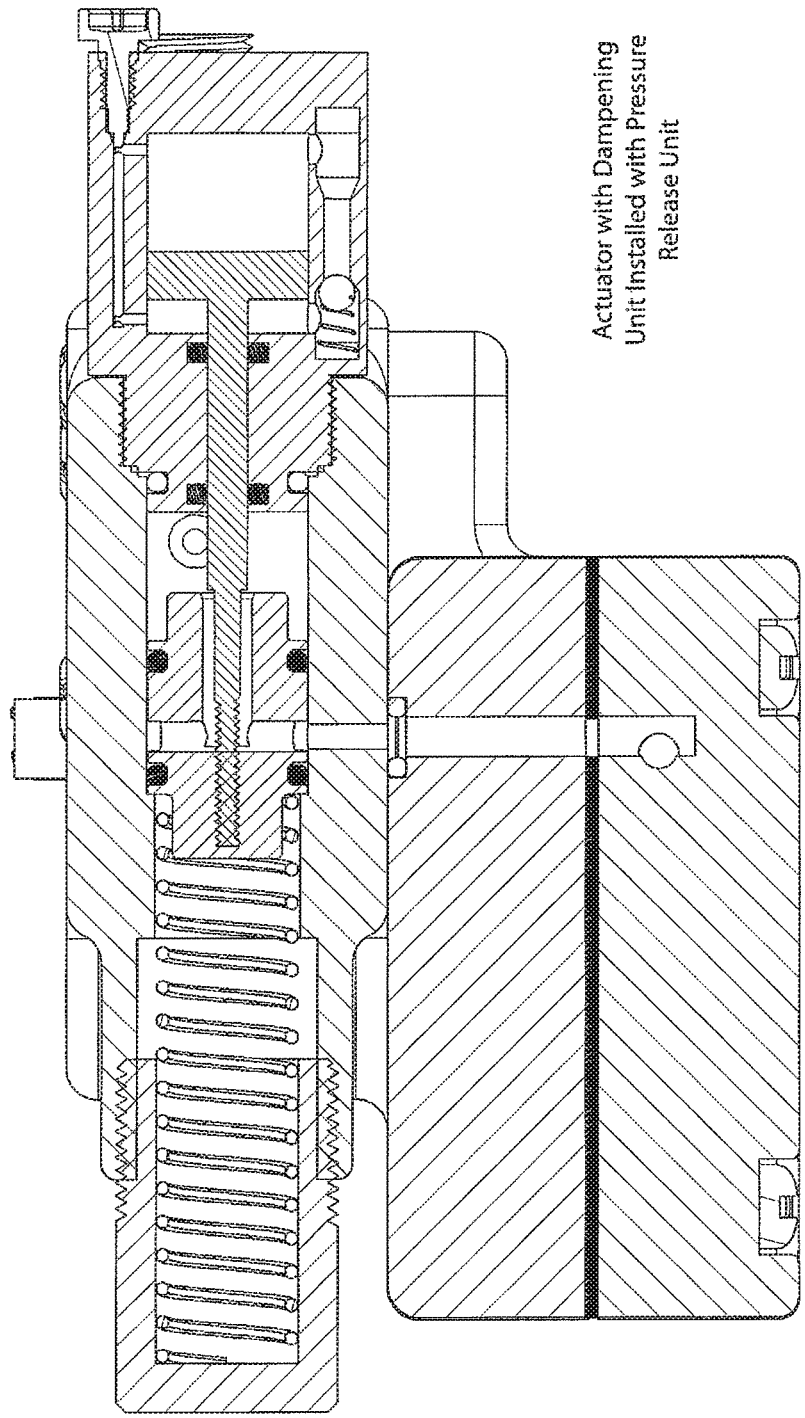
FIG. 67 depicts an internal view of certain components of an example embodiment of a viscous dampening device and fluid activated actuator.

A cutaway view of an example embodiment is illustrated in FIG. 63, a viscous dampening unit includes separate fluid chambers 63100 and 63200 that are connected via a relatively narrow internal fluid passage 63300 and an internal fluid passage 63400. Optionally, the fluid chambers and passages form a closed system. Optionally, the fluid chambers are filled with a viscous fluid including for example, distilled water, purified water, alcohol, etc. Optionally, a needle valve 63500 interfaces with the narrow internal fluid passage 63300. Optionally, if the needle valve 63500 is turned (e.g., clockwise, for example) by a user, the interfacing edge of the needle valve further narrows the internal passage. Optionally, narrowing the passage increases the dampening action of the unit as will be further described below. Optionally, other mechanisms can be used to restrict the flow of fluid through the narrow internal fluid passage 63300 including, for example, a fluid passage including a plurality of ports that can be manually configured to close thereby restricting the flow rate. Optionally, the internal fluid passage 63200 includes a motivation element (e.g., spring 63600) and a sealing element (e.g., ball 63700). Optionally, the sealing element moves against the spring in response to fluid pressure (e.g., upward in FIG. 64) to increase the fluid flow through the passage and into the chamber via port 64100. Optionally, a plunger 63800 separates the first fluid chamber 63100 from the second fluid chamber 63200. Optionally, the plunger 63800 can travel within the chamber, for example in an upward stroke, in response to a force (e.g., push force) applied to the plunger in an upward direction. Optionally, the plunger 63800 can travel within the chamber, for example in a downward stroke, in response to a force (e.g., pull) applied to the plunger in a downward direction. Optionally, the end of the plunger 63800 is attached to the push plate associated with the actuator's flexible diaphragm as illustrated in FIG. 66. For example, the plunger may be adhesively or otherwise joined to the push plate at a point 66200 where the plunger contacts the push plate. Optionally, in an example embodiment, the viscous dampener unit replaces the manual control knob 24400 in the lockstep actuator described above. Optionally, in an example embodiment, the viscous dampener unit replaces the manual pressure head adjustment bushing 32820 in the lockstep actuator described above. Optionally, in an example embodiment, the viscous dampener unit replaces the manual setting knob (e.g., 48800) in the lockstep actuator described above. Optionally, in an example embodiment, the viscous dampener unit replaces an adjustment knob (e.g., 50500) in the actuator described above. Optionally, in an example embodiment, the viscous dampener unit is integral with the pressure delta feature of the lockstep actuators described above as illustrated in FIG. 67. In this example embodiment, the viscous dampener unit retards or delays the spool valve/piston (e.g., spool valve/piston 51100) movement in response to inlet control fluid.

In an example embodiment of a dampening unit, the dampening unit is attached to or is integral to an actuator and diaphragm valve system in order to mitigate inadvertent pressure changes (e.g., pressure drop and/or pressure increase spikes). In the example embodiment described below, the dampening unit is installed as illustrated in FIG. 66. In this example embodiment, the plunger 63800 is attached to the diaphragm push plate 66100. To simplify the description below, the operation of the dampening unit is described with respect to the FIG. 63 in which the unit is mounted in an upright position. However, the dampening unit can be mounted and/or operate in any position including for example, relative to FIG. 63 upside down, horizontal, angled, etc.

The device functions when the diaphragm push plate moves upward in response to an expansion of the actuator's diaphragm. The pressure On stroke or upward stroke exerts a force on the viscous fluid in the chamber 63100. In this example embodiment, the fluid exits the chamber through the narrow internal passage 63300. The fluid pressure created from the plunger action together with the tension spring 63600 seals the internal fluid passage 63400, preventing fluid from exiting the chamber 63100 via this passage. Therefore, in this example embodiment, fluid exits the chamber 63100 via the narrow internal passage 63300. Optionally, the dimension of the passage 63300 is user configured by the needle valve 63500. Optionally, the passage 63300 is narrowed by a rotation (e.g., a clockwise rotation) of the needle valve 63500. Optionally, the passage 63300 is widened by a counter rotation of the needle valve 63500. The narrower the passage 63300, the more fluid resistance that results when fluid exits the chamber 63100. Conversely, widening the passage 63300 creates less fluid resistance in the chamber 63100. Thus, the effect of the viscous dampening unit is to slow or delay the actuator's diaphragm expansion, preventing short duration pressure variations, which may occur in the inlet fluid pressure system, from causing a state change (e.g., open to closed) in the actuator/associated output valve. The clean isolated fluid within the dampening unit and the high thread count of the needle valve enables precise user control of the diaphragm expansion and associated push plate movement.

Continuing with the example embodiment, while it is advantageous to slow or delay the push plate action in response to a pressure On stroke, it optionally is advantageous to not or minimally slow or delay the pressure Off stroke or downward movement of the plunger. The device functions when the diaphragm push plate moves downward in response to a retraction of the actuator's diaphragm. The pressure Off stroke or downward stroke exerts a force on the viscous fluid in the chamber 63200. In this example embodiment, the fluid exits the chamber through both internal passages 63300 and 63400. The fluid pressure created from the plunger action overcomes the spring 64200 tension unseating the obstructing element 63700 enabling the fluid to flow around the element 63700 and into the chamber 63100. The open passage 63400 reduces the resistance of the fluid in the chamber 63200 and enabling a quick return stroke.

Optionally, the viscous dampening unit can be designed to dampen the Off stroke with minimal change to the On stroke. In an example embodiment, by positioning the placement of the obstructing element 63700 at the lower end of the passage 63400, the force of the fluid exiting the chamber 63200 in response to a down stroke (or pressure Off) and/or a spring 63600 tension force causing the obstructing element 63700 to obstruct the passage 63400. Optionally, the force of the fluid exiting the chamber 63100 in response to an up stroke (or pressure On) overcomes the spring 63600 tension unseating the obstructing element 63700, enabling the fluid to flow around the obstructing element 63700 and into the chamber 63200. Therefore, the open passage 63400 reduces the resistance of the fluid in the chamber 63100, enabling a quick pressure On stroke.

Optionally, the precision dome assembly described above can alternatively or in addition be used to manage noisy/fluid pressure fluctuating environments. A precision dome assembly, for example a precision dome assembly such as that illustrated in FIG. 60, and a timing device, for example a timing device 57000 such as that illustrated in FIG. 57 can be fluidly installed between the upstream actuator supply tube and the actuator diaphragm fluid chamber. This will delay the actuator's diaphragm motion and associated cog wheel rotation sufficiently to prevent short duration pressure variations from causing an output valve state change.

Over Pressure Cutoff Device

Figure 68:
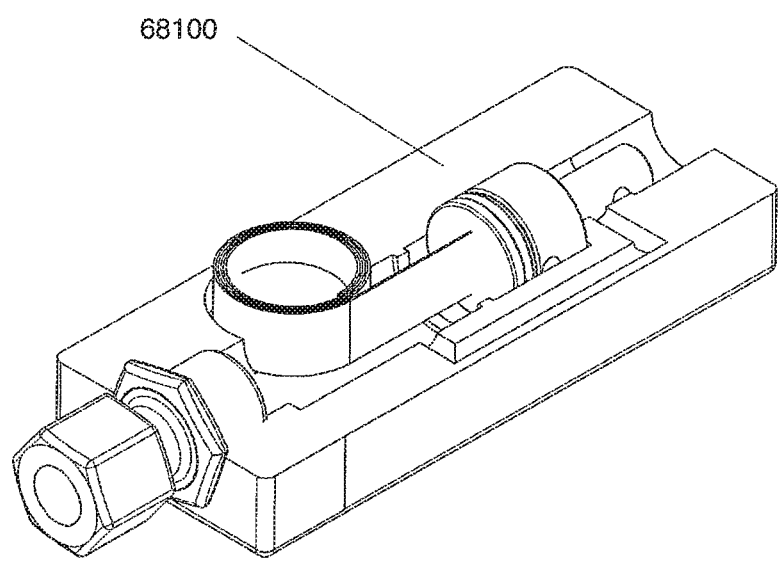
FIG. 68 depicts an internal view of an example embodiment of an over pressure cutoff device.

In another example embodiment, the pressure controlled regulators described above include an over pressure cutoff device 68100, an example embodiment of which is illustrated in FIG. 68. The pressure controlled regulators illustrated above optionally are utilized in fluid environments subject to random and periodic pressure spikes and/or input pressure which may exceed the operating parameters of the regulators. Thus, there is a need to provide a pressure controlled actuator mechanism that is robust to unexpected high pressure surges, or pressure surges that exceed the operation parameters of the regulators.

Figure 70:
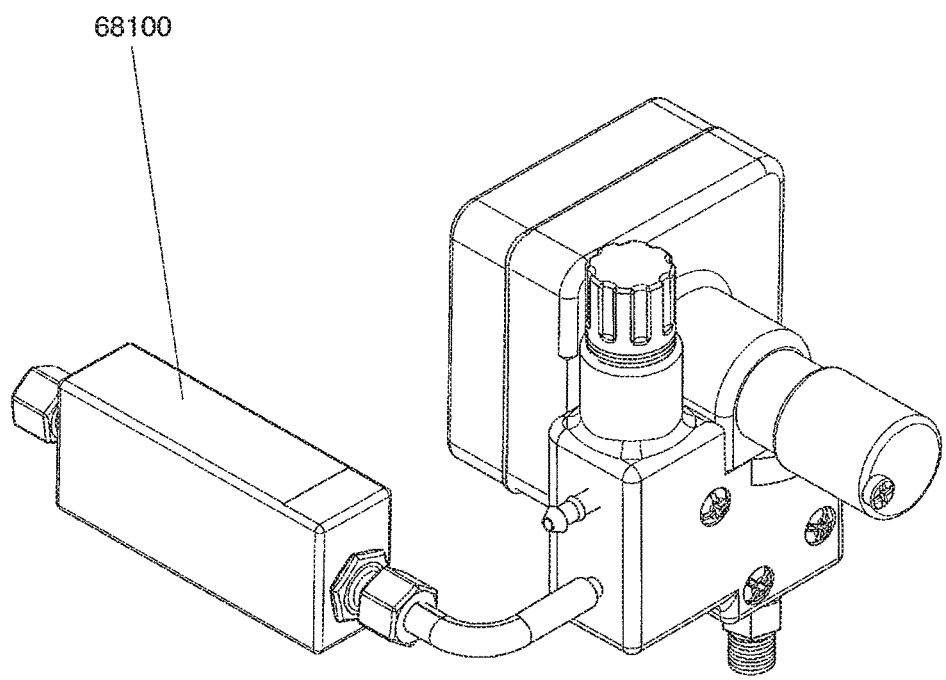
FIG. 70 depicts an example embodiment of an installation of an over pressure cutoff device.

In an example embodiment a fluid control device can optionally include an over pressure cutoff device 68100 which is spliced or otherwise inserted into the fluid control device's control inlet flow as illustrated in FIG. 70. Optionally, for example, the over pressure cutoff device is spliced into the fluid control line 31100 (see FIG. 31). In this example embodiment, the over pressure cutoff device blocks the fluid inlet flow into the fluid control device if the inlet pressure exceeds a specified and/or configurable threshold.

Figure 69:
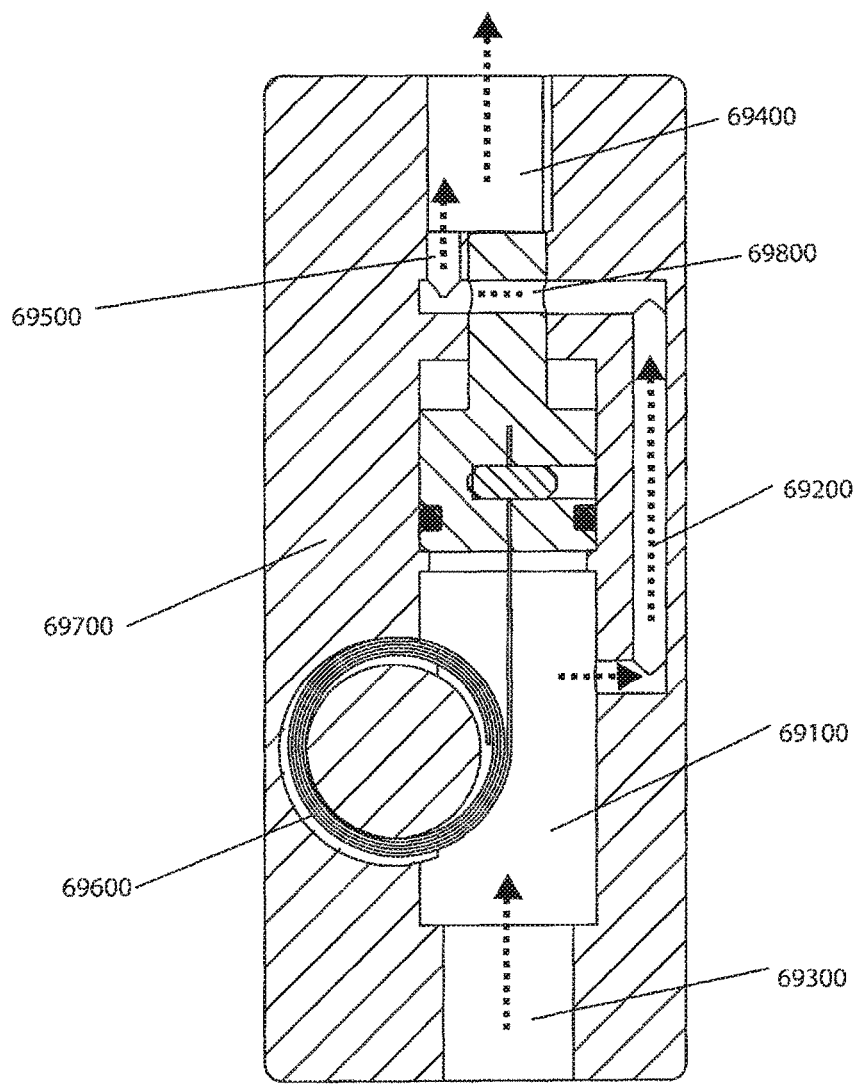
FIG. 69 depicts an internal view of an example embodiment of an over pressure cutoff device.

In an example embodiment as illustrated in FIG. 69, an over pressure cutoff device includes a housing 69700, a piston valve 69100, a substantially constant force spring 69600 (e.g., a spring which provides a substantially unvarying force anywhere along the length of travel), a first fluid passage 69200, a second fluid passage 69500, a fluid inlet 69300, and a fluid outlet 69400. Optionally, the spring 69600, fixed to the housing 69700 restrains the movement of the piston valve 69100. Optionally, the piston valve 69100 travels within the housing 69700 (e.g., vertically in FIG. 69) in response to fluid pressure in which the fluid pressure exceeds the resistance of the spring 69600.

Figure 71:
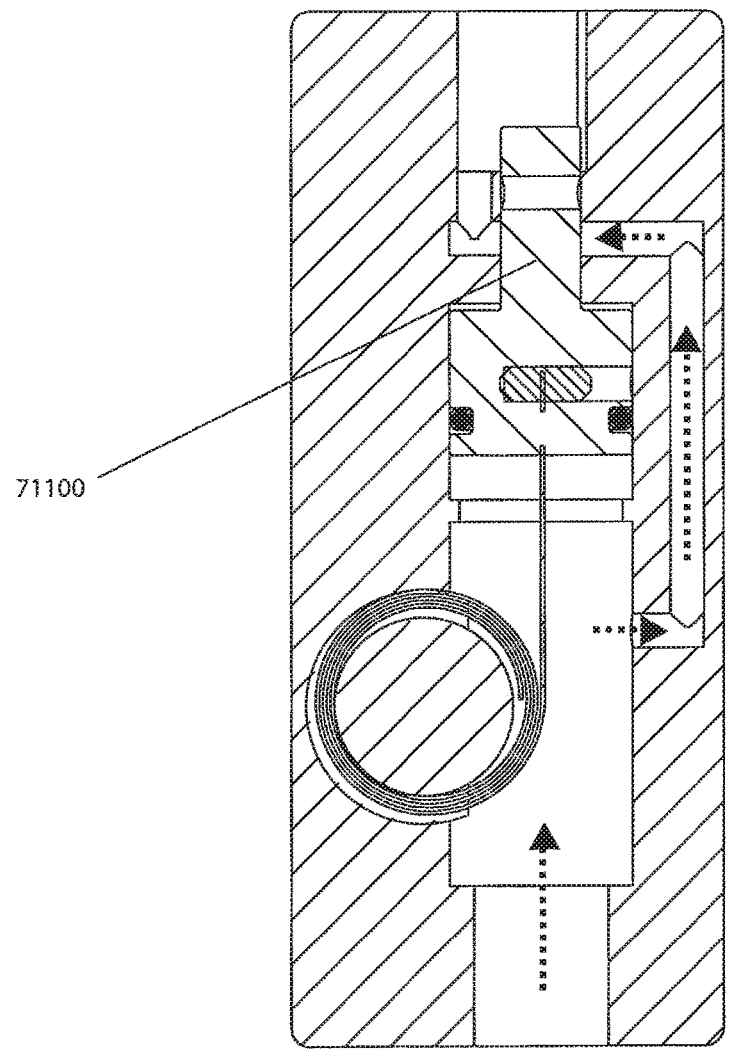
FIG. 71 depicts an internal view of an example embodiment of an over pressure cutoff device.
Figure 72:
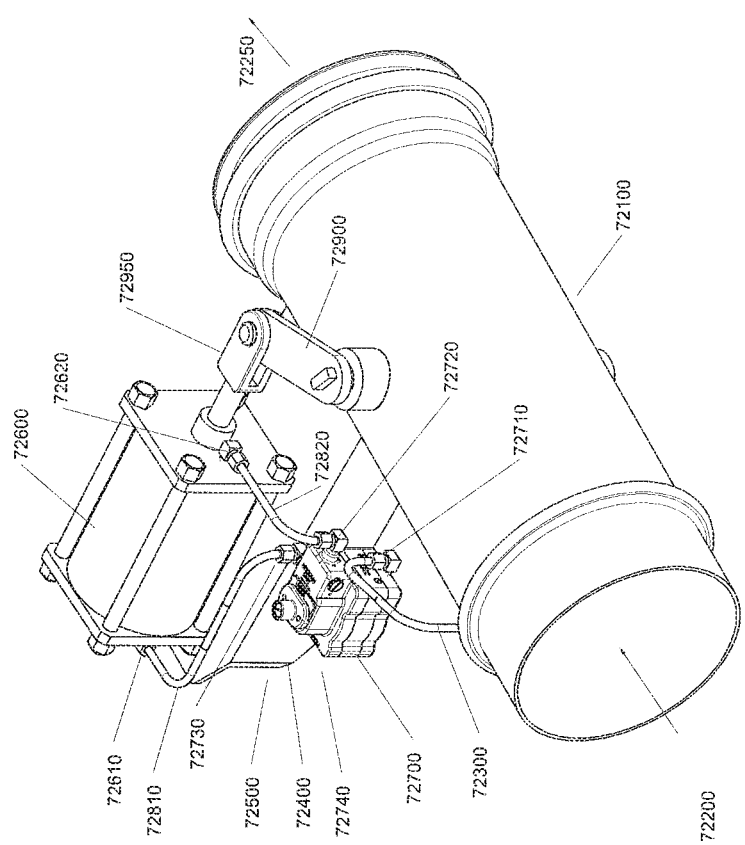
FIG. 72 depicts an example butterfly valve operating environment for a fluid activated actuator assembly.

In a typical normal operating environment, inlet fluid enters the device at the fluid inlet 69300 and exits the device at the fluid outlet 69400. The fluid flows through the over pressure cutoff device via: the piston valve chamber 69100, the inlet 69300, the first fluid passage 69200, the piston valve 69500, and the second fluid passage 69500. The fluid exits the over pressure cutoff device at the fluid outlet 69400. Optionally, provided the fluid pressure within the piston valve does not exceed the resistance force of the spring 69600, fluid traverses the device as described above and as illustrated by the arrows in FIG. 69. Optionally, if the inlet fluid pressure exceeds the resistance force of the spring 69600, the valve piston 69100 travels in the direction of the fluid pressure as illustrated in FIG. 71 (e.g., vertically in FIG. 71). Optionally, the valve port 69800 connected to the piston also travels in the direction of the fluid pressure. The vertical movement of the piston body 71100 obstructs the fluid flow from the first fluid passage 69200 into the second fluid passage 69500, thereby, blocking the flow of fluid to the fluid outlet 69400. Optionally, in response to a subsequent reduction in fluid pressure in which the pressure is reduced below a configured threshold and/or the resistance force of the spring, the valve port 69800 connected to the piston valve travels (e.g., vertically downward in FIG. 71) enabling a fluid path between the first fluid passage 69200 and the second fluid passage 69500, for example, as illustrated in FIG. 69. In the open position, fluid entering the inlet traverses the device as described above and as illustrated by the arrows in FIG. 69.

In an example embodiment, the spring restraint 69600 is configurable to a plurality of fluid pressure points including for example 30 PSI, 40 PSI, 50 PSI, etc. Optionally, other spring mechanisms including, for example, a coil spring can be used in place of a constant spring mechanism.

Butterfly Valve Operation

Embodiments of a fluid flow control device are provided whereby a servo assembly is controlled by a pressure activated mechanism and/or a fluid flow mechanism. Optionally, the fluid flow control devices described herein require no electrical power to manage the flow of fluid through a one or more output valves (although a remote upstream controller, that controls fluid flowing to the fluid flow control devices, may be electrically powered). Optionally, the fluid control devices described herein enable an operator of, for example, a flood irrigation system, to remotely control valve operation by, for example, changing flood pressure within a line (e.g., a main line) without manual intervention of the remote valve by a user/operator.

FIG. 71 represents a generalized arrangement for a fluid activated, actuator assembly associated with an operational butterfly valve. The actuator assembly when appropriately configured can control the operation of the butterfly valve 71100 in response to changes in source input fluid pressure in the fluid line 71200.

In an example embodiment a "NO Electricity" (NOE) butterfly valve actuator is illustrated in FIG. 71. The NOE actuator assembly receives fluid from a source via an inlet line 71300. Pressure, flow rate, or other parameter of the input fluid cause the assembly to change the state of the associated valve (e.g., butterfly valve 71100) to an open or closed position. Optionally, when two or more output valves are present, the system of valves and NOE actuators are configured such that the activation/opening of one or more output valves is associated with the simultaneous, or nearly thereto, deactivation/closing of one or more output valves. Optionally, opening and closing the same number of output valves enables the operator to direct fluid from a distribution line with the same pressure and flow characteristics. In this way multiple distribution lines are optionally served by a single source with the pressure, rate, and other flow characteristics of the original source maintained throughout the entire system. Thus, and as further described below, by changing input line pressure (e.g., by delivering a pressure pulse signal), a fluid delivery system (e.g., in a flood-based irrigation system) can be managed remotely, without the need for user/manual control of each valve and without electrical valve control.

Figure 73:
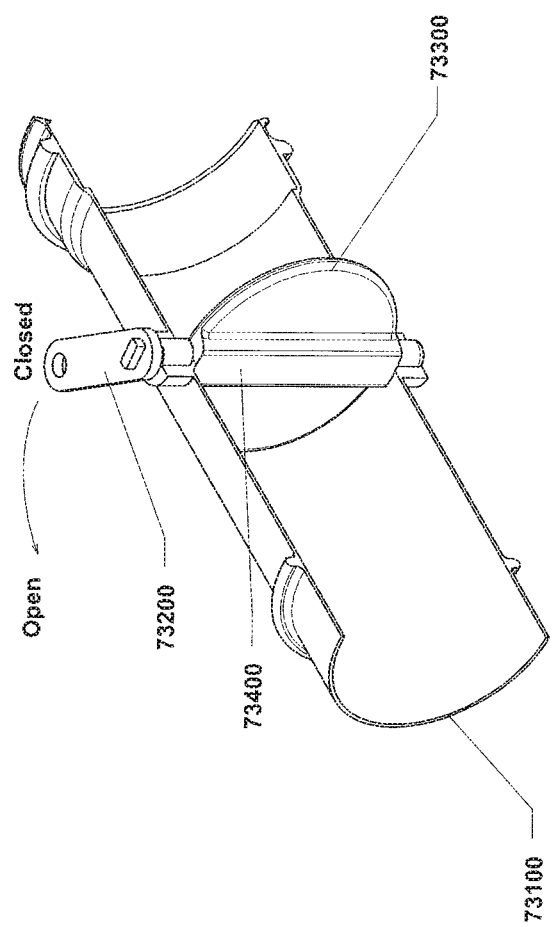
FIG. 73 depicts a cutaway view of an example butterfly valve.

FIG. 73 illustrates a cross-sectional view of an exemplary butterfly valve. A conventional butterfly valve can be used to isolate and/or regulate flow from an input to an output. The shutoff mechanism of an exemplary butterfly valve 73100 takes the form of a disk 73300. The disk shutoff mechanism 73300 is positioned in the center of the valve 73100. Passing through the disk is a rod 73400 connecting to an actuator arm 73200 external to the valve. Rotating the actuator arm 73200 clockwise or counter-clockwise causes the connected disk 73300 to similarly rotate. When the exemplary butterfly valve 73100 is closed, the disk 73300 is positioned so that it completely blocks the fluid passageway (e.g., the actuator arm is driven clockwise to its maximum position). When the exemplary butterfly valve 73100 is open (e.g., the actuator arm is driven counter-clockwise to its maximum position), the disk 73300 is positioned parallel to the fluid flow (90 degrees from the closed position) so that the valve allows a nearly unrestricted passage of the input fluid.

In an example embodiment a single "NO Electricity" (NOE) butterfly valve actuator is illustrated in FIG. 71. Optionally, one or more NOE actuators can be configured in a system of valves to regulate one, two, three, four, five, six, or more butterfly valves. This is optionally accomplished by configuring a number of cam spokes and dual cog wheel posts in a mechanism of the actuator. In this example embodiment, increasing the number of first cog wheel posts reduces the degree of rotation of the first cog wheel. Advantageously, and as described below in an example embodiment, the larger number of first cog wheel posts couple with one or a low number of cam spokes will decrease valve actuation frequency. Optionally, this configuration is used when the operator has a system comprising multiple valves (e.g., 8 or 10 valves). While certain embodiments are described below with respect to a system of two and four output valves, a person having ordinary skill in the art recognizes from the description the enablement of any number of output valves (including both an even number and an odd number of valves) within a system without limitation.

FIG. 71 depicts a configuration of a NOE actuator 71500 interfacing with a conventional butterfly valve actuator arm 71900. Conventionally, the butterfly valve is opened or closed by an operator manually cranking the actuator arm counter-clockwise or clockwise. Thus, certain embodiments optionally incorporate the low cost and simplicity of widely used butterfly valves (e.g., off-the-shelf valves from different manufacturers) with embodiments of the NOE, fluid activated actuator devices disclosed herein.

In an example embodiment, the NOE actuator 71500 includes three elements, each of which is described herein. The three elements include a mounting base 71400, a control assembly 71700, and a piston assembly 71600. The mounting base 71400 is a structural element that enables a platform for the control assembly and piston assembly to be mounted to the associated butterfly valve. Optionally, the base is light weight and attached to the butterfly valve using one or a combination of methods including for example an adhesive, bolts, straps, etc. Optionally, the mounting base is customized for each manufacturer to simplify the procedure for installing the mounting base to the butterfly valve (including, for example, field installations of the actuator). Advantageously, only the mounting base element 71400 and the control arm 71900 interfacing element 71950 change from one butterfly valve manufacturer to another. Further, a single mounting base design can be used with most manufacturers. The control assembly 71700, responds to pressure changes in a deterministic manner to direct working fluid into one of two piston chambers of the piston assembly 71600 as further described below. The piston assembly 71600 hydraulically actuates the control arm of an associated butterfly valve.

The control assembly 71700 includes four ports, a first port 71710 for receiving working fluid, a second port 71720 for directing working fluid into the piston element 71600, a third port 71730 for directing working fluid into the piston element 71600, and a fourth port 71740 (not shown) for venting working fluid to ambient or, optionally, into the output of valve 71100.

The piston assembly 71600 also includes a first port 71610 and a second port 71620. The third port 71730 of the control assembly 71700 interfaces via a water channel 71810 (e.g., a tube) to a first port 71610 on the piston assembly 71600 such that fluid is transportable between the third port 71730 of the control assembly 71700 and the first port 71610 of the piston assembly 71600. The second port 71720 of the control assembly 71700 interfaces via a different water channel 71820 (e.g., a tube) to a second port 71620 on the piston assembly 71600 such that fluid is transportable between the second port 71720 of the control assembly 71700 and the second port 71620 of the piston assembly 71600.

In an example embodiment, the control assembly 71700 is optionally constructed with a control assembly housing to prevent fluid leakage from the control assembly. In addition the housing provides a protective cover to reduce contamination by soil, water, or other environmental conditions. A protective cover is optionally a separate piece that is removable, or is incorporated into a single injection molded part. Optionally, the housing includes a diaphragm 32150 of the control assembly coupled to a rigid push plate 32300, see FIG. 43. A return spring 32400 is further coupled to the push plate 32300 that provides suitable force to compress the push plate 32300 and diaphragm 32150 when pressure is reduced from the fluid source (e.g., via fluid source 71300), see FIGS. 43 and 71. Optionally as previously described herein, the push plate, spring, and diaphragm system is configured with a viscous dampening feature in order to eliminate the effects of noisy (e.g. non-signal) fluid pressure pulses. Optionally, a single or dual acting piston drive is operable in place of the diaphragm, push plate, and spring system. Attached to the push plate 32300 is a cog drive bar or leaf spring 32500 that interfaces with a notched cog wheel 32600. The leaf spring 32500 produce a rotational force in the cog wheel 32600 when the push plate 32300 is raised in response to application of fluid pressure and expansion of the diaphragm 32150. The types of cog wheels and number of cog wheel posts varies as previously described.

Figure 76:
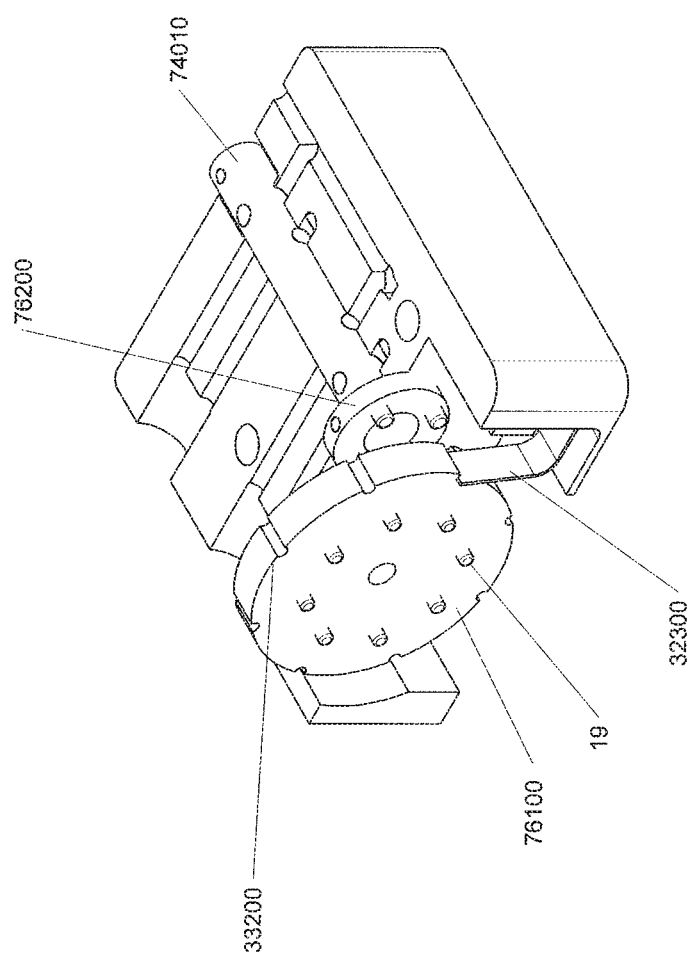
FIG. 76 depicts a cut away view of a portion of a fluid activated actuator assembly.

Optionally, as a variation in the cog wheel mechanisms described above, a dual cog wheel mechanism is used in the NOE control assembly as illustrated in cut away view FIG. 76. In a manner as described in the previous paragraph, the leaf spring 32500 produces a rotational force in a first cog wheel 76100 when the push plate 32300 is raised in response to application of fluid pressure. Optionally, the NOE control assembly 71700 includes an anti-back rotation leaf spring 32300 which is in contact with the cog wheel 76100 and inhibits the rotation of the cog wheel 76100 in response to a reduction in fluid pressure. Further, as described in previous actuator assemblies, a drive bar and/or leaf spring 32500 resets in response to a reduction in fluid pressure. The drive bar or leaf spring 32500 travels down the first cog wheel while the anti-back rotational leaf spring 33500 holds the cog wheel in place. The drive bar/leaf spring clears the cog wheel post and then is in a position to produce a forward rotation in response to a subsequent increase in pressure (see also FIGS. 43 and 76 for exemplary embodiments of cog wheel and drive bar/leaf spring arrangements described in this paragraph).

In this example embodiment, the flip side of the first cog wheel includes a protruding spoked cam. As the first cog wheel 76100 rotates the cam interfaces with the posts of a second cog wheel 76200. With respect to the example embodiment of FIG. 76, the cam 75100 includes 8 spokes and the first cog wheel 76300 includes 8 posts. Each operator intended fluid pressure transition (e.g., an increase in fluid pressure above a specific threshold) causes the first cog wheel 76100 to rotate a fixed percentage, for example 45 degrees. If the interfacing second cog wheel has 4 posts as illustrated in FIG. 8, then each positive fluid pressure transition will cause the smaller second cog wheel and connected pilot valve shaft 74010 to transition 90 degrees. In this example embodiment, each 90 degree transition of the pilot valve shaft 74010 causes the associated butterfly valve to open or close (by directing working fluid into the piston assembly as further described below).

An example embodiment of a dual cog wheel with an 8 post and 8 spoked cam is a system of alternating output fluid flow between two butterfly valves controlled by two NOE actuator assemblies. In this system, each NOE cog wheel 76100 in the two actuators are configured to be out of phase with the other. With respect to the first actuator, in response to a first application of an increase in fluid pressure in the input line, the first cog wheel 76100 advances 45 degrees. The rotation of the cog wheel 76100 causes a 90 degree rotation of the smaller second cog wheel 76200 that is engaged with the cog wheel 76100 via a post and spoke engagement. A 90 degree rotation of the pilot valve which is connected to the second cog wheel 76200, see FIG. 76, causes the first output butterfly valve to open (as is described in additional detail below). With respect to the second actuator, at substantially the same time, the first increase in fluid pressure in the input line causes the first cog wheel 76100 to advances 45 degrees. The rotation of the cog wheel 76100 causes a 90 degree rotation of the smaller second cog wheel 76200 that is engaged with the cog wheel 76100 via a post and spoke engagement. A 90 degree rotation of the pilot valve which is connected to the second cog wheel 76200, see FIG. 76, causes the second output butterfly valve to close. In response to a subsequent decrease in fluid pressure in the input line, the leaf spring/drive bar of actuators 1 and 2 are reset (leaf spring/drive bar advances to the next cog wheel post without changing the first cog wheel position). With respect to the first actuator, a response to a second application of an increase in fluid pressure in the input line causes the first cog wheel 76100 to advances 45 degrees. The rotation of the cog wheel 76100 causes a 90 degree rotation of the smaller second cog wheel 76200 that is engaged with the cog wheel 76100 via a post and spoke engagement. A 90 degree rotation of the pilot valve which is connected to the second cog wheel 76200, see FIG. 76, causes the first output butterfly valve to close. With respect to the second actuator, at substantially the same time, the second application of an increase in fluid pressure in the input line causes the first cog wheel 76100 to advances 45 degrees. The rotation of the cog wheel 76100 causes a 90 degree rotation of the smaller second cog wheel 76200 that is engaged with the cog wheel 76100 via a post and spoke engagement. A 90 degree rotation of the pilot valve which is connected to the second cog wheel 76200, see FIG. 76, causes the second output butterfly valve to open. In response to a subsequent decrease in fluid pressure in the input line, the leaf spring/drive bar of actuator 2 is reset. The system continues to alternate output fluid flow between the first output valve and the second output valve in response to operator intended pressure signals. (Note, as previously described herein, forward movement of the first cog wheel 76100 can occur in response to either a positive fluid pressure transition or a negative fluid pressure transition depending upon the diaphragm/drive bar configuration.)

Figure 77:
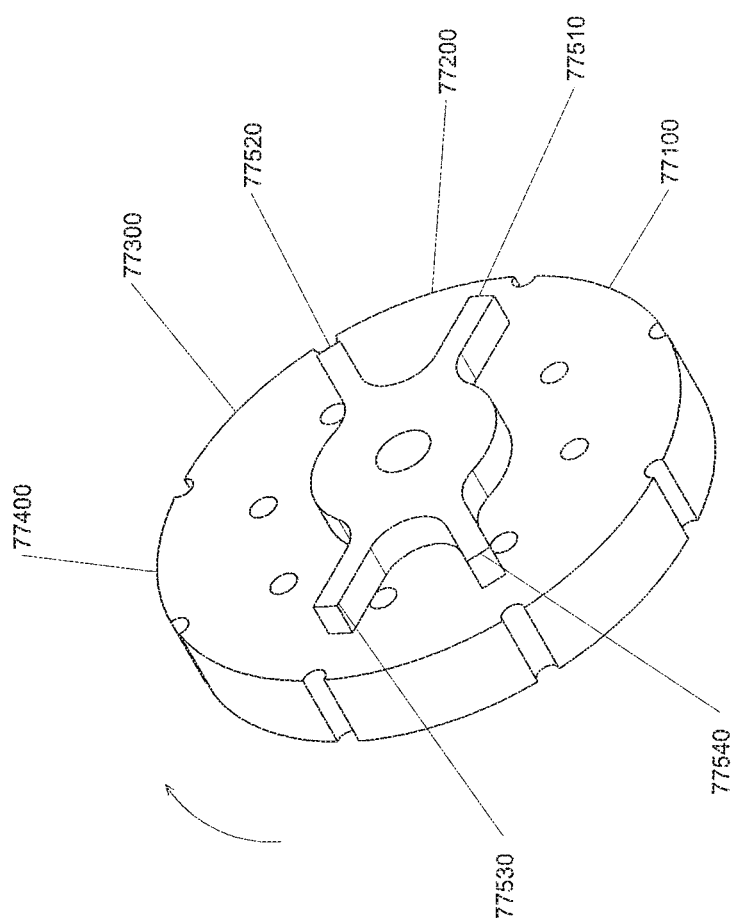
FIG. 77 depicts another example cam cog wheel with spokes.

A system of sequenced output fluid flow across 4 output butterfly valves illustrates an example operational use of a dual cog wheel with an 8 post and 4 spoked cam, see FIG. 77. Optionally, in this system the output valves are connected in a serial fashion using conventional plumbing fittings. In this system, each NOE cog wheel 76100 in the four actuators are configured to be out of phase with each the other. In an example embodiment, relative to the southwest corner post of the second cog wheel 76200 in FIG. 76, actuator 1 (which controls output valve 1) is configured in position 77100, see FIG. 77. Similarly, with respect to FIG. 77, actuator 2 is configured in position 77200, actuator 3 is configured in position 77300, and, actuator 4 is configured in position 77400. In response to a first application of an increase in fluid pressure in the input line, the spoke 77510 of actuator 1 engages the southwest corner post of the second cog wheel causing the connected/joined pilot valve to rotate 90 degrees and open valve 1 (see also FIG. 76). At substantially the same time, the first application of an increase in fluid pressure in the input line causes the first cog wheel 76100 of actuator 2 to advances 45 degrees. The rotation of the cog wheel 76100 causes a 90 degree rotation of the smaller second cog wheel 76200. The spoke 77520 of actuator 2 engages the southwest corner post of the second cog wheel causing a 90 degree rotation of the associated pilot valve further causing the output butterfly valve 2 to close. At substantially the same time, the first application of an increase in fluid pressure in the input line causes the first cog wheel 76100 of actuators 3 and 4 to advances 45 degrees. Because the cam spoke of the first cog wheel does not engage a post of the second cog wheel of actuators 3 and 4, the previously closed output valves 3 and 4 remain closed. Therefore, in response to the first pressure signal, the input valve fluid is directed to the open output valve 1 while output valve 2 closes, and output valves 3 and 4 remain closed.

In response to a subsequent decrease in fluid pressure in the input line, the leaf spring/drive bar of actuators 1-4 are reset (advance to the next cog wheel post 19 without affecting the position of the cog wheel 76100).

In response to a second application of an increase in fluid pressure in the input line, the spoke 77530 of actuator 4 engages the southwest corner post of the second cog wheel causing the pilot valve to rotate 90 degrees and open valve 4. At substantially the same time, the increase in fluid pressure in the input line causes the first cog wheel 76100 of actuator 1 to advances 45 degrees. The rotation of the cog wheel 76100 causes a 90 degree rotation of the smaller second cog wheel 76200. The spoke 77520 of actuator 1 engages the southwest corner post of the second cog wheel causing a 90 degree rotation of the associated pilot valve further causing the output butterfly valve 2 to close. At substantially the same time, the second application of an increase in fluid pressure in the input line causes the first cog wheel 76100 of actuators 2 and 3 to advances 45 degrees. Because the cam does not engage a post of the second cog wheel of actuators 2 and 3, the previously closed output valves 2 and 3 remain closed. Therefore, in response to the second pressure signal, the input valve fluid is directed to the open output valve 4 while output valve 1 closes, and output valves 2 and 3 remain closed.

In response to a subsequent decrease in fluid pressure in the input line, the leaf spring/drive bar of actuators 1-4 are reset.

In response to a third application of an increase in fluid pressure in the input line, the spoke 77530 of actuator 3 engages the southwest corner post of the second cog wheel causing the pilot valve to rotate 90 degrees and open valve 3. At substantially the same time, the increase in fluid pressure in the input line causes the first cog wheel 76100 of actuator 4 to advances 45 degrees. The rotation of the cog wheel 76100 causes a 90 degree rotation of the smaller second cog wheel 76200. The spoke 77540 of actuator 4 engages the southwest corner post of the second cog wheel causing a 90 degree rotation of the associated pilot valve further causing the output butterfly valve 4 to close. At substantially the same time, the increase in fluid pressure in the input line causes the first cog wheel 76100 of actuators 1 and 2 to advances 45 degrees. Because the cam does not engage a post of the second cog wheel of actuators 1 and 2, the previously closed output valves 1 and 2 remain closed. Therefore, in response to the third pressure signal, the input valve fluid is directed to the open output valve 3 while output valve 4 closes, and output valves 1 and 2 remain closed.

In response to a subsequent decrease in fluid pressure in the input line, the leaf spring/drive bar of actuators 1-4 are reset.

In response to a fourth application of an increase in fluid pressure in the input line, the spoke 77530 of actuator 2 engages the southwest corner post of the second cog wheel causing the pilot valve to rotate 90 degrees and open valve 2. At substantially the same time, the increase in fluid pressure in the input line causes the first cog wheel 76100 of actuator 3 to advances 45 degrees. The rotation of the cog wheel 76100 causes a 90 degree rotation of the smaller second cog wheel 76200. The spoke 77540 of actuator 3 engages the southwest corner post of the second cog wheel causing a 90 degree rotation of the associated pilot valve further causing the output butterfly valve 3 to close. At substantially the same time, the increase in fluid pressure in the input line causes the first cog wheel 76100 of actuators 1 and 4 to advances 45 degrees. Because the cam does not engage a post of the second cog wheel of actuators 1 and 4, the previously closed output valves 1 and 4 remain closed. Therefore, in response to the fourth pressure signal, the input valve fluid is directed to the open output valve 2 while output valve 3 closes, and output valves 1 and 4 remain closed.

Valve actuation continues in the described sequence as determine by the fluid source control timer and associated fluid pressure changes. Time durations are set for each output port per normal timer operation.

A variable number of first cog wheel posts, first cog wheel cam spokes, second cog wheel posts, and valve shaft ports enable the apparatus to manage a number of output valves in varying sequences. The examples above illustrate how varying the number of cam spokes for a 4 post second cog wheel allow for the control of various output valves (e.g., two or four output valves). Other configurations are similarly operable. While the examples above directs the input fluid to a single output valve, optionally, the input fluid can be directed to multiple valves in a sequence.

In this example embodiment, the NOE control assembly 71700 optionally includes a pilot valve shaft 74010 which is rotatable and interfaces one or more fluid passages via one or more pilot valve ports. In this example embodiment, the pilot valve shaft 74010 includes one or more pilot valve ports including, for example, 74100, 74200, 74300, 74400, and 74500, and 74700. Optionally, the pilot valve ports interface with one or more fluid passages, including for example, 74150, 74250, 74350, and 74450. Optionally, the pilot valve shaft includes one or more separate fluid passages, including for example, 74700 and 74800. The pilot valve shaft 74010 is secured to the second cog wheel 76200 such that rotation of the cog wheel 76100 produces rotation in the pilot valve shaft 74010 as described above. The pilot valve shaft 74010 is optionally cylindrical in shape. Optionally, the pilot valve shaft 74010 meets the second cog wheel 76200 in a pressure fitting such that the association of the two parts provides sufficient frictional force that rotation of the cog wheel translates to rotation of the valve shaft. It is also appreciated in the art that the cog wheel and valve shaft are optionally affixed with an adhesive or by press fit. The second cog wheel 76200 and pilot valve shaft 74010 are optionally formed from a single unitary piece eliminating the need for fitting a separate pilot valve shaft 74010 and second cog wheel 76200.

In the example embodiment, the pilot valve shaft 74010 optionally includes two internal and separate fluid passages, 74700 and 74800. Optionally, the left fluid passage 74700 includes one or more pilot valve ports 74100 and 74200 leading to the piston assembly 71600. Optionally, the fluid passage 74700 additionally includes a pilot valve port 74500 to a working fluid inlet passage. Optionally, the fluid passage 74800 includes one or more pilot valve ports 74300 and 74400 leading to the piston assembly 71600. Optionally, the fluid passage 74800 additionally includes a pilot valve port 74700 to an exhaust fluid outlet passage.

Figure 74:
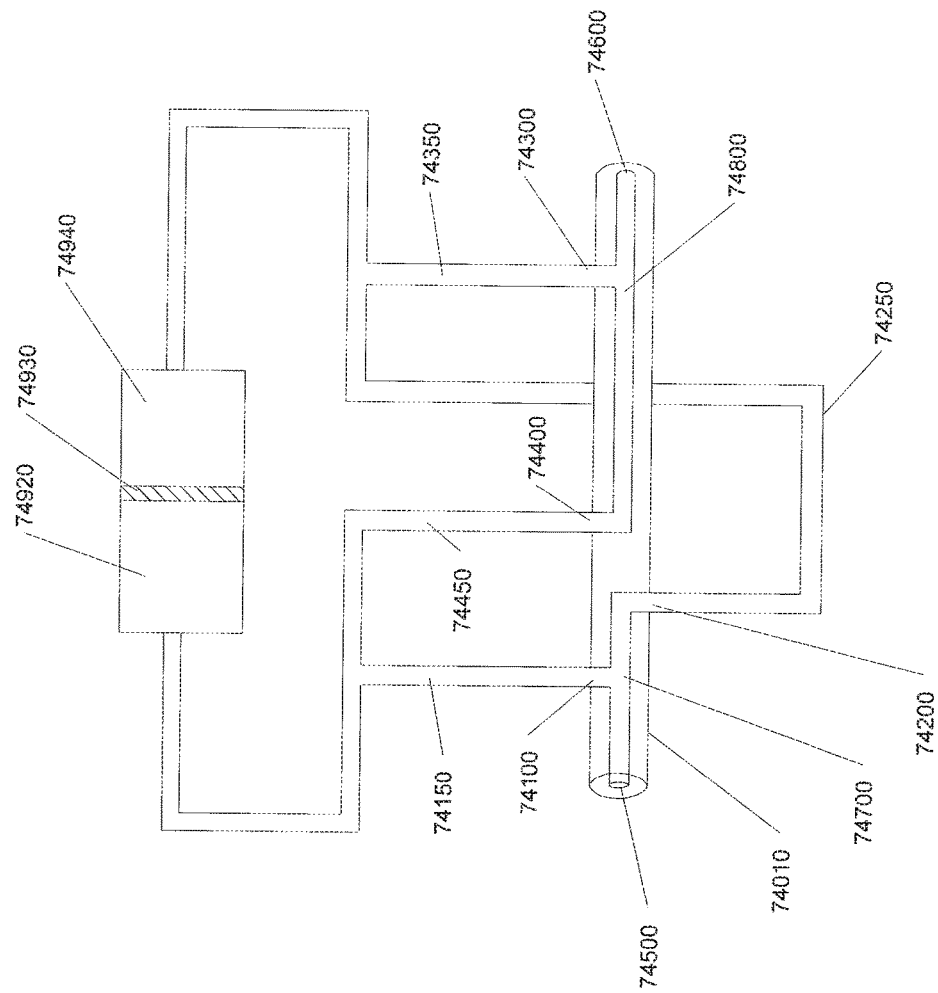
FIG. 74 depicts an example embodiment of one or more fluid channels in an example fluid activated actuator assembly.
Figure 75:
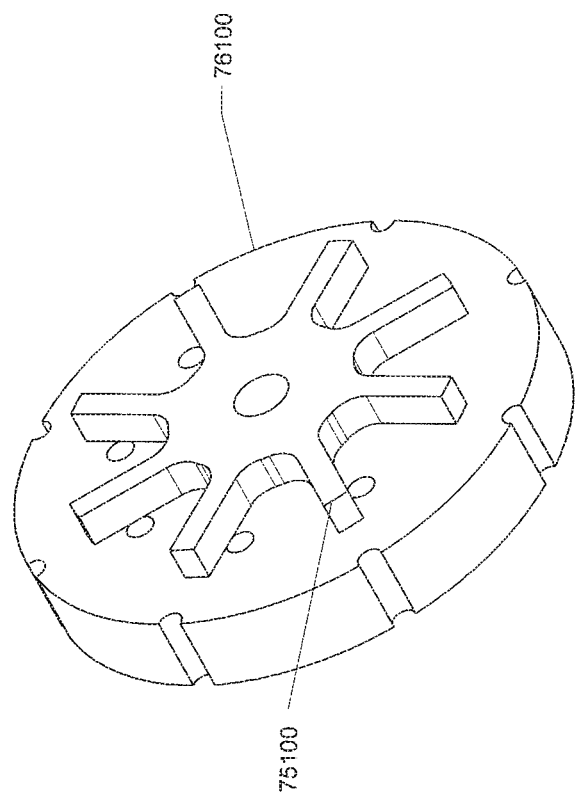
FIG. 75 depicts an example cam cog wheel with spokes.

The NOE control assembly 71700 optionally includes one or more fluid passages 74150, 74250. 74350, and 74450 that optionally interface in rotation with 74700 and 74800 via the pilot valve ports 74100, 74200, 74300, and 74400, respectively see FIG. 74. When two pilot valve shaft ports 74100 and 74300 as illustrated in FIG. 74 are present in a pilot valve shaft 74010, a 90 degree rotation of the cog wheel 76200 aligns the two pilot valve ports 74100 and 74300 with corresponding NOE control assembly passages 74150 and 74350, respectively, while the pilot valve shaft 74010 blocks the pilot valve shaft ports 74200 and 74400. In this example embodiment, this configuration of the pilot valve shaft enables working fluid to enter the piston assembly chamber 74920 and exhaust from the piston assembly chamber 74940 causing the piston 74930 to move left to right in FIG. 74 as further described below. To continue the example embodiment, a further 90 degree rotation of the cog wheel 76200 aligns the two valve shaft ports 74200 and 74400 with corresponding NOE control assembly passages 74250 and 74450, respectively, while the pilot valve shaft 74010 blocks the pilot valve shaft ports 74100 and 74300. In this example embodiment, this configuration of the pilot valve shaft enables working fluid to enter the piston assembly chamber 74940 and exhaust fluid from the piston assembly chamber 74920 causing the piston 74930 to move right to left in FIG. 74. Optionally, the piston 74930 movement when attached to the actuator arm 71900 is used to open and close, for example, a butterfly valve. Therefore, an arrangement of two NOE actuators 71500 provides alternating flow through each actuators for each 90 degrees of valve shaft 74010 rotation as provided by four cog wheel posts on the cog wheel 76200. It is appreciated that multiple configurations of a pilot valve port are operable herein as previously described.

In an example embodiment, the NOE actuator opens or closes a butterfly valve when pressurized source fluid enters the NOE actuator via a fluid passage into diaphragm chamber 32150. The diaphragm expansion overcomes the return spring 32400 compression and forces linear movement of the rigid pressurized disk 32300 (see for example FIG. 43). The coupled leaf spring 32500 rotates the first cog wheel 76100 into its new position. Optionally, the first cog wheel engages a second cog wheel 76200 as described above to cause a rotation of the second cog wheel and associated pilot valve to a first position. Optionally, the first position aligns the pilot valve port 74200 in the valve shaft 74010 with the fluid passage 74250 and the pilot valve port 74400 in the valve shaft 74010 with the fluid passage 74450. This first position enables a first fluid passage connecting working fluid from the fluid inlet source to the piston chamber 74940 and a second fluid passage venting of the piston chamber 74920. The first position enables a fluid passage consisting of: (a) a fluid inlet source 71200, (b) a working fluid tube passage 71300 from the inlet fluid source to an inlet port 71710 of the actuator control assembly 71700, (c) a control assembly working fluid inflow passage (not shown in the Figure) to the diaphragm chamber 28800, (d) diaphragm chamber 28800, (e) control assembly internal fluid passageway (not shown in the Figure) leading from the diaphragm chamber to the pilot valve shaft port 74500, (f) pilot valve shaft passage 74700, (g) piston chamber access passage 74250 via valve shaft port 74200, (h) a piston access tube fluid passage 71820 via control assembly port 71720, and (i) piston chamber 74940 via piston assembly port 72620. (Note, when the pilot valve shaft is in this position, the piston chamber 74940 exhaust passage 74350 is blocked at the pilot valve shaft port 74300. Thus, while pressurized working fluid can enter this passage, there is no fluid flow into the pilot valve exhaust passage 74800.) The first position of the pilot valve also enables a first venting fluid passage from piston chamber 74920. The first position enables a venting fluid passage consisting of: (a) a piston chamber 74920, (b) a piston access tube fluid passage 71810 via piston assembly port 71610, (c) piston chamber access passage 74450, (d) the pilot valve shaft fluid exhaust passage 74800 via valve shaft port 74400, (e) control assembly internal fluid passageway (not shown in Figure) leading from the pilot valve shaft via pilot valve port 74600, and (f) control assembly exhaust vent to ambient outlet via port 71740 (not shown in Figure) (which vents fluid external to the assembly 71700 including, for example, to the ground, to the outlet 71250, etc.). Fluid entering the piston chamber 74940 exerts a force on the wall of the piston 74930 and coupled with the open first venting passage causes the piston to advance to the left (e.g., in FIG. 74). Optionally, the piston 74930 interfaces with a control arm 71900 of a conventional butterfly valve causing the valve to open.

Upon termination or a decrease of the fluid pressure by a master control valve up stream of the butterfly valve, the pressure is removed from the diaphragm chamber 32150 (e.g., via the working fluid tubing passage from the inlet fluid source to the actuator control assembly 71700 and the control assembly working fluid inflow passage, allowing pressure from the return spring 32400 to contract the diaphragm while the anti-back rotation leaf spring stop prevents the cog wheel 76100 from rotating in the reverse direction by the retraction of the leaf spring 32500.

When pressurized source fluid is reapplied or the pressure is increased over a configurable threshold, the fluid (or increased fluid pressure) enters the control assembly 71700 via a fluid passage 34200 into diaphragm chamber 32150. The diaphragm expansion overcomes the return spring 32400 compression and forces linear movement of the rigid pressurized disk 32300 (see for example FIG. 43). The coupled leaf spring 32500 rotates the cog wheel 76100 into its new position. Optionally, the first cog wheel 76100 engages a second cog 76200 wheel as described above to cause a rotation of the second cog wheel 76200 and associated pilot valve 74010 to a second position. Optionally, the second position aligns the pilot valve port 74100 in the valve shaft 74010 with the fluid passage 74150 and the pilot valve port 74300 in the valve shaft 74010 with the fluid passage 74350. Optionally, the second position enables a fluid passage consisting of: (a) a fluid inlet source 71200, (b) a working fluid tube passage 71300 from the inlet fluid source to an inlet port 71710 of the actuator control assembly 71700, (c) a control assembly working fluid inflow passage (not shown in the Figure) to the diaphragm chamber 28800, (d) diaphragm chamber 28800, (e) control assembly internal fluid passageway (not shown in the Figure) leading from the diaphragm chamber to the pilot valve shaft port 74500, (f) pilot valve shaft passage 74700, (g) piston chamber access passage 74150 via valve shaft port 74100, (h) a piston access tube fluid passage 71810 via control assembly port 71730, and (i) piston chamber 74920 via piston assembly port 72610. (Note, when the pilot valve shaft is in this position, the piston chamber 74920 exhaust passage 74450 is blocked at the pilot valve shaft port 74400. Thus, while pressurized working fluid can enter this passage, there is no fluid flow into the pilot valve exhaust passage 74800.) The first position of the pilot valve also enables a first venting fluid passage from piston chamber 74940. The first position enables a venting fluid passage consisting of: (a) a piston chamber 74940, (b) a piston access tube fluid passage 71820 via piston assembly port 71620, (c) piston chamber access passage 74350, (d) the pilot valve shaft fluid exhaust passage 74800 via valve shaft port 74300, (e) control assembly internal fluid passageway (not shown in Figure) leading from the pilot valve shaft via pilot valve port 74600, and (f) control assembly exhaust vent to ambient outlet via port 71740 (not shown in Figure) (which vents fluid external to the assembly 71700 including, for example, to the ground, to the outlet 71250, etc.). Fluid entering the piston chamber 74920 exerts a force on the wall of the piston 74930 and coupled with the open first venting passage causes the piston to advance to the right (e.g., in FIG. 74). Optionally, the piston 74930 interfaces with a control arm 71900 of a conventional butterfly valve causing the valve to close.

In an example embodiment, the pressure delta feature, viscous dampening, and timing device previously described are used in the NOE actuator.

In an example embodiment, the NOE actuator provides user access to either the first or second cog wheel. Optionally, the user can manually rotate the cog wheels in order to modify the state of the actuator. Optionally, the edge of the cog wheel is color coded and/or numbered indicating to the user the current state of the NOE actuator as previously described.

In an example embodiment, the type of NOE actuator can be reconfigured by a user in the field of operation by removing the top housing case, removing the first cog wheel of a first type and replacing it with a first cog wheel of a second type. The reconfiguration is completed with the installation of the top housing case.

Port Timing—Diaphragm Regulators

In an example embodiment, the pressure controlled regulators described above include port timing features with respect to certain types of valves including diaphragm valves. The illustrated pressure controlled regulators/controllers operate in environments in which it is desirable in a sequenced valve transition to have two or more valves open or two or more valves closed during state transitions. For example, the operator/user can configure the system of regulators to ensure all valves are closed during a state transition to ensure that there is sufficient fluid pressure to reliably cause the components of the pressure controlled regulators to operate properly (e.g., sufficient pressure to cause a one or more cog wheels in a regulator to rotate a set number of degrees (e.g., 90 degrees)). In another example, the operator/user can configure the system of regulators to ensure all valves are open during a state transition to minimize the effect of water hammer during a transition.

In an example embodiment, port timing features are provided by varying the angle of the ports in the pilot valves. As described above, as pilot valve ports interface with fluid passages/channels, the ports enable fluid to enter or exit one or more chambers and/or exhaust to ambient. Pilot valves ports configured at varying angles and/or size relative to each other effect valve transitions at different times.

In an example embodiment, an operator/user configures a system of two valves to sequence on/off repeatedly in response to pressure signals (e.g. a decrease and increase in pressure) from a master controller. In this example, the operator/user is using angled pilot valve ports of various port hole dimensions to configure both valves closed during valve transitions. In this example, the operator/user is using diaphragm valves of the type illustrated in FIG. 31 in which opening an exhaust fluid passage from chamber 31200 causes the valve to open. To close the valve illustrated in FIG. 31, an exhaust fluid passage from chamber 31200 is closed and a fill fluid passage is opened into the chamber 31200. In this example system, the system is initially configured with a valve A in the open position with a corresponding exhaust passage open and a valve B is in the closed position with a corresponding exhaust passage closed and fill passage open. In this example, in response to a decrease in fluid pressure, both valve A's and valve B's regulator reset as previously described above (e.g., a drive bar is repositioned on a cog wheel). In response to an operator intended pressure signal (e.g., a subsequent increase in fluid pressure), the cog wheels in both valve A and valve B advance synchronously. In this example, the port interfacing with the fill passage in regulator A is set at an angle forward to that of the exhaust passage in regulator B and is configured as a wider port. As the cog wheels advance, valve A closes in response to a closed exhaust fluid passage and an open fluid fill passage entering the closed chamber 31200. At this point, both valve A and valve B are simultaneously closed. As the cog wheel continues to advance and nears the drive bar full extension, valve B opens in response to an opening of the exhaust passage via a pilot valve port.

Continuing with this example, in response to a decrease in fluid pressure, both valve A and valve B reset as previously described above. In response to an operator intended pressure signal (e.g., a subsequent increase in fluid pressure), the cog wheels in both valve A and valve B advance synchronously. In this example, the port interfacing with the fill passage in regulator B is set at an angle forward to that of the exhaust passage in regulator A and is configured as a wider port. As the cog wheels advance, valve B closes in response to a closed exhaust fluid passage and an open fluid fill passage entering the closed chamber 31200. At this point, both valve A and valve B are simultaneously closed. As the cog wheel continues to advance and nears the drive bar full extension, valve A opens in response to an opening of the exhaust passage via a pilot valve port. The valve sequencing continues in the manner describe in response to operator intended user/operator pressure changes. Therefore, as illustrated in the example embodiment above, varying the pilot valve port angle and/or port size can alter the timing of valve state transitions including sequenced valve state transitions in a system of valves.

Delay Actuation—Butterfly Regulators I

In an example embodiment, the pressure controlled regulators described above include delay actuation features with respect to certain types of valves including butterfly valves. The illustrated pressure controlled regulators/controllers operate in environments in which it is desirable in a sequenced valve transition to have two or more valves open or two or more valves closed during valve state transitions. For example, the operator/user can configure the system of regulators to ensure all valves are closed during a state transition to ensure that there is sufficient fluid pressure to reliably cause the components of the pressure controlled regulators to operate properly (e.g., sufficient pressure to cause a cog wheel in a regulator to rotate a set number of degrees (e.g., 90 degrees)). The example embodiment below illustrates the use of a delay prior to the closure of a valve. In a system of similarly configured regulators, the delay enables all valves in the system to be configured closed during any valve state transition within the system.

In an example embodiment, the delay assembly functions in response to a fluid pressure signal (e.g., an operator intended increase in pressure), a piston of the assembly travels in a piston cylinder for a period of time prior to engaging an actuator arm of the butterfly valve. The piston travel time period prior to engagement of the actuator arm is the delay period of the assembly. Once the piston engages with the butterfly valve actuator arm the valve opens as the piston continues to travel in the piston cylinder. In response to a second fluid pressure signal, the piston travels in the opposite direction. In the piston return stroke, the butterfly valve is engaged with the butterfly valve actuator arm and the butterfly valve closes without a delay. Once the butterfly valve is closed, the piston rod disengages from the butterfly valve and travels to the far end of the piston cylinder or the start position.

Figure 84:
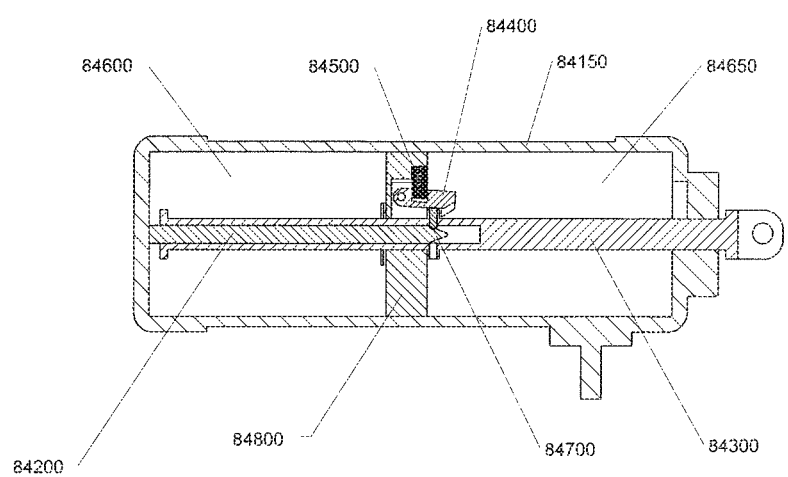
FIG. 84 depicts a cross sectional view of an example delay assembly that can be configured with a fluid activated actuator assembly.

FIG. 84 illustrates a cross sectional view of a delay assembly that can be configured with a regulator 71700. Optionally, the delay assembly comprises: a cylinder 84150 housing, a fixed release post 84200, a piston rod 84300, a latch 84400, a return latch spring 84500, a latch lifter pin 84700, a piston 84800, a left fluid chamber 84600, and a right fluid chamber 84650.

Figure 85:
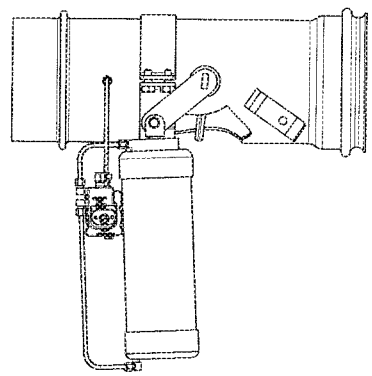
FIG. 85 depicts an example butterfly valve operating environment for a fluid activated actuator assembly with a configured example delay assembly.
Figure 86:
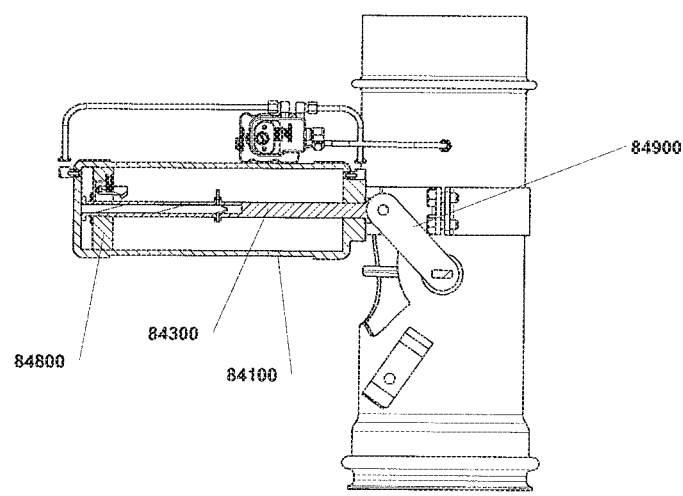
FIG. 86 depicts an example butterfly valve operating environment for a fluid activated actuator assembly with a configured example delay assembly in which the delay assembly is illustrated with a cross sectional view.

In an example embodiment, the NOE regulator with the delay assembly is configured in association with a butterfly valve as illustrated in FIG. 85 and functions as described herein with respect to cross-sectional piston views in FIGS. 86-95. FIG. 86 illustrates the delay assembly in an optional start position. In the start position, the piston 84800 is positioned at the far left of the piston cylinder 84150 and the piston rod 84300, connected to the butterfly valve actuator arm 71900, is similarly positioned at the far left in the piston cylinder 84150. The piston 84800 is configured in the cylinder body using, for example, O-ring seals to enable the piston 84800 to travel freely within the cylinder body from left-to-right or right-to-left in FIG. 84 without loss of fluid between the left fluid chamber 84600 and right fluid chamber 84650. Optionally, the piston 84800 is similarly configured with respect to the interface between the piston 84800 and the piston rod 84300. For example, the use of O-ring seals enable the piston 84800 to travel freely over the piston rod 84300 without a loss of fluid between the two fluid chambers. Optionally, the delay assembly includes a fixed release post 84200 through the centerline of the cylinder body 84150 which is configured to interface with a piston rod 84300 via a bore hole in the piston rod 84300.

Figure 87:
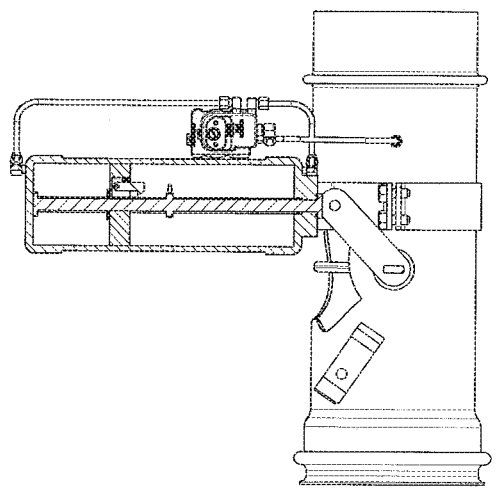
FIG. 87 depicts an example butterfly valve operating environment for a fluid activated actuator assembly with a configured example delay assembly in which the delay assembly is illustrated with a cross sectional view.
Figure 88:
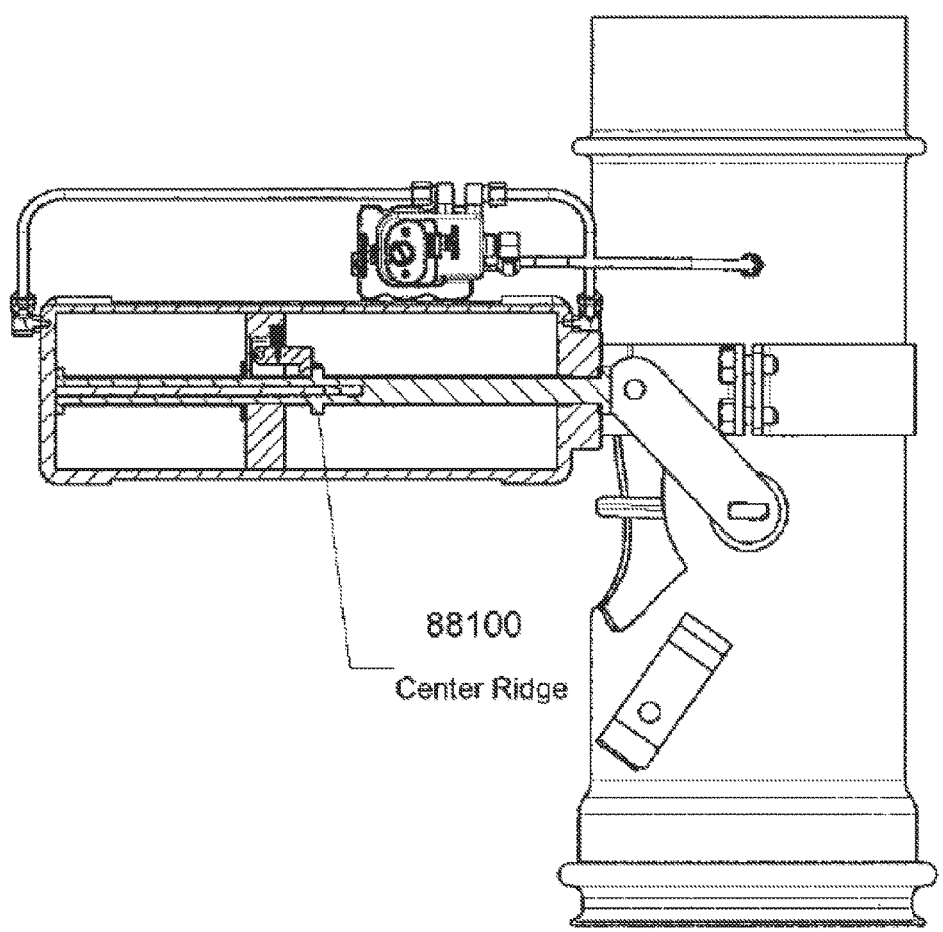
FIG. 88 depicts an example butterfly valve operating environment for a fluid activated actuator assembly with a configured example delay assembly in which the delay assembly is illustrated with a cross sectional view.
Figure 89:
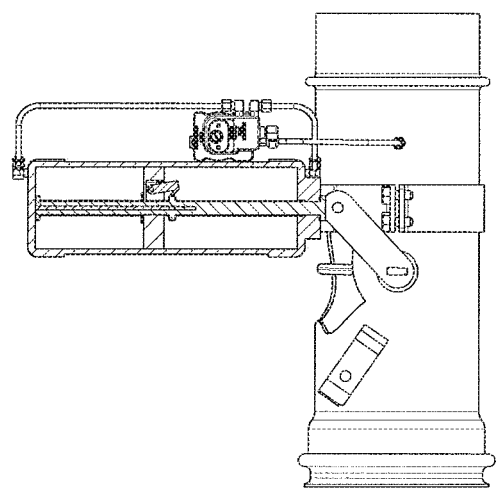
FIG. 89 depicts an example butterfly valve operating environment for a fluid activated actuator assembly with a configured example delay assembly in which the delay assembly is illustrated with a cross sectional view.
Figure 90:
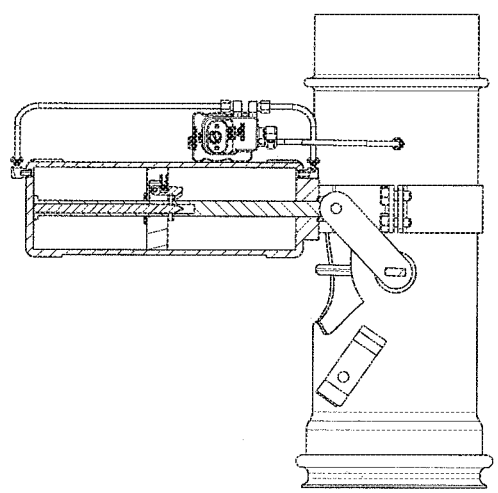
FIG. 90 depicts an example butterfly valve operating environment for a fluid activated actuator assembly with a configured example delay assembly in which the delay assembly is illustrated with a cross sectional view.
Figure 91:
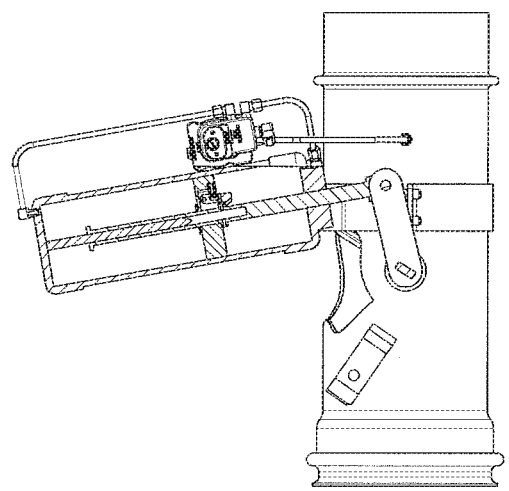
FIG. 91 depicts an example butterfly valve operating environment for a fluid activated actuator assembly with a configured example delay assembly in which the delay assembly is illustrated with a cross sectional view.
Figure 92:
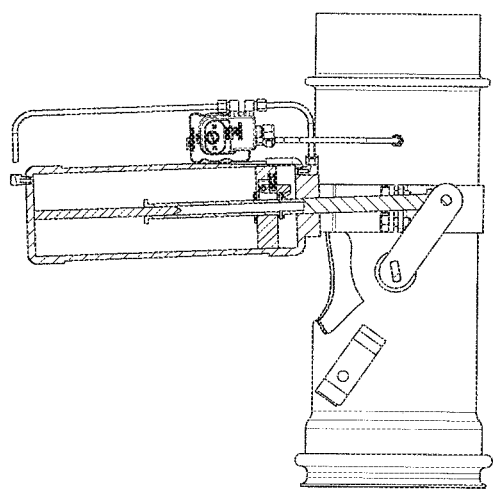
FIG. 92 depicts an example butterfly valve operating environment for a fluid activated actuator assembly with a configured example delay assembly in which the delay assembly is illustrated with a cross sectional view.

In this example embodiment, the butterfly valve is closed when the piston rod 84300 and actuator arm 71900 are to their far left as illustrated in FIG. 86. In response to a fluid pressure signal (e.g., an operator intended increase in pressure), working fluid is directed into the fluid chamber 84600 and the fluid in chamber 84650 is opened (e.g., to ambient). The piston 84800 travels laterally to the right in FIG. 86 in response to the fluid pressure as illustrated in FIG. 87. As the piston 84800 travels to the right, the piston rod 84300 and connected actuator arm 71900 remain fixed to the far left and the butterfly valve remains closed. The piston 84800 continues to travel laterally to the right until the piston 84800 and latching mechanism 84400 comes into contact with a piston rod center ridge 88100 and latch lifter pin 84700 as illustrated in FIG. 88. As the latch moves to the right, the tapered edge of the latch 84400 travels over the top of the piston rod center ridge 88100 and compresses the latch return spring 84500, see FIG. 89. When the latch 84400 travels past the piston rod center ridge 88100, the return spring 84500 returns the latch 84400 to a horizontal position as illustrated in FIG. 90. At this approximate mid-point travel position of the piston 84800, in this example embodiment, the piston engages with the piston rod center ridge 88100 and moves the piston rod 84300 and connected actuator arm 71900 as the piston 84800 continues laterally to the right. The time period from the initial movement of the piston 84800 from the far left of the cylinder body 84150 until the engagement of the piston 84800 with the piston rod center ridge 88100 is the delay time period of the delay assembly 84100. Optionally, two or more butterfly valves are closed during at least a portion of the delay time period as described above. Optionally, the delay period can be configured by the size (e.g., length and diameter) of the cylinder body, the location of the center ridge 88100, and/or the rate at which fluid enters the piston chamber 84600. As fluid continues to enter the piston chamber 84600, the piston 84800 and piston rod 84300 travels laterally to the right as illustrated in FIG. 91. In this example embodiment, the regulator is affixed to the butterfly valve using a swivel configuration to enable the NOE regulator to rotate slightly on the regulator's axis. A slight rotation of the NOE regulator enables the linear piston rod 84300 to move through the arc of the actuator arm (the interfacing point of the piston rod 84300 and the actuator arm 71900 follows an arc as the butterfly valve is opened or closed). FIGS. 87 and 91 illustrate the movement of the NOE regulator from a position perpendicular (e.g., 90 degrees) to the butterfly valve in FIG. 87 to a position swiveled off of center in FIG. 91. In this example embodiment, the maximum swivel occurs when the actuator arm 71900 is parallel to the butterfly valve. Optionally, the fluid channel 71300 is flexible in order to accommodate the swivel rotation of the NOE regulator. Optionally, other mechanisms are used to interface the piston rod 84300 with a conventional butterfly valve actuator arm 71900 known to those skilled in the art of mechanical design. For example, a piston rod 84300 with a limited amount of flex (e.g., enough flex to accommodate the actuator arm). Another example, is a piston rod 84300 with a swivel connector at the end of the rod interfacing with the actuator arm 71900. When the piston 84800 reaches the far end of the piston as illustrated in FIG. 92, the butterfly valve is in the fully open position. The regulator remains in this piston rod 84300 extended position until the regulator receives a fluid pressure signal.

Figure 93:
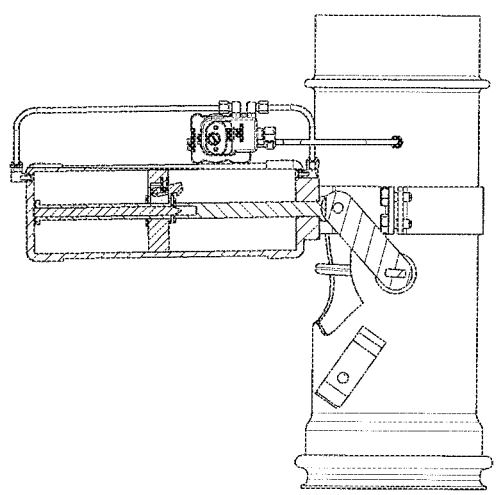
FIG. 93 depicts an example butterfly valve operating environment for a fluid activated actuator assembly with a configured example delay assembly in which the delay assembly is illustrated with a cross sectional view.
Figure 94:
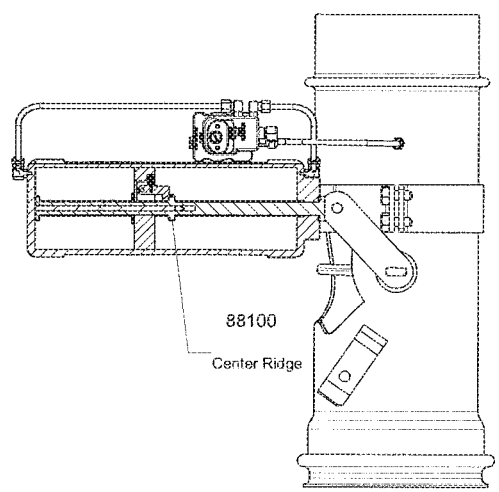
FIG. 94 depicts an example butterfly valve operating environment for a fluid activated actuator assembly with a configured example delay assembly in which the delay assembly is illustrated with a cross sectional view.
Figure 95:
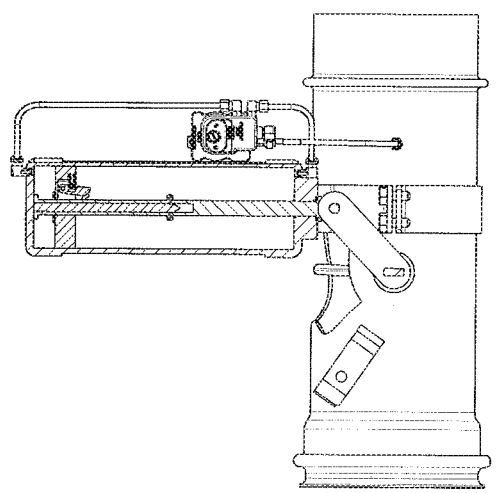
FIG. 95 depicts an example butterfly valve operating environment for a fluid activated actuator assembly with a configured example delay assembly in which the delay assembly is illustrated with a cross sectional view.
Figure 96:
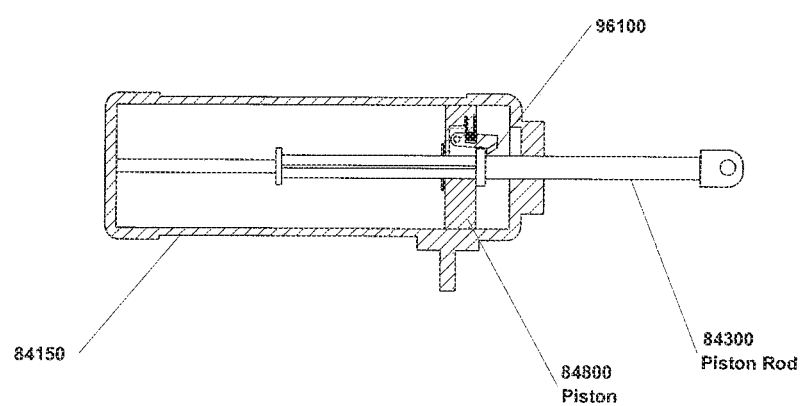
FIG. 96 depicts a cross sectional view of an example delay assembly.
Figure 97:
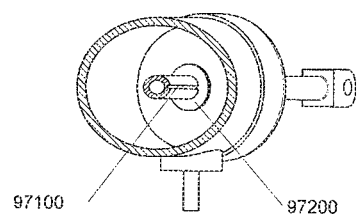
FIG. 97 depicts an example embodiment of a piston rod configurable in an example delay assembly.

Continuing with the illustration of the example embodiment, in response to a fluid pressure signal, fluid enters the right piston chamber 84650 and fluid exhausts from the left piston chamber 84600 creating a piston 84800 return stroke. The latch 84400 engages the piston rod center ridge 88100 forming a union between the piston 84800 and the piston rod 84300. The butterfly valve closes as the piston 84800 and piston rod 84300 travels laterally to the left (note: there is no delay in the regulator return stroke to close the valve in this example embodiment). The piston 84800 travels laterally to the left until the latch lifter pin 84700 interfaces with release post 84200 as illustrated in FIG. 93. As the piston continues to travel to the left, the tapered edge of the release post 84200 forces the latch lifter pin 84700 upward. The latch lifter pin 84700 force exerted on the Latch mechanism 84400 overcomes the return spring 84500 and lifts the latch 84400 upward as illustrated in FIG. 93. When the latch lifter pin 84700 reaches the untapered edge of the release post 84200, the latch 84400 clears the center ridge 88100 of the piston rod 84300 causing the piston 84800 and latching mechanism 84400 to disengage from the piston rod 84300 as illustrated in FIG. 94. In this example embodiment, the latch 84400 includes a center groove 96100 down the center of the latch as illustrated in FIG. 96. This groove enables the latch 84400 to travel over the latch lifter pin 84700 as the latch 84400 disengages from the piston rod center ridge 88100. In this example embodiment, the piston rod 84300 includes groove 97100 and a tab in the washer 97200 which is fixed to the piston that prevents relative rotation between the piston rod 84300 and the piston 84800 as illustrated in FIG. 97. This assures that the latch 84400 and release mechanism are properly aligned (e.g., in order that the latch does not get caught on the latch lifter pin). The piston 84800 continues to travel to the left as illustrated in FIG. 95 until the piston 84800 reaches the far left of the left fluid chamber 84600 or the start position.

Delay Actuation—Butterfly Regulators II

The delay assembly described above is an example embodiment but other embodiments are also possible. This section describes a second example embodiment of a delay assembly for a butterfly valve. Similar, to the first delay assembly the second delay assembly employs a piston traveling through a piston cylinder prior to engaging the butterfly valve actuator arm; the delay period of the assembly. On the piston return stroke, the piston rod immediately closes the valve and then releases from a delay unit housing to travel to the far end of the piston cylinder.

Figure 98:
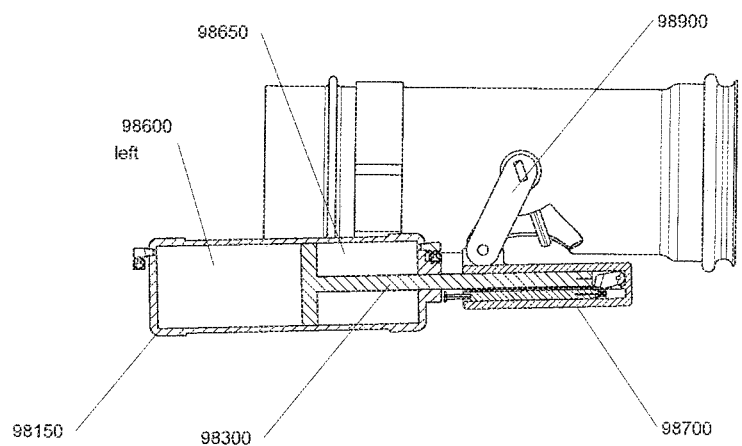
FIG. 98 depicts a cross sectional view of an example butterfly valve configured with another example delay assembly embodiment.

FIG. 98 illustrates a cross sectional view of an example butterfly valve configured with a delay assembly. Optionally, the second delay assembly includes a cylinder body 98150, a left fluid chamber 98600, a right fluid chamber 98650, a piston rod 98300, and a delay unit 98700.

Figure 99:
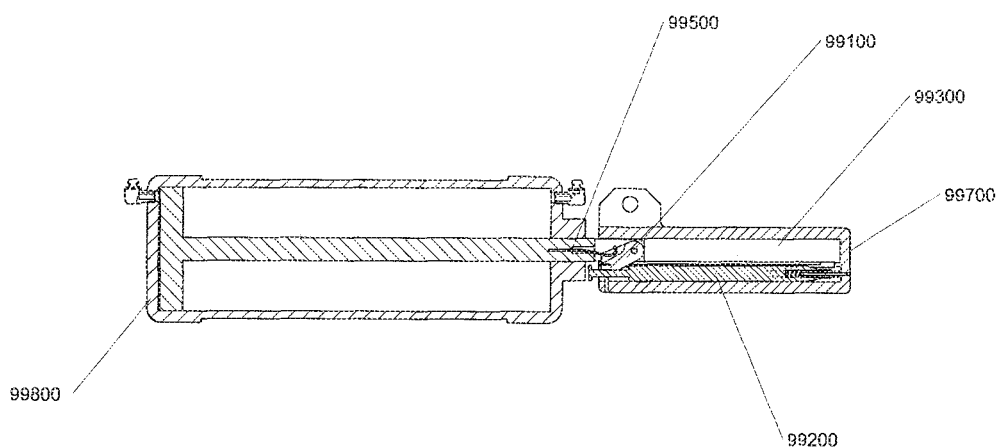
FIG. 99 depicts a cross sectional view of an example delay assembly.

In an example embodiment, the NOE regulator with the delay assembly is configured in association with a butterfly valve as illustrated in FIG. 98 and functions as described herein with respect to cross-sectional piston views in FIGS. 99-103. FIG. 99 illustrates the delay assembly in an optional start position. In the start position, the piston rod 98800 is positioned at the far left of the piston body. The piston rod 98300 is configured in the cylinder body using, for example, O-ring seals to enable the piston rod 98300 to travel freely within the cylinder body from left-to-right or right-to-left in FIG. 84 without loss of fluid between left fluid chamber and right fluid chamber.

Figure 100:
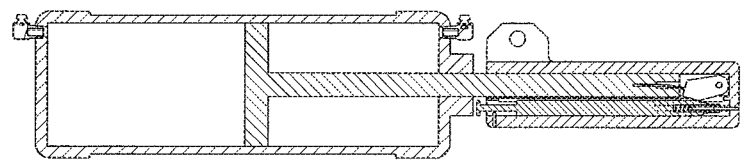
FIG. 100 depicts a cross sectional view of an example delay assembly.
Figure 101:
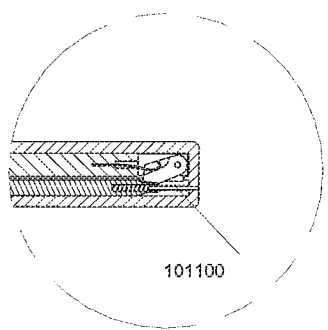
FIG. 101 depicts a cross sectional view of a portion of an example delay assembly.
Figure 102:
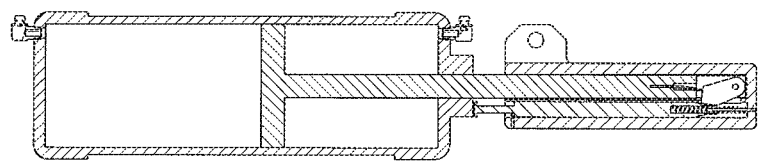
FIG. 102 depicts a cross sectional view of an example delay assembly.

In this example embodiment, the butterfly valve is closed when the piston rod 98300 and actuator arm 71900 are to their far left. Optionally, in the start position, a latch 99100 is positioned in a notched location of a release bar 99200. Optionally, the latch 99100 is held in the notched position with a tension spring 99500 (e.g., a wire spring). In response to a fluid pressure signal (e.g., an operator intended increase in pressure), working fluid is directed into the left fluid chamber 98600 and the right fluid chamber 98650 is opened (e.g., to ambient). The piston rod 98300 travels laterally to the right in response to fluid pressure as illustrated in FIG. 100. Initially, as the piston rod 98300 travels to the right, the actuator arm 71900 remain fixed to the far left and the butterfly valve remains closed. With respect to the latching mechanism 99100, as the piston rod 98300 travels to the right, the latch 99100 releases upward out of the notched position when the latch contacts the edge of the release bar 99200 as illustrated in FIG. 99 The piston rod 98300 and latch 99100 travel laterally to the right down the bore in the delay unit housing 98700 to the mid-point of the piston cylinder when the piston rod 98300 nears the wall of the delay unit housing 98700 as illustrated in FIG. 100. The piston rod 98300 contacts the delay unit housing 98700 and forces the delay unit housing 98700 away from the piston cylinder 99800 or to the right as illustrated in FIG. 102. The delay unit housing 98700 is affixed to the actuator arm 71900. The actuator arm 71900 moves in tandem with the delay unit 98700 and the butterfly valve closes. The time period from the initial movement of the piston rod 98300 from the left edge of the cylinder housing until the engagement of the delay unit housing at the end of the bore is the delay time period of the second delay assembly. Optionally, two or more butterfly valves are closed during at least a portion of the delay time period. Optionally, the delay time period can be configured by the size (e.g., length and diameter) of the cylinder body, the length of the delay unit housing 98700, and/or the rate at which fluid enters the piston chamber 84600. In the initial stage of the delay unit housing 98700 movement away from the cylinder housing 99800, the release bar 99200 is forced in a direction opposite of the delay unit housing by a spring 101100 as illustrated in FIG. 101. As the release bar 99200 moves to the left relative to the delay housing 98700, the latch 99100 is forced via a spring 99500 (e.g., a wire tension spring) into a notch in the delay unit housing 98700. At this point the latch 99100 is engaged with the delay unit assembly 98700. As fluid enters the piston chamber 98600, the piston rod 98300 continues to travel laterally until the piston rod interfaces with the cylinder housing on the far right as illustrated in FIG. 102. In this piston rod 98300 fully extended position, the butterfly valve is in the fully open position. The regulator remains in this end position until the regulator receives a subsequent fluid pressure signal. (Note, the delay assembly and regulator swivel to accommodate the arc of the actuator arm 71900 when opening or closing the butterfly valve as previously described.)

Figure 103:
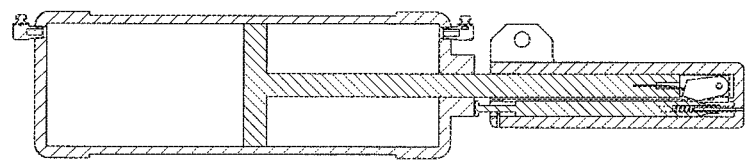
FIG. 103 depicts a cross sectional view of an example delay assembly.

Continuing with the illustration of the example embodiment, in response to a fluid pressure signal, fluid enters the right piston chamber 98650 and fluid exhausts from the left piston chamber 98600. In response to the fluid pressures, the piston rod and connected (e.g. via the latch 99100) delay unit housing 98700 travels laterally to the left. In this example embodiment, as the piston rod 98300 nears the mid-point of the cylinder housing, the protruding release bar 99200 contacts the cylinder housing as illustrated in FIG. 101. The piston rod 98300 force overcomes the spring tension and compresses the spring 101100. As the spring 101100 compresses, the release bar is fixed relative to the left moving delay housing unit 98700. As the delay unit 98700 moves to the left, the tapered end of the release bar 99200 forces the latch 99100 upward against the spring 99500 (e.g., wire spring) and out of the delay unit housing notch as illustrated in FIG. 103. The piston rod 98300 and latching mechanism 99100 travel down the bore of the delay unit 98700. As the piston rod nears the far left cylinder housing 99800, the latch 99100 is pressed into the notch in the release bar 99200 by the spring 99500 (e.g., wire spring). The delay assembly is now in the original start position.

Cam Wheel Variation

Optionally, another variation in the dual cog wheel drive mechanisms is an indented cog wheel design illustrated in 78. Advantageously, the indented cog wheel design enables the pawl/drive bar 78500 to interface directly with the second cog wheel mechanism 76100 and enables a pressure-driven regulator reset as further described below. Optionally, the indented cog wheel design does not include cam spokes. As described herein, the leaf spring/pawl/drive bar 78500 (e.g., leaf spring/pawl/drive bar 32500 as previously described) produces a rotational force in a first cog wheel 78100 when the push plate 32300 is raised in response to application of fluid pressure. Optionally, the NOE control assembly 71700 includes an anti-back rotation leaf spring 33500 which is in contact with the cog wheel 78100 and inhibits the rotation of the cog wheel 78100 in a counter-clock wise direction (e.g., in this example) in response to a reduction in fluid pressure. Further, as described above and repeated here, a pressure reduction reset causes the leaf spring/pawl/drive bar 78500 to travel down the face of the first cog wheel while the anti-back rotational leaf spring 33500 holds the cog wheel in place. The drive bar/leaf spring clears the cog wheel post and then is in a position to produce a forward rotation in response to a subsequent increase in pressure.

Figure 78:
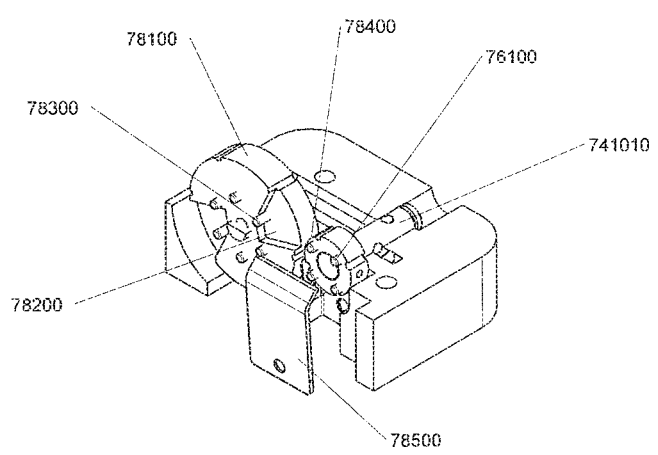
FIG. 78 depicts an example indented cog wheel design.
Figure 79:
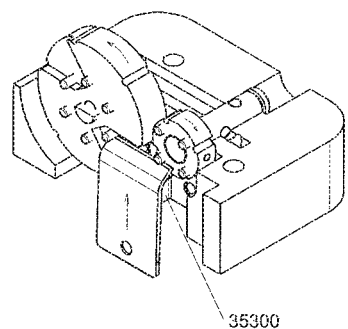
FIG. 79 depicts an example indented cog wheel design with a pawl/drive bar engaging a second cog wheel.

As illustrated in FIG. 78, the cog wheel includes a one or more indented or recessed areas 78200. In an example embodiment, the recessed area(s) enable the leaf spring/pawl/drive bar edge to extend laterally into the recessed areas of the cog wheel 78100. Optionally, the second cog wheel is positioned approximately in the same plane as the depression in the indented or recessed area. In this example embodiment, the edge of the leaf spring/pawl/drive bar when applied to the indented or recessed area extends into and interfaces with the second cog wheel posts but does not interface with second cog wheel itself as illustrated in FIG. 79. Optionally, the indentation area also includes a cog wheel post 78300 to enable the pawl edge to clear a post of the second cog wheel. Optionally, a cog wheel post 78300 is only used if the first cog wheel includes one or more consecutive areas of indentation. In response to an operator intended increase in fluid pressure above a specific threshold the pawl 32500 travels in an upward direction in FIG. 78. A full extension of the pawl will cause the first cog wheel 78100 to rotate a fixed percentage, for example 45 degrees in FIG. 78. If the interfacing second cog wheel has 4 posts as illustrated in FIG. 78, then each cycle (e.g., a reset and positive fluid pressure transition) in which the pawl 32500 is operating in a recessed area will cause the smaller second cog wheel and connected pilot valve shaft 74010 to transition 90 degrees. In response to a regulator reset, the pawl 32500 transitions in a downward direction in FIG. 78 in response to a reduction in fluid pressure. As the pawl 32500 travels downward, the first cog wheel is held in position with the anti-back rotation leaf spring 33500 which is in contact with the cog wheel 78100. The second cog wheel position is not changed in a reset because the pawl does not interface with the posts of the second cog wheel. As with the other cog wheel configurations described herein, the indented cog wheel (or first cog wheel) can be configured with a number of indentations. FIG. 78 illustrates a single indentation cog wheel with 10 posts. A 10 post first cog wheel with a single indentation and a 4 spoked second cog wheel would cause a valve transition once every 10 applications of pressure. In another example embodiment, a 6 post first cog wheel with three indentations and a 4 spoked second cog wheel would cause 3 valve transitions in response to 6 applications of pressure or a valve transition ever other pressure transition. Other first cog wheel indentation variations can be configured including a single indentation, 2 indentations, 3 indentations, etc. including a first cog wheel in which the entire cog wheel is indented.

Reset Feature II

In an example embodiment, the fluid regulator is configured with a mechanism to enable a user/operator to synchronize or reset to a home position a system of fluid regulators. Optionally, the synchronize feature enables the user/operator to reset each fluid regulator to a home setting based on a series of one or more changes in fluid pressure (e.g., pressure pulses). For example, to improve the robustness of a fluid irrigation system, a user/operator might choose to reset each fluid regulator to a home setting after one or more cycles of the system.

In an example embodiment of a pressure activated home reset mechanism, an extended period of reduced pressure causes a modified pawl and anti-back rotation spring to release from the cog wheel allowing the cog wheel to rotate freely. A tension spring associated with the freed cog wheel returns the cog wheel to a home state.

Figure 80:
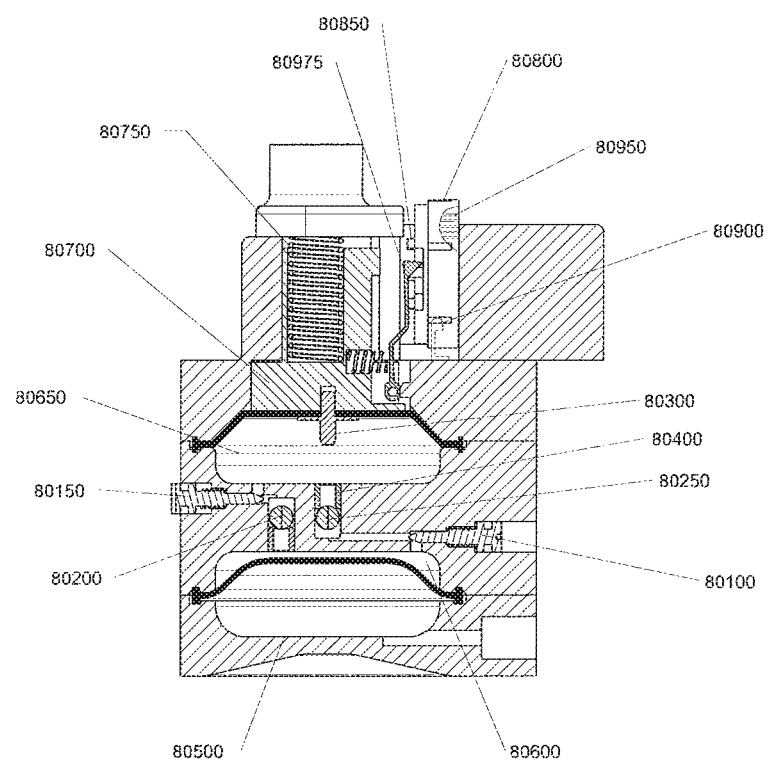
FIG. 80 depicts a cross sectional view of an example embodiment of a fluid activated actuator assembly.

FIG. 80 illustrates a cross sectional view of an example fluid regulator configured with a pressure activated home reset mechanism. The fluid regulator is configured with a number of the features described herein including: a viscous dampening unit, two flow adjustment mechanisms 80100 and 80150, and two check valves 80200 and 80250. In this example embodiment, the new pressure activated home reset mechanism includes the following new components: a precision metering pin 80300, a precision bore 80400, a spiral spring 80950, a modified pawl/drive bar/leaf spring 80975, and a modified anti-back rotation leaf spring 80900. In this example embodiment, the fluid regulator includes other components described herein including: working fluid diaphragm chamber 80500, sealed, high viscosity fluid chambers 80600 and 80650, slide assembly 80700, return spring 80750, cog wheel 80800, cog wheel post 80850, and anti-back rotation leaf spring 80900.

Figure 81:
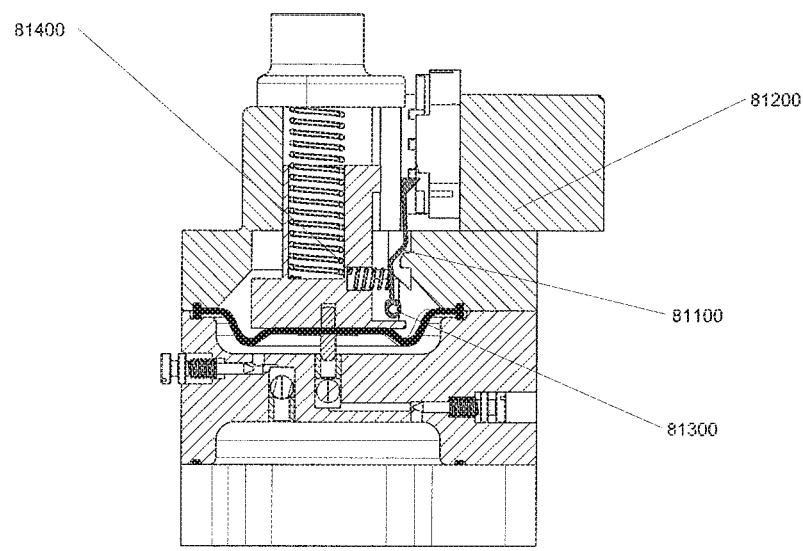
FIG. 81 depicts a cross sectional view of an example embodiment of a fluid activated actuator assembly.

In an example embodiment, during normal fluid regulator operation the home reset mechanism is not triggered. As illustrated in FIG. 80, pressurized working fluid enters the fluid flexible chamber 80500 (or the pressure in the fluid chamber exceeds a threshold), causing the viscous fluid flows into chamber 80650 from 80600. The fluid pressure in chamber 80650 overcomes the return spring 80750 tension causing the slide assembly 80700 and attached pawl 80975 to move in an upward direction in FIG. 80 as described in other example embodiments above. The pawl 80975, interfacing with the cog wheel post 80850, causes a forward rotation of the cog wheel 80800. In response to a decrease in pressure, the fluid regulator is reset as illustrated in FIG. 81. In a reset, pressurized working fluid exits the fluid chamber 80500 (or the pressure in the fluid chamber falls below a threshold), causing the viscous fluid flows into chamber 80600 from 80650. The reduced fluid pressure in chamber 80650 enables the return spring to move the slide assembly 80700 and attached pawl 80975 in a downward direction in FIG. 80. The anti-back rotation leaf spring 80900 prevents the cog wheel 80800 from rotating (e.g., clockwise) as the pawl 80975 is drawn downward to a reset position. As the viscous fluid exhaust from fluid chamber 80650, the precision metering shaft 80300 enters the precision bore 80400. The period of time from the pressure reduction until the precision metering shaft enters the precision bore is an exhaust period 1. Optionally, the exhaust period 1 timing can be adjusted by the flow adjustment screw 80150. The precision metering shaft 80300 partially obstructs the viscous fluid exiting the chamber 80650 causing a slowing of the slide assembly in its downward motion. The period of time from the precision metering pin entering the precision bore to a full extension downward is an exhaust period 2. Optionally, the rate of fluid exhaust and the length of the exhaust period 2 can be adjusted by the shape of the precision metering shaft, the width of the precision bore 80400, and/or the adjustment screw 80150. For example, reducing the gap between the precision bore walls and the precision shaft will reduce the exhaust rate and increase the exhaust period 2. In another example, if the precision shaft entry is long and gently sloped, the fluid will exhaust at a faster rate relative to a precision shaft with a blunt end. In another rate of flow adjustment example, if the flow adjustment screw narrows the exhaust passage, the fluid will exhaust at a slower rate and the exhaust period 2 will increase. Optionally, the exhaust period 1 is a short duration period (e.g., 30 seconds or 1 minute). Optionally, the exhaust period 2 is a longer time period than exhaust period 1 (e.g., 5 or 10 minutes or longer). In normal operation, the fluid regulator reset occurs during the exhaust period 1 or the end of exhaust period 1, or shortly after the beginning of exhaust period 2. In normal operation, the fluid regulator advances to the next state in response to subsequent pressure signal (e.g., an increase in pressure). (Note: an operator intended pressure signal comprises: a decrease in pressure below a pressure threshold for a fixed period of time; an increase in pressure above a pressure threshold for a fixed period of time; a decrease in pressure below a pressure threshold for a fixed period of time followed by an increase in pressure above a pressure threshold for a fixed period of time; and/or an increase in pressure above a pressure threshold for a fixed period of time followed by a decrease in pressure below a pressure threshold for a fixed period of time.)

Figure 82:
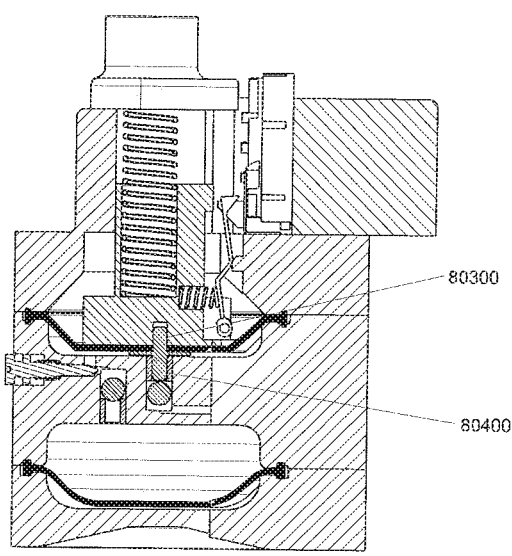
FIG. 82 depicts a cross sectional view of an example embodiment of a fluid activated actuator assembly.

The inventive home reset function is activated when the fluid pressure is left in an off or reduced state for a duration equal to the sum of exhaust period 1 and all of exhaust period 2 or a period of time greater than exhaust period 2. (Note: a home reset can occur when the pressure is reduced for a period including only a portion of exhaust period 2, however, in normal operation a reduced pressure equal to or exceeding exhaust period 2 is preferred.) As the slide assembly moves downward in response to a reduction in working fluid pressure as described herein, the bent angled portion of the pawl 81100 interfaces with the fluid regulator housing 81200. As the slide assembly 80700 travels downward in FIG. 81, the pawl edge is bent away from the cog wheel 80800 and cog wheel post 80850 as illustrated in FIG. 81. Similarly, the anti-back rotation leaf spring 80900 which in this embodiment is connected to the pawl 80975 (and not fixed to the regulator housing 81200) slides laterally (e.g. right to left) in the direction of the bending pawl. In this example embodiment, when the slide assembly 80700 has reached the extended downward position (e.g., at a time period equal to or exceeding the sum of exhaust time period 1 and exhaust time period 2), the cog wheel 80800 is free to rotate in either a clockwise or counter-clockwise direction as the pawl 80975 and anti-back rotation leaf spring 80900 are clear from the cog wheel 80800 and/or cog wheel posts 80850 as illustrated in FIG. 82. Optionally, there is a horizontal return spring 81400 that applies a lateral force to the pawl in the direction of the cog wheel which keeps the pawl engaged/interfacing with the cog wheel 80800 when fluid pressure is reapplied. Optionally, the horizontal return spring 81400 is compressed by the pawl when the slide assembly extends downward during the exhaust time period 2.

Figure 83:
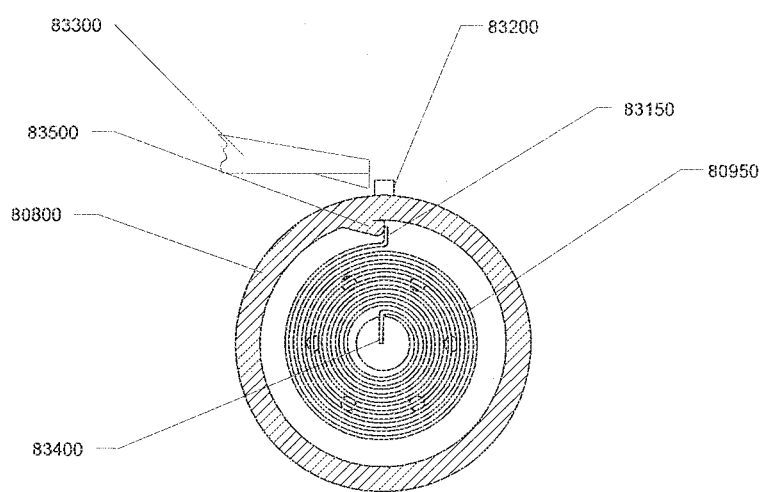
FIG. 83 depicts an example spiral spring component configurable in an example fluid activated actuator assembly.

In this example embodiment, when the slide assembly 80700 is in the extended downward position and the cog wheel 80800 is free to rotate, a spiral tension spring 83100 within the cog wheel 80800 causes the cog wheel 80800 to return to a home state. Specifically, in this example, the tension force of the spiral spring 83100 causes the cog wheel 80800 to rotate clockwise until a flexible stop pin 83200 contacts a housing stop 83300 to stop the rotation of the cog wheel 80800 in the home position as illustrated in FIG. 83. (Note the cog wheel stop pin 83200 is positioned so as not to interface with the anti-back rotation spring 80900.) In this example embodiment, during normal operation, the flexible stop pin 83200 travels over the angled/tapered housing stop 83300 in a counter-clockwise rotation of the cog wheel 80800. In this example embodiment, the spiral tension spring 83100 is attached to a fixed shaft 83400. As the cog wheel 80800 rotates (e.g., counter-clockwise) during normal operation the tension in the spiral spring 83100 increases. Optionally, to prevent the spiral spring 83100 from overcoming the cog wheel 80800 advancing force of the pawl 80975, the spring 83100 is configure to release on each full rotation or revolution. Specifically, the spiral spring 83100 includes a bent edge 83150 as illustrated in FIG. 83. The tension in the spiral spring 83100 causes the spiral spring's bent edge 83150 to maintain contact with the cog wheel stop 83500. As the cog wheel 80800 rotates the tension in the spring 83100 increases. Once the cog wheel 80800 makes one or more revolutions, the tension in the spring 83100 overcomes the ability of the flexible bent edge 83150 to hold the spring in a fixed position against the cog wheel stop 83500. The bent edge 83150 slides over the cog wheel stop 83500 and the spiral spring releases tension by unwinding within the cog wheel 80800 until the bent edge 83150 of the spiral spring again makes contact with the cog wheel stop 83500. Thus, the spiral spring 83100 described herein and as configured is capable of maintaining sufficient tension to return the cog wheel 80800 to the home position but does not build up sufficient tension to impair the normal operation of the cog wheel.

Remote Valve Status Monitoring

In an example embodiment, the illustrated pressure controlled fluid regulators discussed above are optionally provisioned with an acoustic generating mechanisms to enable the state (e.g., open or closed) of an associated valve in a system of valves to be monitored from a central and/or remote location without the need for electrical power (e.g., voltage) and associated wiring. Thus, a centralized monitoring system can reduce the deployment costs of a system of valves. In addition, to improve the robustness of a fluid irrigation system, a user/operator might periodically check on the expected state of a system of valves against the actual state of the system of valves, and if the expected and actual state do not match, the user/operator might remotely reset the system of valves as described above. In an example embodiment, if the state of the system of valves is not operating consistently as expected, the operator may perform certain maintenance and/or trouble shooting to determine the cause of the inconsistent state transitions. Advantageously, performing valve monitoring from a centralized location simplifies and reduces the ongoing cost of operation for the user/operator.

In an example embodiment, the provisioned acoustic mechanisms generate a unique detectable acoustic signature associated with each separate valve. Centralized and/or remote detectors (e.g., located at or near a master controller) can then detect an acoustic signature of an open valve. Optionally, the acoustic signature is transmitted acoustically via the working fluid (e.g., supplied water or gas), the interconnected pipes/tubing, and/or ambient air. In an example ambient air embodiment, the frequency(ies) used may be in an inaudible range for the comfort of humans and animals in proximity to the system of valves. In an example embodiment, the acoustic generating mechanism is configured within one or more fluid passages and/or chambers of the pressure controlled fluid regulators. In another example embodiment, the acoustic generating mechanism is configured into an associated valve (e.g., a diaphragm valve). In another example embodiment, the acoustic generating mechanism is configured into the inlet or outlet line of the fluid system in close proximity to an associated valve.

In an example embodiment, an acoustic signal consists of a unique pattern or frequency for each valve in the system to make each valve distinguishable from all others. The sources of these signals can be, but are not limited to a vibrating reed activated by an input or output fluid flow that is tuned to oscillate at a specific frequency(ies), thus generating acoustic waveforms within the working fluid. In another example embodiment, a turbine driven wheel, a paddle wheel, or other fluid driven motor device activated by an input or output fluid flow that contains a pattern of cogs which impact a membrane or other flexible member within the working fluid that generates a valve specific sound pattern in the working fluid. In another example embodiment, a resonant cavity operated by a fluid flow that is tuned to valve specific frequencies. Optionally, the resonant cavity consists of one or more variable volume chambers (e.g., a spring loaded piston and cylinder or a gas filled cavity isolated from the working fluid by a membrane). These are just examples embodiments of how an active (e.g., moving fluid) fluid source is configured with a mechanism to generate an acoustic signature; other embodiments know to those skilled in the art of mechanical fluid design can be incorporated as well.

In an example embodiment, valve operation/state identification (e.g., at a centralized location) is accomplished by receiving the acoustic signatures via commercially available electronic detectors, including for example, piezoelectric detectors. Optionally, a general purpose computing device (e.g., a micro-processor, personal PC, laptop, etc.) using, for example, digital signal processing techniques (e.g., amplifies and/or filters out noise) to detect the generated acoustic signal and presents the results to an operator/user via a user interface including a graphic user interface. Optionally, the computing device displays and/or notifies the operator/user of the currently open/activated valve (or currently closed valves) in a system of valves.

In another example embodiment, acoustic mirroring and/or radar is used to determine a valve state from a central location/master controller location. In an example embodiment, different acoustic reflective signature mechanisms (or unique radar detectable objects) are configured into the outlet side of each valve in a system of valves. Optionally, the configured reflective acoustic mechanisms (or radar detectable object) provides a minimally obstructive path so as to not impede the fluid flow. An acoustic signal is transmitted at or near the master controller. A detector, similarly positioned at or near the master controller detects a reflected acoustic (or radar) signal from the reflective signature mechanism configured past the open valve. As similarly described above, the detected results are presented to the user/operator.

The actuator servo assemblies described herein change state in response to changes in the pressure of the source fluid. While many of the example embodiments illustrated herein use a portion of the source/working fluid directed through the valve, optionally, the control fluid entering the actuators is sourced from an alternative supply. As previously described, certain conventional fluid systems are controlled via electric solenoids wherein the solenoid is associated with and/or a component of the valve assembly. The solenoids control the flow of fluid into and out of certain valve chambers which change the state of the valve from opened-to-closed or closed-to-opened. Conventionally, the portion of the solenoid assembly which interfaces with a control fluid is subject to corrosive effects and clogging (e.g., due to small tolerance fluid passage and debris in the fluid). Thus, in certain fluid systems, the solenoid components are failure prone and costly to maintain. Therefore, there is a need for a fluid control system which is functionally equivalent to conventional solenoid-based fluid systems with comparable and/or lower costs to purchase and install but not subject to the operational failures and/or high maintenance of a conventional solenoid-based system.

Flow Control Pilot Valve Overview

Figure 104:
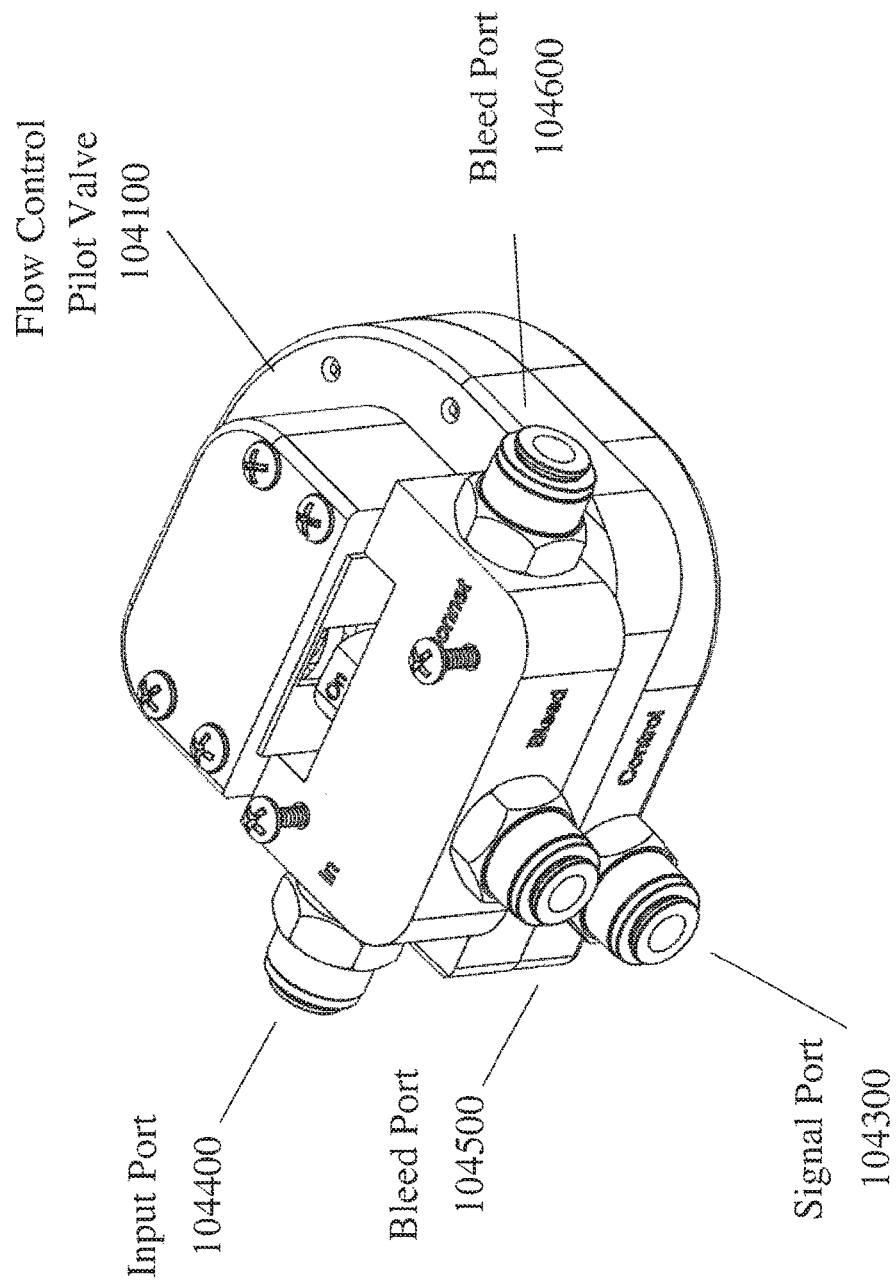
FIG. 104 depicts an example assembly of a fluid control pilot valve.

FIG. 104 illustrates an example embodiment of a Fluid Control (FC) pilot valve which is used to control one or more fluidly connected output valves (e.g., a conventional diaphragm valve 31100 as illustrated in FIG. 31). The FC pilot valve assembly when appropriately configured enables the operational control of one or more fluidly connected valves (e.g., fluid irrigation valves) in response to changes in input fluid pressure. In this example embodiment, the FC pilot valve is be in either an On state or an Off state. In the Off state, pressurized output valve control fluid is delivered through the FC pilot valve via a fluid channel to one or more output valves. The delivered pressurized fluid enters that portion of the output valve (e.g., a diaphragm chamber) responsible for closing the output valve (as previously described herein, see also FIG. 31). In the On state, an output valve bleed fluid passage is established through the FC pilot valve enabling the pressurized fluid stored in a diaphragm chamber of the output valve to be released causing, at least in part, the output valve to open. Advantageously, the illustrative FC pilot valve state change is controlled by the application and/or removal of control fluid pressure without the use of electrical current at the pilot valve assembly. In another advantage, the FC pilot valve is configured remotely (e.g., 1 meter, 100 meters, etc.) from the one or more output valves enabling a centralized configuration of FC pilot valves relative to a set of output valves. In yet another advantage, the FC pilot valve fluid passages is configured with fluid passages larger in size and diameter than conventional solenoid fluid passages. These larger fluid passages are less likely to clog from fluid debris and are not as susceptible to the effects of corrosion. Another advantage of the illustrative pilot valve is that fluid used to signal the FC pilot valve comprises the same fluid working fluid discharged at the output valve. Optionally, and advantageously, fluid used to control the FC pilot valve is a different fluid source and type than that used to control the fluidly connected output valve(s). Thus, fluid used to signal the FC pilot valve comprises, for example and not limited to: a) working fluid used by the output valves, b) output valve control fluid (i.e., a fluid flowing through the FC pilot valve used to control the output valve(s)), c) a separate fluid source neither comprising the working fluid used by the output valve(s) nor the control fluid used by the output valve(s). With respect to option (c), in an example embodiment, compressed air is used to signal the FC pilot valve while water is used as a control and working fluid for a set of one or more output valves. In another example embodiment of option (c), specialized thin and clean fluids (e.g. glycerin) is used in a closed fluid signal control environment to improve the precision and reliability of the FC pilot valve operation and the working fluid comprises dirty fluid. Optionally, the operating characteristics of the control signal fluid is the same or substantially different than the pressurized fluid of the output valve or output valve control fluid. Thus, for example, the FC pilot valve is configured to operate in a low pressure fluid control system while the output valve control fluid is operating at high pressures. In addition, all the optional features previously described herein are configured at time of assembly and/or manufacture into the FC pilot valve, dual flow control pilot valve, and rotary solenoid fluid switch including for examples, a mechanical timing device, remote valve status monitoring, etc.

In the example embodiments of flow control pilot valve and fluid switches illustrated below, the assemblies are optionally configured with external fluid passages (e.g., flexible tubing) which connect external ports of the fluid control assemblies with other associated assemblies (e.g., flow control pilot valves and/or fluid switches) and/or output valves. In an example embodiment, a FC pilot valve 104100 interfaces with an output valve 31000 via a fluid passage (e.g., flexible tubing) wherein the output port or bonnet port 104600 of the FC pilot valve connects to an output valve diaphragm valve port 34400, see also FIGS. 113 and 114. In another example embodiment, a Rotary Solenoid fluid switch Bonnet port 112500 interfaces with a Dual Flow Control pilot valve Signal port 107500 via a fluid passage (e.g., flexible tubing).

Fluid Control Pilot Valve Operation

In an example embodiment, a FC pilot valve 104100 is fluidly connected to one or more output valves 31000 via a fluid passage (e.g., tube) connected from the output/bonnet port 104600 of the FC pilot valve to a first diaphragm valve port 34400 of an output valve. In this example embodiment, the FC pilot valve is also connected to an output valve fluid source 104400 (which serves as an input fluid source for the FC pilot valve and is fluidly connected, for example, to a working fluid upstream port) and a signal control fluid source 104300 for the control of the FC pilot valve 104100 itself.

Figure 105:
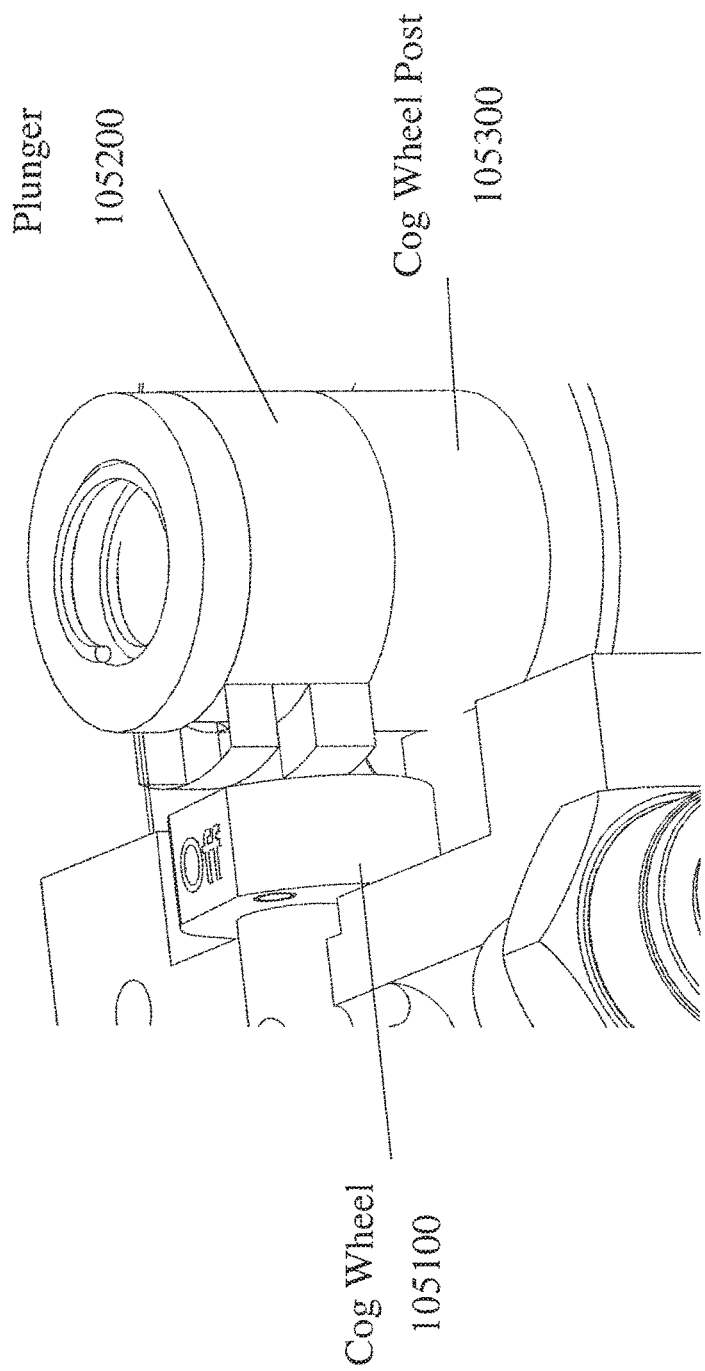
FIG. 105 depicts elements of an example assembly of a fluid control pilot valve.
Figure 106:
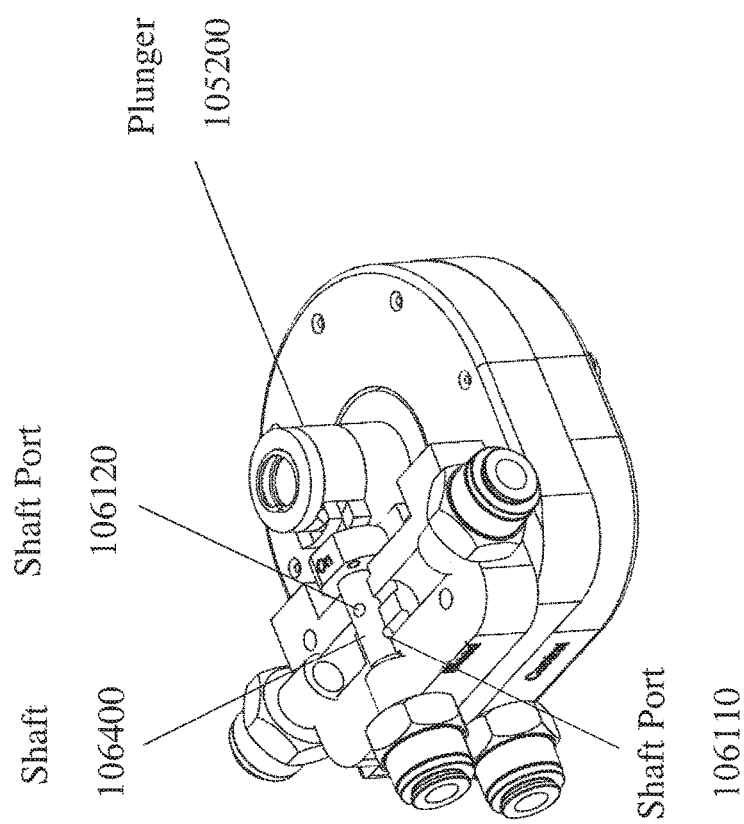
FIG. 106 depicts a partial cross sectional view of an example fluid control pilot valve.

The pressurized signal control fluid enters the FC pilot valve Signal port 104300, traverses a first FC pilot valve fluid passage, and enters a FC pilot valve diaphragm chamber (see also previous example embodiments of diaphragm/plunger assemblies including FIG. 32). The diaphragm expansion of the FC pilot valve overcomes the return spring 32400 compression and forces linear movement of the rigid pressurized disk 32300 (see also FIG. 43). The plunger housing 105200 interfaces with a cog wheel post 105300 as illustrated in FIG. 105. In this example embodiment, the upward movement of the plunger 105200 in response to the application of pressurized fluid causes a clockwise rotation (as seen by the plunger) of the cog wheel 105100 as illustrated in FIG. 105. When the FC pilot valve diaphragm chamber is filled with pressurized fluid and the plunger extended a second fluid passage is enabled within the FC pilot valve housing by the alignment of the ports 106110 and 106120 on the shaft 106400 of the cog wheel assembly and an internal FC pilot valve fluid passage. The second fluid passage comprises: the Input port 104400, an internal fluid passage interfacing with the Input port 104400 and a shaft port 106110 (not shown in FIG. 106), a pair of shaft ports 106110 and 106120 enabling a fluid passage through the shaft 106400, an internal passage interfacing with a shaft port 106120 and the Output port 104600, and the Output port 104600. The FC pilot valve is defined to be in the Off state when the plunger is extended and the second fluid passage is enabled. In the Off state, pressurized output valve control/input fluid flows through the Input port 104400, traverses the enabled second fluid passage, and exits the FC pilot valve assembly at port 104600. The pressurized fluid exiting the port 104600 is directed via a connecting fluid channel (e.g., tubing) into a control port 34400 on one or more output valves. From the control port the fluid enters a diaphragm chamber 31200 of the output valve, and upon filling, causes, at least in part, the output valve (or fluidly connected output valves) to close. Optionally, the external connecting fluid channel enables the FC pilot valve to be positioned remotely from the output valve(s) at a distance from a few centimeters (e.g., 50 cm, 100 cm, 500 cm, etc.) to hundreds of meters (e.g., 1 m, 10 m, 1 km, etc.).

In this example embodiment, in response to a termination or a decrease in pressure at the Signal port 104300 of the FC pilot valve, the pilot valve control fluid exits the diaphragm chamber of the FC pilot valve through the first fluid passage as the extended plunger begins to move laterally downward in response to the return spring 32400 tension. The plunger's 105200 downward movement causes a counter-clockwise rotation (as seen by the plunger) of the interfacing cog wheel 105100 as illustrated in FIG. 105. When the fluid from the FC pilot valve diaphragm chamber is vented and the plunger returns to a retracted position, the second fluid passage is closed by the rotation of the shaft 106400 of the cog wheel assembly (i.e., the ports 106110 and 106120 through the shaft 106400 of the cog wheel are no longer aligned with the second fluid passage of the FC pilot valve housing). In the plunger retracted position, a third fluid passage is enabled by the alignment of a second pair of ports 106310, 106320, with an internal fluid passage of the FC pilot valve. The third fluid passage comprises: the Output port 104600, an internal fluid passage interfacing with the Output port 104600 and a shaft port 106310, a pair of shaft ports 106110 and 106120 (not shown in FIG. 106) enabling a fluid passage through the shaft 106400, an interface with the shaft port 106120 and the Bleed port 104500, and the Bleed port 104500. The FC pilot valve is in the On state when the plunger is retracted and the third fluid passage is enabled. The third fluid passage enables the fluidly connected output valve's diaphragm 31200 to drain out the bleed port 104500 of the FC pilot valve. The loss of fluid and fluid pressure in the diaphragm chamber 31200 causes, at least in part, the output valve to open.

Thus, certain embodiments of the FC pilot valve may be utilized to control a variety of fluid control systems functionally equivalent to conventional solenoid-based fluid systems with comparable or lower costs without the need for electricity at or near the output valves of the system and not subject to the operational failures of a conventional solenoid-based system. Further, the FC pilot valve advantageously and optionally is itself be controlled via fluid pressure changes using a variety of fluid sources.

Dual Flow Control Pilot Valve Overview

Figure 107:
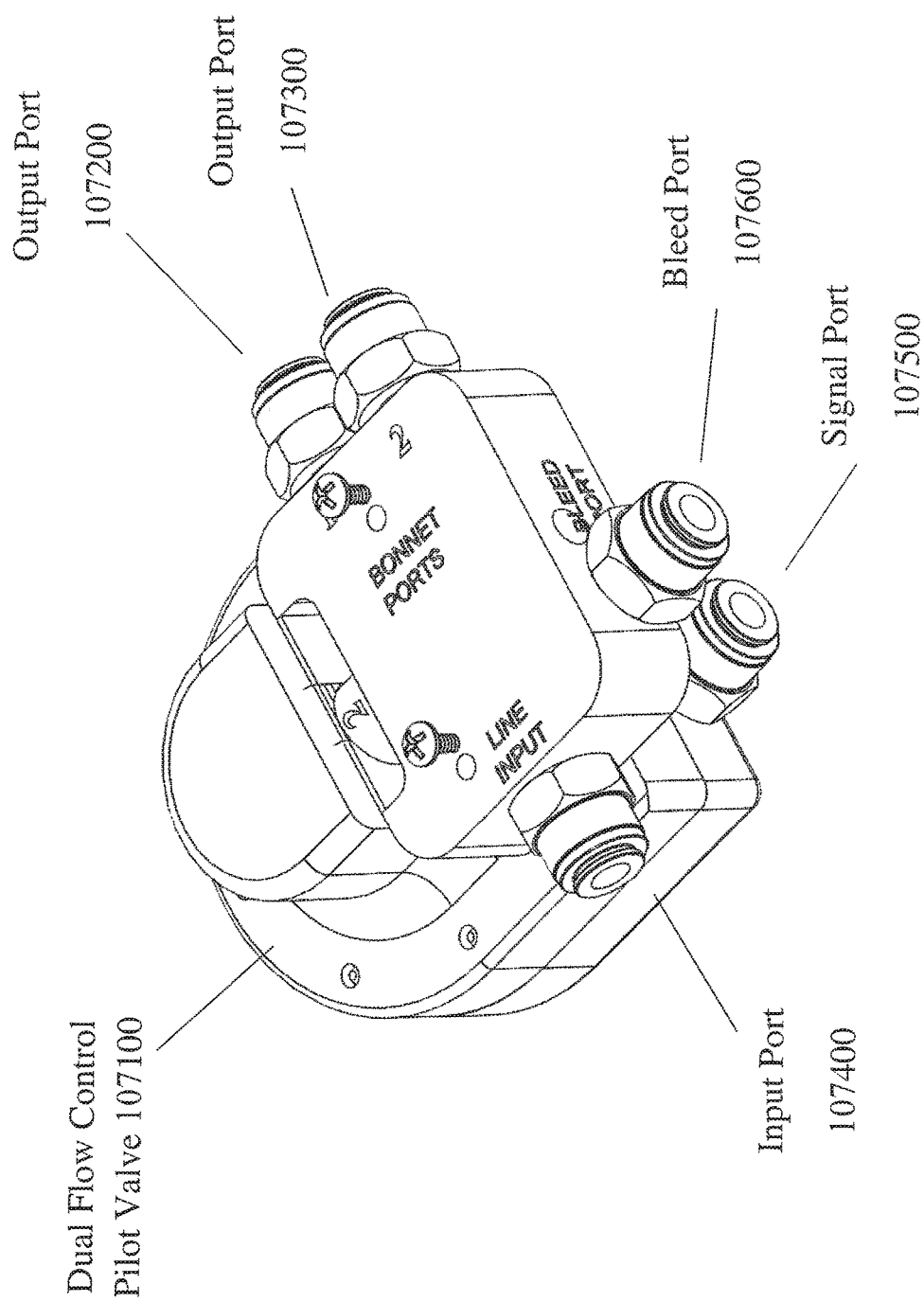
FIG. 107 depicts an example assembly of a dual flow control pilot valve.

FIG. 107 illustrates an example embodiment of a Dual Flow Control (DFC) pilot valve which is used to control, via a pressure pulse signal, two sets of one or more fluidly connected output valves (e.g., a conventional valve such as a diaphragm valve). The DFC pilot valve assembly enables the activation of one set of output valves (A) while a companion set of output valves (B) is nearly simultaneously deactivated. Correspondingly, when the alternate set of output valves (B) are activated, the companion set of output valves (A) are nearly simultaneously deactivated. Thus, in an example embodiment, a farmer activates a water supply, begin irrigating field A, alternate irrigating field A and field B for one or more configurable periods, and then deactivate the water supply without the need for electricity at or near the output valves of field A or field B and not subject to the operational failures of a conventional solenoid-based system.

All the advantages of the FC pilot valve described herein apply to the DFC pilot valve. In addition, all the optional features described with respect to the collection of flow control assemblies described within this specification herein can also be configured into the DFC pilot valves and fluid switches described later herein, including for examples, a mechanical timing device, remote valve status monitoring, etc.

DFC Pilot Valve Operation

In an example embodiment, a DFC pilot valve controls two sets of one or more conventional output valves wherein the convention output valve comprises, for example, a diaphragm valve as illustrated in FIG. 31.

In an example embodiment, a DFC pilot valve 107100 is fluidly connected to two or more output valves 31000 via a fluid passage (e.g., tube) connected from the first output port 107200 of the DFC pilot valve to a first diaphragm valve port 34400 of a first output valve and a second output port 107300 of the DFC pilot valve to a second diaphragm valve port 34400 of a second output valve. In this example embodiment, the DFC pilot valve is also connected to an output valve control fluid source 107400 (which serves as an input fluid source for the DFC pilot valve) and a signal control fluid source 107500 for the control of the DFC pilot valve 107100 itself.

Figure 108:
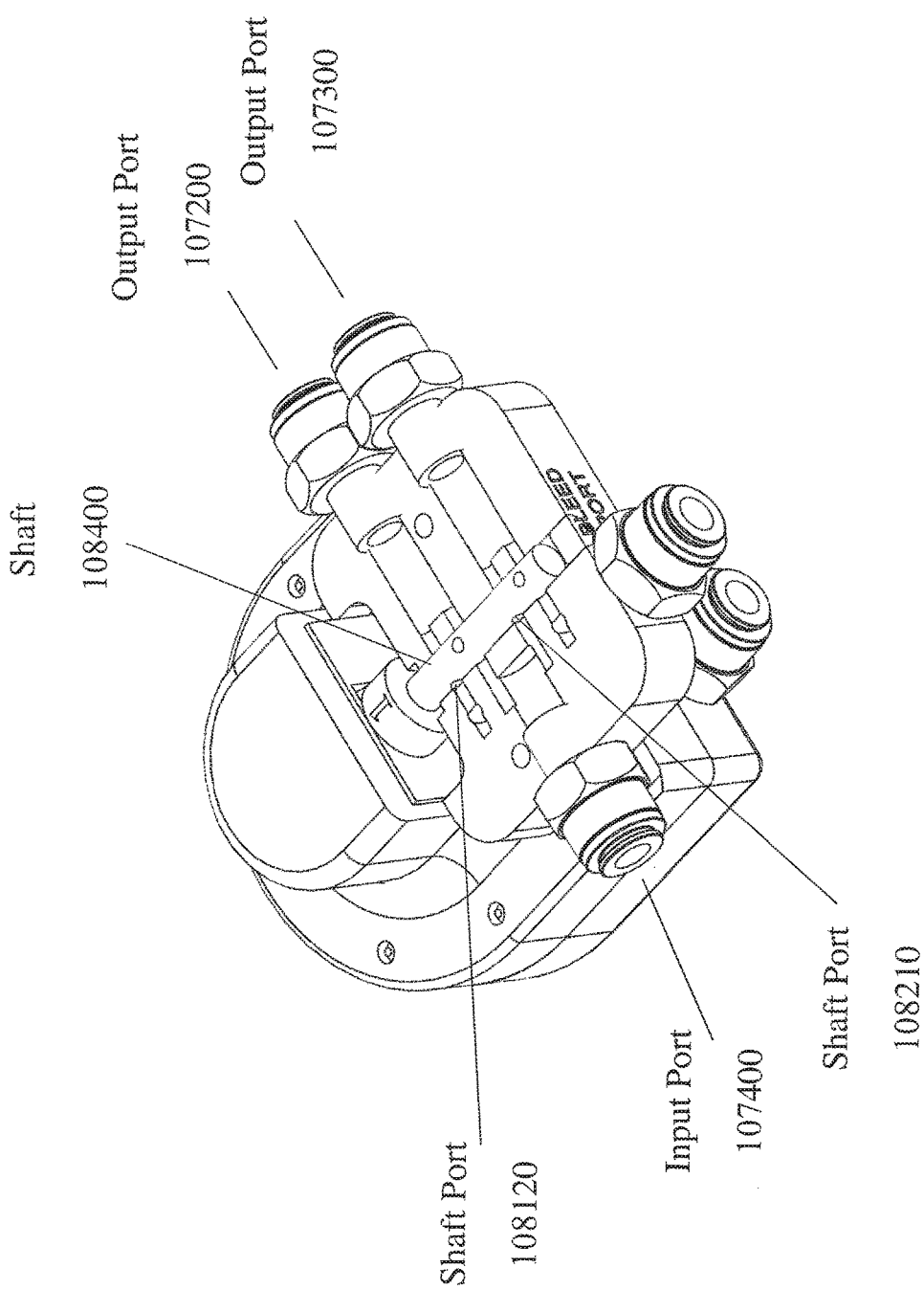
FIG. 108 depicts a partial cross sectional view of an example dual flow control pilot valve.

In an example initial state, the DFC pilot valve is set with the output valve one in the On state and the output valve two in the Off state. (Optionally, the initial output valve states are reversed with output valve one in the Off state and output valve two in the On state.) Pressurized control fluid enters the DFC pilot valve signal port 107500, traverses a first DFC pilot valve fluid passage, and enters a DFC pilot valve diaphragm chamber (see also example embodiments of diaphragm/plunger assemblies described herein including FIG. 32). The diaphragm expansion overcomes the return spring 32400 compression and forces linear movement of the rigid pressurized disk 32300 (see also FIG. 43). The plunger housing 105200 interfaces with a cog wheel post 105300 as illustrated in FIG. 105. In this example embodiment, the upward movement of the plunger 105200 in response to the application of pressurized fluid causes a clockwise rotation (as seen by the plunger) of the cog wheel 105100 as illustrated in FIG. 105. When the DFC pilot valve diaphragm chamber is filled with pressurized fluid and the plunger extended, a second fluid passage and a third fluid passage are enabled within the DFC pilot valve housing by the alignment of the ports 108110, 108120 and 108210, 108220 on the shaft 108400 of the cog wheel assembly with internal DFC pilot valve fluid passages, see also cross sectional view of the DFC pilot valve in FIG. 108. In this condition, with the plunger extended and the second and third fluid passages enabled, the DFC pilot valve is defined to be in the "1" state. In the "1" state, the second fluid passage comprises: Input port 107400, an internal fluid passage interfacing with the Input port 107400 and a shaft port 108210, a pair of shaft ports 108210 and 108220 (not shown in FIG. 108) enabling a fluid passage through the shaft 108400, an internal fluid passage interfacing with the shaft port 108220 and the Output port 107300, and Output port 107300. In the "1" state, the third fluid passage comprises: Output port 107200, an internal fluid passage interfacing with the Output port 107200 and a shaft port 108110, a pair of shaft ports 108110 (not shown in FIG. 108) and 108120 enabling a fluid passage through the shaft 108400, an internal fluid passage interfacing with the shaft port 108120 and the Bleed port 107600, and Bleed port 107600.

With respect to the second fluid passage in the "1" state, input pressurized output valve control fluid flows through the Input port 107400, traverses the second fluid passage, and exits the DFC pilot valve assembly at port 107300. The pressurized fluid exiting the port 107300 is directed via a connecting fluid channel (e.g., tubing) into a control port 34400 on the second output valve. From the control port the fluid enters a diaphragm chamber 31200 of the second output valve, and upon filling, causes, at least in part the closure of the second output valve. Optionally, the connecting fluid channel enables the DFC pilot valve to be positioned remotely from the output valve at a distance from a few centimeters (e.g., 50 cm, 100 cm, 500 cm, etc.) to hundreds of meters (e.g., 1 m, 10 m, 1 km, etc.). With respect to the third fluid passage in the "1" state, the third fluid passage enables the fluidly connected first output valve's diaphragm 31200 to drain out the bleed port 107600 of the DFC pilot valve. The loss of fluid and associated fluid pressure in the diaphragm chamber 31200 causes, at least in part, the first output valve to open.

Figure 109:
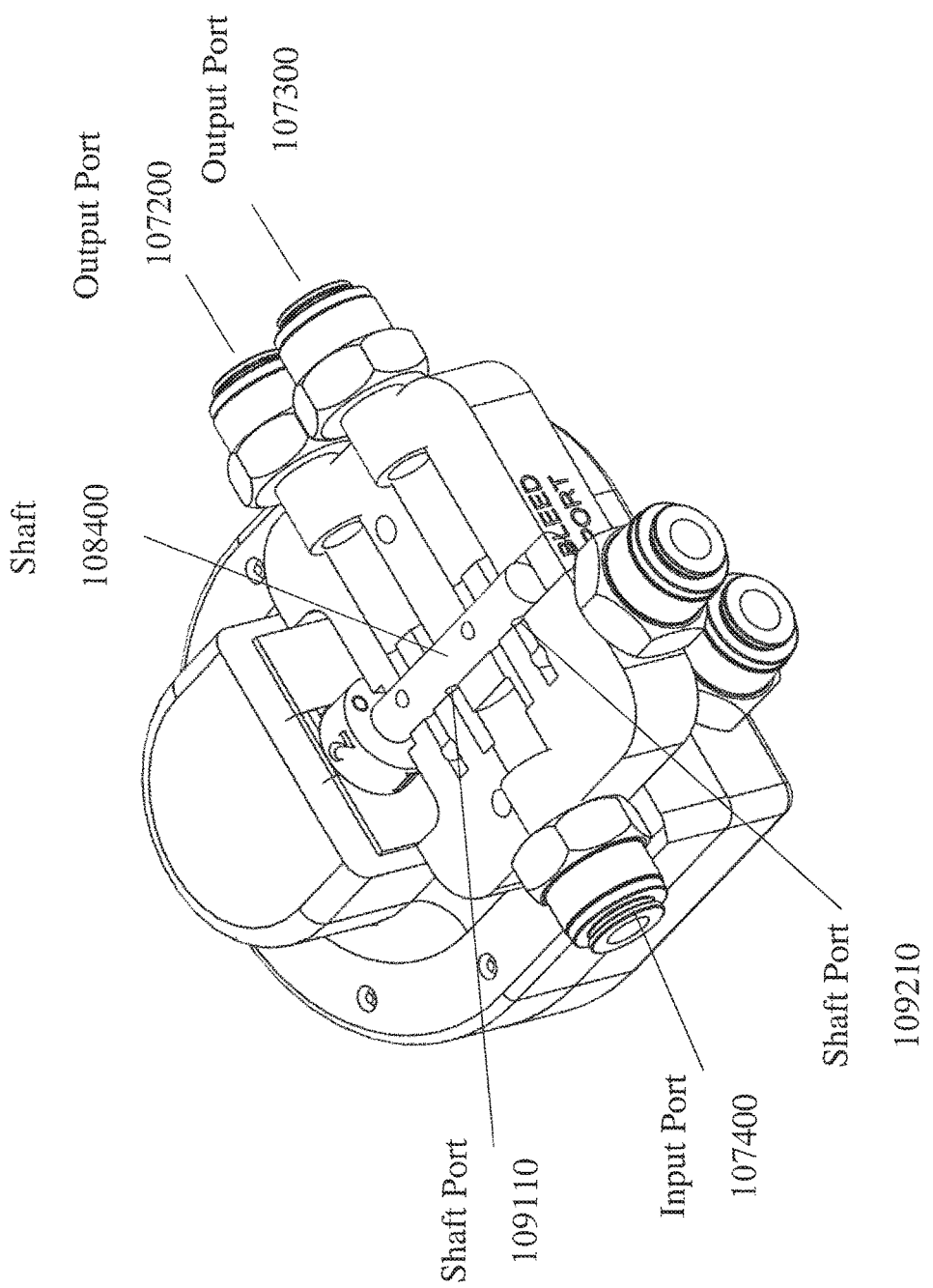
FIG. 109 depicts a partial cross sectional view of an example dual flow control pilot valve.

In this example embodiment, in response to a termination or a decrease in the DFC pilot valve control fluid pressure, the fluid in the DFC pilot valve exits the diaphragm chamber of the DFC pilot valve and the extended plunger begins to move laterally downward in response to the return spring 32400 tension. The plunger's 105200 downward movement causes a counter-clockwise rotation (as seen by the plunger) of the interfacing cog wheel 105100 as illustrated in FIG. 105. When the fluid from the DFC pilot valve diaphragm chamber has exhausted and the plunger returns to a retracted position, a fourth fluid passage and a fifth fluid passage are enabled within the DFC pilot valve housing by the alignment of the ports 109110, 109120 and 109210, 109220 on the shaft 108400 of the cog wheel assembly with internal DFC pilot valve fluid passages, see also cross sectional view of the DFC pilot valve in FIG. 109. In this condition, with the plunger retracted and the fourth and fifth fluid passages enabled, the DFC pilot valve is defined to be in the "2" state. In the "2" state, the fourth fluid passage comprises: Input port 107400, an internal fluid passage interfacing with the Input port 107400 and a shaft port 109110, a pair of shaft ports 109110 and 109120 (not shown in FIG. 109) enabling a fluid passage through the shaft 108400, an internal fluid passage interfacing with the shaft port 109120 and the Output port 107300, and Output port 107300. In the "1" state, the third fluid passage comprises: Output port 107200, an internal fluid passage interfacing with the Output port 107200 and a shaft port 108110, a pair of shaft ports 108110 (not shown in FIG. 108) and 108120 enabling a fluid passage through the shaft 108400, an internal fluid passage interfacing with the shaft port 108120 and the Bleed port 107600, and Bleed port 107600

With respect to the fourth fluid passage in the "2" state, input pressurized output valve control fluid flows through the Input port 107400, traverses the enabled fourth fluid passage, and exits the DFC pilot valve assembly at port 107200. The pressurized fluid exiting the port 107200 is directed via a connecting fluid channel (e.g., tubing) into a control port 34400 on the first output valves. From the control port the fluid enters a diaphragm chamber 31200 of the first output valve, and upon filling, causes, at least in part, the closure of the first output valve. With respect to the fifth fluid passage in the "2" state, control fluid in the output valve's diaphragm chamber vents through the fifth fluid passage via the bleed port 107600. The loss of fluid and associated fluid pressure in the diaphragm chamber 31200 causes, at least in part, the second output valve to open.

In the example DFC pilot valve embodiment above, when the cog wheel 105100 rotates into State "1" it nearly simultaneously closes the fourth and fifth fluid passages at ports 109110, 109120 and 109210, 109220, respectively. Further, when the cog wheel 105100 rotates into State "2" it nearly simultaneously closes the second and third fluid passages at ports 108110, 108120 and 108210, 108220, respectively.

In the example DFC pilot valve embodiment above, two output valves were used to illustrate the operation of the DFC pilot valve. Optionally, each output valve comprises a plurality of output valves.

Thus, certain embodiments may be utilized with a variety of fluid control systems functionally equivalent to conventional solenoid-based fluid systems with comparable or lower costs without the need for electricity at or near the output valves of the system and not subject to operational failures of a conventional solenoid-based system. Further, the DFC pilot valve advantageously and optionally is itself be controlled via fluid pressure changes using a variety of fluid sources Linear Solenoid Integrated Pilot Valve Overview As previously described above, fluid control systems using electrical solenoids is subject to periodic failure due to clogging, corrosion, etc. In certain fluid control systems electrical current is available but maintenance costs associated with solenoid failures are problematic. Therefore, there is a need in a fluid control system to eliminate troublesome points of failure associated with the operation of conventional electrical solenoid.

Figure 110:
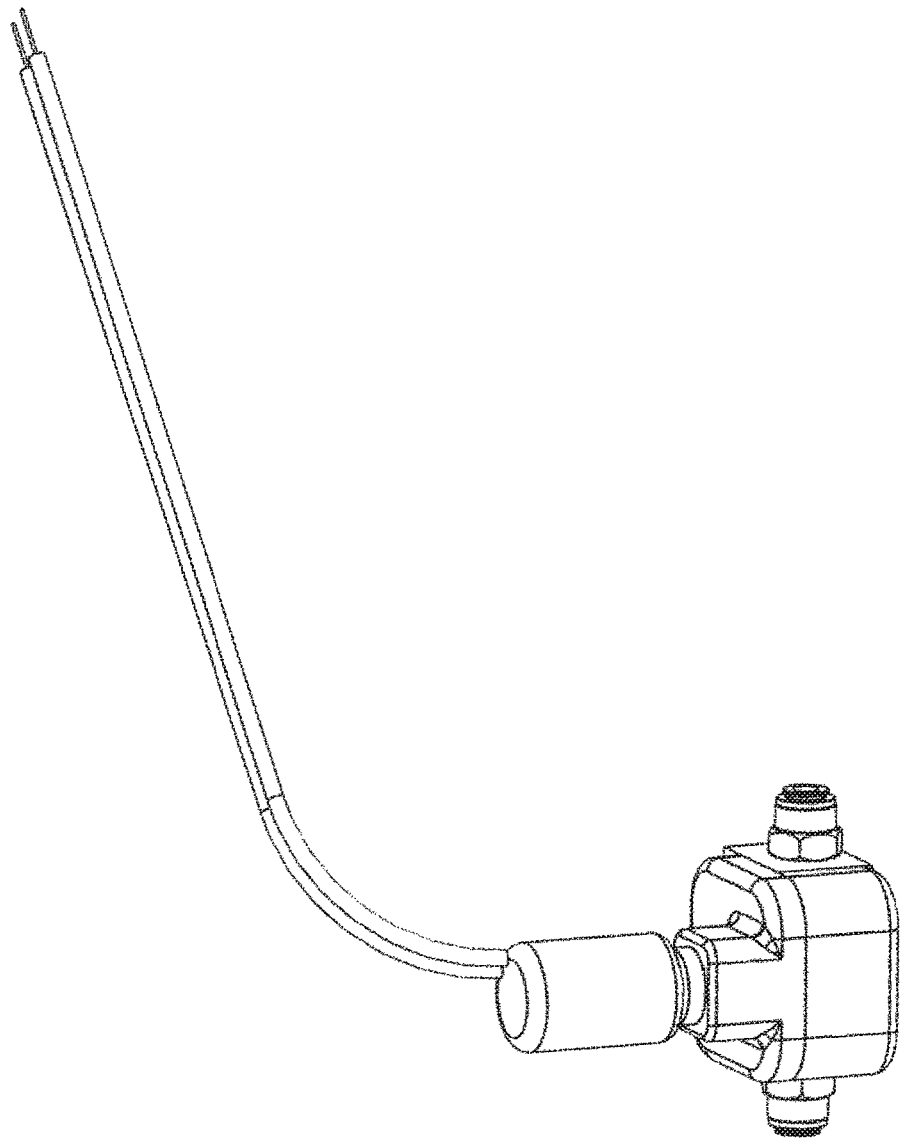
FIG. 110 depicts an example assembly of a linear solenoid flow control pilot valve.

FIG. 110 illustrates an example embodiment of a Linear Solenoid Flow Control (LSFC) pilot valve which is used to control one or more fluidly connected output valves (e.g., a conventional valve such as a diaphragm valve). Advantageously, the solenoid component assembled into the LSFC pilot valve assembly does not interface with fluids associated with the pilot valve. Consequently, in this example embodiment, some or all of the points of failure of a conventional solenoid in a fluid control system are eliminated.

An LSFC pilot valve is operationally similar to an FC pilot valve. Functionally, the fluid control signal assembly of the FC pilot valve is replaced with an electrical solenoid component. Optionally, in an LSFC pilot valve assembly, a linear solenoid is added and the input Signal port 104300 is removed and its associated interfacing fluid passage connecting to a diaphragm chamber. Optionally, the diaphragm chamber itself is also removed from the LSFC pilot valve.

Linear Solenoid Flow Control Pilot Valve Operation

To operate the LSFC pilot valve, the linear solenoid is activated by applying voltage causing the plunger housing or its equivalent to move laterally. The plunger housing 105200 interfaces with a cog wheel post 105300 as illustrated in FIG. 105. In this example embodiment, the upward movement of the plunger 105200 in response to the activation of the solenoid causes a clockwise rotation (as seen by the plunger) of the cog wheel 105100, see FIG. 105. When the plunger is extended, the second fluid passage (see definition of second fluid passage in the FC pilot valve section above) is enabled within the LSFC pilot valve housing by the alignment of the ports 106110 and 106120 on the shaft 106400 of the cog wheel assembly and one or more internal LSFC pilot valve fluid passages. The LSFC pilot valve is defined to be in the Off state when the plunger is extended and the second fluid passage is enabled. In the Off state, pressurized output valve control fluid flows through the Input port 104400, traverses the enabled second fluid passage, and exits the LSFC pilot valve assembly at port 104600. The pressurized fluid exiting the port 104600 is directed via a connecting fluid channel (e.g., tubing) into a control port 34400 on one or more output valves. From the control port the fluid enters a diaphragm chamber 31200 of the output valve, and upon filling, causes, at least in part, the output valve to close. Optionally, the external connecting fluid channel enables the LSFC pilot valve to be positioned remotely from the output valve at a distance from a few centimeters (e.g., 50 cm, 100 cm, 500 cm, etc.) to hundreds of meters (e.g., 1 m, 10 m, 1 km, etc.).

In this example embodiment, in response to a deactivation of the solenoid the return spring 32400 causes the extended plunger to move laterally. The plunger's 105200 downward movement causes a counter-clockwise rotation (as seen by the plunger) of the interfacing cog wheel 105100 as illustrated in FIG. 105. When the plunger (or solenoid connected shaft similar in function to the plunger) returns to a retracted position, the second fluid passage is closed by the rotation of the shaft 106400 of the cog wheel assembly (i.e., the ports 106110 and 106120 through the shaft 106400 of the cog wheel are no longer aligned with the second fluid passage of the LSFC pilot valve housing). In the plunger retracted position, a third fluid passage (see definition of second fluid passage in the FC pilot valve section above) is enabled by the alignment of a second pair of ports 106310, 106320, with an internal fluid passage of the LSFC pilot valve. The LSFC pilot valve is in the On state when the plunger is retracted and the third fluid passage is enabled. The third fluid passage enables the fluidly connected output valve's diaphragm 31200 to drain out the bleed port 104500 of the LSFC pilot valve. The loss of fluid and fluid pressure in the diaphragm chamber 31200 causes, at least in part, the output valve to open.

Thus, certain embodiments of the LSFC pilot valve may be utilized to control a variety of fluid control systems functionally equivalent to conventional solenoid-based fluid systems but not subject to the clogging and corrosive failures of said conventional solenoid-based fluid systems.

Linear Solenoid Dual Flow Control Pilot Valve

Figure 115:
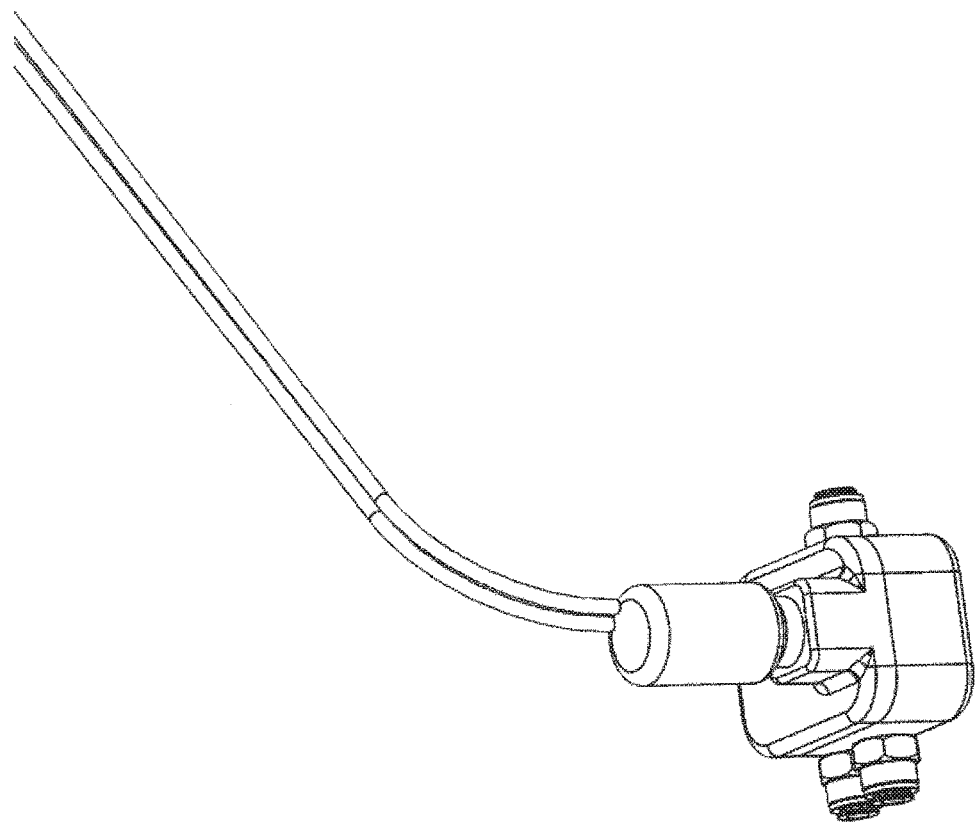
FIG. 115 depicts an example assembly of a linear solenoid controlled dual fluid control pilot valve.

FIG. 115 illustrates an example embodiment of a Linear Solenoid Controlled Dual Flow Control (LSDFC) pilot valve which is used to control two or more fluidly connected output valves (e.g., a conventional valve such as a diaphragm valve) or sets of output valves. Advantageously, the solenoid component assembled into the LSDFC pilot valve assembly does not interface with fluids associated with the pilot valve. Consequently, in this example embodiment, some or all of the points of failure of a conventional solenoid in a fluid control system are eliminated.

An LSDFC pilot valve is operationally similar to a DFC pilot valve. Functionally, the fluid control signal assembly of the LSDFC pilot valve is replaced with an electrical solenoid component. Optionally, in an LSDFC pilot valve assembly, a linear solenoid is added and the input Signal port 107500 is removed and its associated interfacing fluid passage connecting to a diaphragm chamber. Optionally, the diaphragm chamber itself is also removed from the LSFC pilot valve.

Linear Solenoid Dual Flow Control Pilot Valve Operation

In an example embodiment, a LSDFC pilot valve 107100 is fluidly connected to two or more output valves 31000 via a fluid passage (e.g., tube) connected from the first output port 107200 of the LSDFC pilot valve to a first diaphragm valve port 34400 of a first output valve and a second output port 107300 of the LSDFC pilot valve to a second diaphragm valve port 34400 of a second output valve. In this example embodiment, the LSDFC pilot valve is also connected to an output valve control fluid source 107400 (which serves as an input fluid source for the LSDFC pilot valve).

In an example initial state, the LSDFC pilot valve is set with the output valve one in the On state and the output valve two in the Off state. (Optionally, the initial output valve states are reversed with output valve one in the Off state and output valve two in the On state.) To operate the LSDFC pilot valve, the linear solenoid is activated by applying voltage causing the plunger housing or its equivalent to move laterally. The plunger housing 105200 interfaces with a cog wheel post 105300 as illustrated in FIG. 105. In this example embodiment, the upward movement of the plunger 105200 in response to the activation of the solenoid causes a clockwise rotation (as seen by the plunger) of the cog wheel 105100 as illustrated in FIG. 105. When the plunger is extended, a second fluid passage (see definition of the second fluid passage in the DFC pilot valve section above) and a third fluid passage (see definition of the third fluid passage in the DFC pilot valve section above) are enabled within the LSDFC pilot valve housing by the alignment of the ports 108110, 108120 and 108210, 108220 on the shaft 108400 of the cog wheel assembly with internal LSDFC pilot valve fluid passages, see also cross sectional view of the LSDFC pilot valve in FIG. 108. In this condition, with the plunger extended and the second and third fluid passages enabled, the LSDFC pilot valve is defined to be in the "1" state.

With respect to the second fluid passage in the "1" state, input pressurized output valve control fluid flows through the Input port 107400, traverses the second fluid passage, and exits the LSDFC pilot valve assembly at port 107300. The pressurized fluid exiting the port 107300 is directed via a connecting fluid channel (e.g., tubing) into a control port 34400 on the second output valve. From the control port the fluid enters a diaphragm chamber 31200 of the second output valve, and upon filling, causes, at least in part the closure of the second output valve. Optionally, the external connecting fluid channel enables the LSDFC pilot valve to be positioned remotely from the output valve at a distance from a few centimeters (e.g., 50 cm, 100 cm, 500 cm, etc.) to hundreds of meters (e.g., 1 m, 10 m, 1 km, etc.). With respect to the third fluid passage in the "1" state, control fluid in the output valve's diaphragm chamber vents through the third fluid passage via the bleed port 107600. The third fluid passage enables the fluidly connected first output valve's diaphragm 31200 to drain out the bleed port 107600 of the LSDFC pilot valve. The loss of fluid and associated fluid pressure in the diaphragm chamber 31200 causes, at least in part, the first output valve to open.

In this example embodiment, in response to a deactivation of the solenoid the return spring 32400 causes the extended plunger to move laterally. The plunger's 105200 downward movement causes a counter-clockwise rotation (as seen by the plunger) of the interfacing cog wheel 105100 as illustrated in FIG. 105. When the plunger returns to a retracted position, a fourth fluid passage and a fifth fluid passage (see definition of the fourth fluid passage and the fifth fluid passage in the LSDFC pilot valve section above) are enabled within the LSDFC pilot valve housing by the alignment of the ports 109110, 109120 and 109210, 109220 on the shaft 108400 of the cog wheel assembly with internal LSDFC pilot valve fluid passages, see also cross sectional view of the DFC pilot valve in FIG. 109. In this condition, with the plunger retracted and the fourth and fifth fluid passages enabled, the LSDFC pilot valve is defined to be in the "2" state.

With respect to the fourth fluid passage in the "2" state, input pressurized output valve control fluid flows through the Input port 107400, traverses the enabled fourth fluid passage, and exits the LSDFC pilot valve assembly at port 107200. The pressurized fluid exiting the port 107200 is directed via a connecting fluid channel (e.g., tubing) into a control port 34400 on the first output valves. From the control port the fluid enters a diaphragm chamber 31200 of the first output valve, and upon filling, causes, at least in part, the closure of the first output valve. With respect to the fifth fluid passage in the "2" state, control fluid in the output valve's diaphragm chamber vents through the fifth fluid passage via the bleed port 107600. The loss of fluid and associated fluid pressure in the diaphragm chamber 31200 causes, at least in part, the second output valve to open.

In the example LSDFC pilot valve embodiment above, when the cog wheel 105100 rotates into State "1" it nearly simultaneously closes the fourth and fifth fluid passages at ports 109110, 109120 and 109210, 109220, respectively. Further, when the cog wheel 105100 rotates into State "2" it nearly simultaneously closes the second and third fluid passages at ports 108110, 108120 and 108210, 108220, respectively.

In the example LSDFC pilot valve embodiment above, two output valves were used to illustrate the operation of the LSDFC pilot valve. Optionally, each output valve comprises a plurality of output valves.

Thus, certain embodiments of the LSDFC pilot valve may be utilized to control a variety of fluid control systems functionally equivalent to conventional solenoid-based fluid systems but not subject to the clogging and corrosive failures of said conventional solenoid-based fluid systems.

Rotary Solenoid Fluid Switch

As described herein, conventional electrical solenoids may be subject to corrosion and clogging which cause failure or unreliable operation. Therefore, there is a need for a fluid control switch which is functionally equivalent to a conventional solenoid-based device but which operates more reliably, particularly when the fluid source may contain corrosive and/or dirty fluid.

Figure 111:
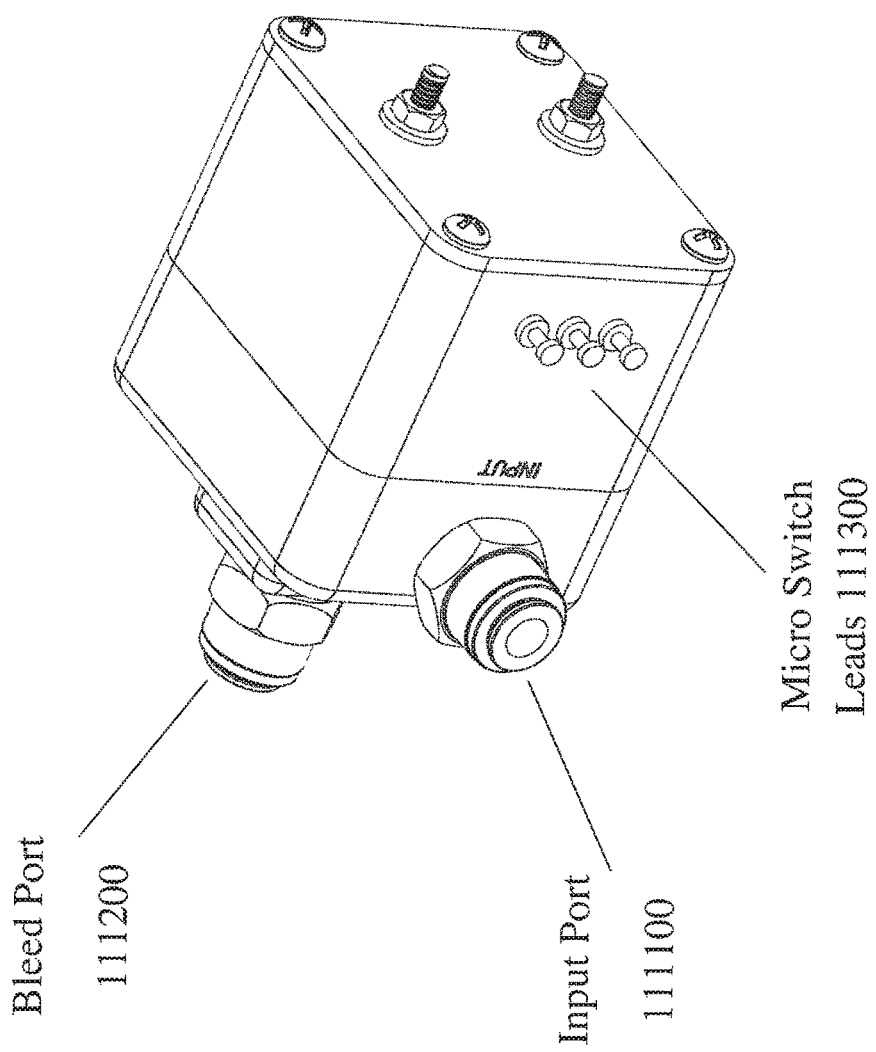
FIG. 111 depicts an example assembly of a rotary solenoid fluid switch.
Figure 112:
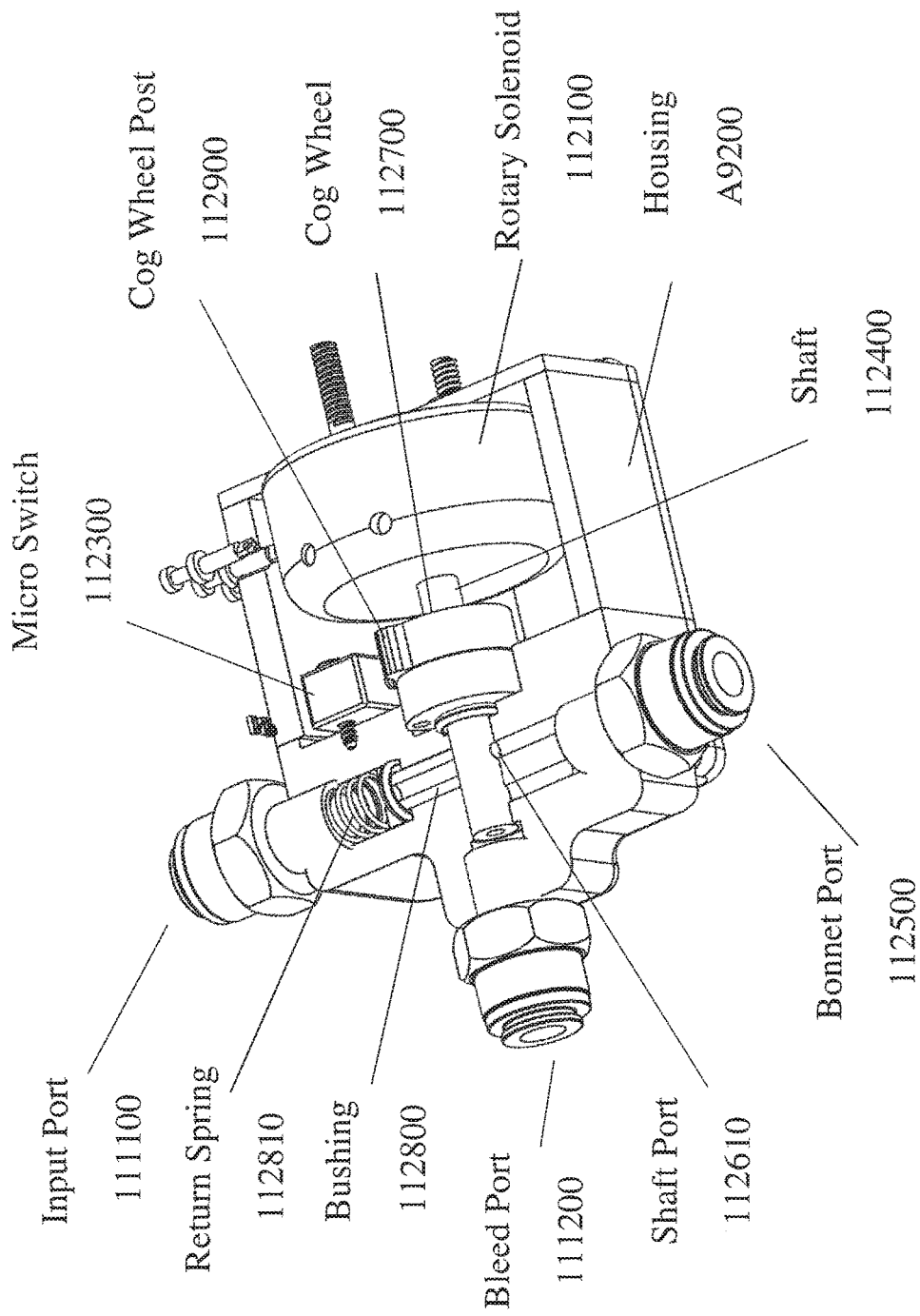
FIG. 112 depicts a cross section view of an example rotary solenoid fluid switch.

FIG. 111 illustrates an example embodiment of a Rotary Solenoid (RS) fluid switch (RS) which is used in combination, for example, with a FC pilot valve or DFC pilot valve as described herein. In a rotary solenoid activated state, the RS fluid switch enables an input flow of fluid to be directed to an output port. When the rotary solenoid is deactivated, the RS fluid switch blocks the flow of input fluid to the output port and enables a bleed port from the output valve. FIG. 112 illustrates a cut-away view of the RSFS.

In an example embodiment, the Rotary Solenoid fluid switch operation is described herein. In an example embodiment of a RS fluid switch, the assembly housing 112200 shields the internal components from the effects of the surrounding environment and includes a conventional rotary solenoid 112100 (see FIG. 112). The rotary solenoid 112100, in response to the application of voltage from a current source, causes an attached shaft 112400 to rotate, for example, clockwise a certain number of degrees (e.g., 50 degrees, 67 degrees, 90 degrees, etc.). A return spring within the rotary solenoid 112100 (not shown in FIG. 112) causes the solenoid and the attached shaft to return (for example rotate counterclockwise) to a starting position when the applied voltage is removed. The assembly housing 112200 also houses a micro switch 112300 with micro switch connector leads 111300. In this example embodiment, the micro switch 112300 reduces the applied voltage to the rotary solenoid 112100 in response to a condition as further described below. In this example embodiment, a higher voltage (e.g. 24 volts) is applied during the initial and/or during the rotational period of the rotary solenoid 112100 in order to overcome friction forces impeding the shaft's 112400 rotation and the force of the solenoid's return spring. As the solenoid armature is drawn toward the end of its path (e.g., the second position) the torque force increases greatly, due to the increase in force as the poles of the solenoid get closer together. Thus a reduced voltage can provide adequate torque (even greater than the original starting torque at the higher voltage) to restrain the return spring which is at its greatest force potential. Therefore, the voltage is optionally reduced (e.g., to 12 volts) via the activation of the micro switch 112300 as the 112400 is drawn into the second position.

In this example embodiment, the RS fluid switch is configured with three ports labeled as: an Input port 111100, a Bonnet port 112500, and a Bleed port 111200. In the Off state, source fluid flows into the Input port 111100, traverses the RS fluid switch housing 112400, exits the RS fluid switch housing at the Bonnet port 112500, where the fluid travels via one or more external fluid passages to enter a diaphragm chamber of an associated output valve. The pressurized fluid entering the diaphragm chamber of the associated output valve causes, at least in part, the output valve to close. In the On state, the RS fluid switch opens a bleed passage through the Bleed port 111200 via which the fluid in the diaphragm chamber of the output valve exits through the RS fluid switch, causing the output valve to open. Optionally, the RS fluid switch is assembled such that the On state enables pressurized control output valve fluid to be directed to an output valve and the Off state opens a bleed passage through the Bleed port 111200 via which the fluid a diaphragm chamber of an output valve vents.

More specifically, in the example embodiment, the RS fluid switch is initially in the Off state with no voltage applied to the rotary solenoid 112100. In response to the application of voltage at the rotary solenoid 112100, the rotary solenoid 112100 causes the attached shaft 112400 to rotate (in this example in a clockwise direction in FIG. 112 as viewed from the rotary solenoid 112400) resulting in an RS fluid switch state transition to the On state. When the rotary solenoid 112100 and attached shaft 112400 complete their first rotation (e.g., a 90 degree rotation) a first pair of ports 112910, 112920 (neither shown in FIG. 112) in the shaft 112400 are in alignment enabling a first fluid passage of the housing leading to the Bleed port 111200. When the RS fluid switch is in the On state, the first fluid passage comprises: a bleed port 111200, a fluid passage interfacing with the bleed port 111200 and a shaft port 112910, a pair of shaft ports 112910, 112920 enabling a fluid passage through the shaft 112400, a fluid passage interfacing with the Bonnet port 112500 and the shaft port 112920, and the Bonnet port 112500. The first fluid passage enables pressurized fluid to flow from a diaphragm chamber of an output valve through the RS fluid switch to the bleed port 111200 to, for example, the ambient environment of the RS fluid switch. This first fluid passage enables, at least in part, the output valve to open. The first fluid passage remains open (and associated output valve open) as long as voltage is applied to the rotary solenoid 112100. The first rotation of the shaft also causes a separate pair of ports 112610, 112620 on the shaft 112400 to move out of alignment with their associated housing fluid passages causing a second fluid passage to be blocked through the RS fluid switch.

When the applied voltage to the rotary solenoid 112100 is removed, the return spring in the rotary solenoid causes the solenoid to return (in this example in a counter-clockwise rotation in FIG. 112 as viewed from the rotary solenoid 112100) to the rotary solenoid's 112100 start position. This second rotation, causes the RS fluid switch to transition to the Off state. When the RS fluid switch is in the Off state, the second fluid passage comprises: an Input port 111100, a fluid passage interfacing with the Input port 111100 and a shaft port 112610, a pair of shaft ports 112610, 112620 enabling a fluid passage through the shaft 112400, a fluid passage interfacing with the Bonnet port 112500 and the shaft port 112620, and the Bonnet port 112500. The second fluid passage enables incoming pressurized fluid to flow through the RS fluid switch to a diaphragm chamber of an output valve causing, at least in part, the valve to close. The second fluid passage remains open (and associated output valve closed) as long as voltage is not applied to the rotary solenoid 112100. The second rotation of the shaft (Off state) also causes the shaft ports 112910 and 112920 on the shaft 112400 to move out of a position of alignment with their associated housing fluid passages causing the first fluid passage to be blocked through the RS fluid switch.

As illustrated in the example embodiment above, a RS fluid switch is used in a fluid control system to reliably control an output valve. As is illustrated in the example embodiment above, the rotary solenoid does not directly interface with fluids of the system, thus, improving the reliability and safety (e.g., wherein the fluid is a flammable fluid) of a conventional solenoid control system.

Optionally, the RS fluid switch includes a micro switch 112300 to enable a voltage transition (e.g., a voltage step down) at the point at which the first rotation has ended. As the first rotation nears it's ending rotation position, a cog wheel 112700 with a protruding cog/post 112900 interfaces with the micro switch 112300. The interfacing post activates the micro switch 112300 causing a step down in the applied voltage. As described above, the reduced voltage reduces the steady-state current requirements, reduces the amount of heat generated, and consequently increases the life of the rotary solenoid.

Optionally, the RS fluid switch (and other flow control pilot valves described herein) include one or more bushings 112800 and return springs 112810 as illustrated in FIG. 112 to improve the fluid seal in the internal fluid passages between certain external ports (e.g., Input port 111100) and shaft ports (e.g., shaft port 112620).

Electric Motor Fluid Switches

In another example embodiment of a fluid switch, the rotary solenoid discussed above is optionally replaced with an electric motor (e.g., an AC (e.g., 110 VAC, 220 VAC, or other AC voltage) or DC, direct drive, single direction, synchronous, and/or permanent magnet rotor, motor). Example solenoid electric motors which can be used in a fluid switch embodiment include but are not limited to: Crouzet GM 823345 electric motor, a Johnson Electric USA, UDS 1 electric motor, etc. Advantageously, the electric motor illustrated in this example environment is configured to operate with a commonly available AC voltage range (e.g., 24 VAC, 110 VAC, 220 VAC, etc.) and is optionally only energized for a limited time window (e.g., approximately the time needed to transition a shaft 90 degrees), although, DC electric motors may be similarly used. This relatively short duration run time of the electric motor reduces motor wear and extends the life of the motor while also reducing or minimizing the amount of electricity needed to power the motor (e.g., enabling battery and/or solar powered configurations). Furthermore, with respect to a short duration run time period (e.g., measured in seconds (e.g., less than 5 seconds, less than 10 seconds, etc.)) and associated longer off time (e.g., measured in minutes, hours, or days (1 minute, 5 minutes, 1 hour, 1 day, etc.)), it is practical to energize an electric motor with higher voltages safely (e.g., without damage to the electric motor). Therefore, advantageously, an important optional characteristic of the fluid control device design is the ability to operate over a range of voltages without end-user modifications to the device. In addition, the Electric Motor (EM) fluid switch is optionally designed and configured with a form, fit, and function which enables a user to simply (e.g. without new user training) replace a conventional solenoid actuator (e.g., a diaphragm valve actuator) and/or without requiring the user to change or reconfigure a controller signaling (e.g., via an electrical control signal) the solenoid. Optionally, the electric motor is manufactured and/or user configured with an associated set of gears or a gearbox. The gears may be configured to enable an increase in torque applied to the valve shaft (e.g., valve shaft 112400 illustrated in FIG. 112). This torque may be configured so as to provide adequate force to overcome the friction of the valve shaft in contact with the housing and other interfacing components. Additionally, a high gear ratio (e.g., 50:1) may be provided that enables the motor, when turned off, to have several wind down revolutions, caused by rotor inertia, without significantly affecting the functional position of the valve shaft port alignments.

Figure 116:
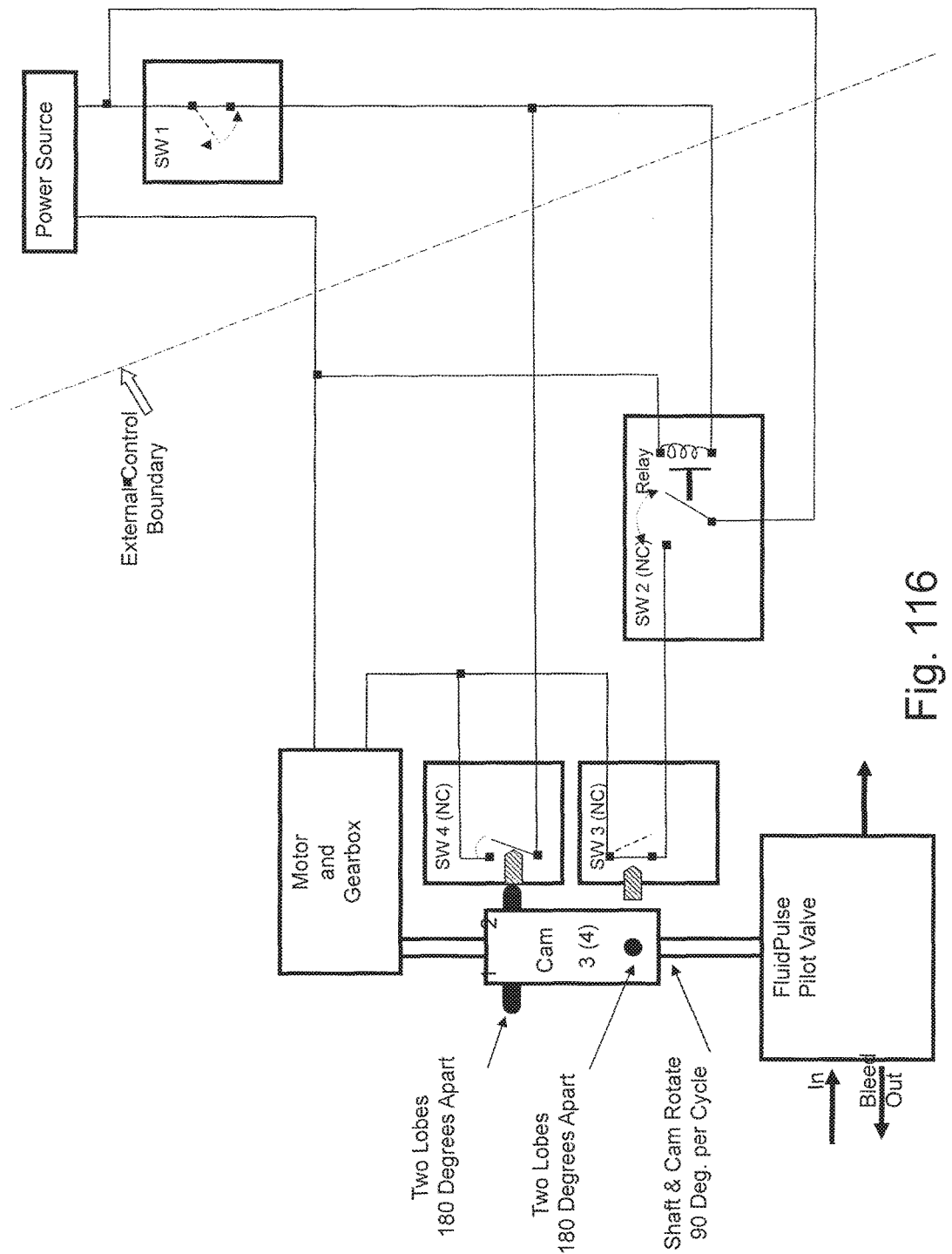
FIG. 116 is a schematic of an example electric circuit used in an example embodiment of an Electric Motor Fluid Switch.

In an example embodiment, an EM fluid switch state change is initiated in response to the receipt of an electronic control signal. Upon receipt of a first control signal, a first electric circuit is energized causing a powered electric motor to rotate the valve shaft 112400 illustrated in FIG. 112. The valve shaft 112400 rotates until a first lobe on the valve shaft interfaces with the first electric circuit (see, e.g., the example electric circuit schematic in FIG. 116). In this example, the first lobe breaks the energized first electric circuit leading to the powered electric motor via SW4 (see also electric circuit schematic in FIG. 116), causing the electric motor and connected valve shaft to stop in a first position. The valve shaft first position causes an alignment of a pair of valve shaft ports 112610, 112620, enabling the flow of input port fluid 111100 to flow through the fluid switch, through an external fluid passage, and to the associated output valve(s) to cause, at least in part, the output valve(s) to close (the "off" state, as described herein above). In the valve shaft first position, a third lobe on the valve shaft interfaces with a second electrical circuit (e.g., a separate electrical circuit than the first electrical circuit or a sub-circuit of the first circuit) enabling the EM fluid switch to respond to a subsequent control signal. Upon receipt of a second electronic control signal, a second electric circuit is energized by closing the normally open relay SW2 causing the powered electric motor to rotate the valve shaft 112400. The valve shaft 112400 rotates until a second lobe on the valve shaft interfaces with the second electric circuit (see electric circuit schematic in FIG. 116). The second lobe breaks the energized first electric circuit leading to the electric motor via SW4 causing the powered electric motor and connected valve shaft to stop in a second position. The valve shaft second position causes an alignment of valve shaft ports 112910, 112920 enabling the exhaust flow of diaphragm chamber fluid from the associated output valve(s) through bleed port 111200, causing, at least in part, the output valve(s) to open (the "on" state, as described herein above). In the valve shaft second position, a fourth lobe on the valve shaft interfaces with a second electrical circuit enabling the EM fluid switch to respond to a subsequent control signal. In this example embodiment, the valve shaft first position and valve shaft second position are offset by 90 degrees as are each of the lobes affixed to the shaft. A subsequent electronic control signal initiates the above described cycle to repeat. FIG. 117 illustrates four possible electro-mechanical device states of the EM fluid switch and the associated four possible states of the fluid switch as the valve shaft rotates through 360 degrees in this example embodiment. It is understood that other example implementations may include fewer or greater than four states.

Figure 118:
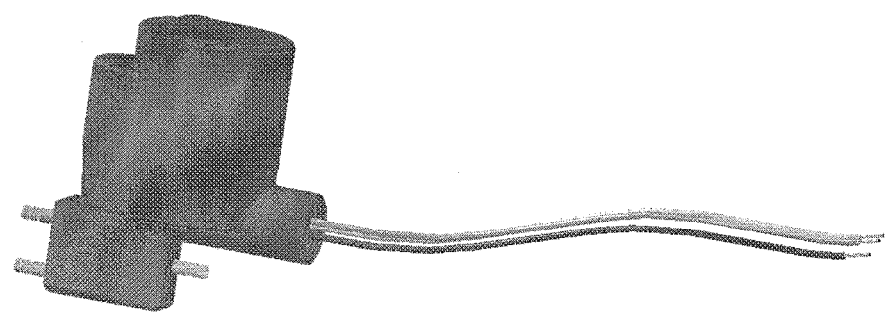
FIG. 118 depicts an example assembly of an Electric Motor Fluid Switch.

FIG. 118 illustrates an external view of an example embodiment of an EM fluid switch.

In example embodiments of an EM fluid switch, various electric circuits are manufactured and/or user configured in or associated with the EM fluid switch. Optionally, these electric circuits receive various external electronic control signals including, for example, an external on/off electronic signal or a relay electronic signal (e.g., an electronic signal applied to a terminal A or a terminal B). Each of these example embodiments are described in greater detail herein.

External Control Signal—on/Off

In an example embodiment, an EM fluid switch state change is initiated in response to a receipt of an electronic control signal. In this example embodiment, the source control signal state change is triggered by an electrical control signal on/off transition. FIG. 126 illustrates four possible electro-mechanical device states of the EM fluid switch as the valve shaft rotates through 360 degrees in response to electronic control signals from an external on/off switch (SW11). It is understood that other example implementations may include fewer or greater than four states. FIGS. 123 and 124 illustrate an example schematic diagram of the electronic circuit and associated block diagram of the example electric motor and associated fluid switching element.

In an example embodiment, at State 1, the external control signal is in the off state. In State 1, the motor is running based at least in part on an energized circuit including a circuit path from the power source to the external closed relay circuit c2-d2 of SW22 and the closed circuit j2-i2 of limit switch SW33, see FIG. 123. The energized circuit causes the powered electric motor to rotate the valve shaft 112400. In State 1, a first lobe (e.g., Lobe 1) of a cam of the valve shaft 112400 interfaces with a limit switch SW22 and continues to interface with the limit switch SW22 through a 90 degree rotation of the valve shaft 112400.

In State 2, as the valve shaft 112400 rotation approaches 90 degrees the first lobe disengages from the interfacing limit switch SW22 causing the powered State 1 circuit to open via an open j2-i2 circuit/path. In State 2, the limit switch SW22 also closes the k2-i2 circuit/path. In State 2, the open circuit causes the running electric motor and connected valve shaft 112400 to stop in a first position. The valve shaft first position causes an alignment of valve shaft ports 112910, 112920 enabling the exhaust flow of diaphragm chamber fluid from the associated output valve(s) through bleed port 111200, causing, at least in part, the output valve(s) to open (the "on" state, as described herein above). The rotation of the shaft to the first position also causes a separate pair of ports 112610, 112620 on the shaft 112400 to move out of alignment with their associated housing fluid passages causing a blocking of input port fluid 111100 through the EM fluid switch.

In State 3, the control signal is switched to the on state (SW11) causing the closure of the circuit a2-b2 of SW11. The control switch SW11 closure causes current passing through the relay switch SW22 to open circuit c2-d2 and close circuit g2-h2. The closure of circuit g2-h2 enables an energized circuit to power the electric motor to rotate the valve shaft 112400. The energized circuit powering the motor in State 3 comprises, at least in part, a circuit path from the power source through the closed circuit connection a2-b2 of external switch SW11, the closed circuit connection g2-h2 of relay switch SW22, and the closed circuit connection k2-j2 of limit switch SW33, see also FIG. 124. In State 3, a second lobe (e.g., Lobe 2) interfaces with the limit switch SW22 and continues to interface with the limit switch SW22 through a 90 degree rotation of the valve shaft 112400.

In State 4, as the valve shaft 112400 rotation approaches 90 degrees the second lobe disengages from the interfacing limit switch SW22 causing the energized circuit to open via an opening of the k2-i2 circuit/path. In State 4, the limit switch SW22 also closes the j2-i2 circuit/path. In State 4, the open circuit causes the running electric motor and connected valve shaft 112400 to stop in a second position. The valve shaft second position causes an alignment of a pair of valve shaft ports 112610, 112620 enabling the flow of input port fluid 111100 to flow through the fluid switch, through an external fluid passage, and to the associated output valve(s) to cause, at least in part, the output valve(s) to close (the "off" state, as described herein above). The rotation of the shaft to the second position also causes the shaft ports 112910 and 112920 on the shaft 112400 to move out of a position of alignment with their associated housing fluid passages causing a bleed passage to be blocked through the EM fluid switch. A subsequent control signal causes the 4 State cycle to repeat from State 1.

FIG. 127 illustrates another example embodiment of an EM fluid switch similar to the EM fluid switch described above. In this example embodiment, the EM fluid switch is enhanced with an electronic feature enabling a manufacturer or user to configure the EM fluid switch to be "normally open" or "normally closed" by changing the position relationship 90 degrees between SW33 and the valve shaft 112400 cam lobes. The example embodiment above illustrates the "normally closed" EM fluid switch.

External Control Signal—Relay

In an example embodiment, an EM fluid switch state change is initiated in response to a receipt of an electronic control signal. In this example embodiment, the electronic source control signal is a certain relay (e.g., SW1 in FIG. 121) which causes a b1 circuit/path to be energized (by forming a connection between terminal a1 and terminal b1 of FIG. 121) or a c1 circuit/path to be energized (e.g. by forming a connection between terminal a1 and terminal c1 of FIG. 122). FIG. 125 illustrates four possible electromechanical device states of the EM fluid switch as the valve shaft rotates through 360 degrees in response to control signals from an external relay (SW1). FIGS. 121 and 122 illustrate the schematic diagram of the electronic circuit and associated block diagram of the electric motor and associated fluid switching element.

In an example embodiment in State 1, the (e.g., external) control relay SW1 is positioned with the a1-b1 patch closed and the a1-c1 path open enabling b circuit/path to be energized, see also FIG. 121. The energized circuit b1 comprises at least in part a circuit path from the power source through the closed circuit connection a1-b1 and the closed circuit connection of e1-d1 of limit switch SW2. The energized circuit b causes the powered electric motor to rotate the valve shaft 112400. In State 1, a first lobe (e.g., Lobe 1) of a cam of the valve shaft 112400 interfaces with a limit switch SW2 and continues to interface with the limit switch SW2 through a 90 degree rotation of the valve shaft 112400.

In State 2, as the valve shaft 112400 rotation approaches 90 degrees, the first lobe disengages from the interfacing limit switch SW2 causing the b1 circuit to open via an opening of the d1-e2 circuit/path. In State 2, the limit switch SW2 also closes the d1-f1 circuit/path. In State 2, the open circuit causes the running electric motor and connected valve shaft 112400 to stop in a first position. The valve shaft first position causes an alignment of valve shaft ports 112910, 112920 enabling the exhaust flow of diaphragm chamber fluid from the associated output valve(s) through bleed port 111200, causing, at least in part, the output valve(s) to open (the "on" state, as described herein above). The rotation of the shaft to the first position also causes separate ports (e.g., the pair of ports 112610, 112620) on the shaft 112400 to move out of alignment with their associated housing fluid passages causing a blocking of input port fluid 111100 through the EM fluid switch.

In State 3, the external control relay SW1 is repositioned with the a1-b1 circuit open and the a1-c1 path closed enabling a c1 circuit/path to be energized. The energized circuit comprises at least in part the circuit path from the power source through the closed circuit connection a1-c1 and the closed circuit connection of f1-d1, see also FIG. 122. The energized circuit c1 causes the powered electric motor to rotate the valve shaft 112400. In State 3, a second lobe (e.g., Lobe 2) of a cam of the valve shaft 112400 interfaces with a limit switch SW2 and continues to interface with the limit switch SW2 through a 90 degree rotation of the valve shaft 112400.

In State 4, as the valve shaft 112400 rotation approaches 90 degrees the second lobe disengages from the interfacing limit switch SW2 causing the c1 circuit to open via an opening of the d1-f1 circuit/path. In State 4, the limit switch SW2 also closes the d1-e1 circuit/path. In State 4, the open circuit causes the running electric motor and connected valve shaft 112400 to stop in a second position. The valve shaft second position causes an alignment of valve shaft ports (e.g., the pair of ports 112610, 112620) enabling the flow of input port fluid 111100 to flow through the fluid switch, through an external fluid passage, and to the associated output valve(s) to cause, at least in part, the output valve(s) to close (the "off" state, as described herein above). The rotation of the shaft to the second position also causes the shaft ports 112910 and 112920 on the shaft 112400 to move out of a position of alignment with their associated housing fluid passages causing a bleed passage to be blocked through the EM fluid switch. A subsequent control signal causes the above described 4 State cycle to repeat. Optionally, the spool chamber wall and the gear reduction chain tending to turn in reverse has a friction resistance sufficient to prevent the spool piston 120700 from reverse movement once the motor force has terminated. Optionally, this rotational resistance may be provided by an O-ring or other pressure seal that provides suitable friction to prevent unwanted reverse movement of the spool piston 120700.

Electric Motor Fluid Switch with Spool Piston

Figure 119:
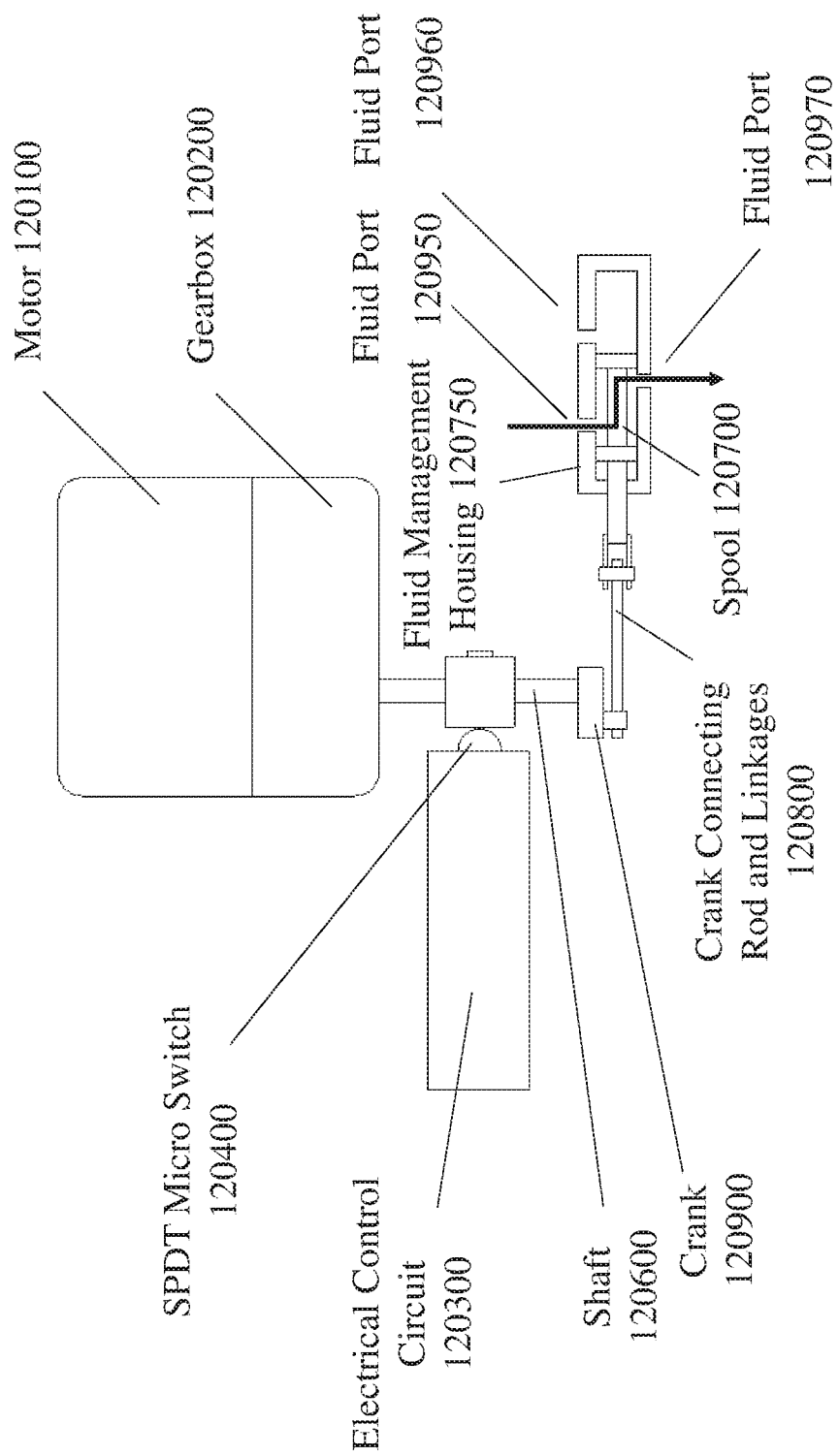
FIG. 119 depicts an example embodiment of an Electric Motor Fluid Switch Spool, with a cross section view of the fluid control subassembly.

In the EM fluid switch example embodiment described above, shaft rotations enable the alignment of fluid ports within internal fluid passages of the fluid management subsystem of the apparatus. In another EM fluid switch example embodiment, fluid is directed amongst fluid passages and/or external ports via linear motion of a sliding piston (e.g., a spool piston, including a piston with grooves enabling fluid passages across portions of the piston as described herein) as illustrated in FIG. 119 and FIG. 120. (Note the elements of the apparatus illustrated in FIGS. 119 and 120 are the same.) For clarity, the description herein may refer to a spool piston, which is intended to encompass both spool valves and rotary pilot valve or other types of valves which enable a redirection of fluid and/or enabling of one or more fluid passages in response to an action or force on an element of the valve (e.g., spool piston), unless the context indicates otherwise.

In an example embodiment of an EM fluid switch spool (EM fluid switch S), the EM fluid switch S includes an electric motor 120100, a gearbox 120200, an electric control circuit 120300, a micro switch 120400, shaft 120600, and cam/cog wheel with posts 120500, as similarly described above with respect to the EM fluid switch. For example, the electric motor 120100, gearbox 120200, and electronic control circuit 120300 is optionally the same motor, gearbox, and electronic circuit of the EM fluid switch described herein above. Similarly, the micro switch 120400, Shaft 120600, and cam 120500 is optionally the same micro switch 112300, shaft 112400, and cog wheel 112700 with cog wheel posts 112900 (except with fewer or more posts) of the EM fluid switch described herein above. In this example embodiment of an EM fluid switch S, the shaft includes a crank 120900. The fluid management element 120700 interfaces to the electric motor element via a rod 120800 linked to the crank 120900 at one end and the spool piston 120700 at the other end. The fluid management element includes a fluid management body 120750 and a spool 120700 wherein the fluid management body includes a Fluid Port 120950, a Fluid Port 120960, and a Fluid Port 120970. Optionally, the electric motor is manufactured and/or user configured with an associated set of gears or a gearbox 120200. The gears may be configured to enable an increase in torque applied to the shaft (e.g., shaft 120600). This torque may be configured so as to provide adequate force to overcome the friction of the shaft in contact with the housing and to overcome any friction forces and fluid pressure forces in the spool piston assembly. Additionally, a high gear ratio (e.g., 50:1) may be provided that enables the motor, when turned off, to have several wind down revolutions, caused by rotor inertia, without significantly affecting the spool functional position.

EM Fluid Switch S with on/Off Control

In an example embodiment, an EM fluid switch S state change is initiated in response to a receipt of an electronic control signal. In this example embodiment, the source control signal state change (e.g., four states) is triggered by an electrical control signal on/off transition as similarly described above herein for the EM fluid switch. Optionally, the same electrical schematic diagram illustrated in FIGS. 123 and 124 is used in the EM fluid switch S example embodiment.

In an example embodiment, in State 1, the external control signal is in the off state. In State 1, the motor is running based at least in part on an energized circuit including a circuit path from the power source to the external closed relay circuit c2-d2 of SW22 and the closed circuit j2-i2 of limit switch SW33, see FIG. 123. The energized circuit causes the powered electric motor to rotate the shaft 120600. In State 1, a first lobe (e.g., Lobe 1) of a cam of the shaft 120600 interfaces with a limit switch SW22 and continues to interface with the limit switch SW22 through a 90 degree rotation of the shaft 120600.

In State 2, as the shaft 120600 rotation approaches 90 degrees the first lobe disengages from the interfacing limit switch SW22 causing the powered State 1 circuit to open via an open j2-i2 circuit/path. In State 2, the limit switch SW22 also closes the k2-i2 circuit/path. In State 2, the open circuit causes the running electric motor and connected shaft 120600 to stop in a first position. In the first position, the crank causes the spool 120700 to be positioned to the left as illustrated in FIG. 119. The spool 120700 in the first position enables external control fluid to enter fluid port 120950 (analogous to the input port 111100 of the EM fluid switch), pass through the fluid management subsystem, and exit an open fluid port 120970 while blocking fluid port 120960 (analogous to the bleed port 111200 of the EM fluid switch). The control fluid exiting the fluid port 120970 enters an associated output valve(s) (e.g. via an external fluid passage such as a tube) to cause, at least in part, the output valve(s) to close (the "off" state, as described herein above).

In State 3, the control signal is switched to the on state (SW11) causing the closure of the circuit a2-b2 of SW11. The control switch SW11 closure causes current passing through the relay switch SW22 to open circuit c2-d2 and close circuit g2-h2. The closure of circuit g2-h2 enables an energized circuit to power the electric motor to rotate the shaft 120600. The energized circuit powering the motor in State 3 comprises, at least in part, a circuit path from the power source through the closed circuit connection a2-b2 of external switch SW11, the closed circuit connection g2-h2 of relay switch SW22, and the closed circuit connection k2-j2 of limit switch SW33, see also FIG. 124. In State 3, a second lobe (e.g., Lobe 2) interfaces with the limit switch SW22 and continues to interface with the limit switch SW22 through a 90 degree rotation of the shaft 120600.

In State 4, as the shaft 120600 rotation approaches 90 degrees the second lobe disengages from the interfacing limit switch SW22 causing the energized circuit to open via an opening of the k2-i2 circuit/path. In State 4, the limit switch SW22 also closes the j2-i2 circuit/path. In State 4, the open circuit causes the running electric motor and connected shaft 120600 to stop in a second position. In the second position, the crank causes the spool 120700 to be positioned to the right as illustrated in FIG. 120. The spool 120700 in the second position enables external fluid to exhaust from the diaphragm chamber of the associated output valve(s) through fluid port 120970 and bleed port 120960 while closing input control fluid port 120950. The exhausting of fluid from the diaphragm chamber of the output valve(s) causes, at least in part, the output valve(s) to open (the "on" state, as described herein above). In this example embodiment, the shaft first position and shaft second position are offset by 180 degrees. A subsequent control signal causes the above described 4 State cycle to repeat.

Certain fluid systems such as a Boomback center pivot irrigation system, or other fluid system, may conventionally require separate control of multiple sets of output valves (e.g., wherein a set of output valves comprises a single output valve or a plurality of output valves) typically requiring a plurality of solenoids. Optionally, the electric motor fluid switch may be configured to simply and cost effectively accomplish this task, as illustrated in the example embodiment illustrated in FIG. 142.

FIG. 142 illustrates certain aspects of the electric motor fluid switch assembly which may be used for multiple set output valve control applications. Upstream fluid may be used as a control fluid to facilitate the actuation of the sets of output valves. In this example embodiment, the upstream fluid enters the assembly housing at the fluid port 142100. Fluid port 142200 is fluidly connected to the diaphragm bonnet on a first output valve or a first set of output valves. Fluid port 142300 is similarly fluidly connected to the diaphragm bonnet on a second output valve or a second set of output valves. In another aspect of the assembly, vent port 142400 provides a fluid vent for both the first and second output valve and/or first and second set of output valves. In this example embodiment, fluid venting occurs when bonnet pressurization is removed/terminated. The fluid pressure applied to the bonnet is manage by the electric motor fluid switching mechanism as further described below. FIGS. 143 and 144 illustrate control fluid management with solid lines indicating upstream control fluid flow and dashed lines indicating venting fluid flow.

FIG. 143 illustrates spool piston 143600 in a state positioned to the far left. As previously described above, the spool piston position/state changes in response to an electrical signal which causes the motor activation enclosed in housing 142900 to apply a force on the spool piston. In this far left state, the spool piston grooves line up to affect a first fluid passage comprising: control fluid input port 142100, internal fluid passage 143100 leading to the spool piston chamber, the spool groove 143200, and bi-directional port 142300 fluidly connected to the second output valve/set of output valves. In this far left state, the spool piston grooves also create a second fluid passage comprising: bi-direction port 142200 leading to the first output valve/set of output valves, the spool piston groove 143300, the internal fluid passage 143400 leading from the spool piston chamber, and the vent port 141400. When the spool piston position/state is to the far left, upstream control fluid traverses the first fluid passage and enters, for example via a fluid connection from output port 142300, the second output valve or second set of output valves causing, at least in part, the second output valve/set of output valves to close (e.g., via fluid entering the bonnet diaphragm chamber causing the valve to close). Also, when the spool piston position/state is to the far left, fluid is vented (e.g., to ambient) from the first output valve/set of output valves through the second fluid passage causing, at least in part, the first output valve/set of output valves to open (e.g., via fluid exiting the bonnet diaphragm chamber causing the valve to open).

FIG. 144 illustrates spool piston 143600 in a state positioned to the far right. As previously described above, the spool piston position/state changes in response to an electrical signal which causes the motor activation enclosed in housing 142900 to apply a force on the spool piston. In this far right state, the spool piston grooves line up to affect a third fluid passage comprising: control fluid input port 142100, internal fluid passage 144100 leading to the spool piston chamber, the spool groove 143300, and bi-directional port 142200 fluidly connected to the first output valve/set of output valves. In this far right state, the spool piston grooves also creates a fourth fluid passage comprising: bi-direction port 142300 leading to the second output valve/set of output valves, the spool piston groove 143200, the internal fluid passage 143400 leading from the spool piston chamber, and the vent port 141400. When the spool piston position/state is to the far right, upstream control fluid traverses the third fluid passage and enters, for example via a fluid connection from output port 142200, the first output valve or second set of output valves causing, at least in part, the first output valve/set of output valves to close (e.g., via fluid entering the bonnet diaphragm chamber causing the valve to close). Also, when the spool piston position/state is to the far right, fluid is vented (e.g., to ambient) from the second output valve/set of output valves through the fourth fluid passage causing, at least in part, the second output valve/set of output valves to open (e.g., via fluid exiting the bonnet diaphragm chamber causing the valve to open).

In yet another example embodiment as illustrated in FIG. 129, an EM fluid switch state change is initiated in response to receipt of an electronic control signal. In this example embodiment, the source control signal state change (e.g., four states) is triggered by an electrical control signal on/off transition as similarly described above herein. Optionally, the electrical/mechanical schematic diagram illustrated in FIG. 129 includes a simplified electrical circuit as compared to the previously described example EM fluid switch embodiments. In the example embodiment operation described below, the bleed port 111200 is initially closed and the input fluid port 111100 to be open, see also FIG. 112.

In this example embodiment, in State 1, the external control signal is in the on state with the circuit of SW111 closed (see also FIG. 129). The closed circuit (ZAa and ZAb) causes current to pass through the relay switch SW222 to close circuit ZAc-ZAd and open circuit ZAc-ZAe. In State 1, the motor is running based at least in part on a circuit path from the power source to the external closed relay circuit ZAc-ZAd of SW222 and the closed circuit ZAg-ZAh of limit switch SW333, see FIG. 129. The energized circuit causes the powered electric motor to rotate the shaft 112400. In State 1, a first lobe (e.g., Lobe 1) of a cam of the shaft 112400 interfaces with limit switch SW333 and continues to interface with limit switch SW333 through a 90 degree rotation of the shaft 112400.

In State 2, as the shaft 112400 rotation approaches 90 degrees the first lobe disengages from the interfacing limit switch SW333 causing the powered State 1 circuit to open via an open ZAg-ZAh leg. In State 2, the limit switch SW333 also closes the ZAf-ZAh leg (or circuit/path), at least in part in response to the first lobe disengagement. In State 2, at least in part in response to the open circuit, the now non-energized electric motor and connected valve shaft 112400 stop in a first position. The valve shaft first position causes an alignment of valve shaft ports 112910, 112920 enabling the exhaust flow of diaphragm chamber fluid from the associated output valve(s) through bleed port 111200, causing, at least in part, the output valve(s) to open (the "on" state, as described herein above). The rotation of the shaft to the first position also causes separate ports (e.g., the pair of ports 112610, 112620) on the shaft 112400 to move out of alignment with their associated housing fluid passages causing a blocking of input fluid port 111100 through the EM fluid switch.

In State 3, the control signal is switched to the off state (SW111) causing the opening of the circuit ZAa-ZAb of SW111. In response to the open circuit of external SW111, the relay switch SW222 opens circuit ZAc-ZAd and closes circuit ZAc-ZAe. The closure of circuit ZAc-ZAe together with the closure of ZAh-ZAf in State 2, enables the energized circuit to power the electric motor to rotate the shaft 112400. The energized circuit powering the motor in State 3 comprises, at least in part, a circuit path from the power source through the closed circuit connection ZAc-ZAe of external switch SW222, the closed circuit connection ZAh-ZAf of limit switch SW333, see also FIG. 130. In State 3, a second lobe (e.g., Lobe 2) interfaces with the limit switch SW333 and continues to interface with the limit switch SW22 through a 90 degree rotation of the shaft 112400.

In State 4, as the shaft 112400 rotation approaches 90 degrees the second lobe disengages from the interfacing limit switch SW333 causing the powered State 3 circuit to open via an open ZAf-ZAh leg. In State 4, the limit switch SW333 also closes the ZAg-ZAh leg (or circuit/path), at least in part in response to the second lobe disengagement. In State 4, at least in part in response to the open circuit, the now non-energized electric motor and connected valve shaft 112400 stop in a second position. The valve shaft second position causes an alignment of valve shaft ports (e.g., the pair of ports 112610, 112620) enabling the flow of input port fluid 111100 to flow through the fluid switch, through an external fluid passage, and to the associated output valve(s) to cause, at least in part, the output valve(s) to close (the "off" state, as described herein above). The rotation of the shaft to the second position also causes the shaft ports 112910 and 112920 on the shaft 112400 to move out of a position of alignment with their associated housing fluid passages causing a bleed passage to be blocked through the EM fluid switch. A subsequent control signal initiates the above described 4 State cycle to repeat. FIG. 131 illustrates the four possible electro-mechanical device states of the EM fluid switch and the associated four possible states of the fluid switch as the valve shaft rotates through 360 degrees in this example embodiment. It is understood that other example implementations may include fewer or greater than four states.

The example embodiments described herein illustrate how an electric motor configured in association with a cam shaft, various electrical circuits, and/or a pilot valve or spool piston enable a durable and long lasting apparatus that can be used to control one or more output valves; other embodiments using components known to those skilled in the art of mechanical fluid design or future components can be incorporated as well. For example, the EM fluid switches can be manufactured and/or user configured to operate in various states, various cam shaft rotations per state, additional or fewer fluid passages, additional or fewer lobes per shaft, various electronic circuits, etc. Optionally, the fluid management subsystem of the EM fluid switches can be similarly manufactured and/or user configured with other types of direction flow components including for example, a slide valve, a gate valve, axial valve seats, sliding piston, etc. Optionally, the conversion of rotary motion of the electric motor can be accomplished using a spring loaded cam, a cam shaped groove with follower, various gear configurations, etc.

As illustrated in the example embodiments above, an EM fluid switch is used in a fluid control system to reliably control an output valve(s). Advantageously, an external electronic signal optionally causes the rotation of a shaft which changes the configuration of the electronic circuit and creates a robust fluid passage to actuate an associated one or more output valves wherein the robust fluid passage is generally not susceptible to conventional dirty fluid clogging. Further advantageously, the electric motor in the assembly optionally is only activated during state transitions to reduce electric motor wear and increase the reliability of the assembly. Further advantageously, in the example embodiments illustrated herein, fluid management is isolated from the electrical components and the electric motor of the apparatus. Further advantageously, state transitions are optionally configured such that transitions are generally impervious to the fluid pressure output flows and/or the fluid pressure within the fluid management subsystem of the apparatus, thereby, reducing the force/power requirements of the associated electric motor.

RS Fluid Switch Operation with DFC Pilot Valve

Figure 113:
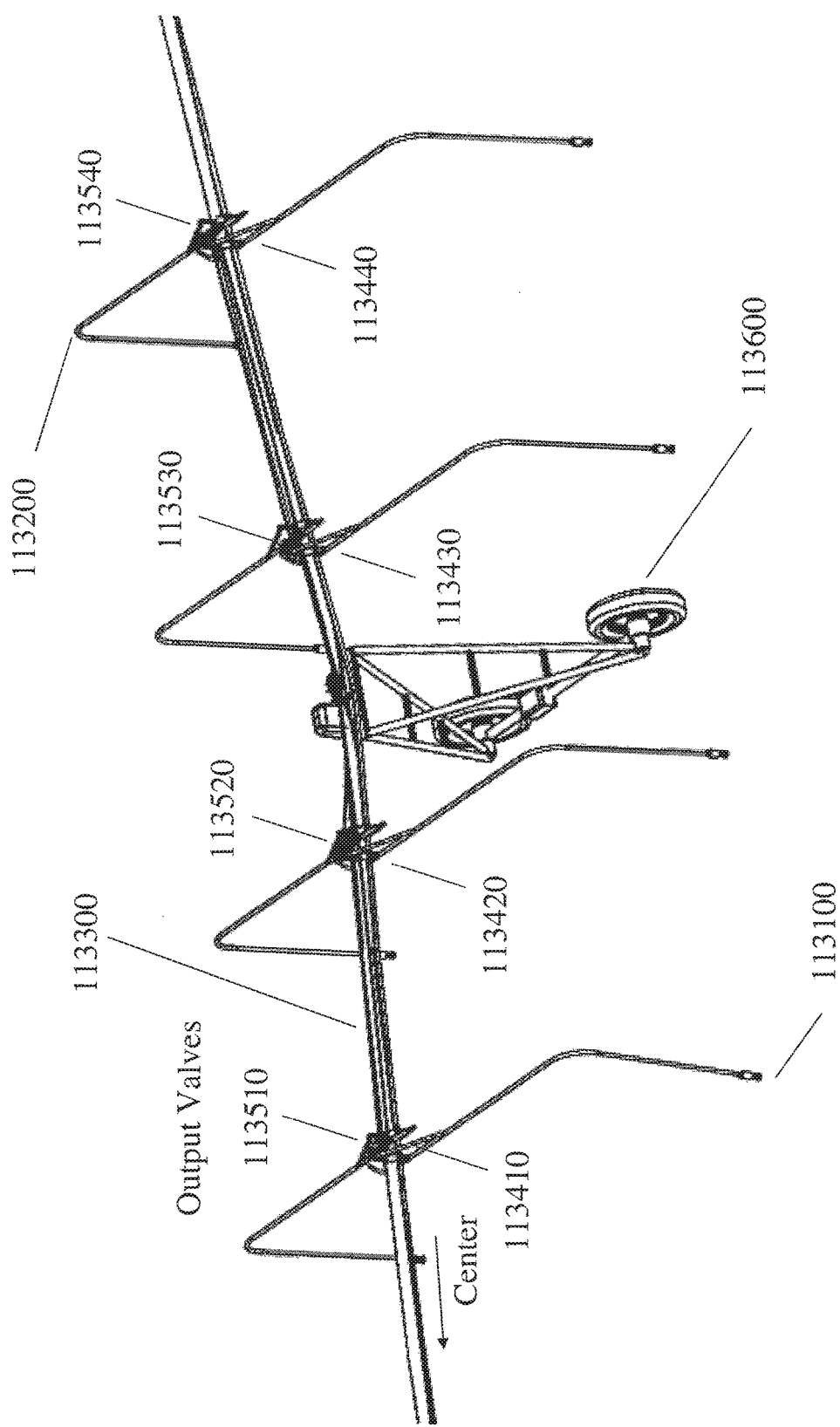
FIG. 113 depicts an example embodiment of a plurality of output valves controlled by an example rotary solenoid fluid switch and an example dual flow control pilot valve.
Figure 114:
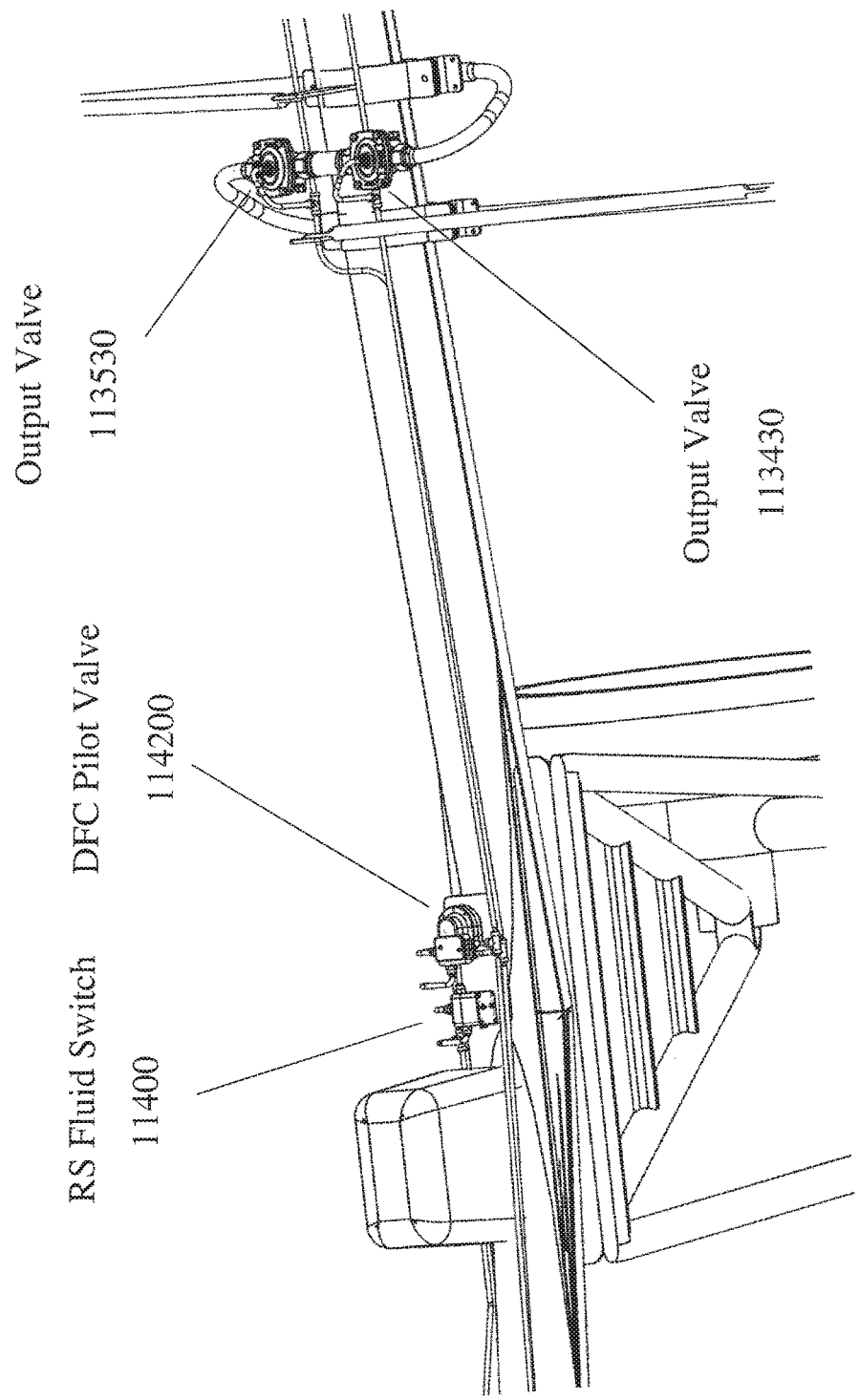
FIG. 114 depicts an enlarged portion of the example embodiment of the illustrative plurality of output valves controlled by an example rotary solenoid fluid switch and an example dual flow control pilot valve of FIG. 113.

The RS fluid switch and/or EM fluid switch example embodiments above illustrates how the fluid control assembly is used, for example, to control a single output valve or a set of output valves. In another example embodiment, the RS fluid switch or EM fluid switch provides a fluid control signal to a DFC pilot valve that optionally controls two sets of output valves. FIG. 113 illustrates an example embodiment of a system of output valves (e.g., a boomback system) in which two sets (e.g., a front set 113100 and a back set 113200) of valves/sprinklers are mounted on a center pivot boom 113300. When the center pivot is moving in the forward direction the rear sprinklers 113200 are activated. When the center pivot is moving in the reverse direction the forward sprinklers 113100 are activated. Advantageously, the dual sprinkler system configuration prevents the wheels of the center pivot system from getting bogged down in wet soil and from creating ruts which inhibit the performance of the center pivot system. In this example embodiment of a center pivot system, there is a need to activate either the front set 113100 sprinklers or the back set 113200 sprinklers depending upon the direction of center pivot rotation.

In this example embodiment an EM fluid switch or RS fluid switch 114100 is used to provide a fluid control signal to a DFC pilot valve 114200 which is associated with two sets of four output valves/sprinklers. In this example embodiment, the EM fluid switch or RS fluid switch assembly is configured such that the On state (applied voltage to the rotary solenoid) causes pressurized fluid at the Input port 111100 to flow through the second fluid passage (as described herein above) of the EM fluid switch or RS fluid switch out the bonnet port 112500. In the Off state, fluid is released via the first fluid passage of the EM fluid switch or RS fluid switch out the Bleed port 111200. In this example embodiment, the DFC pilot valve 114200 is configured to receive pressurized fluid from an EM fluid switch or RS fluid switch 114100 at the signal input port 107500. The DFC pilot valve 114200 is further configured to be in the first state (see above DFC pilot valve description of state 1) in response to pressurized input fluid entering the DFC pilot valve diaphragm chamber from the EM fluid switch or RS fluid switch. While in the DFC pilot valve state 1, input pressurized output valve control fluid at the aperture port 107400 is directed through the DFC pilot valve out port 107300, which in this example embodiment causes, at least in part, the closure of the rear facing set of diaphragm valves. In addition, in the state 1, a fluid exit path is enabled through the DFC pilot valves enabling the fluid in the front facing diaphragm valves to exhaust through the Bleed port 107600 causing, at least in part, the front facing diaphragm valves to open. When the DFC pilot valve 114200 is in state 2, pressurized output valve control fluid at the aperture port 107400 is directed through the DFC pilot valve out port 107200, which in this example embodiment causes, at least in part, the closure of the front facing diaphragm valves. In addition, in state 2, a fluid exit path is enabled through the DFC pilot valves enabling the fluid in the rear facing diaphragm valves to exhaust through the bleed port 107600 causing, at least in part, the rear facing diaphragm valves to open.

More specifically, in the center pivot example embodiment, the center pivot fluid system is irrigating a field in which the center pivot moves through a 180 degree arc in a windshield wiper fashion. In the initial and/or starting configuration, the EM fluid switch or RS fluid switch 114100 is in the Off state and the center pivot system is to the far right (as viewed from the center pivot point). In addition, the DFC pilot valve is configured such that Output port 107200 (labeled 1) is fluidly connected to the rear facing output valves/sprinklers and the Output port 107300 (labeled 2) is fluidly connected to the front facing output valves/sprinklers. The RS fluid switch 114100 is activated via the application of voltage to the encased rotary solenoid 112100 causing the RS fluid switch 114100 to transition from an Off state to an On state. The On state enables pressurized signal control fluid entering the EM fluid switch or RS fluid switch 114100 at the port 111100 to exit the RS fluid switch at the Bonnet port 112500. The pressurized signal control fluid exiting the Bonnet port 112500 and enters the Signal port 107500 of the DFC pilot valve 114200 causing the DFC pilot valve 114200 to transition to state 2. In the DFC pilot valve 114200 state 2, the rear facing output valves 113410-40 close (e.g., via the application of pressurized output valve control fluid exiting the DFC pilot valve 114200 port 107200) and the four front facing output valves 113510-40 open (e.g., via the release of pressurized output valve control fluid at port 107300 and Bleed port 107600) directing output fluid (e.g. a mixture of fertilizer and water) to the front facing sprinklers. The center pivot system pivots/moves right-to-left through the 180 degree arc. In this example embodiment, as the center pivot system travels across the field the front facing sprinklers (on the right side of the boom) are on and the rear facing sprinklers (on the left side of the boom as viewed from the center pivot point) off. Thus, the center pivot wheels 113600 stay dry (trailing sprinklers are active) through the right-to-left pivot. When the center pivot system has completed irrigating the field the center pivot system reverses direction. The voltage is removed from the EM fluid switch or RS fluid switch 114100 causing the EM fluid switch or RS fluid switch 114100 to transition from the On state to the Off state. The Off state enables pressurized fluid stored in the DFC pilot valve 114200 to bleed out through the EM fluid switch or RS fluid switch 114100 causing the DFC pilot valve to transition to state 1. In the DFC pilot valve state 1, the rear facing output valves 113410-40 open (e.g., via the release of pressurized output valve control fluid at port 107300 and Bleed port 107600) and the front facing output valves 113510-40 close (e.g., via the application of pressurized output valve control fluid exiting the DFC pilot valve 114200 port 107200) directing output fluid (e.g. a mixture of fertilizer and water) to the rear facing sprinklers. The center pivot system moves/pivots left-to-right through the 180 degree arc. In this example embodiment, as the center pivot system travels across the field the rear facing sprinklers (on the left side of the boom) are on and the front facing sprinklers (on the right side of the boom) off. Thus, the center pivot wheels 113600 stay dry (trailing sprinklers are active) through the left-to-right pivot. When the center pivot system returns to the right most starting position a cycle is completed. Optionally, the cycle is repeated until the field is sufficiently irrigated.

The center pivot example embodiment above illustrates how an EM fluid switch or RS fluid switch is configured in conjunction with a DFC pilot valve. Advantageously, in this example embodiment, neither the rotary solenoid used in the RS fluid switch nor the electric motor of the EM fluid switch interface with fluids of the overall system and conventional, lower cost and reliable, diaphragm valves (e.g., Dorot diaphragm valves or hydraulic, direct sealing diaphragm type, 2-way, control valves) are remotely controlled via a DFC pilot valve. Advantageously, as previously described a fluid control pilot valve can be positioned geographically remote from a conventional solenoid, an RS fluid switch, and/or an EM fluid switch. Optionally, the remote positioning of the fluid control pilot valve can be over a substantial distance (e.g., 10 m, 100 m, 1000 m, etc.) and, optionally, the connectivity between a controlling solenoid or EM/RS fluid switch is via fluid tubing (e.g., a plastic tubing). Advantageously, the use of fluid interconnections over large distances reduces the user's cost (e.g., cost of installing copper wiring), reduces system equipment and component theft (e.g., theft of copper wiring), and reduce the likelihood of a lighting strike to the system (e.g., as plastic tubing is not electrically conductive). Optionally, the transported signal fluid originates from a separate source from the working fluid (e.g., clean fluid) and/or the signal fluid is working fluid itself (e.g., dirty fluid output fluid such as grey water, water mixed with fertilizer, unfiltered water, etc.). Advantageously, the fluid control pilot described herein design enables operation in varying pressure environments from low (e.g., 2 psi, 5 psi, etc.) to high pressure environments (e.g., 20 psi, 30 psi, etc.) without manufacturer or user component reconfiguration. A pressure agnostic fluid control pilot valve enables a user and/or manufacturer to purchase a single type of fluid control pilot valve for use, for example, in a center pivot system which is operating in varying elevations wherein the elevation changes affect the pressure of the fluid delivered to the fluid control pilot valve. Without a pressure agnostic device, the user and/or manufacturer likely would have to configure multiple devices for each elevation and/or configure the center pivot to only operate in fields which are subject to minimal elevation change. The latter limitation substantially reduce the practicality and/or market of a moving (as opposed to fixed) fluid delivery system.

The design of the fluid control pilot valve which enables the fluid control pilot valve to be pressure agnostic is further defined herein. FIG. 132 illustrates an example embodiment of a fluid control pilot valve similar to the fluid control pilot valve previously described in FIG. 104 except for the addition of a manual control knob and relocation of the control port. FIG. 132 shows the location of fluid ports and a manual control knob, the latter enabling a user to manually activate the one or more associated irrigation valves without energizing the associated remote solenoid, RS fluid switch, or EM fluid switch. The entire unit is sealed to ambient except at the four port connections.

FIG. 133 illustrates, via a cross-sectional view, the internal routing of the fluid control pilot valve fluid paths. The fluid path routing and the cam and plunger operation is similar to that previously described with respect to the fluid control pilot valve of FIG. 104.

FIG. 134 shows a cutaway view of the fluid control pilot valve with upstream fluid entering the lower side of the diaphragm chamber at an initial application of the output valve fluid source (e.g., in an initializing state). (Note: The terms lower and upper are only used to describe positions with respect to the illustrations. There are no limitations to the spatial orientation of the fluid control pilot valve). Advantageously, the fluid port 104400 (optionally connected to an upstream port), illustrated via the small vertical internal passage of FIG. 134, is open to the lower diaphragm chamber and applies upstream fluid pressure to the lower side of the diaphragm (including for example, open to the lower diaphragm chamber during all state changes described herein).

FIG. 135 illustrates the diaphragm being deformed in an upward direction with the plunger moving accordingly causing the cam and pilot shaft to rotate as previously described with respect to FIG. 104. In this state (e.g., initializing state), the remote associated control device (e.g., solenoid, RS fluid switch, or EM fluid switch) is in a vent position enabling any fluid in the upper diaphragm chamber to vent to, for example, ambient.

FIG. 136 illustrates the lower diaphragm chamber completely filled resulting in the pilot shaft ports (not shown in this 136 illustration) being positioned to enable input fluid to fill the irrigation valve bonnet of an associated output valve and close the output valve (output valve and external water lines not shown in FIG. 136) as previously described with respect to FIG. 104.

FIG. 137 illustrates signal fluid entering the Control Port from the remote associated control device (e.g., solenoid, RS fluid switch, or EM fluid switch), for example, in response to a state change of the control device (e.g., in response to the de-activation or activation of the control device). Internal fluid control pilot valve passages enable the signal fluid pressure to be applied to the top side of the diaphragm causing an approximate equalization of pressure on both sides of the diaphragm. With the diaphragm in a pressure equilibrium state, the spring force drives the plunger downward resulting in pilot shaft rotation.

FIG. 138 illustrates the diaphragm moved by spring force to its lowest point with the plunger, cam, and pilot shaft positioned to bleed/exhaust fluid from the output valve bonnet enabling the associated output valve to open as previously described with respect to FIG. 104.

FIG. 139 illustrates fluid being ejected from the control port when the remote associated control device (e.g., solenoid, RS fluid switch, or EM fluid switch) is opened to the vent position. At least in part in response to the loss of fluid pressure on the top side of the diaphragm, the plunger moves upward toward the state where pilot shaft port rotation will align internal fluid passages to close the irrigation valve. Fluid on the top side of the diaphragm is ejected from the control port by the pressure in the upstream irrigation line acting on the lower side of the diaphragm (and the previously noted loss of fluid pressure from the control port). Advantageously, input (e.g., upstream) fluid pressure is adequate to overcome elevation induced pressures on the control line/working fluid line and to overcome the spring and friction forces within the fluid control device described herein. Thus, a signal fluid pressure can be a low pressure source (e.g., 4 or 5 psi). Optionally, with if the fluid control device is configured/manufactured with one or more small force springs and/or large area diaphragm, the signal fluid pressure from the control devices can be set to less than 4 psi (e.g., 3 or 2 psi).

The invention is not limited to the arrangements of the embodiment described above. The description is provided only to describe a fluid control device example embodiment and other embodiments can be enabled, for example, where the control port may be on the lower side and control line fluid pressure is applied to the upper side of the diaphragm and where the spring is located on the side opposite the cam and plunger. Additionally, the principle of differential pressures acting on two opposing faces is not limited to the diaphragm configuration described. Other arrangements such as a double acting piston or other configurations utilizing differential pressures, can also effect the changing of pilot valves such as spool valves, slide valves, or other common valve types via linkages coupling the valves to the driving pressure sensing member, e.g., piston, diaphragm, etc.

Conventional electrical irrigation control systems are powered by either AC or DC power. It may be advantageous to produce the fluid switch using a DC motor in order to provide a single, universal device to the end user for both manufacturing economics and end-user ease of use. Optionally, a DC motor driven fluid switch may be operated and controlled by a typical AC powered system by addition of an AC/DC converter assembly consisting of AC/DC convertor with an accompanying Single Pole Double Throw (SPDT) electrical relay shown in FIG. 140. The simple circuit converts three wire AC power and control signals to three wire DC power and control signals needed for a DC operated fluid switch and/or DC electric motor associated with a fluid switch.

The AC/DC convertor 140100 receives power from the three wire AC source from the right-hand side of FIG. 140 and converts the AC power input to DC voltages applied to the DC motor of the fluid switch (e.g., left-hand side of FIG. 140). An output 140200 from the converter is connected directly to one pole of the motor and the other output 140300 is connected to the common pole of the relay 140500. The relay is controlled by an on or off AC input 140600 from a conventional AC irrigation system controller.

Optionally, the converter and relay may be incorporated into the overall fluid switch/motor/cam assembly. Optionally, the converter assembly may be provided as a separate assembly and not increase the component and manufacturing cost for DC only environments.

A physical embodiment of the assembly is illustrated in FIG. 141. The assembly size is determined primarily by the commercially available AC/DC converter and SPDT electric relay for an approximate volume of 3 cubic inches. Connections may be via commercially available connectors, wire nuts, terminals blocks or other common electrical connection devices.

Certain embodiments of a Flow Control pilot valve, a Dual Flow Control pilot valve, a Linear Solenoid Integrated pilot valves, a Linear Solenoid Integrated Dual pilot valves, a Rotary Solenoid fluid switch, an Electric Motor fluid switch components are optionally formed of a thermoplastic material and preferably are injection molded. Materials illustratively operative herein are thermoformable plastic, polyurethane, polypropylene, polyethylene, polyester, vinyl, polystyrene, rubber, die-cast metal, aluminum, steel, other suitable metals, reinforced plastic, inter fiber reinforced composite, combinations thereof, or other materials known in the art. Thermoplastic materials operative herein illustratively include but are not limited to, polystyrene, acrylonitrile, butyl styrene, and polyalkylenes. Optionally, the illustrative materials used and the minimal number of components used in the example embodiments illustrates the innovative assemblies and the potential low cost of manufacturer of said innovative assemblies.

In the example embodiment Fluid Switches described above, the Fluid Switch is configured to actuate a certain type of diaphragm output valve (e.g., a Dorot diaphragm valve or hydraulic, direct sealing diaphragm type, 2-way, control valves). The output valve type is controlled with an input flow of control fluid and an exhaust of said input flow control fluid. In certain other types of diaphragm output valves, the valves are controlled by sealing a fluid channel in a first state and opening a fluid passage in a second state. For example, a conventional diaphragm valve as illustrated in FIG. 13 is in a closed state when the bleed port 19500 of the diaphragm chamber 22200 is fluidly blocked. The same conventional diaphragm valve as illustrated in FIG. 19 is in an open state when the bleed port 19500 of the diaphragm chamber 22200 is fluidly open. To actuate these conventional diaphragm valve types, the Fluid Switch described above are configured such that the pair of shaft port 112610, 112620 is removed and/or plugged. Thus, if the Rotary Solenoid Fluid Switch example embodiment is used to control a conventional diaphragm valve, when the solenoid is energized the fluid passage leading from the output valve to the bleed port of the RS Fluid switch is open, enabling the fluid in the diaphragm chamber of the output valve to exhaust and the output diaphragm valve to open. When the solenoid is in the non-energized state, the fluid passage leading from the output valve to the RS Fluid Switch is blocked, causing at least in part, the output diaphragm valve to close. Similarly, with respect to the EM Fluid Switch, when a control signal is applied to the EM Fluid Switch, the EM Fluid Switch changes state and the fluid passage leading from the output valve to the bleed port of the RS Fluid Switch is opened, enabling the fluid in the diaphragm chamber of the output valve to exhaust and the output diaphragm valve to open. When a subsequent control signal is applied to the EM Fluid Switch, the EM Fluid Switch changes state and the fluid passage leading from the output valve to the RS Fluid Switch is blocked, causing at least in part, the output diaphragm valve to close.

In the example embodiment Fluid Switches, the Fluid Switches optionally replace solenoids used to control diaphragm output valves. In the Fluid Switch illustrations above, the Fluid Switch is fluidly connected to an output valve(s), for example via tubing, enabling the Fluid Switch to be configured remotely from the output valve(s). Optionally, a diaphragm output valve includes a threaded solenoid mount position. Optionally, the Fluid Switches described herein are configured in a housing which enables the Fluid Switches to be screwed into the threaded receiving area of the output valve housing. Thus, for example in a Dorot type diaphragm output valve (or hydraulic, direct sealing diaphragm type, 2-way, control valve), the bonnet port 112500 comprises an internal fluid passage within the threaded housing interfacing with the diaphragm chamber port of the output valve similar to the internal fluid passage 34400 (see FIG. 31). In another example embodiment, certain conventional diaphragm output valves include a threaded solenoid/actuator mount position. Thus, for example in a conventional diaphragm output valve, the bonnet port 112500 comprises an internal fluid passage within the threaded housing interfacing with the diaphragm chamber port of the output valve similar to the internal fluid passage 50400 (see FIG. 51).

Optionally, no gaskets and/or adaptors are required to interface a Fluid Switch device assembly into the actuator/solenoid mount position. Optionally, one or more Fluid Switch device assemblies are each separately designed to interface within the actuator/solenoid mount position of different output valves without the use of adaptors. Optionally, no machining of the pre-existing diagraph valve is required for the retrofit. Optionally, one or more O-rings or gaskets or other sealing mechanisms may be used to improve the seal between the solenoid mount position of the diaphragm valve and the interface port 112500 of the fluid control device. Optionally, other adaptors are provided to physically mate any brand of commercial valve with the fluid control device. For example, flanges and/or compression fittings can be used to mate the two devices.

Optionally, in certain example embodiments the diaphragm output valve is configured remote from the Fluid Switch. Certain diaphragm output valves include a threaded solenoid/actuator mount position as illustrated herein above. Optionally, the Fluid Switch is fluidly connected remotely from the diaphragm output valve via tubing. Optionally, an adapter is threaded into the receiving mount position of the output valve and connected to the tubing enabling a sealed fluid passage between the diaphragm chamber of the output valve and the Fluid Switch.

ILLUSTRATED EXAMPLES

Certain embodiments are further illustrated with respect to the following non-limiting examples. In these example embodiments, water is used as the fluid. Other example embodiments could use other forms of liquid or a gas. It is appreciated that the flow control system is independent of the fluid that is delivered, and a person having ordinary skill in the art recognizes that enablement for one liquid enables one to make and use certain embodiments with any fluid.

The process flows depict alternative example embodiments where a user is using a pressure activated, fluid flow, regulating device to irrigate a field. The example operating environment include a central pump, a master valve, one or more tributary valves, one or more distribution (tributary) valve actuators, one or more main fluid delivery lines, one or more distribution delivery lines, and, one or more fluid delivery terminals.

The first example operating environment illustrates the irrigation of a farm field using an example embodiment of a fluid flow regulating device; the device labeled a fluid activated servo assembly. The device enables the land owner to irrigate a field without manual labor beyond initial setup. Further, the device enables the land owner to irrigate without electrical power beyond the master valve which is located a considerable distance from the field to be irrigated.

The second example operating environment illustrates the irrigation of a farm field using an example embodiment of a fluid flow regulating device; the device labeled a sequencing actuator. The sequencing actuator enables the land owner to irrigate a field without manual labor beyond initial setup. Further, the sequencing actuator enables the land owner to irrigate without electrical power beyond the master valve which is located a considerable distance from the field to be irrigated.

The third example operating environment illustrates the irrigation of a farm field using an example embodiment of a fluid flow regulating device; the device also labeled a lockstep actuator. The lockstep actuator enables the land owner to irrigate a field without manual labor beyond initial setup. Further, the lockstep actuator enables the land owner to irrigate without electrical power beyond the master valve which is located a considerable distance from the field to be irrigated.

The fourth example operating environment illustrates the irrigation of a farm field using an example embodiment of a fluid flow regulating device; the device also labeled a lockstep actuator. The second variant lockstep actuator enables the land owner to irrigate a field without manual labor beyond initial setup. Further, the lockstep actuator enables the land owner to irrigate without electrical power beyond the master valve which is located a considerable distance from the field to be irrigated.

The fifth example operating environment illustrates the irrigation of a farm field using an example embodiment of a fluid flow regulating device; the device also labeled a lockstep actuator. The third variant lockstep actuator enables the land owner to irrigate a field without manual labor beyond initial setup. Further, the lockstep actuator enables the land owner to irrigate without electrical power beyond the master valve which is located a considerable distance from the field to be irrigated.

First Example Embodiment

Figure 11:
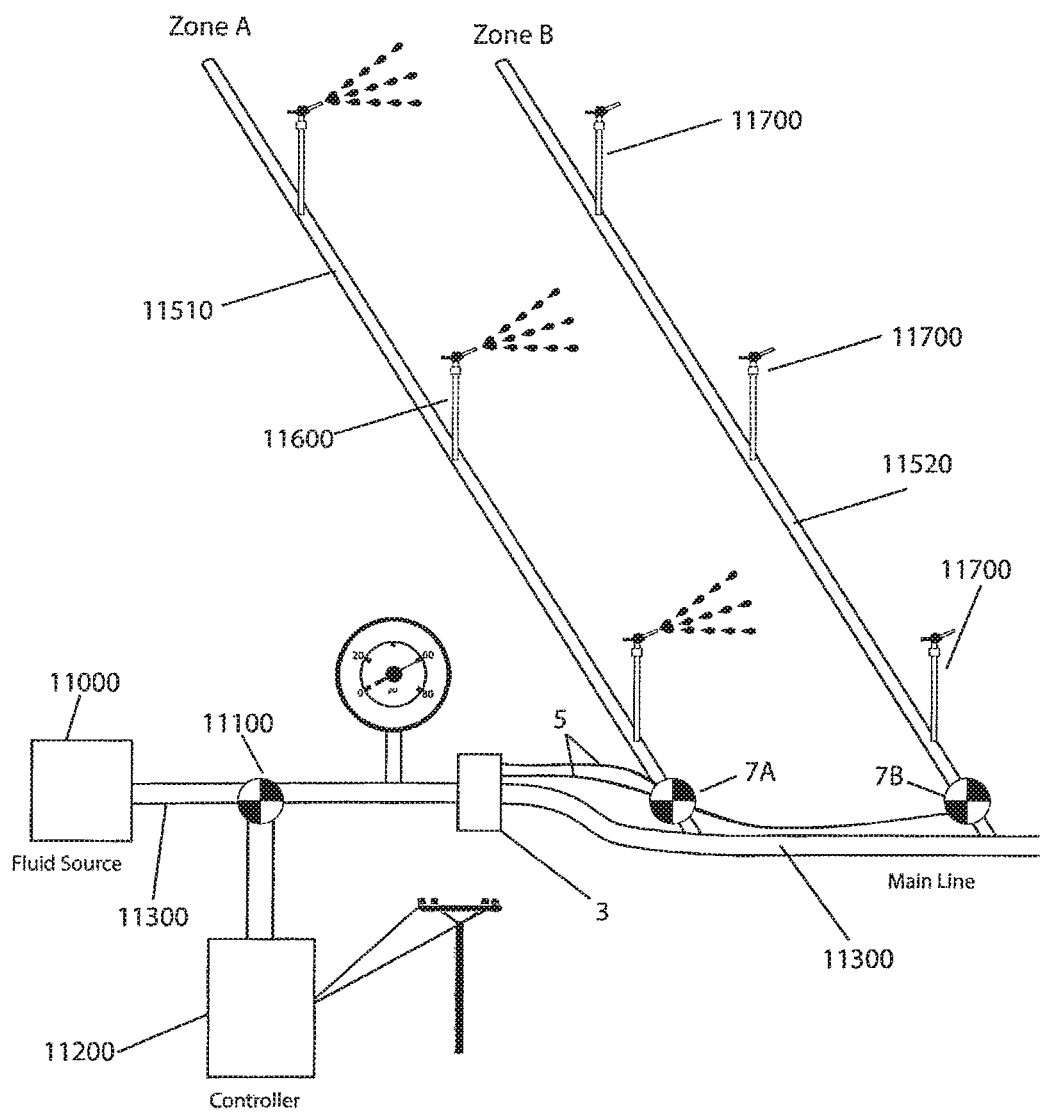
FIG. 11 depicts a first example operating environment for a fluid activated actuator assembly.

The first example operating environment illustrates the irrigation of a field using a single actuator without manual labor or electrical power beyond the central pump and master valve, see FIG. 11.

FIG. 11 illustrates the operating environment of a first example fluid activated actuator system. The operating environment consists of a pressurized water source (e.g., a water pump) 11000. The pressurized water is delivered using conventional water transport methods including, for example PVC pipes, to a master valve 11100. The master valve 11100, for example, is a conventional diaphragm valve. Attached to the master valve 11100 is a conventional valve controller 11200. The valve controller actuates the master valve 11100 into a closed or open position based upon a user configurable timing schedule. When the master valve 11100 is actuated into the on/open position by the controller 11200, pressurized fluid is released from the water source 11000 into the main line 11300. In this example operating environment, the main water line 11300 is fluidly connected to 2 diaphragm valves 7A and 7B in a parallel circuit fashion. In this example, the diaphragm valves 7A and 7B are controlled via a fluid activated servo assembly 3. The fluid activated servo assembly 3 is fluidly connected to adapters 6A and 6B via tubing 5. When the diaphragm valve 7A is in the on position, source water in the main line is delivered to a lateral water line 11510. When the diaphragm valve is in the off position, source water in the main line is prevented from flowing down the lateral water line 11510. Similarly, with respect to diaphragm valve 7B, when the diaphragm valve is in the on position, source water in the main line is delivered to the lateral water line 11520. When the diaphragm valve is in the off position, source water in the main line is prevented from flowing down the lateral water line 11520. Each lateral water line 11510 and 11520 is configured with a series of sprinklers 11600 and 11700, respectively. Water flowing through the lateral line exits the sprinklers and the field is thereby irrigated. Lastly, in this example, the fluid activated servo assembly 3 is a considerable distance from the master valve 11100 (e.g., 250 yards or more) and at a considerable distance from each other.

In this first example, the valve actuator assembly 3 is installed on the main water line 11300 over a small bore hole. Optionally, in this example, the valve actuator assembly includes an inlet port and an outlet port which is spliced into the main water line 11300. In addition, an adapter device 6A and 6B replace a solenoid-based actuator in conventional diaphragm valves 7A and 7B (in this example, no modification of the existing diaphragm valve itself is required).

In this sprinkler irrigation example, water is applied to a farm field using a timed schedule. Irrigation begins every day at 6 AM in the morning and cycles/alternates between Zone A and Zone B for periods of 1 hour. Irrigation of the field ends at 10 AM each day resulting in an irrigation total of 2 hours for each Zone. Zone A is covered by sprinklers 11600 and Zone B is covered by sprinklers 11700. The water source 11000 applies water fluid pressure to the main line, see FIG. 11. Lastly, in this example, the water cycle ended the previous day with valve 7A open and valve 7B closed.

State 1. In this example, at 6 AM the controller 11200, which includes a timing mechanism, opens the master control valve 11100.

State 2. With the opening of the control valve 11100, pressurized water begins to flow down the main line 11300. The pressurized water makes contact with the diaphragm 12 of the fluid actuated servo assembly 3, see FIG. 2.

State 3. The pressure from the fluid exerts a force against the diaphragm 12 causing the diaphragm 12 to move in a linear motion (e.g., in FIG. 2 upwards). In this example, a drive post 11 is coupled to the diaphragm 12. The linear motion of the diaphragm 12 causes the coupled drive post 11 to move (e.g., in FIG. 2 upwards). In this example, the drive post 11 is incased within a channel within the protective housing of the assembly 3 to direct the motion of the drive post. Further, a leaf spring 10 is fixed to the drive post 11. In this example, the leaf spring 10 moves linearly in the direction of the drive post 11, see FIG. 2.

State 4. The leaf spring 10 has a flange at the end which creates a shelf 12000, see FIG. 12. The shelf 12000 is in contact with a cog wheel post 19 of cog wheel 8, see FIG. 3. The linear motion of the leaf spring 10 applies a force to the cog wheel post 19 which causes the cog wheel to advance 90 degrees (as the fluid pressure compresses the diaphragm 12).

State 5. An anti-back rotational leaf spring 9 includes a flange at the end which creates a shelf 12000, see FIG. 12. In this example, the anti-back rotational leaf spring is inverted to the leaf spring 10 and is in contact with cog wheel post 19 directly opposite the cog wheel post in contact with the leaf spring 10. The anti-back rotational leaf spring 9 is also fixed to the housing of the servo assembly 3. As the cog wheel 8 advances in State 4, the cog wheel post 19 in contact with the anti-back rotational leaf spring 9 bends the leaf spring but does not impede the progress of the cog wheel 8. In this example, as the cog wheel 8 nears a 90 degree rotation, the anti-back rotational leaf spring 9 clears the flanged end and engages the cog wheel post 19 to prevent back rotation when the leaf spring 10 is reset (e.g., in a response a drop in fluid pressure).

State 6. Cog wheel 8 is fixed to a servo valve shaft 20 which rotates as the cog wheel 8 rotates. In this example, 90 degrees rotation of the servo valve shaft aligns the servo valve shaft port 21A with interconnect fittings 18A to allow fluid to pass between adjoining fittings. Similarly, a second servo valve shaft port 21B, perpendicular to servo valve shaft port 21A rotates 90 degrees blocking the fluid flow between adjoining interconnect fittings 18B, see FIG. 3.

State 7. The servo valve 4 is fluidly connected via tubing 5 to Adaptor 6A, see FIG. 1. In this example, prior to the rotation of the cog wheel 8 in State 4 there is a fluid passageway from the inlet line of valve 7A, through: (a) diaphragm valve spacer passage 19300, (b) diaphragm valve bleed passage 19500, (c) the adapter 6A channel 49, (d) the interconnect tubing 5, (e) the servo valve interconnect fitting 18B, (f) the servo valve port 21B (g) the companion servo valve interconnect fittings 18B, (h) the interconnect tubing 5 to the adapter 6A, (i) the adapter's 6A companion adapter passage 61, (j) diaphragm valve bleed water flow passage 19600, and into the outlet line of 7A, see FIG. 15 and FIG. 19. With the rotation of the servo valve shaft 20 in State 6, the water flow through the servo valve port 21B is blocked. Because the servo valve port 21B and the diaphragm bleed port 19500 of diaphragm valve 7A are fluidly connected as described above, the bleed port 19500 is effectively closed when the servo valve port 21B is blocked.

State 8. The closing of the bleed port 19500 causes the water pressure to increase in the diaphragm chamber 22200 and coupled with the force of the spring 22400 causes the diaphragm valve 7A to close. The closure of the diaphragm valve prevents the water flow from the inlet line 11300 to the outlet line 11520.

State 9. In this example, the rotation of the servo valve 20 in State 6 creates a water channel through the servo valve port 21A, see FIG. 3. As similarly discussed above, servo valve 4 is fluidly connected via tubing 5 to Adaptor 6B. When the servo valve port 21A is in the open position there is a fluid passage from the inlet of valve 7B, through: (a) diaphragm valve spacer passage 22300, (b) diaphragm valve bleed passage 22500, (c) the adapter channel 49 of adapter 6B, (d) the interconnect tubing 5, (e) the interconnect fittings 18A, (f) the servo valve port 21A, (g) companion interconnect fittings 18A on the servo valve assembly 4, (h) the interconnect tubing 5 to the adapter 6B, (i) the adapter's 6B companion adapter passage 61, (j) diaphragm valve bleed water flow passage 22600, and into the output line of 7B. Because the servo valve port 21A and the bleed port 22500 of diaphragm valve 7B are fluidly connected as described above, the bleed port 22500 is effectively open when the servo valve 21A is opened. The fluid behind the diaphragm 22700 escapes via the bleed port through the passage 49 and exits the valve following the water passage described above, see FIG. 13.

State 10. With the loss of pressure in the diaphragm chamber 22200, the force of the water pressure in the inlet 11300 overcomes the spring compression 19400 and the diaphragm valve 7B opens. Water flows unobstructed from the inlet 11300 through the diaphragm valve 7B to the outlet 2B. The irrigation of Zone B begins.

State 11. At the 1 hour mark, the controller 11200 briefly shuts off water pressure in the inlet line 11300 (e.g., by closing a valve).

State 12. With respect to closed valve 7A, a decrease in water pressure causes fluid to leak from the diaphragm passage 22300. However, the diaphragm valve 7A remains closed due to the force exerted by the compression spring 22400, see FIG. 22.

State 13. With respect to open valve 7B, a decrease in water pressure causes the diaphragm compression spring 22400 to overcome the decreasing fluid pressure. The diaphragm valve transitions to a closed state.

State 14. With respect to fluid actuated servo assembly 3, the loss of water pressure enables the return spring 16 compression to overcome the water pressure exerted against the diaphragm 12 causing the diaphragm 12 to move in a linear motion (e.g., in FIG. 2 downwards). In this example, the linear motion of the diaphragm 12 causes the coupled drive post 11 and coupled leaf spring to also move (e.g., in FIG. 2 downwards).

State 15. As the leaf spring 10 retracts the beginning of the flanged end of the leaf spring 12000 makes contact with the cog wheel post 19. As the leaf spring 10 continues to retract the cog wheel post 19 causes the leaf spring 10 to bend slightly outward but does not impede the progress of the spring. Near the end of the retraction of the leaf spring 10, the flanged end 12000 clears the cog wheel post 19 and the shelf of the leaf spring 10 engages the cog wheel post 19.

State 16. As the leaf spring 10 retracts, the anti-back rotation leaf spring 9 inverted to the leaf spring 10 is in contact with cog wheel post 19 directly opposite the cog wheel post in contact with the leaf spring 10. The anti-back rotation leaf spring 9 prevents the cog wheel 8 from rotating during the leaf spring 10 retraction. The actuator is now reset.

State 18. The controller 11200 reasserts water pressure in the inlet line 11300 (e.g., by opening a valve).

States 19-22. The States 2-5 are repeated. In this example, the diaphragm 12 moves linearly (e.g. upward) in response to the water pressure causing the drive post 11 and leaf spring 10 to move which in turn causes the cog wheel 8 to rotate.

State 23. Cog wheel 8 is fixed to a servo valve 20 which rotates as the cog wheel 8 rotates. In this example, 90 degrees rotation of the servo valve aligns the servo valve shaft port 21B with interconnect fittings 18B to allow fluid to pass between adjoining fittings. Similarly, a second servo valve shaft port 21A, perpendicular to servo valve shaft port 21B rotates 90 degrees blocking the fluid flow between adjoining interconnect fittings 18b, see FIG. 3.

State 24. The opening of servo valve shaft port 21B causes the fluidly connected diaphragm valve 7A to open as similarly described in State 9 and State 10. The opening of the diaphragm valve enables the water flow from the inlet line 11300 to the outlet line 11520. The irrigation of Zone A begins.

State 25. The closing of servo valve shaft port 21A (see State 23) causes the fluidly connected diaphragm valve 7B to close as similarly described in State 7 and State 8. The closure of the diaphragm valve stops the water flow from the inlet line 11300 to the outlet line 11520. The irrigation of Zone B ends.

State 26. At the 2 hour mark, the controller 11200 briefly shuts off water pressure in the inlet line 1 (e.g., by closing a valve).

States 27-35. The States 2 through 10 are repeated. The water shutoff resets the actuator. The application of water pressure causes the valve shaft port 21B to close and associated diaphragm valve 7A to close. The irrigation of Zone A ends. The corresponding opening of the valve shaft port 21A causes the associated diaphragm valve 7B to open. The irrigation of Zone B begins.

State 36. At the 3 hour mark, the controller 11200 briefly shuts off water pressure in the inlet line 11300 (e.g., by closing a valve).

States 37-50. The States 12 through 25 are repeated. The water shutoff resets the actuator. The application of water pressure causes the valve shaft port 21B to open and associated diaphragm valve 7A to open. The irrigation of Zone A begins. The corresponding closing of the valve shaft port 21A causes the associated diaphragm valve 7B to close. The irrigation of Zone B ends.

State 51. At the 4 hour mark, the controller shuts off water pressure in the inlet line 11300 (e.g., by closing a valve) terminating the field irrigation for the day. The cycle repeats beginning the next morning at 6 AM.

Second Example Embodiment

The second example operating environment, similar to the first example, illustrates the irrigation of a field using a single actuator without manual labor or electrical power beyond the central pump and master valve. In this example, as compared to the first example, the sequencing valve actuator is mounted in the solenoid position in one of the diaphragm valves in the operating system. This fluid activated actuator configuration reduces the number of parts in the system, is simpler to install, and requires no bore hole in the main line.

Figure 39:
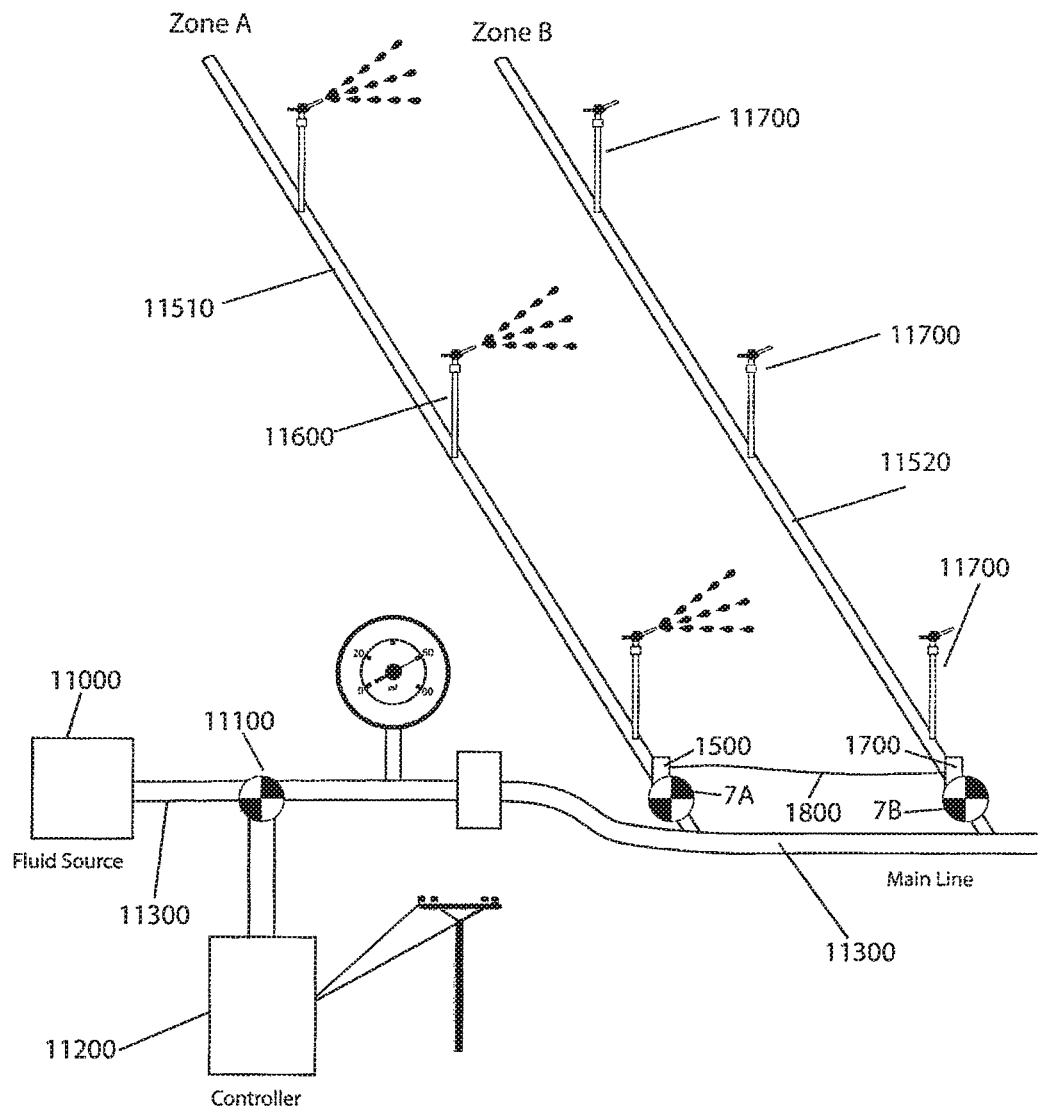
FIG. 39 depicts a second example operating environment for a fluid activated actuator assembly.

FIG. 39 illustrates the operating environment of a second example fluid activated actuator system. The operating environment consists of a pressurized water source (e.g., a water pump) 11000. The pressurized water is delivered using conventional water transport methods including, for example PVC pipes, to a master valve 11100. The master valve 11100, for example, is a conventional diaphragm valve. Attached to the master valve 11100 is a conventional valve controller 11200. The valve controller actuates the master valve 11100 into a closed or open position based upon a user configurable timing schedule. When the master valve 11100 is actuated into the on/open position by the controller 11200, pressurized fluid is released from the water source 11000 into the main line 11300. In this second example operating environment, the main water line 11300 is fluidly connected to 2 diaphragm valves 7A and 7B in a parallel circuit fashion. In this example, the diaphragm valves 7A and 7B are controlled via a fluid activated sequencing actuator 1500. The sequencing actuator 1500 is mounted in the solenoid position of the diaphragm valve 7A. The sequencing actuator 1500 is also fluidly connected to adapter 1700 via tubing 1800. When the diaphragm valve 7A is in the on position, source water in the main line is delivered to a lateral water line 11510. When the diaphragm valve is in the off position, source water in the main line is prevented from flowing down the lateral water line 11510. Similarly, with respect to diaphragm valve 7B, when the diaphragm valve is in the on position, source water in the main line is delivered to the lateral water line 11520. When the diaphragm valve is in the off position, source water in the main line is prevented from flowing down the lateral water line 11520. Each lateral water line 11510 and 11520 is configured with a series of sprinklers 11600 and 11700, respectively. Water flowing through the lateral line exits the sprinklers and the field is thereby irrigated. Lastly, in this example, the diaphragm valves 7A and 7B are a considerable distance from the master valve 11100 (e.g., 250 yards or more) and at a considerable distance from each other.

In this second example, the sequencing actuator assembly 1500 replaces two conventional solenoid-based actuators as illustrated in FIG. 20 and FIG. 21. In this example, the solenoid 20100 in the diaphragm valve 7A is replaced with the sequencing actuator 1500. Further, the solenoid in the second diaphragm valves 7B, which is slaved to the actuator 1500, is replaced with an adapter 1700 and fluidly connected to the sequencing actuator assembly 1500 via tubing 1800, see FIG. 21. In this example, no modification to the existing diaphragm valve is required. Optionally, the diaphragm valves are purchased by the user without solenoids and the sequencing actuator assembly 1500 and adapter 1700 are installed without a solenoid removal step. Optionally, the diaphragm valves are purchased with the sequencing actuator preinstalled.

In this sprinkler irrigation example, water is applied to a farm field using a timed schedule. Irrigation begins every day at 6 AM in the morning and cycles/alternates between Zone A and Zone B for periods of 1 hour. Irrigation of the field ends at 10 AM each day resulting in an irrigation total of 2 hours for each Zone. Zone A is covered by sprinklers 11600 and Zone B is covered by sprinklers 11700. The water source 11000 applies water fluid pressure to the main line, see FIG. 39. Lastly, in this example, the water cycle ended the previous day with valve 7A closed and valve 7B open.

State 1. The user actuates the valve manually by pulling the manual setting knob 14650, see FIG. 14, until the actuator indicator 38000 indicates that the first valve 7A is closed and that the second valve 7B is open. (In this example, manually actuating to a closed first valve 7A and an open second valve 7B will result in an initial open first valve 7A when water pressure is applied. Conversely, in this example, manually actuating to an open first valve 7A and a closed second valve 7B will result in an initial closed first valve 7A when water pressure is applied.)

State 2. In this example, at 6 AM the controller 11200, which includes a timing mechanism, opens the master control valve 11100.

State 3. Fluid begins to flow down the main line 11300 with the opening of the control valve 11100 and makes contact with the diaphragm valve 7A, see FIG. 39. The water flows through the spacer passage 22300 building up water pressure behind the diaphragm seating the diaphragm if it was previously not seated in the closed position, see FIG. 22.

State 4. Fluid flows through the diaphragm valve passageway 22500 into the sequencing actuator 1500.

State 5. Fluid enters the actuator diaphragm chamber 14300 via the sequencing actuator passage 14700. As the chamber 14300 fills, the pressure from the fluid exerts a force against the diaphragm 14400 overcoming the return spring 14550 compression causing the diaphragm 14400 to move in a linear motion (e.g., upwards in FIG. 14).

State 6. In this example, a rigid pressure disk 14100 is coupled to diaphragm 14400, see FIG. 14. The linear motion of the diaphragm 14400 causes the coupled rigid pressure disk to move in a linear motion (e.g., upwards in FIG. 2). In this example, the rigid pressure disk 14100 is incased within a channel within the protective housing to ensure the linear direction of motion of the pressure disk.

State 7. A leaf/drive spring 16000 is fixed to the rigid pressure disk 14100. In this example, the drive spring 16000 moves linearly in the direction of the rigid pressure disk 14100.

State 8. The drive spring 16000 has a hook at the end 16100, see FIG. 16. The end of the hook 16100 is in contact with a cog wheel 8 and cog wheel post 19. The linear motion of the drive spring 16000 applies a force to the cog wheel post 19 which causes the cog wheel to advance 90 degrees.

State 9. In this example, an anti-back rotational leaf spring 16300 is positioned parallel to the leaf spring 16000 but inverted and located on the adjacent but opposite side of the cog wheel 8, see FIG. 16. The anti-back rotational leaf spring 16300 includes a bend at the end 16400 which enables the cog wheel post 19, on rotation of the cog wheel, to enter underneath the leaf spring 16300. The anti-back rotational leaf spring 16300 is also fixed to the housing 14200 of the sequencing actuator 1500. As the cog wheel 8 advances in State 8, the anti-back rotational leaf spring 16300 makes contact with the leaf spring but does not impede the progress of the cog wheel 8. In this example, as the cog wheel 8 nears a 90 degree rotation, the anti-back rotational leaf spring 16300 clears the end of the anti-back rotational leaf spring and engages the cog wheel post 19 to prevent back rotation when the pressure disk 14100 and coupled diaphragm 14400 retracts (e.g., in response to the spring 14550 overcoming a drop in fluid pressure in the chamber 14300).

State 10. Cog wheel 8 is fixed to a pilot valve shaft 14900 which rotates as the cog wheel 8 rotates, see FIG. 17. In this example, a 90 degrees rotation of the pilot valve aligns the pilot valve shaft port 17100 with passageway 18980 to allow fluid to pass through the cog wheel 8 via the pilot valve shaft port 17100 into the sequencing passageway 18300. Similarly, a second pilot valve shaft port 17200, perpendicular to pilot valve shaft port 17100 rotates 90 degrees blocking the fluid flow to the interconnect fitting 17400, see FIG. 17.

State 11. With the opening of the valve shaft port 17100, a diaphragm bleed port fluid passage is created through which water can flow. Water flows through: (a) the diaphragm valve bleed path 22500, (b) the sequencing actuator bleed path 14700, (c) the pilot valve 17000, (d) the valve shaft port 17100, (e) the sequencing actuator bleed path 18980 and 18300, (f) the diaphragm bleed path 22600, and into the outlet 11510, see FIGS. 18 and 22. Therefore, water from the diaphragm valve chamber 22200 exhausts through this passage into outlet 11510.

State 12. With the loss of pressure in the diaphragm valve chamber 22200 caused by the water flow passage of State 11, the force of the water pressure in the inlet 11300 overcomes the spring compression 19400 and the diaphragm valve opens, see FIG. 19. Water flows unobstructed from the inlet 11300 through the diaphragm valve 7A to the outlet 11510. The irrigation of Zone A begins.

State 13. As illustrated in FIG. 21, the sequencing actuator fitting 17400 is fluidly connected to fluid adaptor 1700 via interconnect tubing 1800. With the rotation of the pilot valve as described in State 10, the fluid flow past the fitting is blocked. Consequently, the following fluidly connected passage is blocked: (a) sequencing actuator fitting 17400, (b)

interconnect tubing 1800, (c) fluid adaptor 1700 fluid passage 26000, and, (d) diaphragm bleed passage 19500.

State 14. The blockage of the bleed passage 19500 as described in State 13 causes the water pressure flowing in from spacer passage 19300 to build up in the diaphragm chamber 22200, see FIG. 19 and FIG. 22. The shape of the diaphragm 22700 and compression spring 22400 overcome the pressure exerted by the source water cause an expansion of the diaphragm linearly (e.g., downward in FIG. 22) closing the diaphragm valve 7B.

State 15. At the 1 hour mark, the controller 11200 briefly shuts off water pressure in the inlet line 1 (e.g., by closing a valve).

State 16. With respect to closed valve 7B, a decrease in water pressure causes fluid to leak from the diaphragm passage 22300. However, the diaphragm valve 7B remains closed due to the force exerted by the compression spring 22400, see FIG. 22.

State 17. With respect to open valve 7A, a decrease in water pressure causes the diaphragm compression spring 19400 to overcome the decreasing fluid pressure. The diaphragm valve transitions to a closed state.

State 18. With the pressure drop, the water in the sequencing actuator diaphragm chamber 14300 exits through the sequencing actuator passageway 14700 and diaphragm bleed port 19500, see FIG. 18. With loss of pressure in the sequencing actuator diaphragm chamber 14300, the return spring 14550 exerts a force on the pressure disk 14100 causing linear motion (e.g., downward motion in FIG. 18).

State 19. The linear motion of the pressure disk 14100 causes a linear motion of the coupled drive spring 16300. As the coupled drive spring in contact with the cog wheel 8 moves downward, the drive spring edge 16100 makes contact with the cog wheel post 19. As the coupled drive spring moves downward, the cog wheel 8 is held in a fixed position by the leaf spring 16300 in contact with the cog wheel post 19. The coupled drive spring continues its downward motion as the curved edge of the drive spring 16100 moves over the surface of the cog wheel post 19, bending outward, until the drive spring clears the post and engages the cog wheel post 19. The actuator is reset.

State 20. The controller 11200 then reasserts water pressure in the inlet line 11300 (e.g., by opening a master valve 11100).

State 21. The pressurized water flow moves down the main line 11300 and makes contact with the diaphragm valve 7A. The water flows through the spacer passage 22300 through the diaphragm valve passageway 22500 into the sequencing actuator 1500. Fluid enters the actuator diaphragm chamber 14300 via the sequencing actuator passage 14700.

State 22. As the chamber fills, the pressure from the fluid exerts a force against the diaphragm 14400 overcoming the return spring 14550 compression causing the diaphragm 14400 to move in a linear motion (e.g., in FIG. 14 upwards).

State 23. In this example, a rigid pressure disk 14100 is coupled to diaphragm 14400, see FIG. 14. The linear motion of the diaphragm 14400 causes the coupled rigid pressure disk to move in a linear motion (e.g., in FIG. 2 upwards). In this example, the rigid pressure disk 14100 is incased within a channel within the protective housing to ensure the linear direction of motion of the pressure disk.

State 24. A leaf/drive spring 16000 is fixed to the rigid pressure disk 14100. In this example, the drive spring 16000 moves linearly in the direction of the rigid pressure disk 14100.

State 25. The drive spring 16000 has a hook at the end 16100, see FIG. 16. The end of the hook 16100 is in contact with a cog wheel 8 and cog wheel post 19. The linear motion of the drive spring 16000 applies a force to the cog wheel post 19 which causes the cog wheel to advance 90 degrees.

State 26. In this example, an anti-back rotational leaf spring 16300 is positioned parallel to the leaf spring 16000 but inverted and positioned on the adjacent but opposite side of the cog wheel 8, see FIG. 16. The anti-back rotational leaf spring 16300 includes a bend at the end which enables the cog wheel post 19, on rotation of the cog wheel, to enter underneath the leaf spring 16300. The anti-back rotational leaf spring 16300 is also fixed to the housing 14200 of the sequencing actuator 1500. As the cog wheel 8 advances in State 25, the anti-back rotational leaf spring 16300 makes contact with the leaf spring but does not impede the progress of the cog wheel 8. In this example, as the cog wheel 8 nears a 90 degree rotation, the anti-back rotational leaf spring 16300 clears the end of the anti-back rotational leaf spring and engages the cog wheel post 19 to prevent back rotation when the pressure disk 14100 and coupled diaphragm 14400 retracts (e.g., in response to the spring 14550 overcoming a drop in fluid pressure in the chamber 14300).

State 27. Cog wheel 8 is fixed to a pilot valve shaft 14900 which rotates as the cog wheel 8 rotates, see FIG. 17. In this example, a 90 degrees rotation of the pilot valve aligns the pilot valve shaft port 17200 with passageway 14950 to allow fluid to pass from the fitting 17400 into the sequencing actuator passageway. Similarly, a second pilot valve shaft port 17100, perpendicular to pilot valve shaft port 17200 rotates 90 degrees blocking the fluid flow through the cog wheel 8, see FIG. 14 and FIG. 17.

State 28. With the opening of the valve shaft port 17200, a diaphragm bleed port fluid passage is created through which water can flow from valve 7B, see FIG. 26. Water flows through: (a) the diaphragm bleed path 22500, the sequencing adapter 26000, interconnect tubing 1800, the sequencing actuator fitting 17400, the pilot valve 17200, the sequencing actuator bleed path 14950, the diaphragm bleed port path 19600, and into the outlet 11510.

State 29. With the loss of pressure in the diaphragm chamber 22200, the force of the water pressure in the inlet 11300 overcomes the spring compression 19400 and the diaphragm valve 7B opens. Water flows unobstructed from the inlet 11300 through the diaphragm valve 7B to the outlet 11520. The irrigation of Zone B begins.

State 30. With the rotation of the pilot valve as described in State 27, the fluid flow through the cog wheel 8 is blocked. Consequently, the following fluidly connected passages are blocked: sequencing actuator passage 14700 and diaphragm bleed passage 19500.

State 31. The blockage of the diaphragm bleed passage 19500 causes the water pressure flowing in from diaphragm passage 19300 to build up in the diaphragm chamber 22200. The shape of the diaphragm 22200 and compression spring 22400 overcome the pressure exerted by the source water causing an expansion of the diaphragm linearly (e.g., downward in FIG. 14) closing the diaphragm valve 7A. The irrigation of Zone A ends.

State 32. At the 2 hour mark, the controller 11200 briefly shuts off water pressure in the inlet line 11300 (e.g., by closing the master valve 11100).

States 33-42. The States 3 through 12 are repeated. The water shutoff resets the actuator. The application of water pressure causes the pilot valve shaft port 17100 to open and associated diaphragm valve 7A to open. The irrigation of Zone A begins. The corresponding closing of the valve shaft port 17200 causes the associated diaphragm valve 7B to close. The irrigation of Zone B ends.

State 43. At the 3 hour mark, the controller 11200 briefly shuts off water pressure in the inlet line 11300 (e.g., by closing the master valve 11100).

States 44-59. The States 16 through 31 are repeated. The water shutoff resets the actuator. The application of water pressure causes the valve shaft port 17200 to open and associated diaphragm valve 7B to open. The irrigation of Zone B begins. The corresponding closing of the valve shaft port 17100 causes the associated diaphragm valve 7A to close. The irrigation of Zone A ends.

State 60. At the 4 hour mark, the controller shuts off water pressure in the inlet line 1 (e.g., by closing the master valve 11100) terminating the field irrigation for the day. The cycle repeats beginning the next morning at 6 AM.

Third Example Embodiment

The third example operating environment, similar to the first and second example, illustrates the irrigation of a field using multiple fluid activated actuators without manual labor or electrical power beyond the central pump and master valve. In this example, as compared to the first and second example, the fluid activated valve actuator (labeled a lockstep actuator) is mounted in the solenoid position in each of the diaphragm valves in the operating system see FIG. 20 and FIG. 24. The lockstep actuator further simplifies the operating environment for a user but is designed using the same general concepts and principles as the actuators of examples 1 and 2. In particular, the lockstep actuators do not require connective tubing between the actuator and associated or slaved diaphragm valves.

Figure 23:
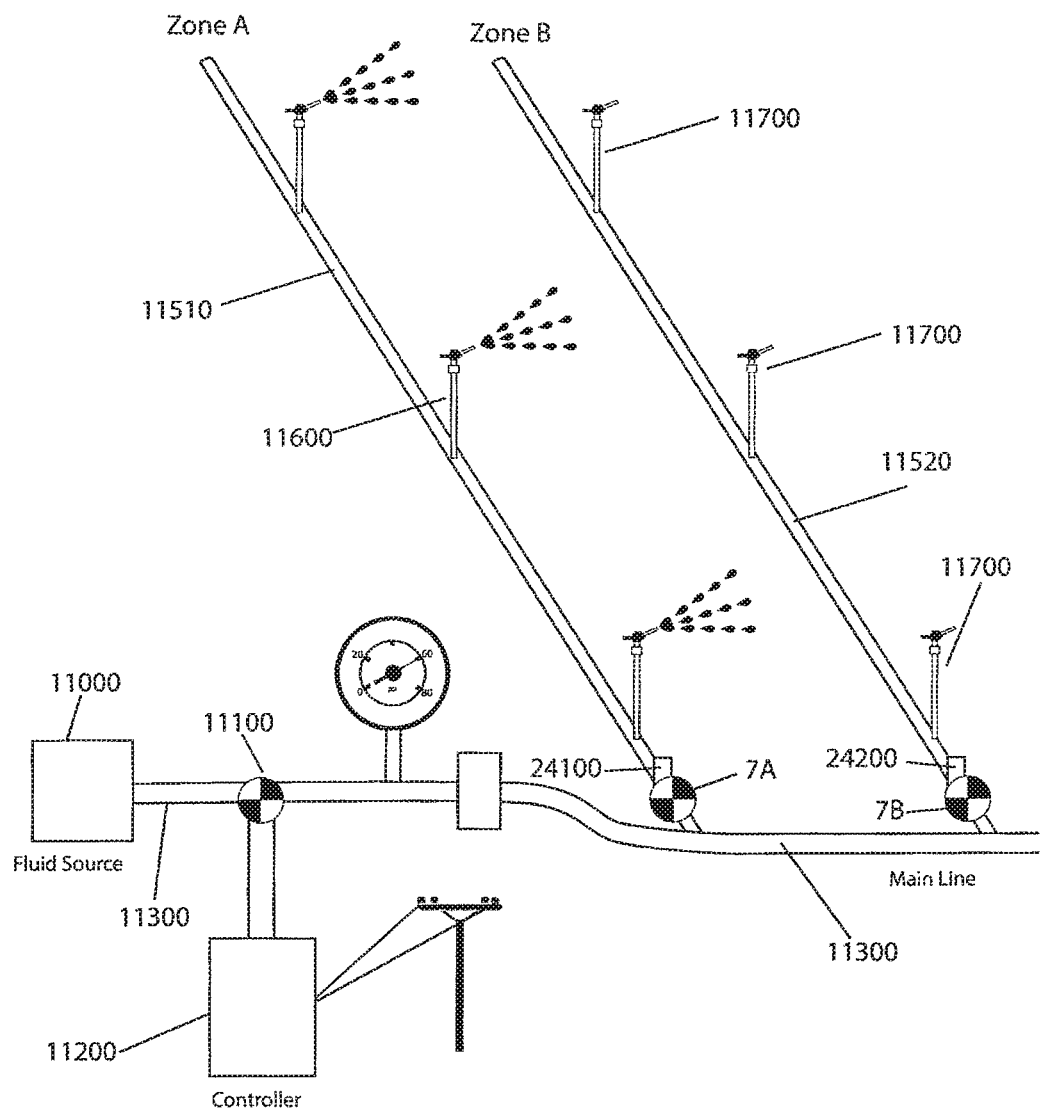
FIG. 23 depicts a third example operating environment for a fluid activated actuator assembly.

FIG. 23 illustrates the operating environment of a third example fluid activated actuator system. The operating environment consists of a pressurized water source (e.g., a water pump) 11000. The pressurized water is delivered using conventional water transport methods including, for example PVC pipes, to a master valve 11100. The master valve 11100, for example, is a conventional diaphragm valve. Attached to the master valve 11100 is a conventional valve controller 11200. The valve controller actuates the master valve 11100 into a closed or open position based upon a user configurable timing schedule. When the master valve 11100 is actuated into the on/open position by the controller 11200, pressurized fluid is released from the water source 11000 into the main line 11300. In this third example operating environment, the main water line 11300 is fluidly connected to 2 diaphragm valves 7A and 7B in a parallel circuit fashion. In this example, the diaphragm valves 7A and 7B are controlled via 2 fluid activated lockstep actuators 24100 and 24200, respectively. When the diaphragm valve is in the on position, source water in the main line is delivered to a lateral water line 11510. When the diaphragm valve is in the off position, source water in the main line is prevented from flowing down the lateral water line 11510. Similarly, with respect to diaphragm valve 7B, when the diaphragm valve is in the on position, source water in the main line is delivered to the lateral water line 11520. When the diaphragm valve is in the off position, source water in the main line is prevented from flowing down the lateral water line 11520. Each lateral water line 11510 and 11520 is configured with a series of sprinklers 11600 and 11700, respectively. Water flowing through the lateral line exits the sprinklers and the field is thereby irrigated. Lastly, in this example, the diaphragm valves 7A and 7B are a considerable distance from the master valve 11100 (e.g., 250 yards or more) and at a considerable distance from each other.

In this third example, the lockstep actuators 24100 and 24200 replace two conventional solenoid-based actuators as illustrated in FIG. 24. In this example, the solenoids in the diaphragm valves 7A and 7B are replaced with lockstep actuators 24100 and 24200, see FIG. 24. In this example, no modification to the existing diaphragm valve is required. Optionally, the diaphragm valves are purchased by the user without solenoids and the lockstep actuators 24100 and 24200 are installed without a solenoid removal step. Optionally, the diaphragm valves are purchased with the lockstep actuators preinstalled.

In this sprinkler irrigation example, water is applied to a farm field using a timed schedule. Irrigation begins every day at 6 AM in the morning and cycles/alternates between Zone A and Zone B for periods of 1 hour. Irrigation of the field ends at 10 AM each day resulting in an irrigation total of 2 hours for each Zone. Zone A is covered by sprinklers 11600 and Zone B is covered by sprinklers 11700. The water source 11000 applies water fluid pressure to the main line, see FIG. 23.

State 1. The user manually actuates the lockstep actuator by pulling the manual setting knob 24400 until the actuator indicator 24300 indicates that the first actuator 7A is in a closed diaphragm valve position. The user manually actuates the lockstep actuator by pulling the manual setting knob 24400 until the actuator indicator 24300 indicates that the second actuator 7B is in an open diaphragm valve position. [In this example, manually actuating to a closed first valve and an open second valve will result in an initial open first valve when water pressure is applied. Conversely, in this example, manually actuating to an open first valve and a closed second valve will result in an initial closed first valve when water pressure is applied.]

State 2. In this example, at 6 AM the controller, which includes a timing mechanism 11200, opens the master control valve 11100.

State 3. Fluid begins to flow down the main line 11300 with the opening of the control valve 11100. The pressurized water flow moves down the main line 11300 and makes contact with the diaphragm valve 7A, see FIG. 23. The water flows through the spacer passage 22300 building up water pressure behind the diaphragm seating the diaphragm if it was previously not seated in the closed position, see FIG. 29.

State 4. Fluid flows through the diaphragm valve passageway 22500 into the lockstep actuator 24100.

State 5. Fluid enters the actuator diaphragm chamber 28800 via the lockstep actuator passage 29900, see FIG. 29. As the chamber fills, the pressure from the fluid exerts a force against the diaphragm 28810 overcoming the return spring 28550 compression causing the diaphragm 28810 to move in a linear motion (e.g., in FIG. 29 upwards).

State 6. In this example, a rigid pressure disk 28555 is coupled to diaphragm 28810, see FIG. 29. The linear motion of the diaphragm 28810 causes the coupled rigid pressure disk to move in a linear motion (e.g., in FIG. 29 upwards). In this example, the rigid pressure disk 28555 is incased within a channel within the protective housing to ensure the linear direction of motion of the pressure disk.

State 7. A leaf/drive spring 16000 is fixed to the rigid pressure disk 28555. In this example, the drive spring 16000 moves linearly in the direction of the rigid pressure disk 28555.

State 8. The drive spring 16000 has a hook at the end 16100, see FIG. 16. The end of the hook 16100 is in contact with a cog wheel 25400 and cog wheel post 19. The linear motion of the drive spring 16000 applies a force to the cog wheel post 19 which causes the cog wheel to advance 90 degrees.

State 9. In this example, an anti-back rotational leaf spring 16300 is positioned parallel to the leaf spring 16000 but inverted to the leaf spring and positioned on the adjacent but opposite side of the cog wheel 25400, see FIG. 16. The anti-back rotational leaf spring 16300 includes a bend at the end which enables the cog wheel post 19, on rotation of the cog wheel, to enter underneath the leaf spring 16300. The anti-back rotational leaf spring 16300 is also fixed to the housing 28500 of the lockstep actuator 24100. As the cog wheel 25400 advances in State 8, the anti-back rotational leaf spring 16300 makes contact with the cog wheel post 19 and the spring bends outward but does not impede the progress of the cog wheel 25400. In this example, as the cog wheel 25400 nears a 90 degree rotation, the anti-back rotational leaf spring 16300 clears the end of the anti-back rotational leaf spring and engages the cog wheel post 19 to prevent back rotation when the pressure disk 28555 and coupled diaphragm 28810 retracts (e.g., in response to the return spring 28550 overcoming a drop in fluid pressure).

State 10. Cog wheel 25400 is fixed to a pilot valve shaft 28350 which rotates as the cog wheel 25400 rotates, see FIG. 28. In this example, a 90 degrees rotation of the pilot valve shaft aligns the pilot valve shaft port 27100 with passageway 28100, see FIG. 28 and FIG. 27, to allow fluid to flow through the actuator housing via the diaphragm chamber 28800 and internal fluid passageway 28600, through the pilot valve shaft port 27100, and into the valve bleed water passageway 28300.

State 11. With the opening of the pilot valve port 27100, a bleed water passage is created through which fluid can flow. Water flows through: (a) the diaphragm valve bleed path 22500, (b) the lockstep actuator bleed path 28900, (c) the diaphragm chamber 28800 (d) the pilot valve port 27100, (e) the lockstep actuator bleed path 28100, through the diaphragm valve bleed path 22600, and into the outlet 11510. Water from the diaphragm valve chamber 22200 exhausts through this passage into outlet 11510.

State 12. With the loss of pressure in the diaphragm chamber 22200, the force of the water pressure in the inlet 11300 overcomes the spring compression 19400 and the diaphragm valve 7A opens, see FIG. 19. Water flows unobstructed from the inlet 11300 through the diaphragm valve 7A to the outlet 11510. The irrigation of Zone A begins.

State 13. Returning to State 3. Fluid begins to flow down the main line 11300 with the opening of the control valve 11100. The pressurized water flow moves down the main line 11300 and makes contact with the diaphragm valve 7B, see FIG. 23 (which is an open position). The water flows through the spacer passage 19300, through the bleed port passage 19500, and through the lockstep actuator passage 28900, see FIG. 28.

State 14. Fluid enters the actuator diaphragm chamber 28800 via the lockstep actuator passage 28900. As the chamber fills, the pressure from the fluid exerts a force against the actuator diaphragm 28810 overcoming the return spring 28550 compression causing the diaphragm 28810 to move in a linear motion (e.g., in FIG. 28 upwards).

State 15. In this example, a rigid pressure disk 28555 is coupled to diaphragm 28810, see FIG. 28. The linear motion of the diaphragm 28810 causes the coupled rigid pressure disk to move in a linear motion (e.g., in FIG. 28 upwards). In this example, the rigid pressure disk 28555 is incased within a channel within the protective housing to ensure the linear direction of motion of the pressure disk.

State 16. A leaf/drive spring 16000 is fixed to the rigid pressure disk 28555. In this example, the drive spring 16000 moves linearly in the direction of the rigid pressure disk 28555.

State 17. The drive spring 16000 has a hook at the end 16100, see FIG. 16. The end of the hook 16100 is in contact with a cog wheel 25400 and cog wheel post 19. The linear motion of the drive spring 16000 applies a force to the cog wheel post 19 which causes the cog wheel to advance 90 degrees.

State 18. In this example, an anti-back rotational leaf spring 16300 is positioned parallel to the leaf spring 16000 but inverted to the leaf spring and positioned on the adjacent but opposite side of the cog wheel 25400, see FIG. 16. The anti-back rotational leaf spring 16300 includes a bend at the end which enables the cog wheel post 19, on rotation of the cog wheel, to enter underneath the leaf spring 16300. The anti-back rotational leaf spring 16300 is also fixed to the housing 28500 of the lockstep actuator 24200. As the cog wheel 25400 advances in State 17, the anti-back rotational leaf spring 16300 makes contact with the cog wheel post 19 and the spring bends outward but does not impede the progress of the cog wheel 25400. In this example, as the cog wheel 25400 nears a 90 degree rotation, the anti-back rotational leaf spring 16300 clears the end of the anti-back rotational leaf spring and engages the cog wheel post 19 to prevent back rotation when the pressure disk 28555 and coupled diaphragm 28810 retracts (e.g., in response to the spring 28550 overcoming a drop in fluid pressure).

State 19. Cog wheel 25400 is fixed to a pilot valve shaft 28350 which rotates as the cog wheel 25400 rotates. In this example, a 90 degrees rotation of the pilot valve shaft blocks the water flow to pilot valve shaft outlet port 27100, see FIG. 29.

State 20. With the closing of the pilot valve port 27100, the diaphragm bleed port passage 19500 is effectively closed. Water pressure in the valve diaphragm chamber 22200 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7B closed. In this example, Zone B is not irrigated during the first hour.

State 21. At the 1 hour mark, the controller 11200 briefly shuts off water pressure in the inlet line 11300 (e.g., by closing the master valve 11100).

State 22. With respect to open valve 7A, a decrease in water pressure causes the diaphragm compression spring 19400 to overcome the decreasing fluid pressure. The diaphragm valve transitions to a closed state.

State 23. With the pressure drop, the water in the lockstep actuator 24100 diaphragm chamber 28800 exits through the lockstep actuator passages 28900 and 28100 and diaphragm bleed port 19500 and 19600, respectively, see FIGS. 19 and 28. With loss of pressure in the lockstep actuator diaphragm chamber 28800, the return spring 28550 exerts a force on the pressure disk 28555 causing linear motion (e.g., downward motion in FIG. 28).

State 24. The linear motion of the pressure disk 28555 causes a linear motion of the coupled drive spring 16000. As the coupled drive spring in contact with the cog wheel 25400 moves downward, the drive spring edge 16100 makes contact with the cog wheel post 19. As the coupled drive spring moves downward, the cog wheel 8 is held in a fixed position by the leaf spring 16300 in contact with the cog wheel post 19. The coupled drive spring continues its downward motion as the curved edge of the drive spring 16100 moves over the surface of the cog wheel post 19, bending outward, until the drive spring clears the post and engages the cog wheel post 19. The lockstep actuator 24100 is reset.

State 25. With respect to closed valve 7B, the diaphragm compression spring 22400 maintains the valve closed in light of the decreased water pressure.

State 26. With the pressure drop, the water in the lockstep actuator 24200 diaphragm chamber 28800 exits through the lockstep actuator passage 29900 and diaphragm bleed port 22500, see FIG. 22 and FIG. 28. With loss of pressure in the lockstep actuator diaphragm chamber 28800, the return spring 28550 exerts a force on the pressure disk 28555 causing linear motion (e.g., downward motion in FIG. 29).

State 27. The linear motion of the pressure disk 28555 causes a linear motion of the coupled drive spring 16000. As the coupled drive spring in contact with the cog wheel 25400 moves downward, the drive spring edge 16100 makes contact with the cog wheel post 19. As the coupled drive spring moves downward, the cog wheel 25400 is held in a fixed position by the leaf spring 16300 in contact with the cog wheel post 19. The coupled drive spring continues its downward motion as the curved edge of the drive spring 16100 moves over the surface of the cog wheel post 19, bending outward, until the drive spring clears the post and engages the cog wheel post 19. The lockstep actuator 24200 is reset.

State 28. The controller 11200 then reasserts water pressure in the inlet line 11300 (e.g., by opening a master valve 11100).

State 29. The pressurized water flow moves down the main line 11300 and makes contact with the diaphragm valve 7A, see FIG. 24 (which is an open position). The water flows through the spacer passage 19300, through the bleed port passage 19500, and through the lockstep actuator passage 28900, see FIG. 28.

State 30-36. Repeating States 14-20, with the closing of the pilot valve port 27100, the diaphragm bleed port passage 19500 is effectively closed. Water pressure in the valve diaphragm chamber 22200 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7A closed. The irrigation of Zone A ends.

State 37. Returning to State 28. Fluid begins to flow down the main line 11300 with the opening of the control valve 11100. The pressurized water flow moves down the main line 11300 and makes contact with the diaphragm valve 7B, see FIG. 24. The water flows through the spacer passage 22300 building up water pressure behind the diaphragm seating the diaphragm if it was previously not seated in the closed position.

State 38-46. Repeating States 4-12, with the loss of pressure in the diaphragm chamber 22200, the force of the water pressure in the inlet 11300 overcomes the spring compression 19400 and the diaphragm valve 7A opens, see FIG. 19. Water flows unobstructed from the inlet 11300 through the diaphragm valve 7B to the outlet 11510. The irrigation of Zone B begins.

State 47. At the two hour mark, the controller 11200 briefly shuts off water pressure in the inlet line 11300 (e.g., by closing the master valve 11100).

States 48-50. Repeating States 25-27, with the pressure drop, the water in the lockstep actuator diaphragm chamber 28800 exits through the lockstep actuator passage 29900 and diaphragm bleed port 22500, see FIG. 22 and FIG. 29. The lockstep actuator 24100 resets.

States 51-53. Repeating States 22-24, with the pressure drop, the water in the lockstep actuator diaphragm chamber 28800 exits through the lockstep actuator passages 28900 and 28100 and diaphragm bleed ports 19500 and 19600, respectively, see FIGS. 19 and 28. The lockstep actuator 24200 resets.

State 54. The controller 11200 reasserts water pressure in the inlet line 11300 (e.g., by opening a master valve 11100).

States 55-63. Repeating States 4-12, with the loss of pressure in the diaphragm chamber 22200, the force of the water pressure in the inlet 11300 overcomes the spring compression 19400 and the diaphragm valve 7A opens, see FIG. 19. Water flows unobstructed from the inlet 11300 through the diaphragm valve 7A to the outlet 11510. The irrigation of Zone A begins.

States 64-71. States 13-20 are repeated. With the closing of the pilot valve port 27100, the diaphragm bleed port passage 19500 is effectively closed. Water pressure in the valve diaphragm chamber 22200 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7B closed. The irrigation of Zone B ends.

State 72. At the three hour mark, the controller 11200 briefly shuts off water pressure in the inlet line 11300 (e.g., by closing the master valve 11100).

States 73-75. Repeating States 22-24, with the pressure drop, the water in the lockstep actuator diaphragm chamber 28800 exits through the lockstep actuator passages 28900 and 28100 and diaphragm bleed ports 19500 and 19600, respectively, see FIGS. 19 and 28. The lockstep actuator 24100 resets.

States 76-78. Repeating States 25-27, with the pressure drop, the water in the lockstep actuator diaphragm chamber 28800 exits through the lockstep actuator passage 29900 and diaphragm bleed ports 22500, see FIG. 22 and FIG. 28. The lockstep actuator 24200 resets.

State 79. The controller 11200 reasserts water pressure in the inlet line 11300 (e.g., by opening a master valve 11100).

States 80-87. Repeating States 13-20, with the closing of the pilot valve port 27100, the diaphragm bleed port passage 19500 is effectively closed. Water pressure in the valve diaphragm chamber 22200 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7A closed. The irrigation of Zone A ends.

States 88-96. Repeating States 4-12, with the loss of pressure in the diaphragm chamber 22200, the force of the water pressure in the inlet 11300 overcomes the spring compression 19400 and the diaphragm valve 7A opens, see FIG. 19. Water flows unobstructed from the inlet 11300 through the diaphragm valve 7B to the outlet 11510. The irrigation of Zone B begins.

State 97. At the 4 hour mark, the controller shuts off water pressure in the inlet line 1 (e.g., by closing a valve) terminating the field irrigation for the day. The cycle repeats beginning the next morning at 6 AM.

Fourth Example Embodiment

The forth example operating environment illustrates the irrigation of a field using a different example embodiment of a lockstep actuator to that illustrated in Example 3. As in the other examples, the field is irrigated using a lockstep actuator per valve without manual labor or electrical power beyond the central pump and master valve, see FIG. 35. In this fourth example, a second type of diaphragm valve is used to further illustrate the flexibility of the actuator to interoperate with different diaphragm valve types. In this example, as in the third example, the fluid activated valve actuator (labeled a lockstep actuator) is mounted in the solenoid position in each of the diaphragm valves in the operating system, see FIG. 20 and FIG. 36.

Figure 35:
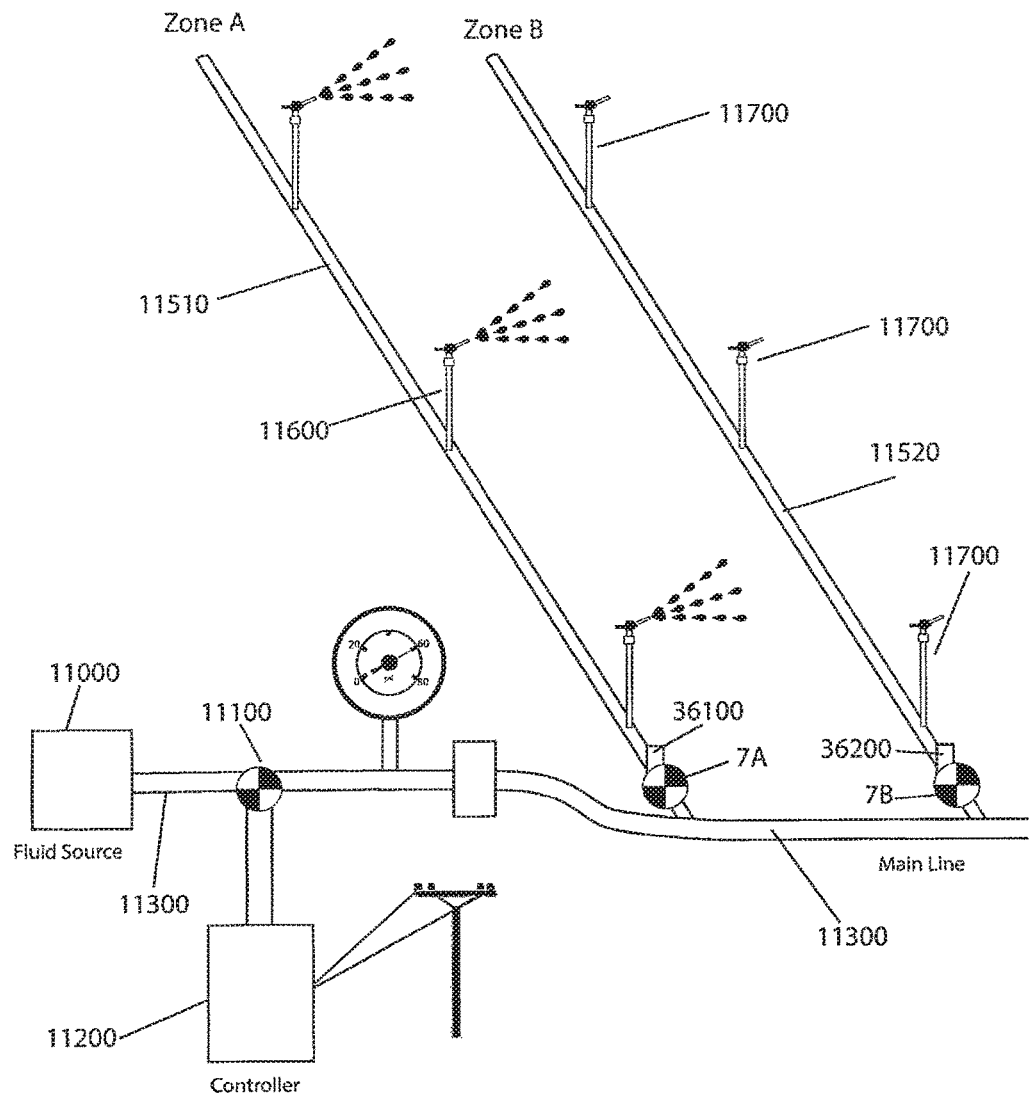
FIG. 35 depicts a fourth example operating environment for a fluid activated actuator assembly.

FIG. 35 illustrates the operating environment of a fourth example fluid activated actuator system. The operating environment consists of a pressurized water source (e.g., a water pump) 11000. The pressurized water is delivered using conventional water transport methods including, for example PVC pipes, to a master valve 11100. The master valve 11100, for example, is a conventional diaphragm valve. Attached to the master valve 11100 is a conventional valve controller 11200. The valve controller actuates the master valve 11100 into a closed or open position based upon a user configurable timing schedule. When the master valve 11100 is actuated into the on/open position by the controller 11200, pressurized fluid is released from the water source 11000 into the main line 11300. In this fourth example operating environment, the main water line 11300 is fluidly connected to 2 diaphragm valves 7A and 7B in a parallel circuit fashion. In this example, the diaphragm valves 7A and 7B are controlled via fluid activated lockstep actuators 36100 and 36200. The lockstep actuators 36100 and 36200 are mounted in the solenoid position of the diaphragm valve 7A and 7B, respectively. When the diaphragm valve 7A is in the on position, source water in the main line is delivered to a lateral water line 11510. When the diaphragm valve is in the off position, source water in the main line is prevented from flowing down the lateral water line 11510. Similarly, with respect to diaphragm valve 7B, when the diaphragm valve is in the on position, source water in the main line is delivered to the lateral water line 11520. When the diaphragm valve is in the off position, source water in the main line is prevented from flowing down the lateral water line 11520. Each lateral water line 11510 and 11520 is configured with a series of sprinklers 11600 and 11700, respectively. Water flowing through the lateral line exits the sprinklers and the field is thereby irrigated. Lastly, in this example, the diaphragm valves 7A and 7B are a considerable distance from the master valve (e.g., 250 yards or more) and at a considerable distance from each other.

In this fourth example, the lockstep actuators 36100 and 36200 replace two conventional solenoid-based actuators as illustrated in FIG. 36. In this example, the solenoids in the diaphragm valves 7A and 7B are replaced with lockstep actuators 36100 and 36200, see FIG. 36. In this example, no modification to the existing diaphragm valve is required. Optionally, the diaphragm valves are purchased by the user without solenoids and the lockstep actuators 36100 and 36200 are installed without a solenoid removal step. Optionally, the diaphragm valves are purchased with the lockstep actuators preinstalled.

In this sprinkler irrigation example, water is applied to a farm field using a timed schedule. Irrigation begins every day at 6 AM in the morning and cycles/alternates between Zone A and Zone B for periods of 1 hour. Irrigation of the field ends at 10 AM each day resulting in an irrigation total of 2 hours for each Zone. Zone A is covered by sprinklers 11600 and Zone B is covered by sprinklers 11700. The water source 11000 applies water fluid pressure to the main line, see FIG. 35.

State 1. The user manually actuates the lockstep actuator by pulling the manual setting knob 32800 until the actuator indicator 44100 indicates that the first actuator 7A is in a closed diaphragm valve position. The user manually actuates the lockstep actuator by pulling the manual setting knob 32800 until the actuator indicator 44100 indicates that the second actuator 7B is in an open diaphragm valve position. [In this example, manually actuating to a closed first valve and an open second valve will result in an initial open first valve when water pressure is applied. Conversely, in this example, manually actuating to an open first valve and a closed second valve will result in an initial closed first valve when water pressure is applied.]

State 2. In this example, at 6 AM the 11200 controller, which includes a timing mechanism 11200, opens the master control valve 11100.

State 3. Fluid begins to flow down the main line 11300 with the opening of the control valve 11100. The pressurized water flow moves down the main line 11300 and makes contact with the diaphragm valve 7A, see FIG. 35.

State 4. Fluid flows through the diaphragm valve passageway 31100 into the lockstep actuator 36100.

State 5. Fluid enters the actuator diaphragm chamber 32150 via the lockstep actuator passage 34200. As the actuator diaphragm chamber 32150 fills, the pressure from the fluid exerts a force against the push plate 32300 overcoming the return spring 32400 compression causing the push plate 32300 to move in a linear motion (e.g., in FIG. 32 upwards). In this example, the push plate 32300 is incased within a channel within the protective housing to ensure the linear direction of motion of the pressure disk.

State 6. A drive bar/leaf spring 32500 is fixed to the push plate 32300. In this example, the drive bar 32500 moves linearly in the direction of the rigid pressure disk 32300.

State 7. The drive bar 32500 is bent outward at the end. The end of the drive bar 32500 is in contact with a cog wheel 32600 and cog wheel post 19. The linear motion of the drive spring 32500 applies a force to the cog wheel post 19 which causes the cog wheel to advance 90 degrees.

State 8. In this example, the cog wheel 32600 is notched 33200, see FIG. 33. The actuator includes an anti-back rotational leaf spring which is fixed to the actuator housing. As the cog wheel advances in State 7, the anti-back rotational leaf spring makes contact with the cog wheel 32600 but does not impede the progress of the cog wheel 32600. In this example, as the cog wheel 32600 nears a 90 degree rotation, the anti-back rotational leaf spring clears the end of the notch 33200 in the cog wheel 32600 and is positioned to prevent back rotation when the push plate 32300 and coupled actuator diaphragm 32100 retracts (e.g., in response to the spring 32400 overcoming a drop in fluid pressure).

State 9. Cog wheel 32600 is fixed to a pilot valve shaft 34100 which rotates as the cog wheel 32600 rotates, see FIG. 32. In this example, a 90 degrees rotation of the pilot valve shaft port 34100 blocks the actuator fluid passage between passage 34500 and passage 34400. In addition, the pilot valve shaft port 34600 opens creating a passageway between actuator passage 34400 and actuator passage 34700 (e.g. to an open area outside of the diaphragm valve and associated lockstep actuator).

State 10. With the opening of the valve shaft port 34600, a passage is created through which water can exhaust from the valve diaphragm chamber 31200. The water exhausting from the diaphragm valve chamber 31200 causes the diaphragm 31300 to contract/compress in a linear motion (e.g., upward in FIG. 31 in reaction to water pressure from inlet 11300) causing the diaphragm valve 7A to open. Water flows unobstructed from the inlet 11300 through the diaphragm valve 7A to the outlet 11510. The irrigation of Zone A begins.

State 11. Returning to State 2. Fluid begins to flow down the main line 11300 with the opening of the control valve 11100. The pressurized water flow moves down the main line 11300 and makes contact with the diaphragm valve 7B, see FIG. 35.

State 12. Fluid flows through the diaphragm valve passageway 31100 into the lockstep actuator 36200.

State 13. Fluid enters the actuator diaphragm chamber 32150 via the lockstep actuator passage 34200. As the actuator diaphragm chamber 32150 fills, the pressure from the fluid exerts a force against the push plate 32300 overcoming the return spring 32400 compression causing the push plate 32300 to move in a linear motion (e.g., in FIG. 32 upwards). In this example, the push plate 32300 is incased within a channel within the protective housing to ensure the linear direction of motion of the pressure disk.

State 14. A drive bar/leaf spring 32500 is fixed to the push plate 32300. In this example, the drive bar 32500 moves linearly in the direction of the rigid pressure disk 32300.

State 15. The drive bar 32500 is bent outward at the end. The end of the drive bar 32500 is in contact with a cog wheel 32600 and cog wheel post 19. The linear motion of the drive spring 32500 applies a force to the cog wheel post 19 which causes the cog wheel to advance 90 degrees.

State 16. In this example, the cog wheel 32600 is notched 33200, see FIG. 33. The actuator includes an anti-back rotational leaf spring which is fixed to the actuator housing. As the cog wheel advances in State 15, the anti-back rotational leaf spring makes contact with the cog wheel 32600 but does not impede the progress of the cog wheel 32600. In this example, as the cog wheel 32600 nears a 90 degree rotation, the anti-back rotational leaf spring clears the end of the notch 33200 in the cog wheel 32600 and is positioned to prevent back rotation when the push plate 32300 and coupled actuator diaphragm 32100 retracts (e.g., in response to the spring 32400 overcoming a drop in fluid pressure).

State 17. Cog wheel 32600 is fixed to a pilot valve shaft 34100 which rotates as the cog wheel 32600 rotates, see FIG. 32. In this example, a 90 degrees rotation of the pilot valve aligns the pilot valve shaft port 34200 with passage 34500 and passage 34400 to allow fluid to flow through the actuator housing via the pilot valve shaft port 34200, and into the attached valve diaphragm chamber 31200, see FIG. 31 and FIG. 34. In addition, the pilot valve rotation changes the alignment of the pilot valve port 34600 so as to block the passageway between actuator passage 34700 and actuator passage 34400.

State 18. With the opening of the valve shaft port 34200, a fluid passage is created through which water can flow from the water inlet passage 11300, through: (a) the tubing 31100 connecting the inlet water flow with the actuator assembly, (b) the actuator inlet assembly passage 34500, (c) the pilot valve port 34200, (d) the outlet actuator passage 34400. The water flow entering the diaphragm valve causes the diaphragm 31300 to expand in a linear motion (e.g., downward in FIG. 31) causing the diaphragm valve 7B to close.

State 19. At the 1 hour mark, the controller 11200 briefly shuts off water pressure in the inlet line 11300 (e.g., by closing the master valve 11100).

State 20. With respect to both lockstep actuator 36100 and lockstep actuator 36200, the pressure drop causes the fluid in the lockstep actuator diaphragm chamber 32150 to exit through the lockstep actuator passages including 32900. With loss of pressure in the lockstep actuator diaphragm chamber 32150, the return spring 32400 exerts a force on the push plate 32300 causing linear motion (e.g., downward motion in FIG. 32).

State 21. A drive bar/leaf spring 32500 is fixed to the push plate 32300. In this example, the drive bar 32500 moves linearly in the direction of the rigid pressure disk 32300.

State 22. The drive bar 32500 is bent outward at the end. As the drive bar/leaf spring is driven along the cog wheel 32600 (e.g., downward in FIG. 32), the drive bar makes contact with the cog wheel post 19. The cog wheel post 19 bends the drive bar back until the drive bar 32500 clears the cog wheel post 19. As the drive bar is driven along the cog wheel 32600, the cog wheel 32600 is held in position by the anti-back rotational leaf spring which is in contact with a notch 33200 on the cog wheel 19. The lockstep actuator 36100 and lockstep actuator 36200 are now reset.

State 23. The controller 11200 reasserts water pressure in the inlet line 11300 (e.g., by opening a master valve 11100).

State 24. Fluid begins to flow down the main line 11300 with the opening of the control valve 11100. The pressurized water flow moves down the main line 11300 and makes contact with the diaphragm valve 7A, see FIG. 35.

State 25-31. Repeating States 12-18, with the opening of the pilot valve port 34200 and closing of the pilot valve 34600, the diaphragm bleed port passage 34400 is effectively closed. Water pressure in the valve diaphragm chamber 31200 begins to build. The diaphragm 31300 overcomes the pressure exerted by the inlet water pressure 11300 causes an expansion of the diaphragm linearly (e.g., downward in FIG. 31) causing diaphragm valve 7A to seal closed. The irrigation of Zone A ends.

State 32. Returning to State 23. Fluid begins to flow down the main line 11300 with the opening of the control valve 11100. The pressurized water flow moves down the main line 11300 and makes contact with the diaphragm valve 7B, see FIG. 35.

State 33-39. Repeating States 4-10, with the opening of the pilot valve 34600, a bleed water passage is created through which water can flow out of the diaphragm valve chamber 31200. With the loss of pressure in the diaphragm chamber 31200, the force of the water pressure in the inlet 11300 opens the diaphragm valve 7A, see FIG. 36. Water flows unobstructed from the inlet 11300 through the diaphragm valve 7B to the outlet 11520. The irrigation of Zone B begins.

State 40. At the 2 hour mark, the controller 11200 briefly shuts off water pressure in the inlet line 11300 (e.g., by closing the master valve 11100).

State 41-43. Repeating States 20-22, with respect to both lockstep actuator 36100 and lockstep actuator 36200, the pressure drop causes the fluid in the lockstep actuator diaphragm chamber 32150 to drain from the internal actuator passages including 32900 causing a reset of the lockstep actuator 36100 and lockstep actuator 36200.

State 44. The controller 11200 reasserts water pressure in the inlet line 113000 (e.g., by opening a master valve 11100).

State 45. Fluid begins to flow down the main line 11300 with the opening of the control valve 11100. The pressurized water flow moves down the main line 11300 and makes contact with the diaphragm valve 7A, see FIG. 35.

States 46-52. Repeating States 4-10, with the opening of the pilot valve 34600, a bleed water passage is created through which water can flow out of the diaphragm valve chamber 31200. With the loss of pressure in the diaphragm chamber 31200, the force of the water pressure in the inlet 11300 opens the diaphragm valve 7A, see FIG. 36. Water flows unobstructed from the inlet 11300 through the diaphragm valve 7A to the outlet 11520. The irrigation of Zone A begins.

State 53. Returning to State 45. Fluid begins to flow down the main line 11300 with the opening of the control valve 11100. The pressurized water flow moves down the main line 11300 and makes contact with the diaphragm valve 7B, see FIG. 35.

States 54-60. Repeating States 12-18, with the opening of the pilot valve port 34200 and closing of the pilot valve 34600, the diaphragm bleed port passage 34400 is effectively closed. Water pressure in the valve diaphragm chamber 31200 begins to build. The diaphragm 31300 overcomes the pressure exerted by the inlet water pressure 11300 causes an expansion of the diaphragm linearly (e.g., downward in FIG. 31) causing diaphragm valve 7B to seal closed. The irrigation of Zone B ends.

State 61. At the three hour mark, the controller 11200 briefly shuts off water pressure in the inlet line 11300 (e.g., by closing the master valve 11100).

State 62-64. Repeating States 20-22, with respect to both lockstep actuator 36100 and lockstep actuator 36200, the pressure drop causes the fluid in the lockstep actuator diaphragm chamber 32150 to drain from the internal actuator passages including 32900 causing a reset of the lockstep actuator 36100 and lockstep actuator 36200.

State 65. The controller 11200 reasserts water pressure in the inlet line 11300 (e.g., by opening a master valve 11100).

State 66. Fluid begins to flow down the main line 11300 with the opening of the control valve 11100. The pressurized water flow moves down the main line 11300 and makes contact with the diaphragm valve 7A, see FIG. 35.

States 67-73. Repeating States 12-18, with the opening of the pilot valve port 34200 and closing of the pilot valve 34600, the diaphragm bleed port passage 34400 is effectively closed. Water pressure in the valve diaphragm chamber 31200 begins to build. The diaphragm 31300 overcomes the pressure exerted by the inlet water pressure 11300 causes an expansion of the diaphragm linearly (e.g., downward in FIG. 31) causing diaphragm valve 7A to seal closed. The irrigation of Zone A ends.

State 74. Returning to State 67. Fluid begins to flow down the main line 11300 with the opening of the control valve 11100. The pressurized water flow moves down the main line 11300 and makes contact with the diaphragm valve 7B, see FIG. 35.

States 75-81. Repeating States 4-10, with the opening of the pilot valve 34600, a bleed water passage is created through which water can flow out of the diaphragm valve chamber 31200. With the loss of pressure in the diaphragm chamber 31200, the force of the water pressure in the inlet 11300 opens the diaphragm valve 7A, see FIG. 36. Water flows unobstructed from the inlet 11300 through the diaphragm valve 7B to the outlet 11520. The irrigation of Zone B begins.

State 82. At the 4 hour mark, the controller shuts off water pressure in the inlet line 1 (e.g., by closing a valve) terminating the field irrigation for the day. The cycle repeats beginning the next morning at 6 AM.

Fifth Example Embodiment

The fifth example operating environment, similar to the fourth example, illustrates the irrigation of a field using multiple fluid activated actuators without manual labor or electrical power beyond the central pump and master valve. In this example, the fluid activated valve actuator (labeled a lockstep actuator) is mounted in the solenoid position in each of the diaphragm valves in the operating system, see FIG. 20 and FIG. 45. The lockstep actuator, while designed using the same general concepts and principles as the actuators of the previous examples, employs slight variations in its design.

Figure 46:
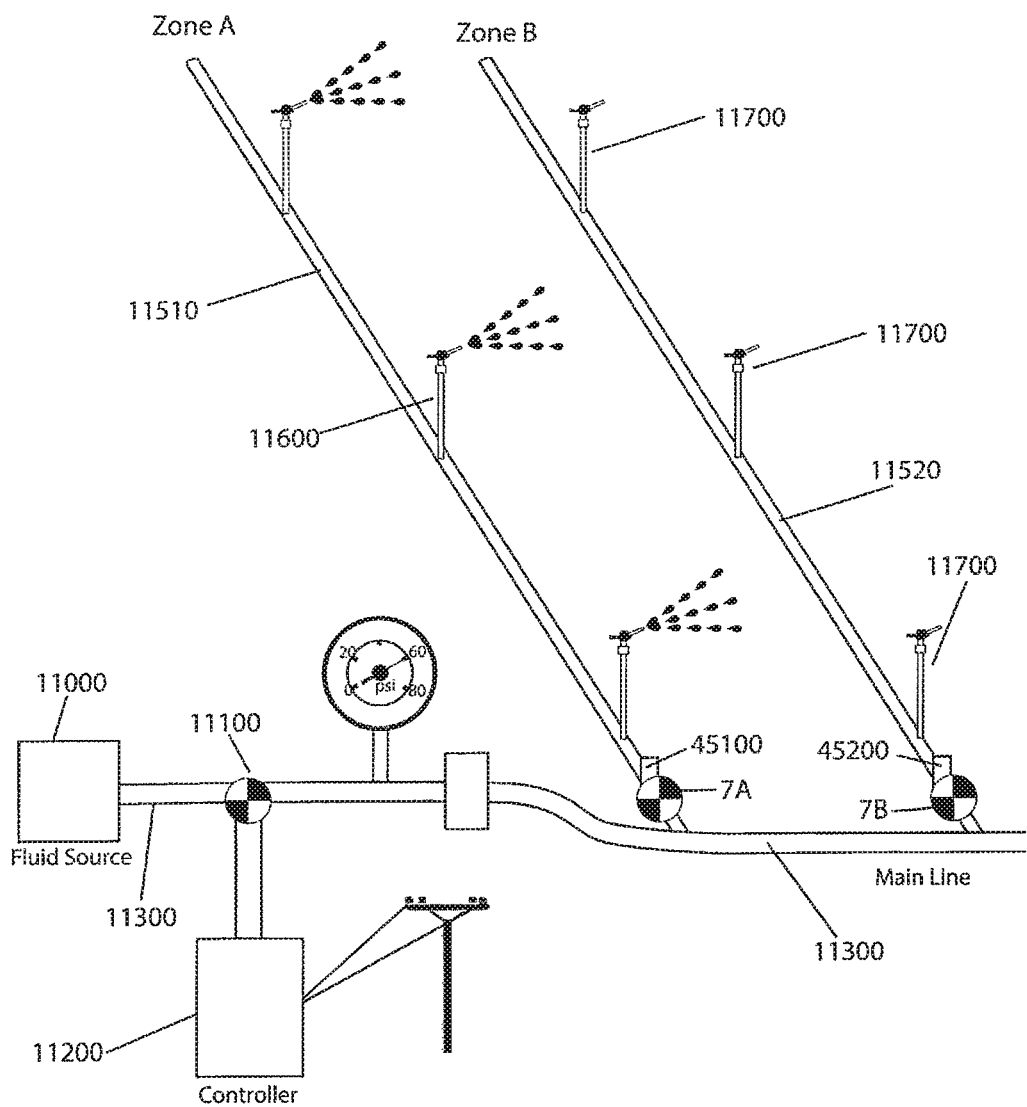
FIG. 46 depicts a fifth example operating environment for a fluid activated actuator assembly.

FIG. 46 illustrates the operating environment of this fifth example fluid activated actuator system which resembles that of the previous example fluid activated actuator system. The operating environment consists of a pressurized water source (e.g., a water pump) 11000. The pressurized water is delivered using conventional water transport methods including, for example PVC pipes, to a master valve 11100. The master valve 11100, for example, is a conventional diaphragm valve. Attached to the master valve 11100 is a conventional valve controller 11200. The valve controller actuates the master valve 11100 into a closed or open position based upon a user configurable timing schedule. When the master valve 11100 is actuated into the on/open position by the controller 11200, pressurized fluid is released from the water source 11000 into the main line 11300. In this example fifth operating environment, the main water line 11300 is fluidly connected to 2 diaphragm valves 7A and 7B in a parallel circuit fashion. In this example, the diaphragm valves 7A and 7B are controlled via fluid activated lockstep actuators 45100 and 45200. The lockstep actuators 45100 and 45200 are mounted in the solenoid position of the diaphragm valve 7A and 7B, respectively. When the diaphragm valve 7A is in the on position, source water in the main line is delivered to a lateral water line 11510. When the diaphragm valve is in the off position, source water in the main line is prevented from flowing down the lateral water line 11510. Similarly, with respect to diaphragm valve 7B, when the diaphragm valve is in the on position, source water in the main line is delivered to the lateral water line 11520. When the diaphragm valve is in the off position, source water in the main line is prevented from flowing down the lateral water line 11520. Each lateral water line 11510 and 11520 is configured with a series of sprinklers 11600 and 11700, respectively. Water flowing through the lateral line exits the sprinklers and the field is thereby irrigated. Lastly, in this example, the diaphragm valves 7A and 7B are a considerable distance from the master valve (e.g., 250 yards or more) and at a considerable distance from each other.

In this fifth example, the lockstep actuators 45100 and 45200 replace two conventional solenoid-based actuators as illustrated in FIG. 45. In this example, the solenoids in the diaphragm valves 7A and 7B are replaced with lockstep actuators 45100 and 45200, see FIG. 45. In this example, no modification to the existing diaphragm valve is required. Optionally, the diaphragm valves are purchased by the user without solenoids and the lockstep actuators 45100 and 45200 are installed without a solenoid removal step. Optionally, the diaphragm valves are purchased with the lockstep actuators preinstalled.

In this sprinkler irrigation example, water is applied to a farm field using a timed schedule. Irrigation begins every day at 6 AM in the morning and cycles/alternates between Zone A and Zone B for periods of 1 hour. Irrigation of the field ends at 10 AM each day resulting in an irrigation total of 2 hours for each Zone. Zone A is covered by sprinklers 11600 and Zone B is covered by sprinklers 11700. The water source 11000 applies water fluid pressure to the main line, see FIG. 46.

State 1. The user manually actuates the lockstep actuator by pulling the manual setting knob 48300 until the actuator indicator 44100 indicates that the first actuator 7A is in a closed diaphragm valve position. The user manually actuates the lockstep actuator by pulling the manual setting knob 36300 until the actuator indicator 44100 indicates that the second actuator 7B is in an open diaphragm valve position. [In this example, manually actuating to a closed first valve and an open second valve will result in an initial open first valve when water pressure is applied. Conversely, in this example, manually actuating to an open first valve and a closed second valve will result in an initial closed first valve when water pressure is applied.]

State 2. In this example, at 6 AM the 11200 controller, which includes a timing mechanism 11200, opens the master control valve 11100.

State 3. Fluid begins to flow down the main line 11300 with the opening of the control valve 11100. The pressurized water flow moves down the main line 11300 and makes contact with the diaphragm valve 7A, see FIG. 46.

State 4. Fluid flows through passages 22300 and 22500 into the lockstep actuator passage 41200 and 41220, see FIG. 22 and FIG. 42.

State 5. Fluid enters the actuator diaphragm chamber 41100 via the lockstep actuator passage 41200. As the actuator diaphragm chamber 41100 fills, the pressure from the fluid exerts a force against the push plate 32300 overcoming the return spring 32400 compression causing the push plate 32300 to move in a linear motion (e.g., in FIG. 41 upwards). In this example, the push plate 32300 is incased within a channel within the protective housing to ensure the linear direction of motion of the pressure disk.

State 6. A drive bar/leaf spring 32500 is fixed to the push plate 32300. In this example, the drive bar 32500 moves linearly in the direction of the push plate 32300.

State 7. The drive bar 32500 is bent outward at the end. The end of the drive bar 32500 is in contact with a cog wheel 32600 and cog wheel post 19. The linear motion of the drive spring 32500 applies a force to the cog wheel post 19 which causes the cog wheel to advance 90 degrees.

State 8. In this example, the cog wheel 32600 is notched 33200, see FIG. 33. The actuator includes an anti-back rotational leaf spring which is fixed to the actuator housing. As the cog wheel advances in State 7, the anti-back rotational leaf spring makes contact with the cog wheel 32600 but does not impede the progress of the cog wheel 32600. In this example, as the cog wheel 32600 nears a 90 degree rotation, the anti-back rotational leaf spring clears the end of the notch 33200 in the cog wheel 32600 and is positioned to prevent back rotation when the push plate 32300 and coupled actuator diaphragm 32150 retracts (e.g., in response to the spring 32400 overcoming a drop in fluid pressure).

State 9. Cog wheel 32600 is fixed to a cam shaft 41300 which rotates as the cog wheel 32600 rotates, see FIG. 43. In this example, a 90 degrees rotation of the cam shaft 41300 causes the post on the end of the cam shaft to apply a force to the plunger 41400. The force of the rotating cam shaft 41300 overcomes the plunger return spring 41450 compression and raises the plunger 41400. The unseating of the plunger creates a water passage from the bleed port inlet 22500 to the bleed port outlet 22600.

State 10. With the unseating of the plunger, a fluid passage is created through which water can exhaust from the valve diaphragm chamber 22200. The water exhausting from the diaphragm valve chamber 22200 causes the diaphragm 19700 to contract/compress in a linear motion (e.g., upward in FIG. 22 in reaction to the lack of internal diaphragm water pressure and the force of the inlet water pressure) causing the diaphragm valve 7A to open, see FIG. 19. Water flows unobstructed from the inlet 11300 through the diaphragm valve 7A to the outlet 11510. The irrigation of Zone A begins.

State 11. Returning to State 2. Fluid begins to flow down the main line 11300 with the opening of the control valve 11100. The pressurized water flow moves down the main line 11300 and makes contact with the diaphragm valve 7B, see FIG. 46.

State 12. Fluid flows through passages 19300 and 19500 into the lockstep actuator passage 41200 and 41220, see FIG. 19 and FIG. 42.

State 13. Fluid enters the actuator diaphragm chamber 41100 via the lockstep actuator passage 41200. As the actuator diaphragm chamber 41100 fills, the pressure from the fluid exerts a force against the push plate 32300 overcoming the return spring 32400 compression causing the push plate 32300 to move in a linear motion (e.g., in FIG. 32 upwards). Note, in this example, the pressure builds because there is sufficient pressure from the inlet 11300 via 31100 together with the shape of the diaphragm to overcome the spring compression. In this example, the push plate 32300 is incased within a channel within the protective housing to ensure the linear direction of motion of the pressure disk.

State 14. A drive bar/leaf spring 32500 is fixed to the push plate 32300. In this example, the drive bar 32500 moves linearly in the direction of the rigid pressure disk 32300.

State 15. The drive bar 32500 is bent outward at the end. The end of the drive bar 32500 is in contact with a cog wheel 32600 and cog wheel post 19. The linear motion of the drive spring 32500 applies a force to the cog wheel post 19 which causes the cog wheel to advance 90 degrees.

State 16. In this example, the cog wheel 32600 is notched 33200, see FIG. 33. The actuator includes an anti-back rotational leaf spring which is fixed to the actuator housing. As the cog wheel advances in State 15, the anti-back rotational leaf spring makes contact with the cog wheel 32600 but does not impede the progress of the cog wheel 32600. In this example, as the cog wheel 32600 nears a 90 degree rotation, the anti-back rotational leaf spring clears the end of the notch 33200 in the cog wheel 32600 and is positioned to prevent back rotation when the push plate 32300 and coupled actuator diaphragm 32100 retracts (e.g., in response to the spring 32400 overcoming a drop in fluid pressure).

State 17. Cog wheel 32600 is fixed to a cam shaft 41300 which rotates as the cog wheel 32600 rotates, see FIG. 32. In this example, a 90 degrees rotation of the cam shaft 41300 causes the post on the end of the cam shaft to move in a downward direction. The return spring 41450 compression causes the plunger 41400 to move downward until the plunger seats against diaphragm bleed water passage 19600, see FIG. 47.

State 18. With the closing of the diaphragm bleed water passage 19500, water pressure in the valve diaphragm chamber 19200 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7B closed. In this example, Zone B is not irrigated during the first hour.

State 19. At the 1 hour mark, the controller 11200 briefly shuts off water pressure in the inlet line 11300 (e.g., by closing the master valve 11100).

State 20. With respect to both lockstep actuator 45100 and lockstep actuator 45200, the pressure drop causes the fluid in the lockstep actuator diaphragm chamber 41100 to exit through the lockstep actuator internal passages. With loss of pressure in the lockstep actuator diaphragm chamber 41100, the return spring 32400 exerts a force on the push plate 32300 causing linear motion (e.g., downward motion in FIG. 41).

State 21. A drive bar/leaf spring 32500 is fixed to the push plate 32300. In this example, the drive bar 32500 moves linearly in the direction of the rigid pressure disk 32300.

State 22. The drive bar 32500 is bent outward at the end. As the drive bar/leaf spring is driven along the cog wheel 32600 (e.g., downward in FIG. 32), the drive bar makes contact with the cog wheel post 19. The cog wheel post 19 bends the drive bar back until the drive bar 32500 clears the cog wheel post 19. As the drive bar is driven along the cog wheel 32600, the cog wheel 32600 is held in position by the anti-back rotational leaf spring which is in contact with a notch 33200 on the cog wheel 19. The lockstep actuator 45100 and lockstep actuator 45200 are now reset.

State 23. The controller 11200 reasserts water pressure in the inlet line 113000 (e.g., by opening a master valve 11100).

State 24. Fluid begins to flow down the main line 11300 with the opening of the control valve 11100. The pressurized water flow moves down the main line 11300 and makes contact with the diaphragm valve 7A, see FIG. 46.

State 25-31. Repeating States 12-18, with the rotation of the cam shaft 41300 and the associated lowering of the plunger 41400 the diaphragm bleed port passage 19600 is blocked. Water pressure in the valve diaphragm chamber 19700 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7A closed. The irrigation of Zone A ends.

State 32. Returning to State 23. Fluid begins to flow down the main line 11300 with the opening of the control valve 11100. The pressurized water flow moves down the main line 11300 and makes contact with the diaphragm valve 7B, see FIG. 46.

State 33-39. Repeating States 4-10, with the rotation of the cam shaft 41300 and the associated raising of the plunger 41400 the diaphragm bleed port passage 19600 is opened. With the opening of the bleed water passage 22500, a passage is created through which water can flow out of the diaphragm valve chamber 31200 into bleed water passage 22500 and exhaust through bleed water passage 22600. With the loss of pressure in the diaphragm chamber 19200, the force of the water pressure in the inlet 11300 opens the diaphragm valve 7B, see FIG. 19. Water flows unobstructed from the inlet 11300 through the diaphragm valve 7B to the outlet 11520. The irrigation of Zone B begins.

State 40. At the 2 hour mark, the controller 11200 briefly shuts off water pressure in the inlet line 11300 (e.g., by closing the master valve 11100).

State 41-43. Repeating States 20-22, with respect to both lockstep actuator 45100 and lockstep actuator 45200, the pressure drop causes the fluid in the lockstep actuator diaphragm chamber 41100 to drain from internal passages causing a reset of the lockstep actuator 45100 and lockstep actuator 45200.

State 44. The controller 11200 reasserts water pressure in the inlet line 113000 (e.g., by opening a master valve 11100).

State 45. Fluid begins to flow down the main line 11300 with the opening of the control valve 11100. The pressurized water flow moves down the main line 11300 and makes contact with the diaphragm valve 7A, see FIG. 46.

States 46-52. Repeating States 4-10, with the rotation of the cam shaft 41300 and the associated raising of the plunger 41400 the diaphragm bleed port passage 19600 is opened. With the opening of the bleed water passage 22500, a passage is created through which water can flow out of the diaphragm valve chamber 31200 into bleed water passage 22500 and exhaust through bleed water passage 22600. With the loss of pressure in the diaphragm chamber 19200, the force of the water pressure in the inlet 11300 opens the diaphragm valve 7A, see FIG. 19. Water flows unobstructed from the inlet 11300 through the diaphragm valve 7A to the outlet 11520. The irrigation of Zone A begins.

State 53. Returning to State 45. Fluid begins to flow down the main line 11300 with the opening of the control valve 11100. The pressurized water flow moves down the main line 11300 and makes contact with the diaphragm valve 7B, see FIG. 46.

States 54-60. Repeating States 12-18, with the opening of the pilot valve port 34200 and closing of the pilot valve 34600, the diaphragm bleed port passage 34400 is effectively closed. Water pressure in the valve diaphragm chamber 31200 begins to build. The diaphragm 31300 overcomes the pressure exerted by the inlet water pressure 11300 causes an expansion of the diaphragm linearly (e.g., downward in FIG. 31) causing diaphragm valve 7B to seal closed. The irrigation of Zone B ends. Repeating States 11-18, with the rotation of the cam shaft 41300 and the associated lowering of the plunger 41400 the diaphragm bleed port passage 19600 is blocked. Water pressure in the valve diaphragm chamber 19700 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7B closed. The irrigation of Zone B ends.

State 61. At the three hour mark, the controller 11200 briefly shuts off water pressure in the inlet line 11300 (e.g., by closing the master valve 11100).

State 62-64. Repeating States 20-22, with respect to both lockstep actuator 45100 and lockstep actuator 45200, the pressure drop causes the fluid in the lockstep actuator diaphragm chamber 41100 to drain from internal passages causing a reset of the lockstep actuator 45100 and lockstep actuator 45200.

State 65. The controller 11200 reasserts water pressure in the inlet line 11300 (e.g., by opening a master valve 11100).

State 66. Fluid begins to flow down the main line 11300 with the opening of the control valve 11100. The pressurized water flow moves down the main line 11300 and makes contact with the diaphragm valve 7A, see FIG. 35.

States 67-73. Repeating States 12-18, with the rotation of the cam shaft 41300 and the associated lowering of the plunger 41400 the diaphragm bleed port passage 19600 is blocked. Water pressure in the valve diaphragm chamber 19700 begins to build. The shape of the diaphragm 22700 and return spring 22400 compression overcome the pressure exerted by the inlet water pressure 11300 causes an expansion of the diaphragm linearly (e.g., downward in FIG. 22) causing the spacer 22100 to seal the diaphragm valve 7A closed. The irrigation of Zone A ends.

State 74. Returning to State 67. Fluid begins to flow down the main line 11300 with the opening of the control valve 11100. The pressurized water flow moves down the main line 11300 and makes contact with the diaphragm valve 7B, see FIG. 35.

States 75-81. Repeating States 4-10, with the rotation of the cam shaft 41300 and the associated raising of the plunger 41400 the diaphragm bleed port passage 19600 is opened. With the opening of the bleed water passage 22500, a passage is created through which water can flow out of the diaphragm valve chamber 31200 into bleed water passage 22500 and exhaust through bleed water passage 22600. With the loss of pressure in the diaphragm chamber 19200, the force of the water pressure in the inlet 11300 opens the diaphragm valve 7B, see FIG. 19. Water flows unobstructed from the inlet 11300 through the diaphragm valve 7B to the outlet 11520. The irrigation of Zone B begins.

State 82. At the 4 hour mark, the controller shuts off water pressure in the inlet line 1 (e.g., by closing a valve) terminating the field irrigation for the day. The cycle repeats beginning the next morning at 6 AM.

What is claimed is:

1. A fluid regulator, comprising:
   a shaft configured with at least:
      a first lobe,
      a second lobe, and
      a crank;
   an electric motor configured with an electric circuit;
   a first housing, the first housing configured with at least:
      a first port configured to enable a bi-directional fluid path to a first set of output valves, and
      a second port configured to enable a bi-directional fluid path to a second set of output valves;
   a piston contained within the first housing, the piston in operative communication with the shaft via the crank, wherein the piston is capable of travel within the first housing;
   an actuator configured to:
      open the first set of output valves and close the second set of output valves at least partly in response to:
         receipt of an electrical signal at the electric motor, which causes the shaft to rotate towards a first shaft position and movement of the piston towards a first piston position,
         wherein the shaft rotation is stopped at the first shaft position and the movement of the piston is stopped at the first piston position at least partly in response to the first lobe of the shaft interfacing with the electric circuit while the shaft is rotating, which in turn causes, at least in part,
            the electric motor to reduce or halt power consumption, and while the piston of the actuator is at the first position,
               enable, a first fluid flow from the second port to the second set of output valves, and
               enable, a second fluid flow from the first set of output valves to the first port;
      close the first set of output valves and open the second set of output valves at least partly in response to:
         a subsequent electrical signal at the electric motor, which causes the shaft to rotate towards a second shaft position and movement of the piston towards a second piston position which in turn causes, at least in part,
            the second lobe of the rotating valve shaft to interface with the electric circuit, which in turn causes, at least in part, the shaft to stop at the second shaft position and the piston to stop at the second piston position, which in turn causes, at least in part,
               the electric motor to reduce or halt power consumption, and
               while the piston is at the second position,
                  a third fluid flow from the first port to the first set of output valves is enabled, and
                  a fourth fluid flow from the second set of output valves to the second port is enabled.

2. The fluid regulator as defined in claim 1, wherein the first set of output valves or the second set of output valves comprises a single output valve.

* * * * *